United States Patent
Kumon et al.

(10) Patent No.: US 10,219,650 B2
(45) Date of Patent: Mar. 5, 2019

(54) STIRRING MEMBER, ROTOR, AND RICE COOKER

(71) Applicant: SHARP KABUSHIKI KAISHA, Osaka-shi, Osaka (JP)

(72) Inventors: Yui Kumon, Osaka (JP); Masaki Ohtsuka, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 179 days.

(21) Appl. No.: 14/412,851

(22) PCT Filed: Jul. 5, 2013

(86) PCT No.: PCT/JP2013/068514
§ 371 (c)(1),
(2) Date: Jan. 5, 2015

(87) PCT Pub. No.: WO2014/007371
PCT Pub. Date: Jan. 9, 2014

(65) Prior Publication Data
US 2015/0190012 A1     Jul. 9, 2015

(30) Foreign Application Priority Data

Jul. 6, 2012 (JP) ................................ 2012-152551
Jul. 6, 2012 (JP) ................................ 2012-152552
(Continued)

(51) Int. Cl.
  *B01F 7/00*   (2006.01)
  *B01F 7/16*   (2006.01)
  (Continued)

(52) U.S. Cl.
  CPC ............... *A47J 36/00* (2013.01); *A47J 27/04* (2013.01); *A47J 43/0711* (2013.01);
  (Continued)

(58) Field of Classification Search
  CPC ........ A47J 27/04; A47J 36/00; A47J 43/0711; B01F 2215/0422; B01F 7/00058;
  (Continued)

(56) References Cited

U.S. PATENT DOCUMENTS

| | | | | |
|---|---|---|---|---|
| 4,023,780 A | * | 5/1977 | Egid | ..................... B01F 7/1655 366/206 |
| 6,247,837 B1 | * | 6/2001 | Wardberg | ........... B01F 7/00066 366/129 |

FOREIGN PATENT DOCUMENTS

| | | |
|---|---|---|
| JP | 58-110296 | 7/1983 |
| JP | 2000-308572 A | 11/2000 |

(Continued)

OTHER PUBLICATIONS

English Machine Translation CN103260478.*
(Continued)

*Primary Examiner* — Tu B Hoang
*Assistant Examiner* — Vy T Nguyen
(74) *Attorney, Agent, or Firm* — Birch, Stewart, Kolasch & Birch, LLP

(57) ABSTRACT

A stirring member rotating around an axis of rotation in a direction of rotation together with a rotor and stirring a stirred object accommodated in an inner pot includes a stirring portion, a cross-sectional shape of the stirring portion in a cross-section orthogonal to the axis of rotation has a front end portion located foremost in the direction of rotation, and when a virtual circle centered at the axis of rotation and passing through the front end portion is drawn, a tangential straight line in the front end portion of a centerline of the cross-sectional shape is directed inward in a direction of radius of rotation on a forward side of the direction of rotation with respect to a tangent in the front end portion of the virtual circle.

17 Claims, 73 Drawing Sheets

(30) Foreign Application Priority Data

Jul. 6, 2012 (JP) .................................. 2012-152553
Jul. 6, 2012 (JP) .................................. 2012-152554
Jul. 6, 2012 (JP) .................................. 2012-152555

(51) Int. Cl.
*B01F 7/18* (2006.01)
*A47J 27/04* (2006.01)
*A47J 36/00* (2006.01)
*A47J 43/07* (2006.01)

(52) U.S. Cl.
CPC ...... *B01F 7/00058* (2013.01); *B01F 7/00258* (2013.01); *B01F 7/00275* (2013.01); *B01F 7/16* (2013.01); *B01F 7/18* (2013.01); *B01F 2215/0422* (2013.01)

(58) Field of Classification Search
CPC .... B01F 7/00258; B01F 7/00275; B01F 7/16; B01F 7/18
USPC ................... 99/384, 348; 366/331, 241–251, 366/281–286, 308, 276–278; 259/114, 259/19, 39, 6, 111, 5, 21, 40, 64, 107, 259/108
See application file for complete search history.

(56) References Cited

FOREIGN PATENT DOCUMENTS

| | | | |
|---|---|---|---|
| JP | 2007-38123 A | 2/2007 | |
| JP | 2008-278924 A | 11/2008 | |
| JP | WO 2012077487 A1 * | 6/2012 | ............ A47J 27/004 |
| WO | WO 2012/077487 A1 | 6/2012 | |

OTHER PUBLICATIONS

International Search Report, dated Jul. 30, 2013, issued in PCT/JP2013/068514.
Japanese Notice of Grounds of Rejection for Japanese Patent Application No. 2016-137606 dated Apr. 25, 2017 with English language translation.

* cited by examiner

STIRRING MEMBER, ROTOR, AND RICE COOKER

TECHNICAL FIELD

The present invention relates to a stirring member, a rotor, and a rice cooker, and particularly to a stirring member stirring a stirred object accommodated in an inner pot, a rotor including the stirring member, and a rice cooker including the stirring member.

BACKGROUND ART

Japanese Patent Laying-Open No. 2000-308572 (PTD 1) is directed to a rice cooker. This rice cooker includes water flow generation means for causing water stored in an inner pot to flow. This publication states that, with this rice cooker, generation of water vapor can be suppressed and tasty cooked rice can be obtained.

Japanese Patent Laying-Open No. 2008-278924 (PTD 2) is directed to a rice cooker. This rice cooker includes a stirring element stirring a cooked rice object. The publication states that, with this rice cooker, a cooked rice object can be loosened after a steaming step, with a simplified construction.

CITATION LIST

Patent Document

PTD 1: Japanese Patent Laying-Open No. 2000-308572
PTD 2: Japanese Patent Laying-Open No. 2008-278924

SUMMARY OF INVENTION

Technical Problem

An object of the present invention is to provide a stirring member capable of more uniformly stirring the entire stirred object by forming such a flow as reaching the entire stirred object accommodated in an inner pot, a rotor including the stirring member, and a rice cooker including the stirring member.

Solution to Problem

A stirring member based on the present invention is a stirring member rotating around an axis of rotation in a prescribed direction of rotation together with a rotor and stirring a stirred object accommodated in an inner pot, which includes a first end portion pivotably supported by the rotor, a second end portion located opposite to the first end portion, and a stirring portion located between the first end portion and the second end portion, a cross-sectional shape of the stirring portion in a cross-section orthogonal to the axis of rotation has a front end portion located foremost in the direction of rotation, and when a virtual circle centered at the axis of rotation and passing through the front end portion is drawn, a tangential straight line in the front end portion of a centerline of the cross-sectional shape is directed inward in a direction of radius of rotation on a forward side of the direction of rotation with respect to a tangent in the front end portion of the virtual circle.

Preferably, the tangential straight line is directed inward in the direction of radius of rotation within a range not smaller than 5° and not larger than 50° on the forward side of the direction of rotation with respect to the tangent.

Preferably, the cross-sectional shape of the stirring portion is such that an interior angle formed in the front end portion is at an acute angle. Preferably, the cross-sectional shape of the stirring portion has an outer surface located on an outer side of the direction of radius of rotation, and the outer surface is directed inward in the direction of radius of rotation with respect to the direction of rotation.

Preferably, the cross-sectional shape of the stirring portion is formed to decrease in width in the direction of radius of rotation, from a portion at some midpoint in the direction of rotation toward an opposite side of the direction of rotation. Preferably, a portion of the stirring portion closer to the second end portion is formed as being tapered so as to decrease in thickness toward the second end portion. Preferably, a portion of the stirring portion closer to the second end portion has an extension portion formed, which extends inward in the direction of radius of rotation, toward the second end portion.

Preferably, the stirring portion has a rear edge portion located rearmost in the direction of rotation, and a portion of the rear edge portion closer to the second end portion is located on a rear side of the direction of rotation, relative to a portion of the rear edge portion closer to the first end portion. Preferably, when a direction of extension of the extension portion is viewed in a direction in parallel to the axis of rotation, a reference line connecting a center of rotation of the extension portion and a base end of the extension portion in the direction of extension to each other is formed and an angle formed between the direction of extension and the reference line is not smaller than 0° and not larger than 90°. Preferably, the stirring portion comes closer to the axis of rotation, from the first end portion toward the second end portion, and an angle formed between the stirring portion and a horizontal surface is not larger than 90°.

Preferably, the extension portion is formed as being curved toward the second end portion. Preferably, the stirring portion has an outer geometry formed substantially in a scoop shape. Preferably, a surface of the stirring portion has asperities formed.

A rotor based on one aspect of the present invention includes the stirring member based on the present invention and another stirring member identical or different in shape to or from the stirring member. A rotor based on another aspect of the present invention includes the stirring member based on the present invention, and the stirring member is driven such that the second end portion vertically moves when the stirring member stirs the stirred object accommodated in the inner pot. A rotor based on yet another aspect of the present invention includes one stirring member or a plurality of stirring members based on the present invention.

A rice cooker based on the present invention includes one stirring member or a plurality of stirring members based on the present invention.

Advantageous Effects of Invention

According to the present invention, a stirring member capable of more uniformly stirring the entire stirred object by forming such a flow as reaching the entire stirred object accommodated in an inner pot, a rotor including the stirring member, and a rice cooker including the stirring member can be obtained.

BRIEF DESCRIPTION OF DRAWINGS

FIG. 120 is a schematic diagram (a vertical cross-sectional view) showing the rotor and a stirring member (a movable member) in modification 8 of Embodiment 15.

FIG. 121 is another schematic diagram (a lateral cross-sectional view) showing the rotor and the stirring member (movable member) in modification 8 of Embodiment 15.

FIG. 122 is a schematic diagram (a lateral cross-sectional view) showing another construction of the rotor and a stirring member (a movable member) in modification 8 of Embodiment 15.

FIG. 123 is a schematic diagram showing a rotor and a stirring member (a movable member) in modification 9 of Embodiment 15.

FIG. 124 is a schematic diagram showing a rotor and a stirring member (a movable member) in modification 10 of Embodiment 15.

FIG. 125 is a schematic diagram showing a rotor and a stirring member (a movable member) in modification 11 of Embodiment 15.

FIG. 126 is a schematic diagram showing a rotor and a stirring member (a movable member) in modification 12 of Embodiment 15.

FIG. 127 is a perspective view showing a stirring member (a movable member) in modification 13 of Embodiment 15.

FIG. 128 is a left side view showing the stirring member (movable member) in modification 13 of Embodiment 15.

FIG. 129 is a right side view showing the stirring member (movable member) in modification 13 of Embodiment 15.

FIG. 130 is a rear view showing the stirring member (movable member) in modification 13 of Embodiment 15.

FIG. 131 is a front view showing the stirring member (movable member) in modification 13 of Embodiment 15.

DESCRIPTION OF EMBODIMENTS

Figure 1:
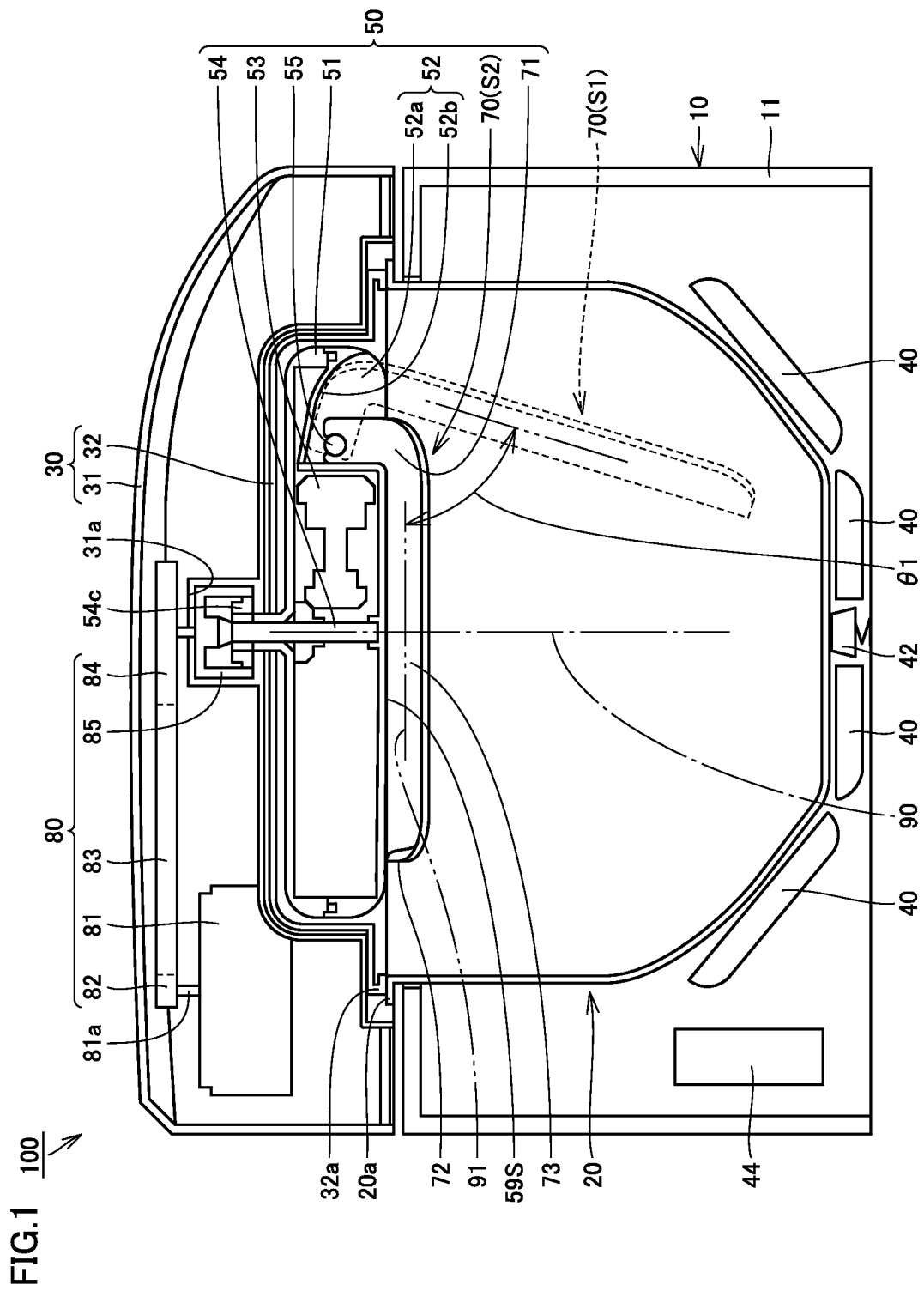
FIG. 1 is a cross-sectional view showing a rice cooker in Embodiment 1.

Each embodiment and each example based on the present invention will be described hereinafter with reference to the drawings. When the number, a quantity or the like is mentioned in the description of each embodiment and each example, the scope of the present invention is not necessarily limited to the number, the quantity or the like, unless otherwise specified. In the description of each embodiment and each example, the same or corresponding elements have the same reference characters allotted and redundant description may not be repeated. Combination for use of features shown in each embodiment and each example as appropriate is originally intended, unless otherwise restricted.

Embodiment 1

Rice Cooker 100

A rice cooker 100 in the present embodiment will be described with reference to FIG. 1. Rice cooker 100 is used, for example, as one of household or commercial cooking apparatuses. Rice cooker 100 includes a main body 10, an inner pot 20, a lid body 30, a heating portion 40, a temperature sensor 42, a control unit 44, a rotor 50, and a driving mechanism 80.

Though details will be described later, rotor 50 includes a stirring member 70 (a movable member). Stirring member 70 has a first end portion 71 pivotably supported by a pivot shaft 55 of rotor 50, a second end portion 72 located opposite to first end portion 71, and a stirring portion 73 located between first end portion 71 and second end portion 72. Stirring member 70 rotates around an axis of rotation 90 together with rotor 50, as rotor 50 rotates.

Main body 10 accommodates inner pot 20. Main body 10 includes an outer case 11 and an inner case (not shown) arranged on an inner side of outer case 11. This inner case is formed of a material having resistance to heat and an electrically insulating property. This inner case holds inner pot 20. Inner pot 20 is molded from a cladding material containing a magnetic material. An opening is provided in a top portion of inner pot 20, and an annular flange portion 20a is provided around an edge of this opening. A stirred object (not shown) such as rice and/or water is accommodated in inner pot 20.

Lid body 30 is attached to a top portion of main body 10 and opens and closes the opening of inner pot 20. Lid body 30 includes an outer lid 31 and an inner lid 32. Outer lid 31 is supported by main body 10 and pivots around a portion supported by main body 10. A recess 31a is provided in outer lid 31 on a side of inner pot 20. A drive-side coupling 85 (details of which will be described later) is accommodated in recess 31a.

Inner lid 32 is arranged in outer lid 31 on the side of inner pot 20 and removably attached to outer lid 31. Inner lid 32 has an outer circumferential edge portion 32a, an insertion hole 32b (see FIGS. 3 and 4), and a vapor hole (not shown). Outer circumferential edge portion 32a of inner lid 32 is formed, for example, of an elastic material having resistance to heat. Outer circumferential edge portion 32a of inner lid 32 and a portion other than outer circumferential edge portion 32a of inner lid 32 are desirably formed of materials different from each other.

When lid body 30 closes the opening of inner pot 20, outer circumferential edge portion 32a of inner lid 32 is in intimate contact with an upper surface of flange portion 20a of inner pot 20. Outer circumferential edge portion 32a is sealed against flange portion 20a so that leakage of rice gruel therebetween is suppressed. Vapor generated in inner pot 20 is emitted to the outside of rice cooker 100 through the vapor hole (not shown).

Heating portion 40, temperature sensor 42, and control unit 44 are arranged in a lower portion of main body 10. Heating portion 40 is implemented, for example, by an induction coil, and it inductively heats inner pot 20. Heating portion 40 may heat inner pot 20 with resistance heating. Temperature sensor 42 senses a temperature of inner pot 20. Control unit 44 is arranged in a space between outer case 11 and the inner case. Control unit 44 controls an amount of induction heating by heating portion 40 or controls rotational driving force from a motor 81 (details of which will be described next).

Driving mechanism 80 includes motor 81, a small pulley 82, a belt 83, a large pulley 84, and drive-side coupling 85. Motor 81, small pulley 82, belt 83, large pulley 84, and drive-side coupling 85 are arranged in outer lid 31.

Motor 81 has a rotation shaft 81a. Small pulley 82 is fixed to rotation shaft 81a. Belt 83 is wound around a part of an outer circumference of small pulley 82 and a part of an outer circumference of large pulley 84. Large pulley 84 is coupled to drive-side coupling 85. Rotational driving force from motor 81 is transmitted to drive-side coupling 85 through small pulley 82, belt 83, and large pulley 84.

When small pulley 82, belt 83, and large pulley 84 transmit rotational driving force, drive-side coupling 85 is higher in rotation speed than rotation shaft 81a of motor 81. A ratio of the rotation speed of drive-side coupling 85 to the rotation speed of rotation shaft 81a of motor 81 is adjusted to any value by changing a size of small pulley 82 and/or a size of large pulley 84.

Drive-side coupling 85 is substantially in a cup shape. An inner surface of drive-side coupling 85 has asperities provided. Drive-side coupling 85 is accommodated in recess 31a provided in outer lid 31 on the side of inner pot 20. A driven-side coupling 54c of rotor 50 (details of which will be described later) is fitted into drive-side coupling 85. As driven-side coupling 54c is fitted into drive-side coupling 85, inner lid 32 and rotor 50 are attached to lid body 30.

(Rotor 50)

Figure 2:
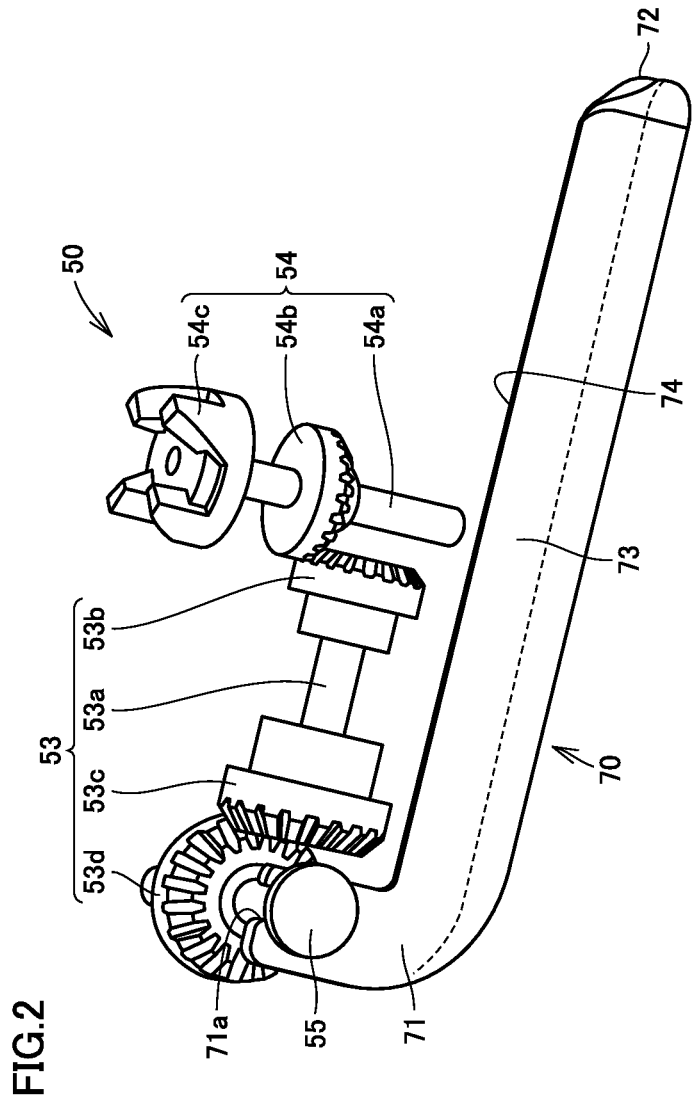
FIG. 2 is a perspective view showing an internal structure of a rotor included in the rice cooker in Embodiment 1.

FIG. 2 is a perspective view showing an internal structure of rotor 50 included in rice cooker 100. As shown in FIGS. 1 and 2, rotor 50 includes frame bodies 51 and 52 (see FIG. 1), transmission mechanisms 53 and 54, pivot shaft 55, and stirring member 70. For the sake of convenience of illustration, FIG. 2 does not show frame bodies 51 and 52. Rotor 50 is arranged in lid body 30 on the side of inner lid 32 and rotates around axis of rotation 90.

As shown in FIG. 1, frame body 52 has an accommodation portion 52a and a standing stopper 52b. Accommodation portion 52a and standing stopper 52b are formed, for example, of an elastic material having resistance to heat. First end portion 71 of stirring member 70 and pivot shaft 55 are arranged in accommodation portion 52a. First end portion 71 of stirring member 70 is pivotably supported by pivot shaft 55 on a surface 59S opposed to inner pot 20.

Stirring portion 73 of stirring member 70 can selectively form a standing state 51 substantially in parallel to axis of rotation 90 of rotor 50 and a turned-down state S2 substantially perpendicular to axis of rotation 90 of rotor 50 as it pivots around first end portion 71.

As shown with a dotted line in FIG. 1, while stirring portion 73 of stirring member 70 forms standing state 51, first end portion 71 of stirring member 70 abuts to standing stopper 52b of frame body 52. Second end portion 72 of stirring member 70 moves away from frame body 51 of rotor 50 (surface 59S of rotor 50 which is opposed to inner pot 20) and is arranged in the vicinity of a bottom portion of inner pot 20.

As shown with a solid line in FIG. 1, while stirring portion 73 of stirring member 70 forms turned-down state S2, a gap is formed between first end portion 71 of stirring member 70 and standing stopper 52b of frame body 52. First end portion 71 of stirring member 70 does not abut to standing stopper 52b of frame body 52. Second end portion 72 of stirring member 70 is arranged at a position proximate to frame body 51 of rotor 50 (surface 59S of rotor 50 which is opposed to inner pot 20).

While stirring portion 73 of stirring member 70 forms standing state 51, stirring portion 73 comes closer to axis of rotation 90, from first end portion 71 toward second end portion 72, and an angle θ1 formed between stirring portion 73 and a horizontal surface 91 (a rotational plane) is desirably not larger than 90°. More preferably, angle θ1 is not smaller than 80° and not larger than 85°. Angle θ1 can be set to any value by adjusting a shape of first end portion 71 and/or a shape of standing stopper 52b.

As shown in FIG. 2, transmission mechanism 53 of rotor 50 has a transmission shaft 53a and miter gears 53b to 53d. Transmission mechanism 54 of rotor 50 has a transmission shaft 54a, a miter gear 54b, and driven-side coupling 54c.

Transmission shaft 53a of transmission mechanism 53 is arranged between frame body 51 (see FIG. 1) and frame body 52 (see FIG. 1). Transmission shaft 53a is substantially orthogonal to transmission shaft 54a of transmission mechanism 54. Miter gear 53b is provided at one end portion of transmission shaft 53a and meshes with miter gear 54b of transmission mechanism 54. Miter gear 53c is provided at the other end portion of transmission shaft 53a and meshes with miter gear 53d. Miter gear 53d is fixed to one end portion of pivot shaft 55.

Transmission shaft 54a of transmission mechanism 54 passes through frame body 51 (see FIG. 1) and can rotate with respect to frame bodies 51 and 52 (see FIG. 1). Miter gear 54b is provided in a central portion of transmission shaft 54a. Driven-side coupling 54c is provided at one end portion of transmission shaft 54a. An upper surface of driven-side coupling 54c (a surface on a side of outer lid 31) has asperities provided. The asperities provided in driven-side coupling 54c are engaged with asperities provided in the inner surface of drive-side coupling 85 (see FIG. 1).

A notch 71a (see FIG. 2) is provided in first end portion 71 of stirring member 70. A central portion of pivot shaft 55 is removably fitted into notch 71a. As pivot shaft 55 rotates, stirring member 70 pivots around pivot shaft 55. Upon receiving motive power transmitted from motor 81 (see FIG. 1), pivot shaft 55 pivots. As a result of pivot of pivot shaft 55, stirring portion 73 of stirring member 70 can selectively form standing state S1 and turned-down state S2 (details of which will be described later with reference to FIGS. 5 and 6).

Figure 3:
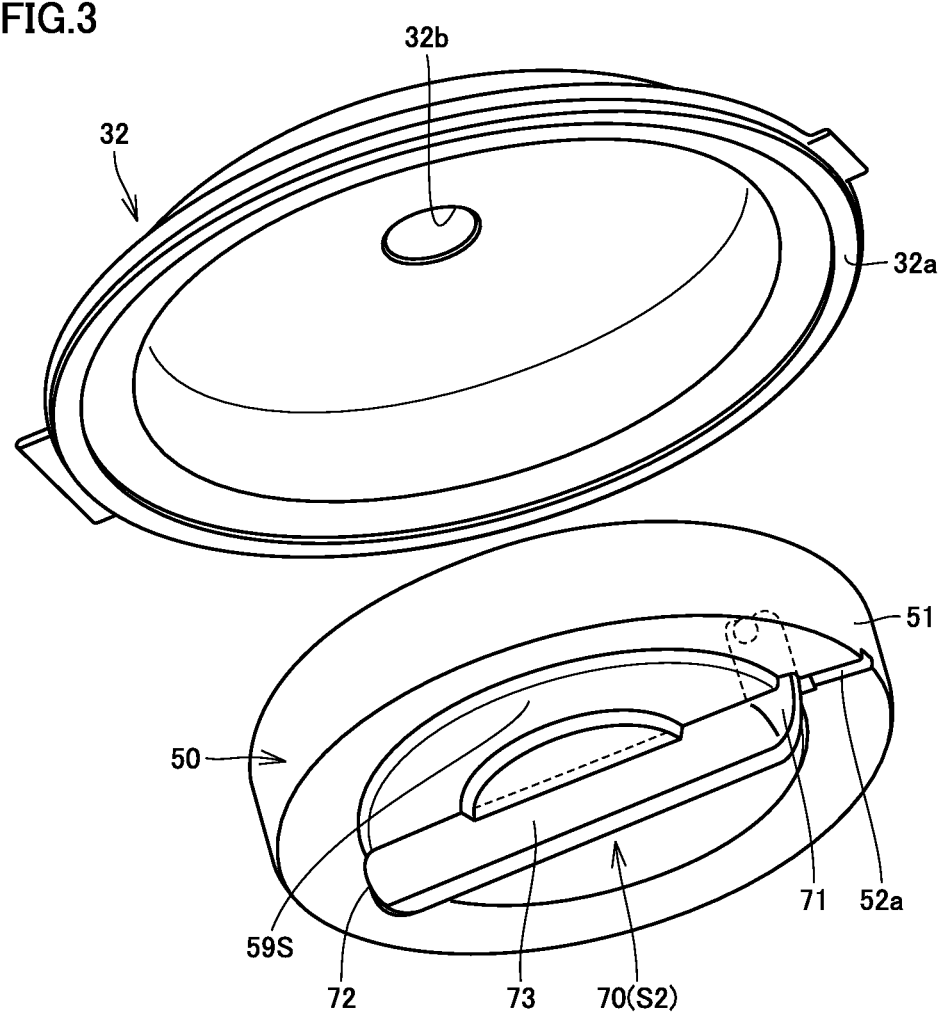
FIG. 3 is a perspective view showing a lower side of an inner lid and the rotor included in the rice cooker in Embodiment 1.
Figure 4:
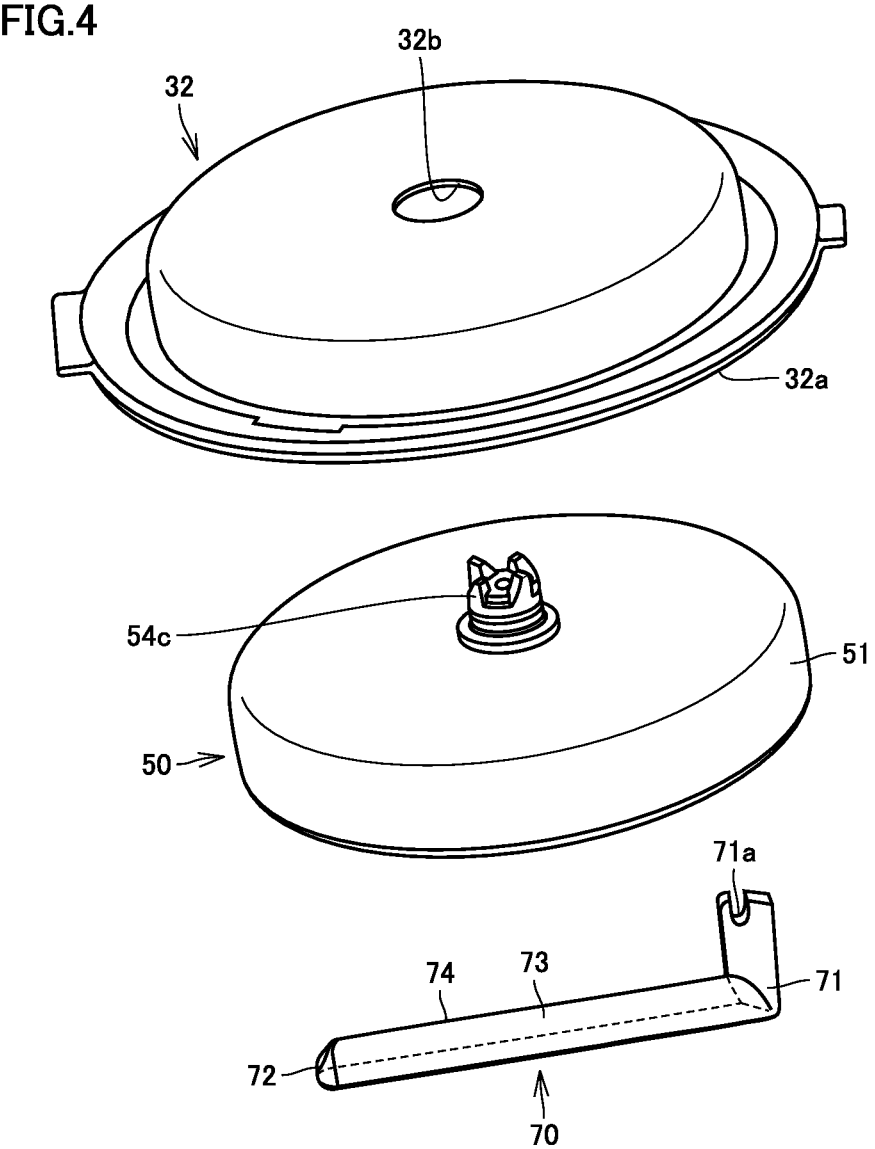
FIG. 4 is a perspective view showing an upper side of the inner lid and the rotor included in the rice cooker in Embodiment 1.

FIG. 3 is a perspective view showing a lower side of inner lid 32 and rotor 50. In FIG. 3, a state that inner lid 32 is removed from outer lid 31 (see FIG. 1) and rotor 50 is removed from inner lid 32 is shown. FIG. 4 is a perspective view showing an upper side of inner lid 32 and rotor 50. In FIG. 4, a state that inner lid 32 is removed from outer lid 31 (see FIG. 1), rotor 50 is removed from inner lid 32, and stirring member 70 is removed from frame body 51 of rotor 50 is shown. For the sake of convenience of illustration, the vapor hole in inner lid 32 in FIGS. 3 and 4 is not shown.

As shown in FIGS. 3 and 4, insertion hole 32b is provided in inner lid 32. Driven-side coupling 54c (see FIG. 4) is inserted in insertion hole 32b. Rotor 50 includes a sealing material (not shown) such as an O ring, and has such a structure that water does not enter rotor 50. Rotor 50 is constructed to be attachable to and removable from inner lid 32. While rotor 50 is removed from inner lid 32, rotor 50 can readily be washed.

An outer surface of rotor 50 has been subjected to non-adhesive treatment (for example, fluorine coating treatment). An inner surface of rotor 50 has also been subjected to non-adhesive treatment similar to that for the outer surface of rotor 50. Non-adhesive treatment can facilitate washing of rotor 50.

While stirring portion 73 of stirring member 70 forms turned-down state S2, a part of stirring portion 73 protrudes from surface 59S of rotor 50 which is opposed to inner pot 20 (see FIG. 3). As described above, stirring member 70 is coupled to pivot shaft 55 by fitting the central portion of pivot shaft 55 (see FIG. 2) into notch 71a (see FIG. 4).

While stirring portion 73 of stirring member 70 forms turned-down state S2, stirring member 70 can readily be removed from pivot shaft 55 by moving stirring member 70 away from pivot shaft 55 of rotor 50 in a direction substantially in parallel to axis of rotation 90 of rotor 50 (see FIG. 1). In a state that stirring member 70 has been removed from pivot shaft 55, stirring member 70 can readily be washed.

Figure 5:
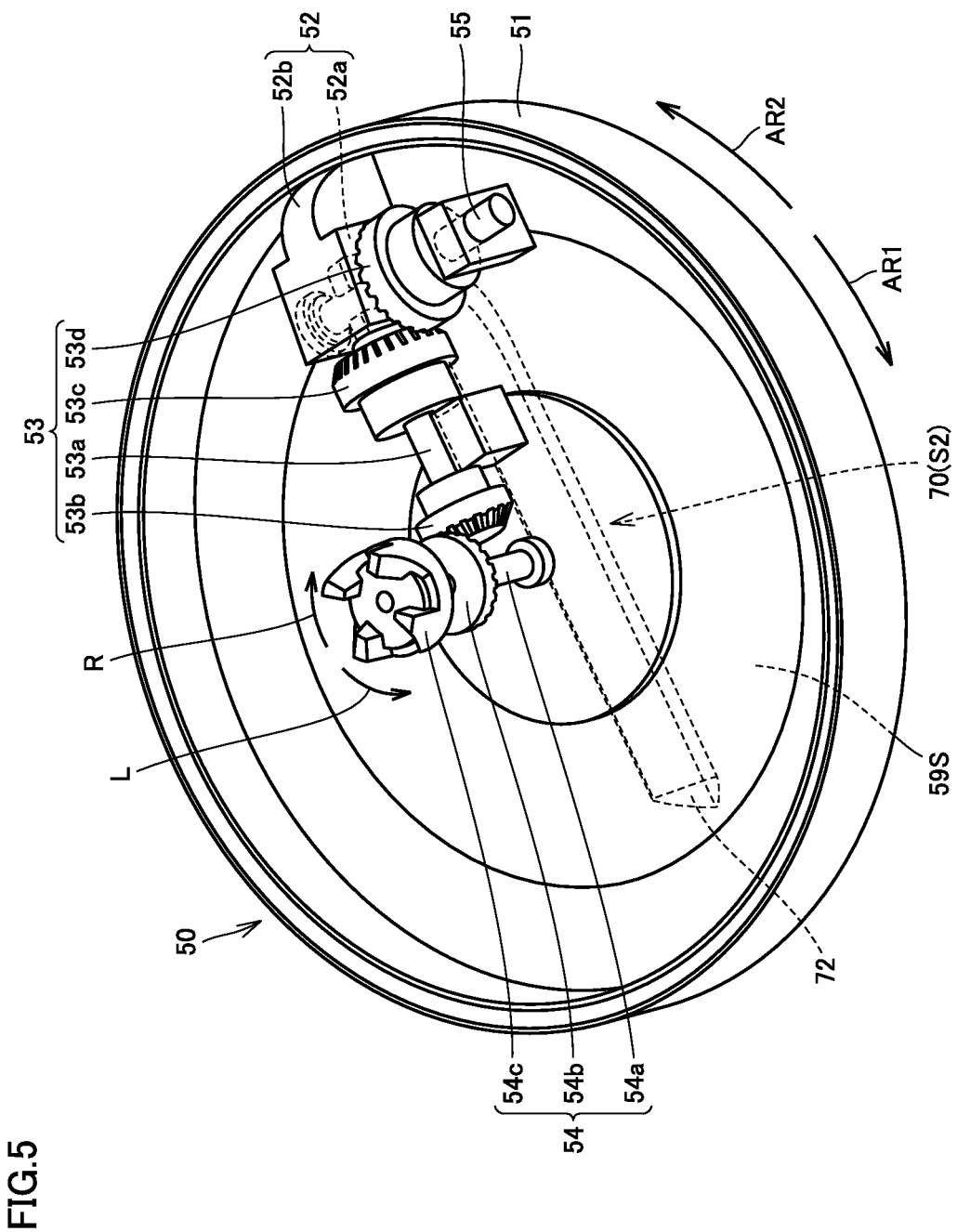
FIG. 5 is a perspective view showing the rotor while a stirring member (a movable member) in Embodiment 1 forms a turned-down state.
Figure 6:
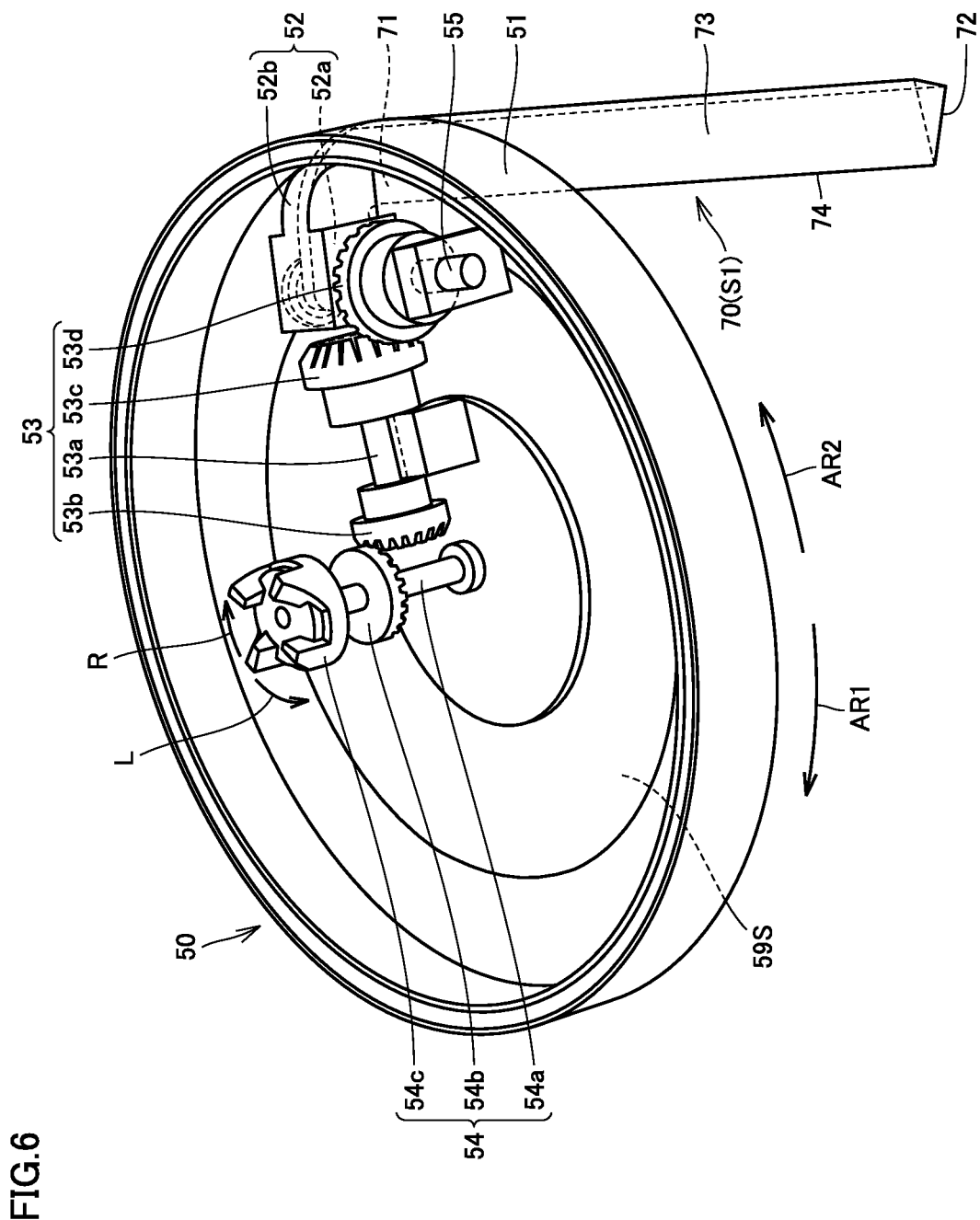
FIG. 6 is a perspective view showing the rotor while the stirring member (movable member) in Embodiment 1 forms a standing state.

FIG. 5 is a perspective view showing rotor 50 when stirring portion 73 of stirring member 70 forms turned-down state S2. FIG. 6 is a perspective view showing rotor 50 while stirring portion 73 of stirring member 70 forms standing state S1.

In a state shown in FIG. 5, when driven-side coupling 54c which has received motive power from motor 81 (see FIG. 1) rotates in a direction shown with an arrow R, miter gear 54b also rotates in the direction shown with arrow R. When miter gear 54b rotates in the direction shown with arrow R, miter gear 53b, transmission shaft 53a, miter gear 53c, and miter gear 53d also rotate with respect to frame body 52. Stirring member 70 pivots in a direction in which second end portion 72 moves away from surface 59S of rotor 50 which is opposed to inner pot 20 (see FIG. 1). While stirring member 70 is pivoting, rotor 50 rests against inner lid 32 (see FIG. 1).

As shown in FIG. 6, as first end portion 71 of stirring member 70 abuts to standing stopper 52b, pivot of stirring member 70 stops. Miter gear 53b, transmission shaft 53a, miter gear 53c, and miter gear 53d cannot rotate with respect to frame body 52.

When driven-side coupling 54c and miter gear 54b rotate in the direction shown with arrow R in this state, rotor 50 rotates in a direction shown with an arrow AR1 (a first direction of rotation) with respect to inner lid 32 (see FIG. 1). Stirring member 70 is rotationally driven in the direction shown with arrow AR1 (the first direction of rotation) around axis of rotation 90 (see FIG. 1) together with rotor 50 while it forms standing state 51. Stirring member 70 can stir a stirred object accommodated in inner pot 20 (see FIG. 1).

When driven-side coupling 54c which has received motive power from motor 81 (see FIG. 1) rotates in a direction shown with an arrow L in a state shown in FIG. 6, miter gear 54b also rotates in the direction shown with arrow L. When miter gear 54b rotates in the direction shown with arrow L, miter gear 53b, transmission shaft 53a, miter gear 53c, and miter gear 53d also rotate with respect to frame body 52. Stirring member 70 pivots in a direction in which second end portion 72 moves toward surface 59S of rotor 50 which is opposed to inner pot 20 (see FIG. 1). While stirring member 70 is pivoting, rotor 50 rests against inner lid 32 (see FIG. 1).

As shown in FIG. 5, as second end portion 72 of stirring member 70 abuts to surface 59S of rotor 50 which is opposed to inner pot 20 (see FIG. 1), pivot of stirring member 70 stops. Miter gear 53b, transmission shaft 53a, miter gear 53c, and miter gear 53d cannot rotate with respect to frame body 52.

When driven-side coupling 54c and miter gear 54b rotate in the direction shown with arrow L in this state, rotor 50 rotates in a direction shown with an arrow AR2 (a second direction of rotation) with respect to inner lid 32 (see FIG. 1). Stirring member 70 rotates in the direction shown with arrow AR2 (the second direction of rotation) around axis of rotation 90 (see FIG. 1) together with rotor 50 while it forms turned-down state S2. Here, stirring member 70 does not stir a stirred object accommodated in inner pot 20 (see FIG. 1).

(Stirring Member 70)

Figure 7:
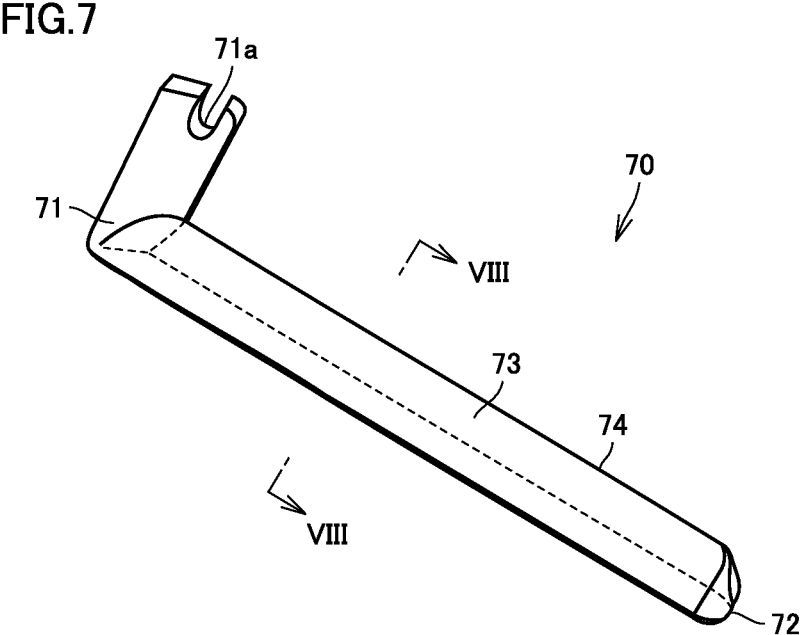
FIG. 7 is a perspective view showing the stirring member (movable member) in Embodiment 1.
Figure 8:
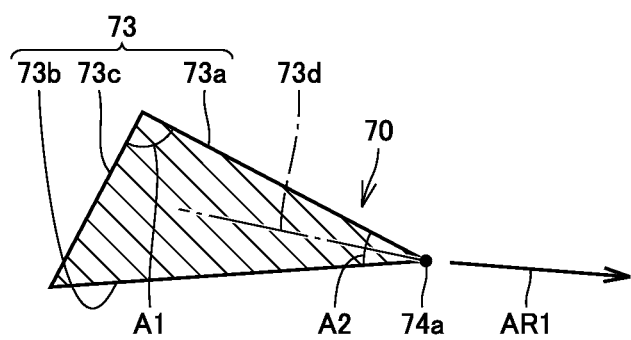
FIG. 8 is a cross-sectional view in a direction shown with an arrow along the line VIII-VIII in FIG. 7.

Referring to FIGS. 7 and 8, stirring member 70 in the present embodiment will be described in detail. FIG. 7 is a perspective view showing stirring member 70. FIG. 8 is a cross-sectional view in a direction shown with an arrow along the line VIII-VIII in FIG. 7. Arrow AR1 shown in FIG. 8 corresponds to arrow AR1 shown in FIGS. 5 and 6 and indicates the direction of rotation (the first direction of rotation) of stirring member 70. Arrow AR1 shown in FIG. 9 and the following drawings also corresponds to arrow AR1 shown in FIGS. 5 and 6 and indicates the direction of rotation (the first direction of rotation) of stirring member 70. Arrow AR2 shown in FIG. 9 and the following drawings also corresponds to arrow AR2 shown in FIGS. 5 and 6 and indicates another direction of rotation (the second direction of rotation) of stirring member 70.

As shown in FIG. 7, stirring member 70 (movable member) includes first end portion 71, second end portion 72 located opposite to first end portion 71, and stirring portion 73 (movable portion) located between first end portion 71 and second end portion 72. A resin having resistance to heat is desirably employed as a material for stirring member 70. A resin having resistance to heat is exemplified, for example, by polyacetal (POM) or a fluorine-based resin.

As described above, notch 71a is formed in first end portion 71. First end portion 71 is pivotably supported by pivot shaft 55 (see FIG. 2) of rotor 50 (see FIG. 2). Stirring portion 73 has a stirring front edge portion 74. Stirring front edge portion 74 is located foremost in the direction of rotation (the direction shown with arrow AR1) of stirring member 70 when stirring member 70 forming standing state S1 rotates in the direction shown with arrow AR1 (see FIGS. 6 and 8).

FIG. 8 shows a cross-sectional shape of stirring portion 73 in a cross-section orthogonal to axis of rotation 90 (see FIG. 1). As shown in FIG. 8, stirring portion 73 of stirring member 70 has an outer surface 73a located on an outer side of a direction of radius of rotation, an inner surface 73b located on an inner side of the direction of radius of rotation, and a rear end surface 73c located on a rear side of the direction of rotation (the direction shown with arrow AR1) when stirring member 70 stirs a stirred object.

Stirring member 70 in the present embodiment has a cross-section in a shape of a right triangle. Stirring member 70 may have a cross-section in a shape of a trapezoid. An angle A1 between outer surface 73a and rear end surface 73c is set to 90° and an angle A2 between outer surface 73a and inner surface 73b is set to 30°. A front end portion 74a is formed between outer surface 73a and inner surface 73b and an interior angle formed in front end portion 74a is at an acute angle.

Front end portion 74a corresponds to stirring front edge portion 74 (see FIG. 7) and is located foremost in the direction of rotation (the direction shown with arrow AR1) at the time when stirring member 70 stirs a stirred object. A centerline 73d is virtually formed from front end portion 74a toward rear end surface 73c. Centerline 73d formed in stirring member 70 is a bisector of an angle formed between outer surface 73a and inner surface 73b.

Figure 9:
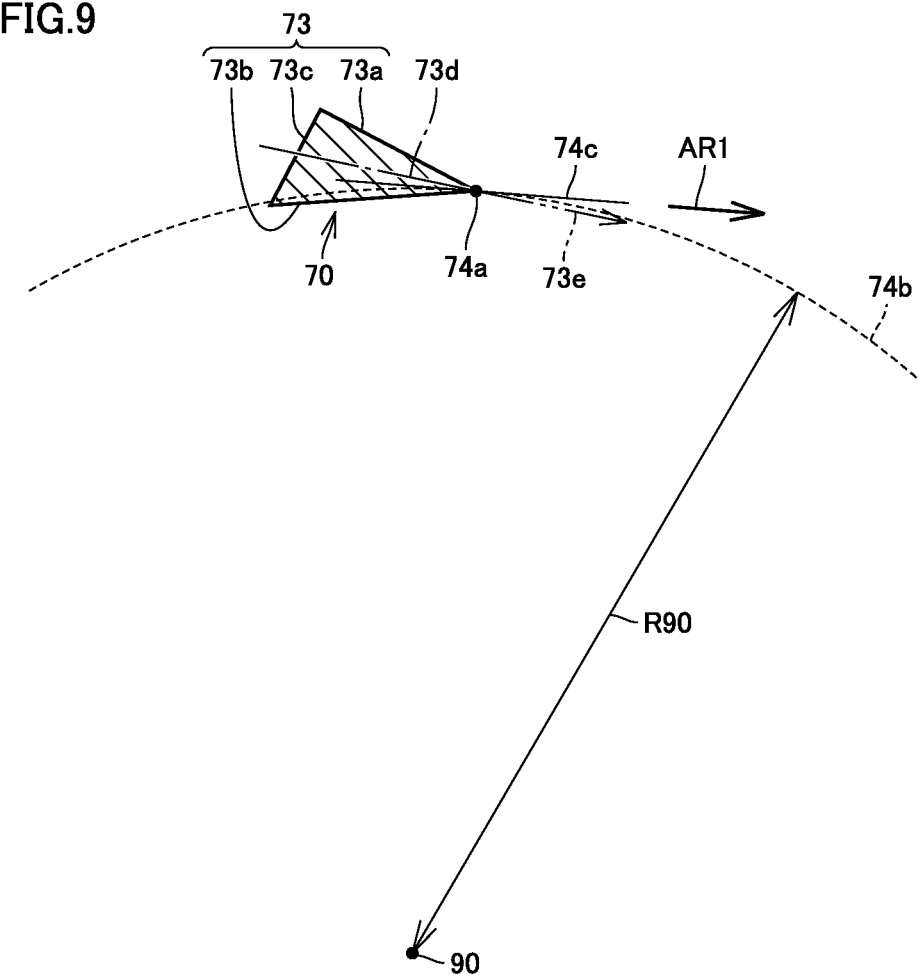
FIG. 9 is a first cross-sectional view showing the stirring member (movable member) in Embodiment 1.

Referring to FIG. 9, a virtual circle 74b centered at axis of rotation 90 of stirring member 70 and passing through front end portion 74a is drawn. Virtual circle 74b is a circle with a radius R90, which is centered at axis of rotation 90. A tangent 74c is formed in front end portion 74a of virtual circle 74b. In stirring member 70 in the present embodiment, a tangential straight line 73e is formed to pass through front end portion 74a of centerline 73d.

Since centerline 73d is linearly formed in stirring member 70 in the present embodiment, centerline 73d and tangential straight line 73e at front end portion 74a of centerline 73d are formed on the same line. Tangential straight line 73e in front end portion 74a is directed inward in the direction of radius of rotation on the forward side of the direction of rotation (the direction shown with arrow AR1) with respect to tangent 74c in front end portion 74a of virtual circle 74b.

Figure 10:
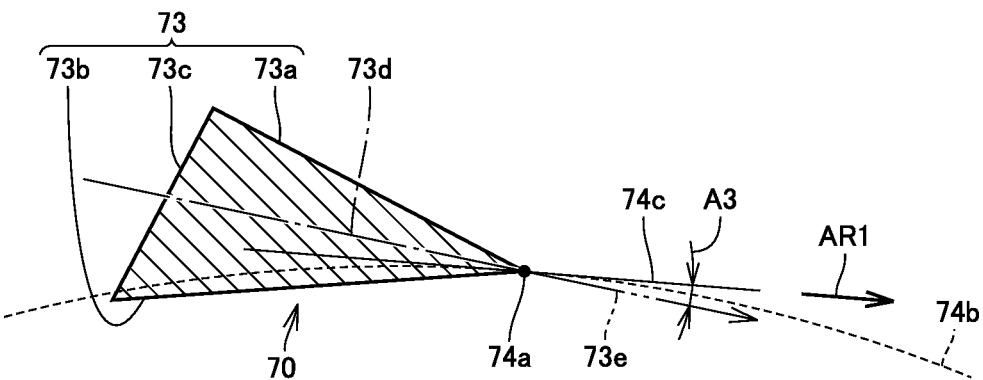
FIG. 10 is a second cross-sectional view showing the stirring member (movable member) in Embodiment 1.

Referring to FIG. 10, tangential straight line 73e is desirably directed inward in the direction of radius of rotation with respect to tangent 74c in front end portion 74a of virtual circle 74b, such that an angle A3 is in a range not smaller than 5° and not larger than 50° on the forward side of the direction of rotation (the direction shown with arrow AR1). The reason therefor will be described in Experimental Example 3 which will be described later. In stirring member 70 in the present embodiment, outer surface 73a is also directed inward in the direction of radius of rotation with respect to the direction of rotation (the direction shown with arrow AR1).

Figure 11:
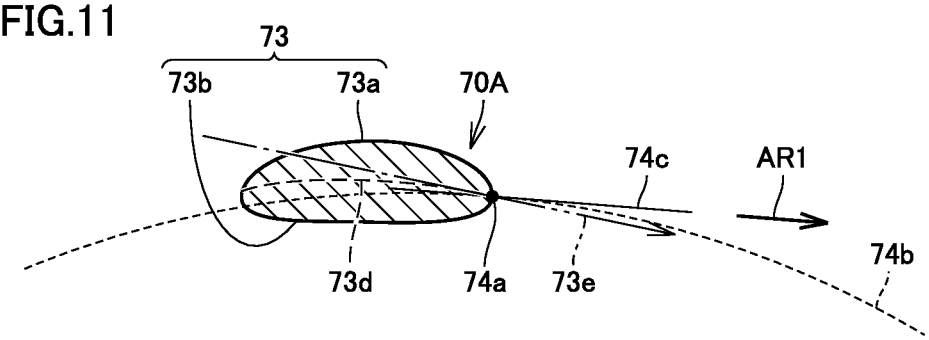
FIG. 11 is a cross-sectional view showing a stirring member (a movable member) in a modification of Embodiment 1.

As in a stirring member 70A shown in FIG. 11, centerline 73d extending from front end portion 74a may be formed as being curved. Centerline 73d in this case is formed such that a width in a direction of radius between centerline 73d and outer surface 73a and a width in a direction of radius between centerline 73d and inner surface 73b are the same from front end portion 74a to a rear side of the direction of rotation. Tangential straight line 73e is formed as a tangent in front end portion 74a of centerline 73d thus formed.

(Function and Effect)

Figure 12:
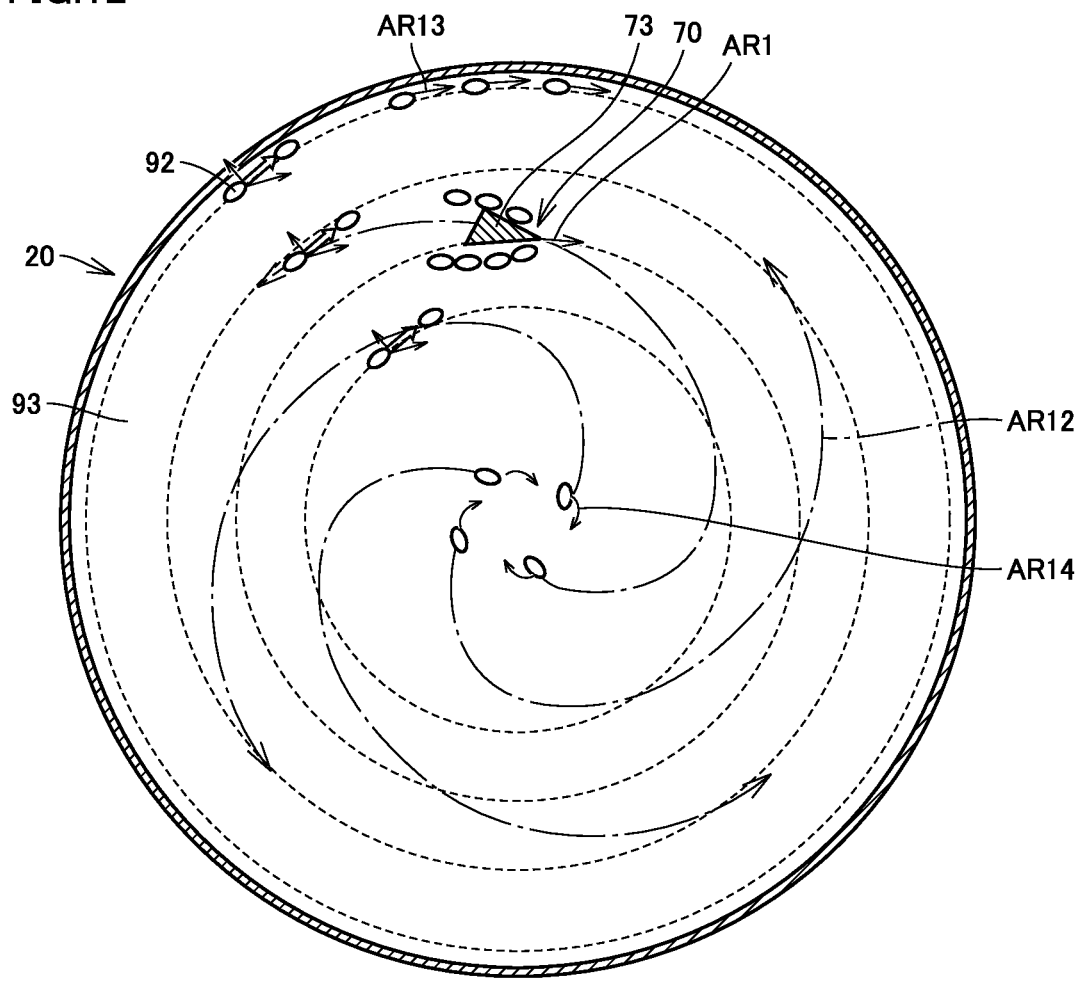
FIG. 12 is a diagram schematically showing stirring of a stirred object by the stirring member (movable member) in Embodiment 1.
Figure 13:
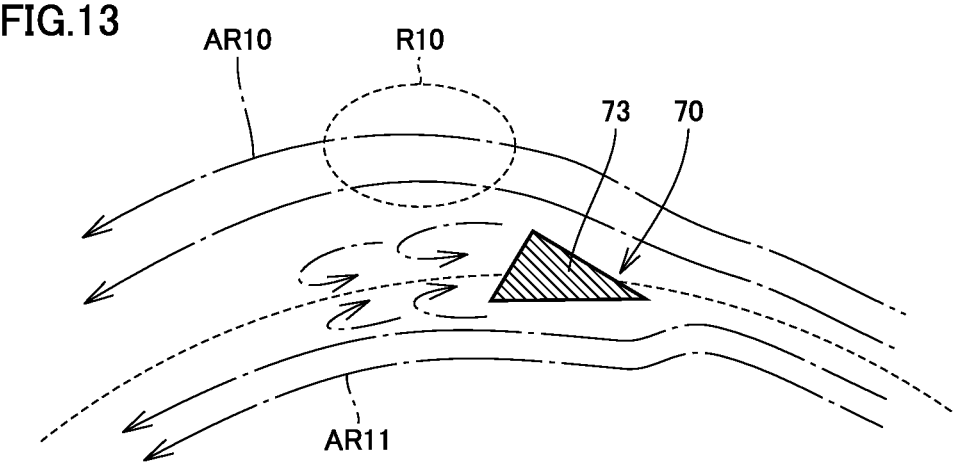
FIG. 13 is a first diagram schematically showing surroundings of the stirring member (movable member) while the stirring member (movable member) in Embodiment 1 is stirring the stirred object.
Figure 14:
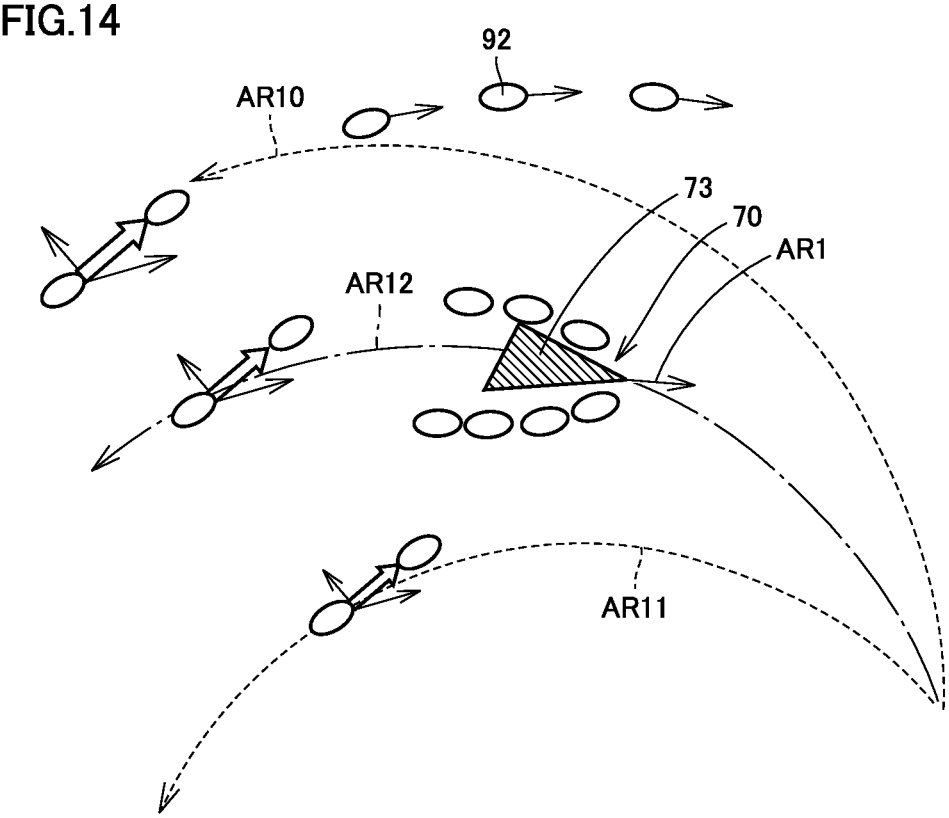
FIG. 14 is a second diagram schematically showing surroundings of the stirring member (movable member) while the stirring member (movable member) in Embodiment 1 is stirring the stirred object.

Referring to FIGS. 12 to 14, as tangential straight line 73e formed in stirring member 70 (and stirring member 70A) is directed inward in the direction of radius of rotation as above, an effect as follows is obtained.

FIG. 12 is a diagram schematically showing stirring of a stirred object such as rice 92 and water 93 as stirring member 70 rotating together with rotor 50 (not shown) rotates in the direction shown with arrow AR1 (the first direction of rotation). FIG. 13 is a first diagram schematically showing surroundings of stirring member 70 while stirring member 70 is stirring the stirred object. FIG. 14 is a second diagram schematically showing the surroundings of stirring member 70 while stirring member 70 is stirring the stirred object.

As shown in FIGS. 12 and 13, when stirring member 70 rotates in the direction shown with arrow AR1 to stir rice 92 and water 93, such a flow as spreading from an inner side toward an outer side of the direction of radius of rotation is formed on an outer side of the direction of radius of rotation of stirring portion 73 of stirring member 70 (see an arrow AR10 in FIG. 13) and a flow substantially along a circumferential direction is formed on an inner side of the direction of radius of rotation of stirring portion 73 of stirring member 70 (see an arrow AR11 in FIG. 13). Here, since an interior angle formed in front end portion 74a of stirring member 70 (see FIG. 8) is at an acute angle, rice 92 and water 93 can smoothly flow along the surface of stirring member 70.

As shown with a region R10 in FIG. 13, on the outer side of the direction of radius of rotation of stirring portion 73 of stirring member 70, such a flow as serving as moderate resistance against travel of stirring member 70 is formed. In region R10, centrifugal force diagonally rearward on the outer side of the direction of radius of rotation with respect to a direction of travel of stirring member 70 is also generated. A flow around region R10 extends outward from the inner side in the direction of radius of rotation and is formed outward, and fluid force resulting from this flow cooperates with centrifugal force generated in rice 92 and water 93. Capability of stirring member 70 to stir rice 92 and water 93 can effectively be enhanced.

In stirring member 70 in the present embodiment, since outer surface 73a (see FIG. 10) is also directed inward in the direction of radius of rotation with respect to the direction of rotation (the direction shown with arrow AR1), capability of stirring member 70 to stir rice 92 and water 93 can further be enhanced.

As shown in FIGS. 12 and 14, as a flow in the direction shown with arrow AR10 is formed on the outer side of stirring member 70 and a flow in the direction shown with arrow AR11 is formed on the inner side of stirring member 70, a new rectified flow is formed on the rear side of the direction of rotation of stirring member 70 (an arrow AR12) such that a flow passes between these flows (arrows AR10 and AR11).

As shown in FIG. 12, this new flow (arrow AR12) has a substantially radial shape and flows to gradually increase in radius of rotation outward from the inner side in the direction of radius of rotation. This rectified new flow (arrow AR12) flows as involving rice 92 which is present around a center of inner pot 20 and as involving also rice 92 which is present around a wall surface of inner pot 20. A flow extending from a portion around the center of inner pot 20 to a portion around the wall surface of inner pot 20 is generated and kinetic energy of stirring member 70 is transmitted to the entire stirred object.

While stirring portion 73 of stirring member 70 forms standing state S1 in stirring member 70 in the present embodiment, angle θ1 (see FIG. 1) formed between stirring portion 73 and horizontal surface 91 is not larger than 90°. More preferably, angle θ1 is not smaller than 80° and not larger than 85°. Stirring member 70 can effectively provide kinetic energy not only to rice 92 and water 93 around the center of inner pot 20 but also to rice 92 and rice 92 around the wall surface of inner pot 20. An optimal value for angle θ1 is obtained depending on a ratio between a height of inner pot 20 and a diameter of inner pot 20. Desirably, when inner pot 20 relatively small in depth is employed, small angle θ1 is set, and when inner pot 20 relatively large in depth is employed, angle θ1 closer to 90° is set.

A new flow (arrow AR12) applies smooth fluid force to water 93 and collision between rice 92 which ride on the flow is effectively suppressed. Rice 92 which has been present around the wall surface of inner pot 20 does not stay at a position where it has originally been present but can satisfactorily be stirred together with water 93 as a result of stirring by stirring member 70 (see an arrow AR13). Rice 92 which is present around the center of inner pot 20 does not stay at a position where it has originally been present either, but can satisfactorily be stirred together with water 93 as a result of stirring by stirring member 70 (see an arrow AR14).

Therefore, stirring member 70 in the present embodiment can form a flow as reaching the entire stirred object accommodated in inner pot 20 and can more uniformly stir the entire stirred object. With stirring member 70, a time period required until the entire stirred object is uniformly stirred can be shortened and energy consumption required for stirring can also be reduced. Since stirring member 70 is removable from rotor 50, it can be replaced with another stirring member having a shape as allowing optimal stirring in accordance with a heated object in inner pot 20. According to rice cooker 100 in the present embodiment, when stirring member 70 is pivoted to turned-down state S2 as shown in FIG. 5 by rotating miter gear 54b in the direction shown with arrow L with the use of rotational motive power from motor 81 (see FIG. 1) in the state in FIG. 6, stirring member 70 is not caught at the time when lid body 30 is opened and hence lid body 30 can readily be opened. Stirring member 70 can be prevented from blocking opening of lid body 30.

By rotating miter gear 54b in the direction shown with arrow R with the use of rotational motive power from motor 81 (see FIG. 1) in the state in FIG. 5, stirring member 70 can be pivoted to standing state 51 as shown in FIG. 6. By rotating miter gear 54b in the direction shown with arrow R with the use of rotational motive power from motor 81, stirring member 70 in standing state 51 can be rotated integrally with rotor 50, so that this rotating stirring member 70 in standing state 51 can stir, for example, rice and water in inner pot 20 and also can sufficiently rinse rice.

Rice cooker 100 is provided with one motor 81. This one motor 81 can allow pivot of stirring member 70 and rotation of stirring member 70 and rotor 50. Therefore, rice cooker 100 can have lid body 30 smaller than in a case that a motor for pivot of stirring member 70 and a motor for rotation of stirring member 70 and rotor 50 are separately provided. A height of rice cooker 100 can be reduced.

With driving mechanism 80 of rice cooker 100, stirring member 70 pivots or rotor 50 rotates by means of miter gear 54b to miter gear 53d. If stirring member 70 and rotor 50 can perform an operation similar to that by driving mechanism 80, a gear other than miter gear 54b to miter gear 53d or another motive power transmission mechanism may allow stirring member 70 to pivot or allow rotor 50 to rotate.

As stirring member 70 stirs, for example, rice and water in inner pot 20, for example, in a pre-heating step for rice cooking (an operation for setting a temperature in inner pot 20 to approximately 60° C.), a temperature in inner pot 20 can be made uniform. Variation in water feed to rice can be prevented, a temperature zone (approximately 60° C.) in which diastatic enzymes actively function in inner pot 20 affects rice as a whole, and thus a total sugar increase effect is obtained.

In a start-up step performed next to the pre-heating step, gelatinization of starch is started. Stirring by stirring member 70 may excessively increase viscosity of a rice cooking liquid or deteriorate heat transfer in inner pot 20. Desirably by rotating miter gear 54b in the direction shown with arrow L with rotational motive power from motor 81 before the start-up step, stirring member 70 is caused to pivot and set to turned-down state S2.

Though motor 81 may be stopped after stirring member 70 has formed turned-down state S2, as means for obtaining more tasty cooked rice, drive of motor 81 may be continued so as to rotate stirring member 70 in turned-down state S2 integrally with rotor 50. Rice gruel which has come in contact with rotor 50 is moved downward as it receives centrifugal force, and it readily returns into inner pot 20. Consequently, pregelatinization of rice in inner pot 20 is promoted and thus tasty cooked rice high in savory component is obtained. Since boilover of rice gruel is suppressed, rice cooking over high heat can be achieved and a time period for rice cooking can also be shortened.

Stirring member 70 in turned-down state S2 substantially does not protrude toward inner pot 20 from surface 59S of rotor 50 which is opposed to inner pot 20. A part or the entirety of stirring member 70 in turned-down state S2 may protrude from surface 59S of rotor 50 which is opposed to inner pot 20. A part of stirring member 70 protruding from the surface of rotor 50 on the inner pot 20 side comes in contact with rice gruel and provides external force thereto during boiling of a rice cooking liquid, so that bubbles of rice gruel can physically be broken. Consequently, boilover of rice gruel can be suppressed and pregelatinization of rice can reliably be promoted.

In Embodiment 1, stirring member 70 in standing state 51 may continuously rotate integrally with rotor 50 during rice rinsing, or stirring member 70 in standing state 51 may intermittently rotate integrally with rotor 50 during rice rinsing. Stirring during rice rinsing may be continuous or intermittent.

Comparative Example 1

A stirring member 70Z1 in Comparative Example 1 in connection with Embodiment 1 will be described with reference to FIGS. 15 and 16. As shown in FIG. 16, in stirring member 70Z1, tangential straight line 73e in front end portion 74a of centerline 73d is formed on the same line as tangent 74c in front end portion 74a of virtual circle 74b. Tangential straight line 73e of stirring member 70Z1 is not directed inward in the direction of radius of rotation, unlike that in stirring member 70 in Embodiment 1 described above. Tangential straight line 73e of stirring member 70Z1 coincides with the direction of rotation (the direction shown with arrow AR1).

Figure 15:
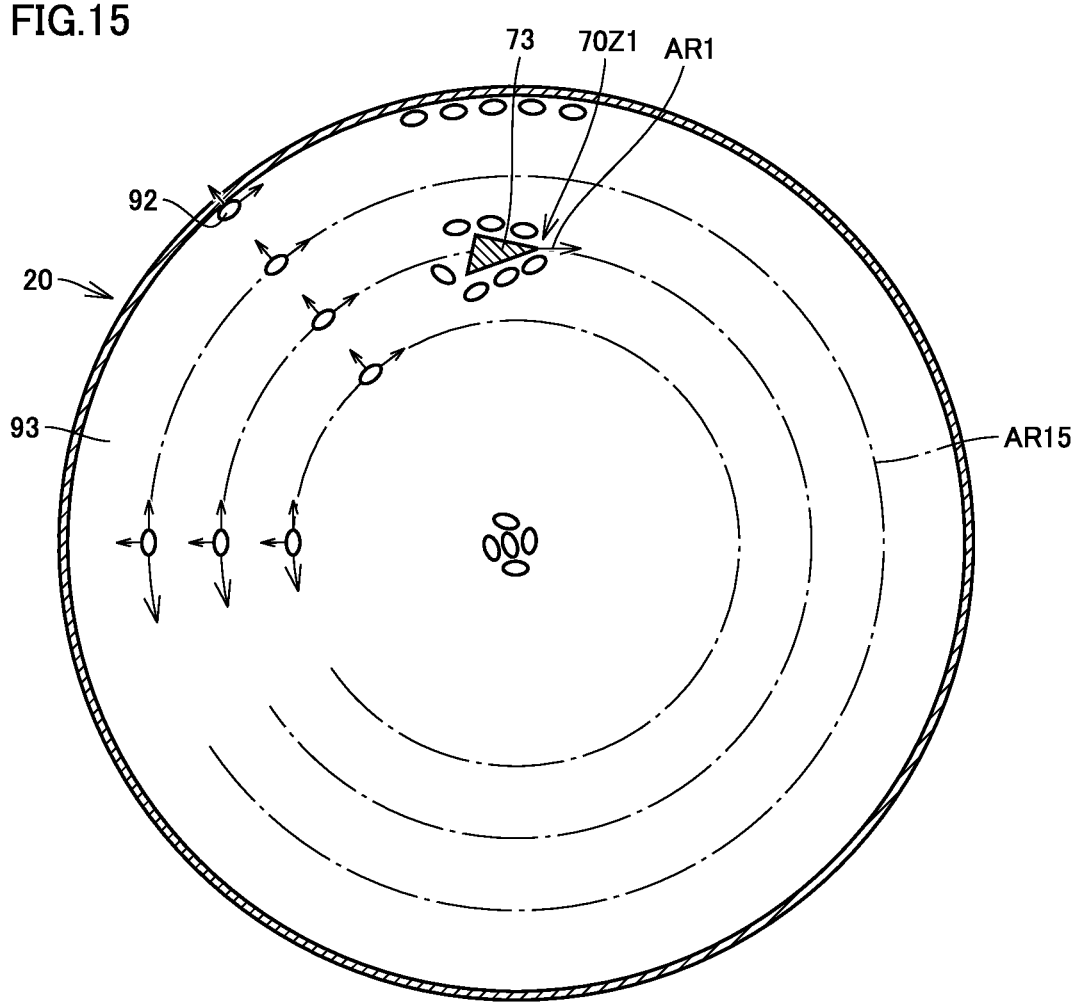
FIG. 15 is a diagram schematically showing stirring of the stirred object by a stirring member (a movable member) in Comparative Example 1 in connection with Embodiment 1.
Figure 16:
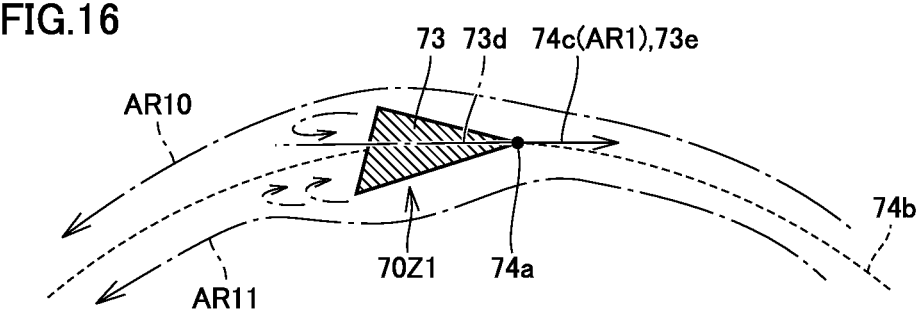
FIG. 16 is a diagram schematically showing surroundings of the stirring member (movable member) while the stirring member (movable member) in Comparative Example 1 in connection with Embodiment 1 is stirring the stirred object.

As shown in FIGS. 15 and 16, when stirring member 70Z1 rotates in the direction shown with arrow AR1 and stirs rice 92 and water 93, concentric flows as shown with an arrow AR15 (see FIG. 15) are formed. Such a flow as serving as moderate resistance against travel of stirring member 70Z 1 is not formed on the outer side of the direction of radius of rotation of stirring portion 73 of stirring member 70Z1. Rice 92 and water 93 flow as sliding over the surface of stirring portion 73 of stirring member 70Z1. Stirring member 70Z1 travels as wading (sneaking through) among rice 92 and kinetic energy of stirring member 70Z 1 is less likely to be transmitted to a stirred object.

Stirring member 70Z1 is lower in capability to stir rice 92 and water 93 than stirring member 70 in Embodiment 1 described above. When stirring member 70Z1 stirs rice 92 and water 93, rice 92 which is present around the center of inner pot 20 and rice 92 which is present around the wall surface of inner pot 20 are likely to stay at positions where they have originally been present. Therefore, stirring member 70Z1 in Comparative Example 1 cannot form a flow as reaching the entire stirred object accommodated in inner pot 20 and it is also difficult for stirring member 70Z1 to uniformly stir the entire stirred object. Since stirring member 70Z1 causes variation in amount of stirring, quality of rice cooking may be varied.

Comparative Example 2

A stirring member 70Z2 in Comparative Example 2 in connection with Embodiment 1 will be described with reference to FIGS. 17 and 18. As shown in FIG. 18, in stirring member 70Z2, stirring portion 73 has a cross-section formed in a square shape. Tangential straight line 73e in front end portion 74a of centerline 73d is formed on the same line as tangent 74c in front end portion 74a of virtual circle 74b. Tangential straight line 73e of stirring member 70Z2 is not directed inward in the direction of radius of rotation, unlike that in stirring member 70 in Embodiment 1 described above, but it coincides with the direction of rotation (the direction shown with arrow AR1).

Figure 17:
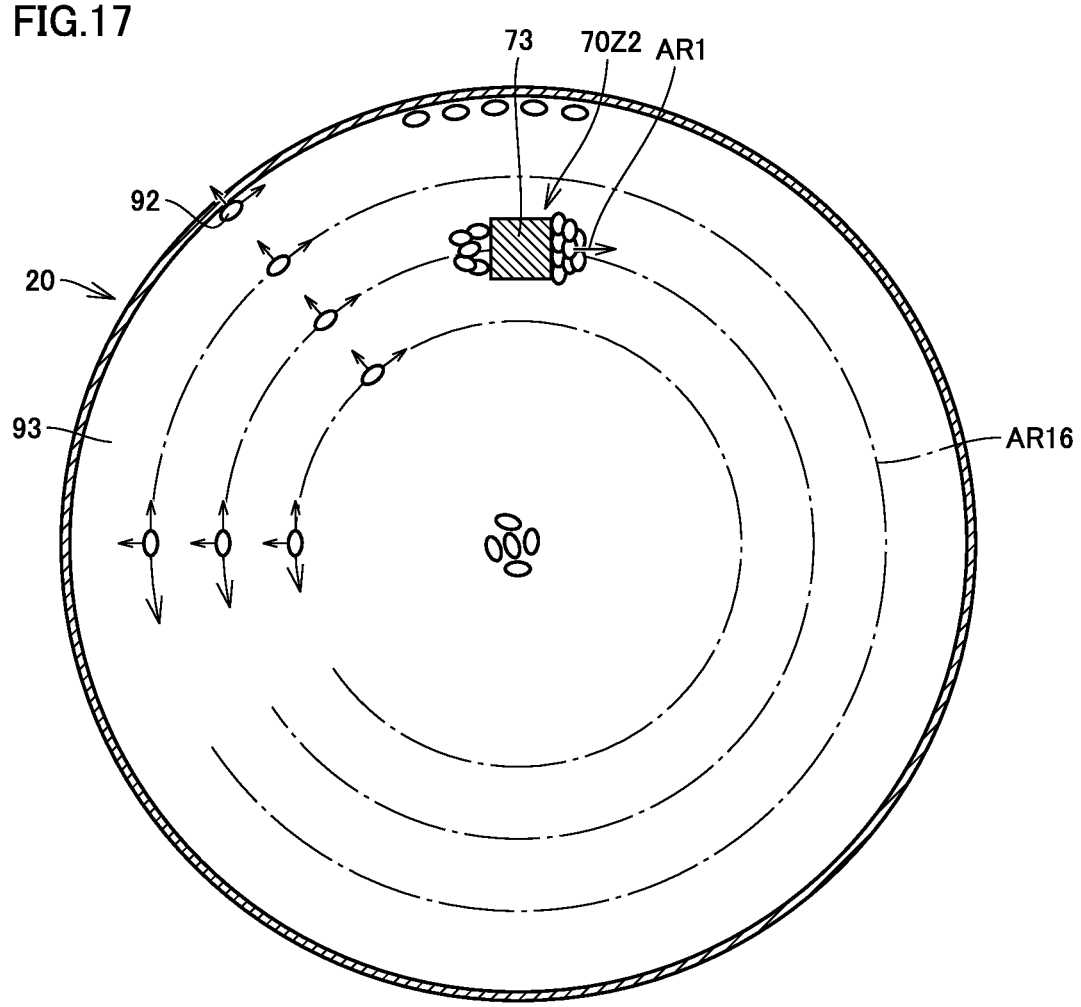
FIG. 17 is a diagram schematically showing stirring of the stirred object by a stirring member (movable member) in Comparative Example 2 in connection with Embodiment 1.
Figure 18:
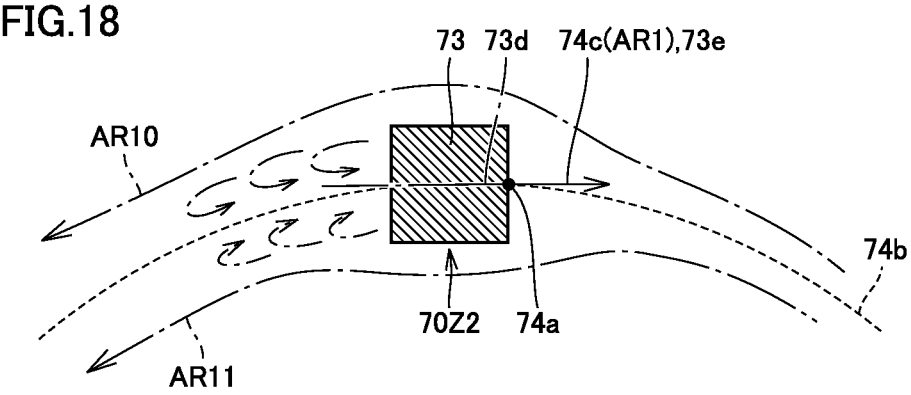
FIG. 18 is a diagram schematically showing surroundings of the stirring member (movable member) while the stirring member (movable member) in Comparative Example 2 in connection with Embodiment 1 is stirring the stirred object.

As shown in FIGS. 17 and 18, when stirring member 70Z2 rotates in the direction shown with arrow AR1 and stirs rice 92 and water 93, concentric flows as shown with an arrow AR16 (see FIG. 17) are formed. Such a flow as serving as moderate resistance against travel of stirring member 70Z2 is not formed on the outer side of the direction of radius of rotation of stirring portion 73 of stirring member 70Z2.

On the other hand, resistance against a surface of stirring member 70Z2 on a side of front end portion 74a is excessive and energy required for stirring increases. A water surface tends to be disturbed during stirring, and it is also possible that rice-rinse water adheres to the wall surface of inner pot 20 or inner lid 32 when water scatters. On the surface of stirring member 70Z2 on the side of front end portion 74a, rice 92 are carried without being stirred and rice 92 collide with one another, which may lead to a crack in rice 92 or separation of a nutrient from the surface of rice 92. On a surface of stirring member 70Z2 opposite to front end portion 74a as well, a turbulence is formed and rice 92 collide with one another, which may lead to a crack in rice 92 or separation of a nutrient from the surface of rice 92.

Stirring member 70Z2 is lower in capability to stir rice 92 and water 93 than stirring member 70 in Embodiment 1 described above. When stirring member 70Z2 stirs rice 92 and water 93, rice 92 which is present around the center of inner pot 20 and rice 92 which is present around the wall surface of inner pot 20 are likely to stay at positions where they have originally been present. Therefore, stirring member 70Z2 in Comparative Example 2 cannot form a flow as reaching the entire stirred object accommodated in inner pot 20 and it is also difficult for stirring member 70Z2 to uniformly stir the entire stirred object. Since stirring member 70Z2 causes variation in amount of stirring, quality of rice cooking may be varied.

Comparative Example 3

A stirring member 70Z3 in Comparative Example 3 in connection with Embodiment 1 will be described with reference to FIGS. 19 and 20. As shown in FIG. 20, in stirring member 70Z3, stirring portion 73 has a cross-section formed in a circular shape. Tangential straight line 73e in front end portion 74a of centerline 73d is formed on the same line as tangent 74c in front end portion 74a of virtual circle 74b. Tangential straight line 73e of stirring member 70Z3 is not directed inward in the direction of radius of rotation, unlike that in stirring member 70 in Embodiment 1 described above, but it coincides with the direction of rotation (the direction shown with arrow AR1).

Figure 19:
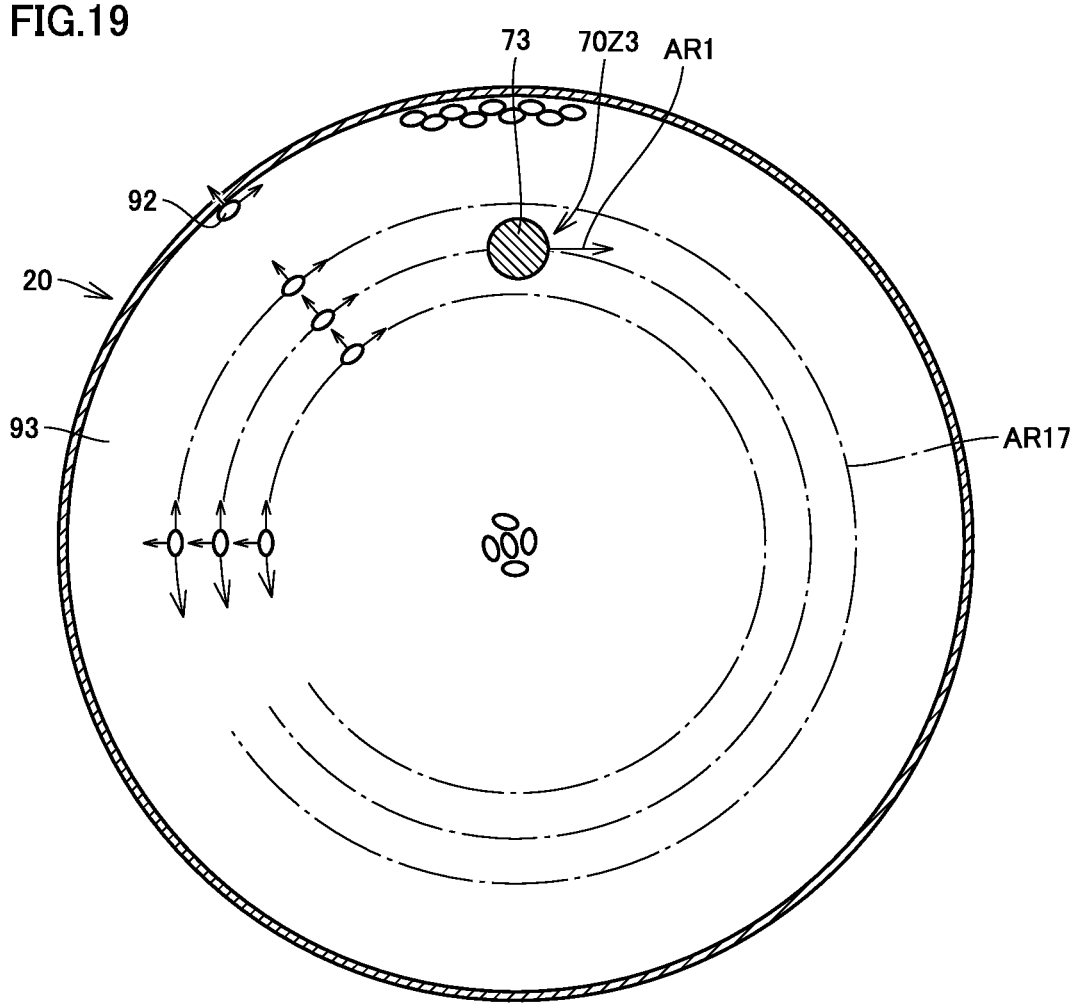
FIG. 19 is a diagram schematically showing stirring of the stirred object by a stirring member (movable member) in Comparative Example 3 in connection with Embodiment 1.
Figure 20:
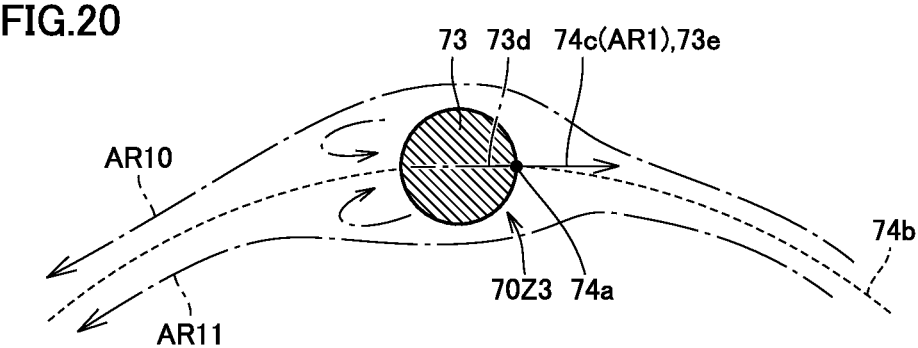
FIG. 20 is a diagram schematically showing surroundings of the stirring member (movable member) while the stirring member (movable member) in Comparative Example 3 in connection with Embodiment 1 is stirring the stirred object.

As shown in FIGS. 19 and 20, when stirring member 70Z3 rotates in the direction shown with arrow AR1 and stirs rice 92 and water 93, concentric flows as shown with an arrow AR17 (see FIG. 19) are formed. Such a flow as serving as moderate resistance against travel of stirring member 70Z3 is not formed on the outer side of the direction of radius of rotation of stirring portion 73 of stirring member 70Z3.

Stirring member 70Z3 is lower in capability to stir rice 92 and water 93 than stirring member 70 in Embodiment 1 described above. When stirring member 70Z3 stirs rice 92 and water 93, rice 92 which is present around the center of inner pot 20 and rice 92 which is present around the wall surface of inner pot 20 are likely to stay at positions where they have originally been present. Therefore, stirring member 70Z3 in Comparative Example 3 cannot form a flow as reaching the entire stirred object accommodated in inner pot 20 and it is also difficult for stirring member 70Z3 to uniformly stir the entire stirred object. Since stirring member 70Z3 causes variation in amount of stirring, quality of rice cooking may be varied.

Comparative Example 4

A stirring member 70Z4 in Comparative Example 4 in connection with Embodiment 1 will be described with reference to FIGS. 21 and 22. As shown in FIG. 22, stirring member 70Z4 has a cross-section formed in a shape of a right triangle similarly to stirring member 70 in Embodiment 1 described above. In stirring member 70Z4, however, tangential straight line 73e in front end portion 74a of centerline 73d is directed outward in the direction of radius of rotation on the forward side of the direction of rotation (the direction shown with arrow AR1) with respect to tangent 74c in front end portion 74a of virtual circle 74b. Tangential straight line 73e of stirring member 70Z4 is not directed inward in the direction of radius of rotation, unlike that in stirring member 70 in Embodiment 1 described above, but it is directed outward in the direction of radius of rotation.

Figure 21:
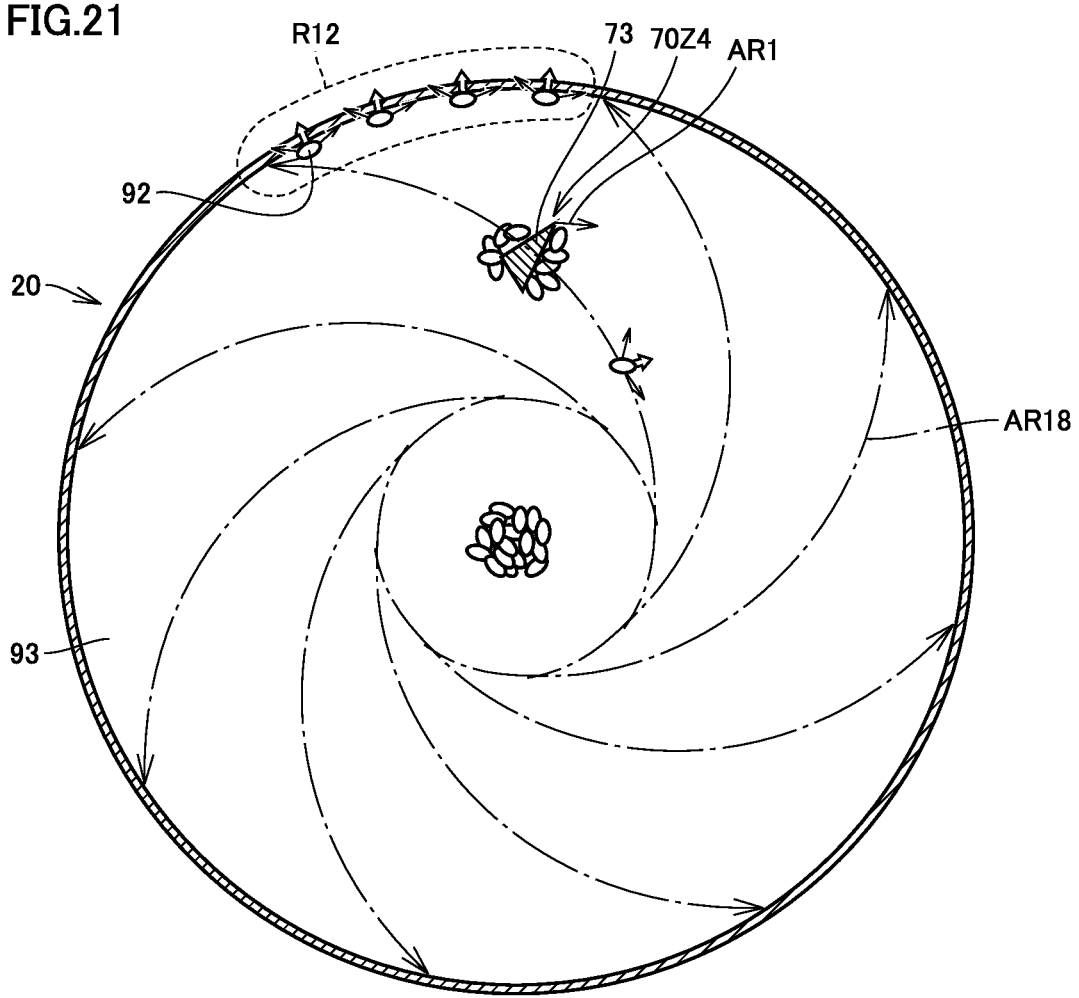
FIG. 21 is a diagram schematically showing stirring of the stirred object by a stirring member (movable member) in Comparative Example 4 in connection with Embodiment 1.
Figure 22:
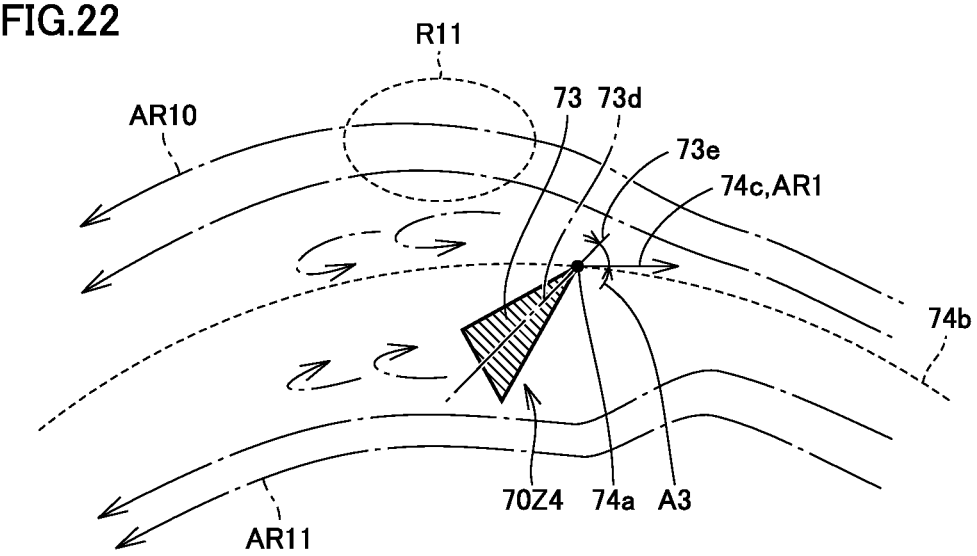
FIG. 22 is a diagram schematically showing surroundings of the stirring member (movable member) while the stirring member (movable member) in Comparative Example 4 in connection with Embodiment 1 is stirring the stirred object.

As shown in FIGS. 21 and 22, when stirring member 70Z4 rotates in the direction shown with arrow AR1 and stirs rice 92 and water 93, a flow as shown with an arrow AR18 (see FIG. 21) is formed. As shown with a region R11 in FIG. 22, a flow which flows as gradually increasing in radius of rotation is formed outward from the inner side in the direction of radius of rotation, on the outer side of the direction of radius of rotation of stirring portion 73 of stirring member 70Z4. On the other hand, resistance against a surface of stirring member 70Z4 on the side of front end portion 74a is excessive and energy required for stirring increases. A water surface tends to be disturbed during stirring, and it is also possible that scattered rice-rinse water adheres to the wall surface of inner pot 20 or inner lid 32.

As shown with a region R12 in FIG. 21, since a velocity of a flow which flows as gradually increasing in radius of rotation outward from the inner side in the direction of radius of rotation is high, fluid force and centrifugal force are applied to rice 92 and rice collide with the wall surface of inner pot 20, which may lead to a crack in rice 92 or separation of a nutrient from the surface of rice 92. Rice 92 which is present around the center of inner pot 20 and rice 92 which is present around the wall surface of inner pot 20 are likely to stay at positions where they have originally been present. Therefore, it is difficult for stirring member 70Z4 in Comparative Example 4 to form a flow as reaching the entire stirred object accommodated in inner pot 20 and also to uniformly stir the entire stirred object. Since stirring member 70Z4 causes variation in amount of stirring, quality of rice cooking may be varied.

Experimental Example 1

Figure 23:
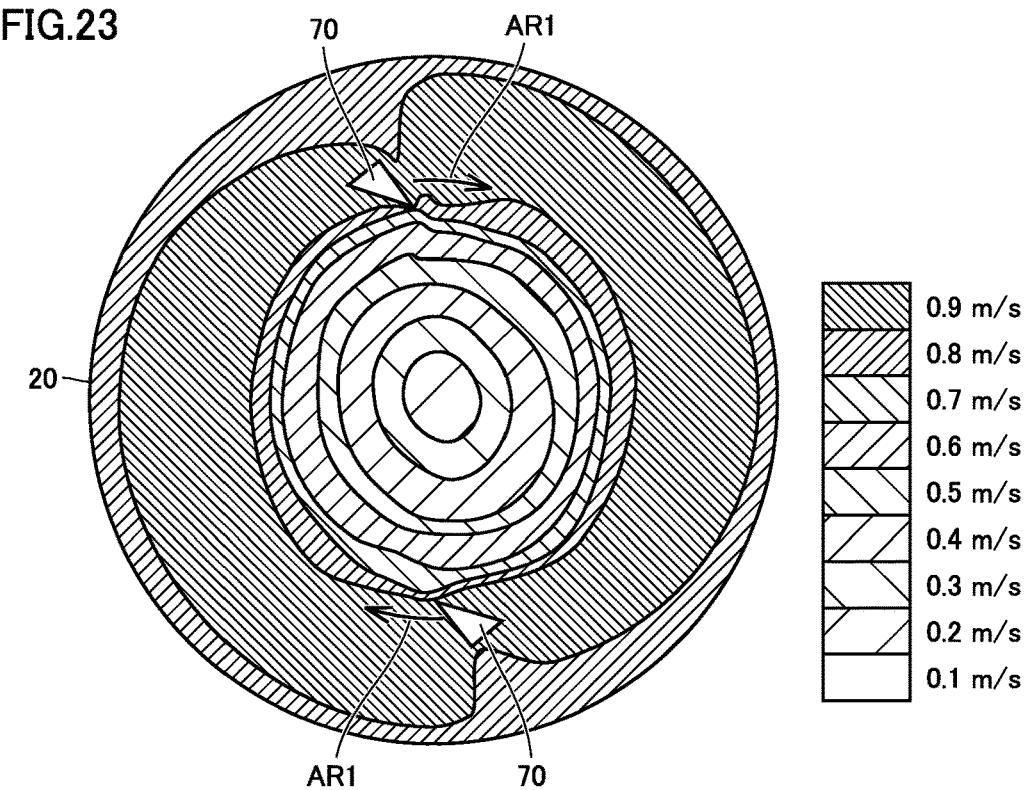
FIG. 23 is a diagram showing a result of simulation in Experimental Example 1.

Referring to FIG. 23, two stirring members 70 in Embodiment 1 described above (see FIG. 7) were used to stir water 93. As Experimental Example 1, an experiment of a velocity of flow of water 93 at this time was conducted. A speed of rotation of stirring member 70 was set to 170 rpm. A value for angle A3 (see FIG. 10) was set to 30°. FIG. 23 shows a result of simulation of measurement of speed distribution of water 93 in a plane at a height position of 30 mm from a bottom surface of inner pot 20.

As shown in FIG. 23, when stirring member 70 was employed, a region where a velocity of flow of water 93 was high was formed to extend over a long distance rearward from stirring member 70 in the direction of rotation of stirring member 70. The region where a velocity of flow of water 93 was high was formed to widely spread also in the direction of radius of rotation. A flow of water 93 having a velocity of flow to some extent was formed also around the center of inner pot 20. From the results in Experimental Example 1, it can be seen that stirring member 70 can form a flow as reaching the entire stirred object accommodated in inner pot 20 and the entire stirred object can more uniformly be stirred.

Experimental Example 2

Figure 24:
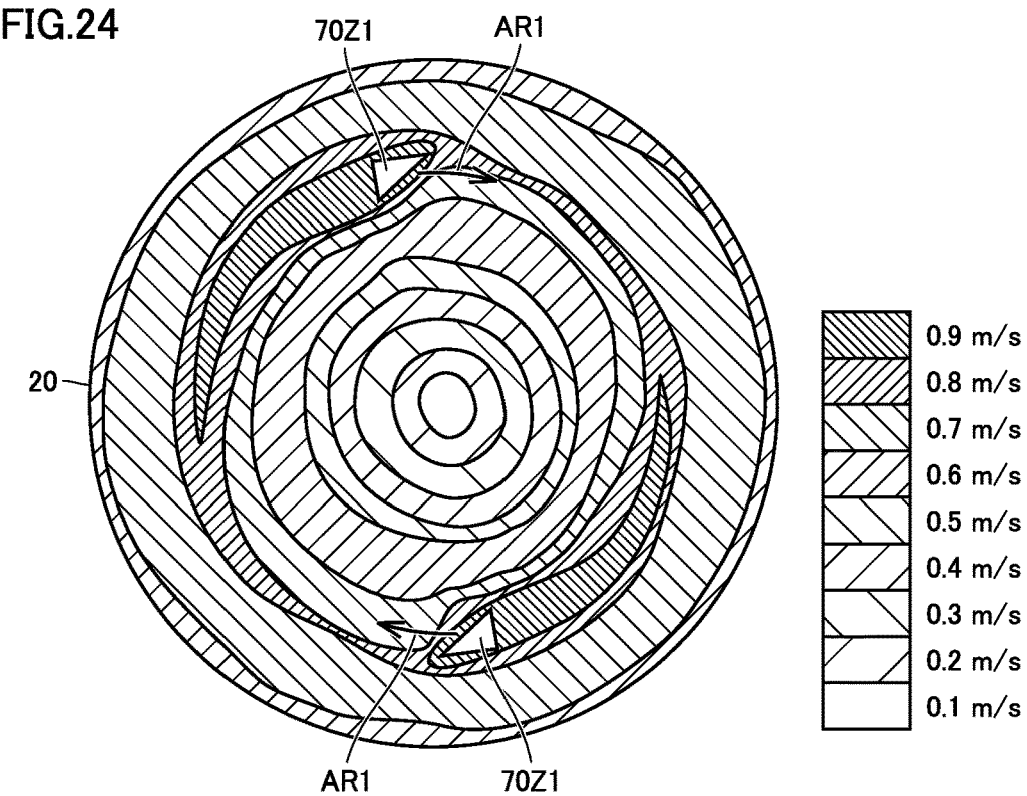
FIG. 24 is a diagram showing a result of simulation in Experimental Example 2.

Referring to FIG. 24, two stirring members 70Z1 in Comparative Example 1 described above were used to stir water 93. As Experimental Example 2, an experiment of a velocity of flow of water 93 at this time was conducted. A speed of rotation of stirring member 70Z1 was set to 170 rpm. A value for angle A3 (see FIG. 10) was set to 0°. FIG. 24 shows a result of simulation of measurement of speed distribution of water 93 in a plane at a height position of 30 mm from the bottom surface of inner pot 20.

As shown in FIG. 24, when stirring member 70Z1 was employed, a region where a velocity of flow of water 93 was high was formed to extend over only a short distance rearward from stirring member 70Z 1 in the direction of rotation of stirring member 70Z1. The region where a velocity of flow of water 93 was high was formed to hardly spread in the direction of radius of rotation. A flow having a low velocity of flow was formed around the center of inner pot 20. Present Experimental Example 2 was lower in velocity of flow of water 93 as a whole than Experimental Example 1 described above. From the results in Experimental Example 2, it can be seen that stirring member 70Z1 cannot form a flow as reaching the entire stirred object accommodated in inner pot 20 and it is difficult for stirring member 70Z1 to uniformly stir the entire stirred object.

Experimental Example 3

Experimental Example 3 will be described with reference to FIGS. 25 to 28. In Experimental Example 3, a stirring member similar in shape as stirring member 70 (see FIG. 7) in Embodiment 1 described above was used to stir rice 92 and water 93. An amount of rice 92 and an amount of water 93 prepared were comparable to 3 gou. A speed of rotation of the stirring member was set to 170 rpm.

Figure 25:
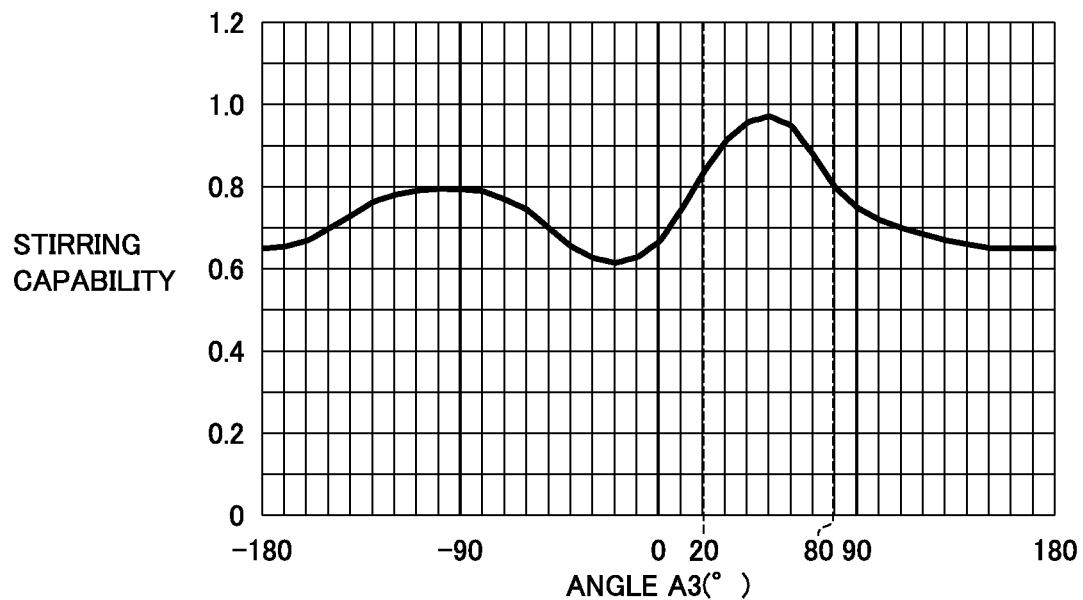
FIG. 25 is a diagram showing a result of simulation in which capability of a stirring member (a movable member) in Experimental Example 3 to stir rice was measured.

FIG. 25 shows a result of measurement of capability of the stirring member to stir rice 92 when a value for angle A3 (see FIG. 10) was varied in a range from 0° to ±180°. When relation of 0°<angle A3<180° is satisfied, tangential straight line 73e (see FIG. 10) is directed inward in the direction of radius of rotation. When relation of −180°<angle A3<0° is satisfied, tangential straight line 73e (see FIG. 10) is directed outward in the direction of radius of rotation. Stirring capability shown on the ordinate in FIG. 25 is shown, with a case that the entire stirred object is stirred and the entire stirred object moves in inner pot 20 being defined as 1.0. A higher numeric value means better stirring of a stirred object.

It can be seen from the results shown in FIG. 25 that 70% or more of the stirred object was stirred when angle A3 was not smaller than 5° and not larger than 115°, 80% or more of the stirred object was stirred when angle A3 was not smaller than 20° and not larger than 80°, 90% or more of the stirred object was stirred when angle A3 was not smaller than 30° and not larger than 66°, and 95% or more of the stirred object was stirred when angle A3 was not smaller than 40° and not larger than 60°.

Figure 26:
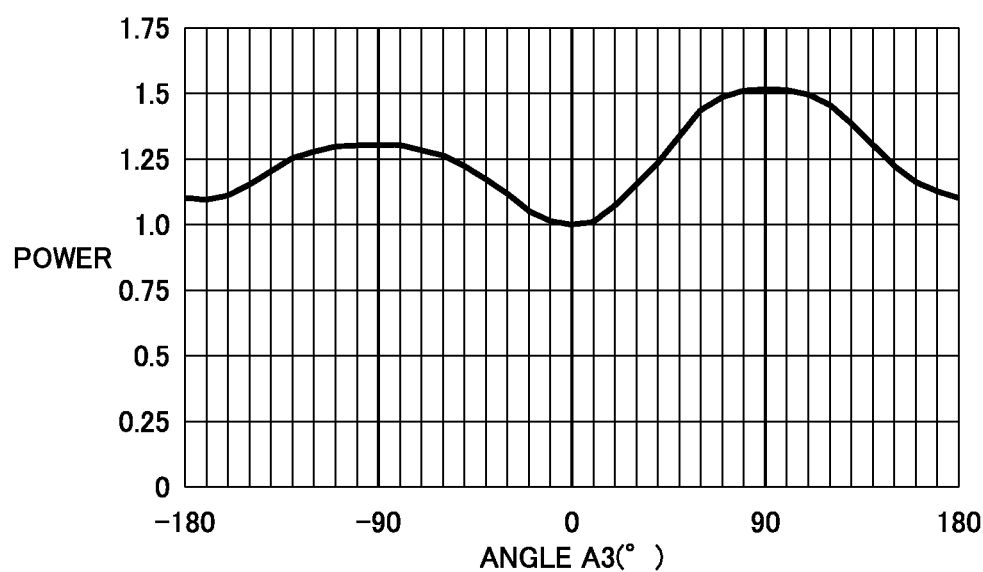
FIG. 26 is a diagram showing a result of simulation in which power necessary for the stirring member (movable member) in Experimental Example 3 to stir rice was measured.

FIG. 26 shows a result of measurement of power necessary for a stirring member to stir rice 92 when a value for angle A3 (see FIG. 10) was varied in a range from 0° to ±180°. Power shown on the ordinate in FIG. 26 is shown, with a case that angle A3 is set to 0° (in other words, tangential straight line 73e of stirring member 70 (see FIG. 10) coincides with a direction of travel of rotation) being defined as a reference value of 1.0. A value relative to the reference value is shown as power shown on the ordinate in FIG. 26. A higher numeric value means higher power necessary for a stirring member to stir a stirred object.

It can be seen from the results shown in FIG. 26 that power necessary for a stirring member to stir a stirred object is higher in a case of 0°<angle A3<180° (tangential straight line 73e being directed inward in the direction of radius of rotation) than in a case of −180°<angle A3<0° (tangential straight line 73e being directed outward in the direction of radius of rotation).

Figure 27:
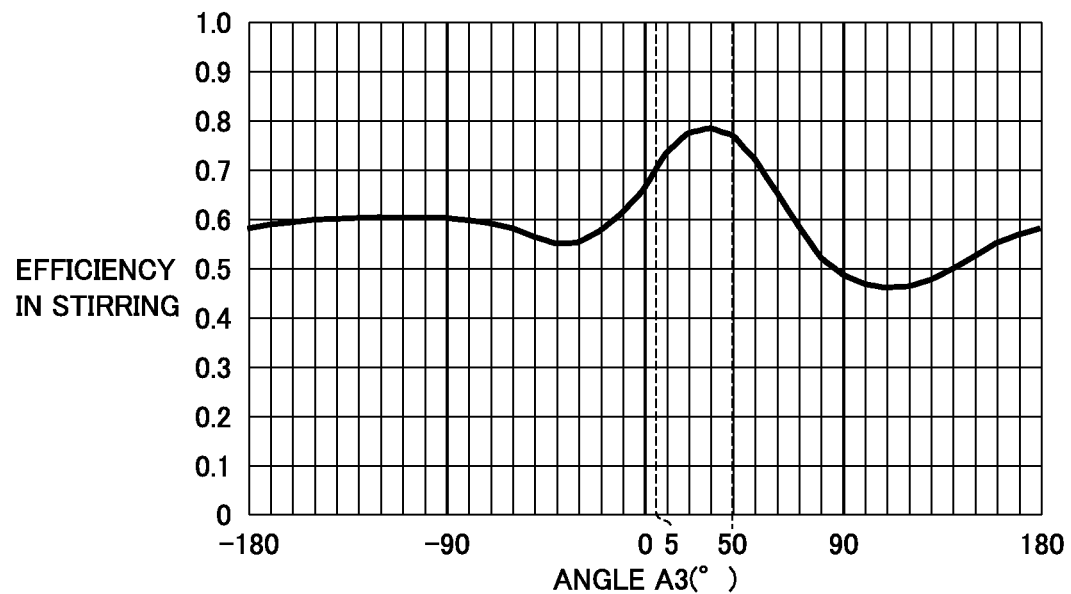
FIG. 27 is a diagram showing efficiency in stirring by the stirring member (movable member) in Experimental Example 3.

FIG. 27 shows efficiency in stirring by a stirring member when a value for angle A3 (see FIG. 10) was varied in a range from 0° to ±180°. Efficiency in stirring is represented by a value calculated by dividing stirring capability shown in FIG. 25 by power shown in FIG. 26. A higher numeric value indicates that stirring member 70 can stir a stirred object with high energy efficiency.

In obtaining an optimal value for angle A3, both of the fact that stirring member 70 is efficiently stirring a stirred object and the fact that minimum stirring capability (see FIG. 25) is ensured are considered. An angular range in FIG. 27 in which high efficiency in stirring (not lower than 70%) is obtained in an angular range in which stirring capability shown in FIG. 25 exceeds 70% (not smaller than 5° and not larger than 115°) is not smaller than 5° and not larger than 50°.

Figure 28:
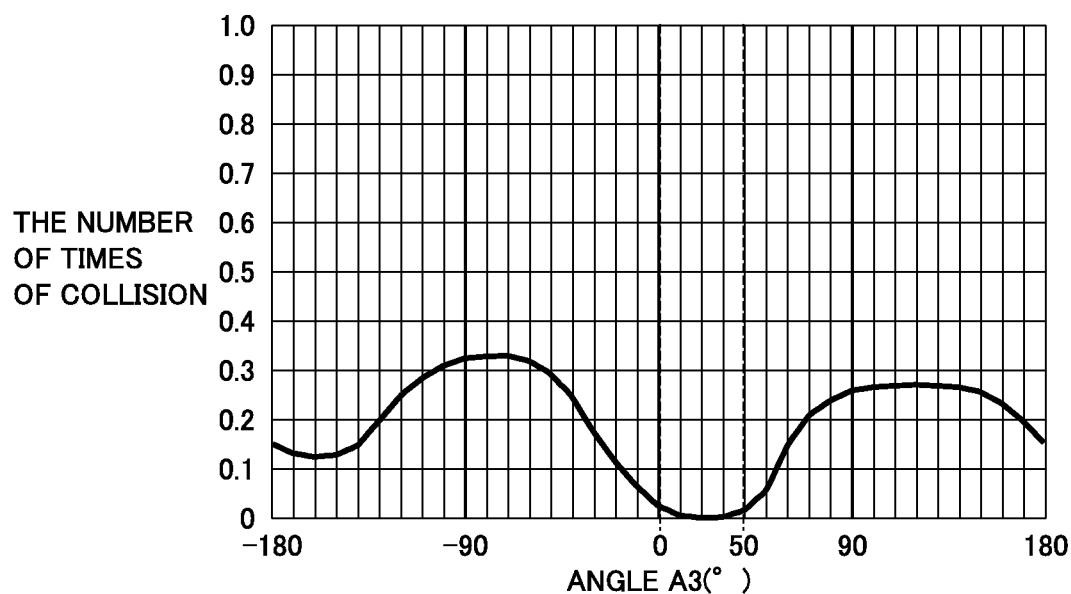
FIG. 28 is a diagram showing the number of times of collision between rice and the number of times of collision between rice and an inner pot when the stirring member (movable member) in Experimental Example 3 was used.

FIG. 28 shows the number of times of collision between rice 92 and the number of collision between rice 92 and inner pot 20 when a value for angle A3 (see FIG. 10) was varied in a range from 0° to ±180°. The number of times of collision shown on the ordinate is shown with a case that all rice 92 collide with rice 92 or inner pot 20 being defined as a reference value of 1.0. A higher numeric value means the larger number of times of collision of rice 92. As the number of times of collision is larger, rice 92 tends to be broken. It can be seen from the results shown in FIG. 28 that, in a case of 0°<angle A3<50°, the number of times of collision is not greater than 0.03 and rice 92 which is a stirred object is gently stirred.

It can be seen from the results shown in FIGS. 25 to 28 that a value for angle A3 allowing high stirring capability, allowing efficient stirring with low power, and achieving the smaller number of times of collision is not smaller than 5° and not larger than 50°. Therefore, it can be seen that tangential straight line 73e (see FIG. 10) is desirably directed inward in the direction of radius of rotation such that angle A3 is in a range not smaller than 5° and not larger than 50° on the forward side of the direction of rotation (the direction shown with arrow AR1) with respect to tangent 74c in front end portion 74a of virtual circle 74b.

Embodiment 2

Stirring Member 70B

Figure 29:
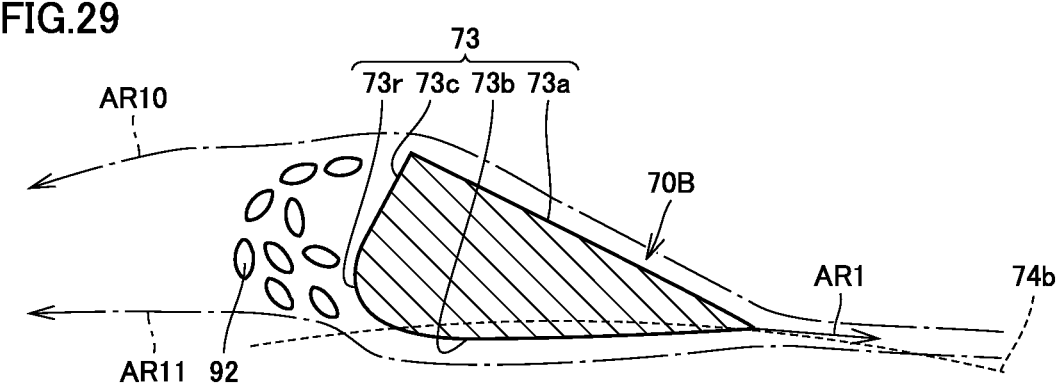
FIG. 29 is a cross-sectional view showing a stirring member (a movable member) in Embodiment 2.

A stirring member 70B in the present embodiment will be described with reference to FIG. 29. Stirring member 70B can be applied to a rice cooker similar to rice cooker 100 (see FIG. 1) in Embodiment 1 described above or a rotor similar to rotor 50 (see FIG. 2) in Embodiment 1 described above.

In stirring member 70B, a cross-sectional shape of stirring portion 73 is formed to gradually decrease in width in the direction of radius of rotation from a portion at some midpoint in the direction of rotation (the direction shown with arrow AR1) toward an opposite side (the direction shown with arrow AR1) of the direction of rotation. A curved surface portion 73r connecting inner surface 73b and rear end surface 73c to each other in an arc shape is formed between inner surface 73b and rear end surface 73c. A cross-sectional shape of stirring portion 73 of stirring member 70B is formed to gradually decrease in width in the direction of radius of rotation in curved surface portion 73r toward the opposite side of the direction of rotation (the direction shown with arrow AR1). An area of contact with a stirred object in a portion of stirring portion 73 on the forward side of the direction of rotation (the direction shown with arrow AR1) is substantially the same between stirring member 70B and stirring member 70 in Embodiment 1 described above.

In stirring member 70B, curved surface portion 73r having a large radius of curvature is provided in a portion on a rear side of the direction of rotation. Though a cross-sectional area of stirring portion 73 decreases due to provision of curved surface portion 73r, capability to stir rice 92 and water 93 does not substantially change between stirring member 70B and stirring member 70 in Embodiment 1 described above. On the other hand, resistance received from rice 92 and water 93 by the portion of stirring member 70B on the rear side of the direction of rotation is lowered as curved surface portion 73r is provided. A flow (arrow AR11) which flows on the inner side of the direction of radius of rotation of stirring portion 73 of stirring member 70B is more smoothly formed. Energy consumption required for stirring can be reduced.

A more rectified flow is formed on the rear side of the direction of rotation of stirring member 70B. Efficiency in stirring is enhanced and the entire water flow can more uniformly be stirred. Collision between rice 92, which leads to a crack in rice 92 or separation of a nutrient from a surface of rice 92, can also further be suppressed.

Comparative Example 5

Stirring member 70 in Comparative Example 5 in connection with Embodiment 2 will be described with reference to FIG. 30. Stirring member 70 is constructed similarly to stirring member 70 (see FIG. 13) in Embodiment 1 described above. Unlike stirring member 70B in Embodiment 2 described above, stirring member 70 is not provided with curved surface portion 73r (see FIG. 29).

Figure 30:
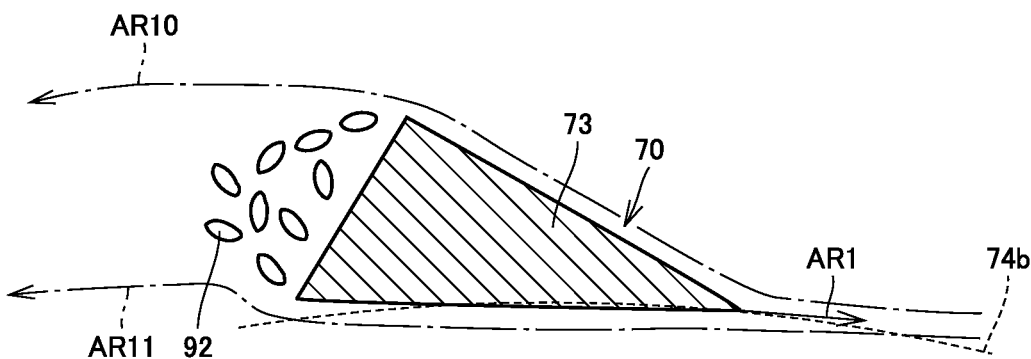
FIG. 30 is a cross-sectional view showing the stirring member (movable member) in Comparative Example 5 in connection with Embodiment 2.

When stirring member 70 rotates in the direction shown with arrow AR1 and stirs rice 92 and water 93, a flow as spreading outward from the inner side in the direction of radius of rotation is formed on the outer side of the direction of radius of rotation of stirring portion 73 of stirring member 70 (see arrow AR10 in FIG. 30) and a flow substantially along a circumferential direction is formed on the inner side of the direction of radius of rotation of stirring portion 73 of stirring member 70 (see arrow AR11 in FIG. 30).

Resistance received from rice 92 and water 93 by the portion of stirring member 70 on the rear side of the direction of rotation, however, is higher than that received by stirring member 70B in Embodiment 2 described above. Energy consumption required for stirring by stirring member 70 is higher than with stirring member 70B in Embodiment 2 described above. Therefore, as in stirring member 70B in Embodiment 2 described above, curved surface portion 73r is preferably provided in the portion on the rear side of the direction of rotation.

Comparative Example 6

Figure 31:
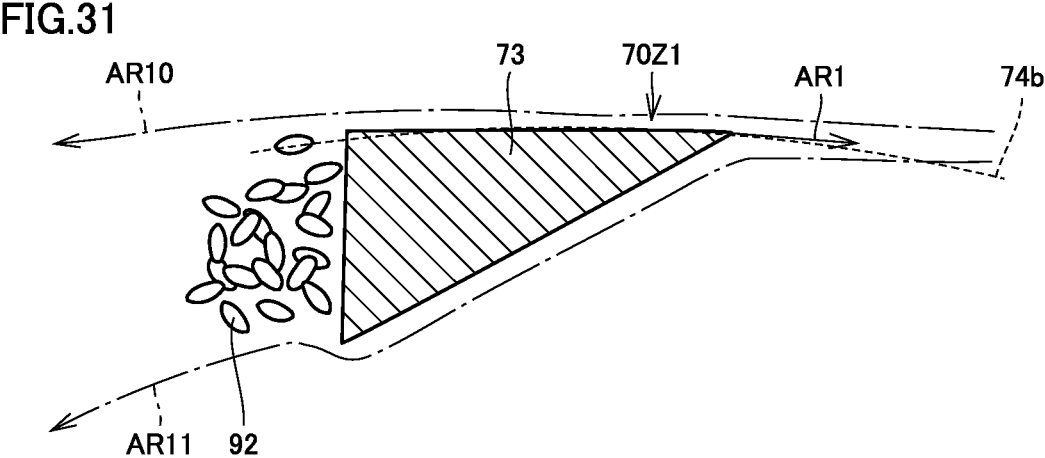
FIG. 31 is a cross-sectional view showing the stirring member (movable member) in Comparative Example 6 in connection with Embodiment 2.

Stirring member 70Z1 in Comparative Example 6 in connection with Embodiment 2 will be described with reference to FIG. 31. Stirring member 70Z1 is constructed similarly to stirring member 70Z1 (see FIG. 16) in Comparative Example 1 in connection with Embodiment 1 described above. Unlike stirring member 70B in Embodiment 2 described above, stirring member 70Z1 is not provided with curved surface portion 73r (see FIG. 29) either.

Resistance received from rice 92 and water 93 by a portion of stirring member 70Z1 on the rear side of the direction of rotation is higher than that received by stirring member 70B in Embodiment 2 described above. Energy consumption required for stirring by stirring member 70Z1 is higher than with stirring member 70B in Embodiment 2 described above. On a surface opposite to the direction of rotation of stirring member 70Z1, rice 92 may collide with one another, which may lead to a crack in rice 92 or separation of a nutrient from a surface of rice 92. Therefore, as in stirring member 70B in Embodiment 2 described above, curved surface portion 73r is preferably provided in the portion on the rear side of the direction of rotation.

Embodiment 3

Figure 32:
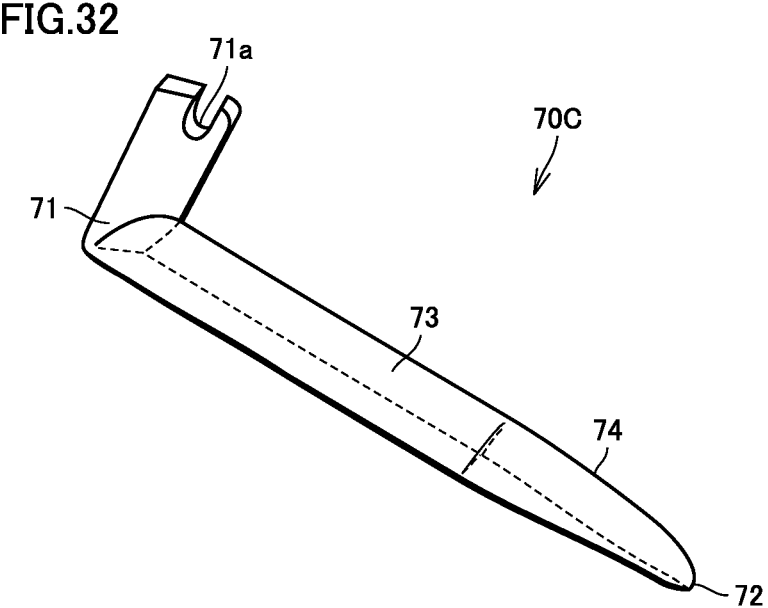
FIG. 32 is a perspective view showing a stirring member (a movable member) in Embodiment 3.

A stirring member 70C in the present embodiment will be described with reference to FIG. 32. Stirring member 70C can be applied to a rice cooker similar to rice cooker 100 (see FIG. 1) in Embodiment 1 described above or a rotor similar to rotor 50 (see FIG. 2) in Embodiment 1 described above. In stirring member 70C, a portion of stirring portion 73 closer to second end portion 72 is formed as being tapered so as to decrease in thickness toward second end portion 72.

A portion in the vicinity of second end portion 72 is a boundary between stirring portion 73 and a stirred object. In the vicinity of second end portion 72, a great pressure difference is likely. Stirring member 70C can suppress occurrence of such a pressure difference. Stirring member 70C can effectively suppress occurrence of disturbance of a flow resulting from this pressure difference. Collision between rice 92, which may lead to a crack in rice 92 or separation of a nutrient from a surface of rice 92, can also effectively be suppressed.

A cross-sectional shape of a portion of stirring portion 73 closer to first end portion 71 may be formed in a shape of a right triangle so as to gradually decrease in thickness toward the portion of stirring portion 73 which is closer to second end portion 72 and the cross-sectional shape gradually makes transition from a shape of a right triangle to a circular shape. Occurrence of disturbance of a flow resulting from a pressure difference can further effectively be suppressed.

Embodiment 4

Figure 33:
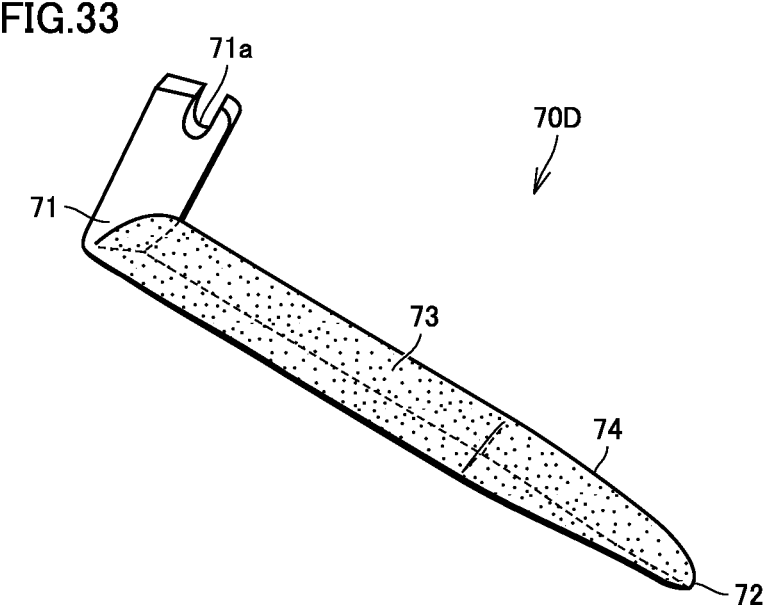
FIG. 33 is a perspective view showing a stirring member (a movable member) in Embodiment 4.

A stirring member 70D in the present embodiment will be described with reference to FIG. 33. Stirring member 70D can be applied to a rice cooker similar to rice cooker 100 (see FIG. 1) in Embodiment 1 described above or a rotor similar to rotor 50 (see FIG. 2) in Embodiment 1 described above. In stirring member 70D, a surface of stirring portion 73 has asperities formed, which have a dimple shape or a fine rib shape.

Stirring member 70D can lower resistance received from a stirred object by stirring portion 73. Rice 92 and water 93 can smoothly flow along a surface of stirring member 70D and energy consumption required for stirring can also be reduced. Stirring member 70D can also efficiently break rice gruel physically by making use of a projecting and recessed shape in the surface (rice gruel will be described in detail in Embodiment 15 and later).

Embodiment 5

Figure 34:
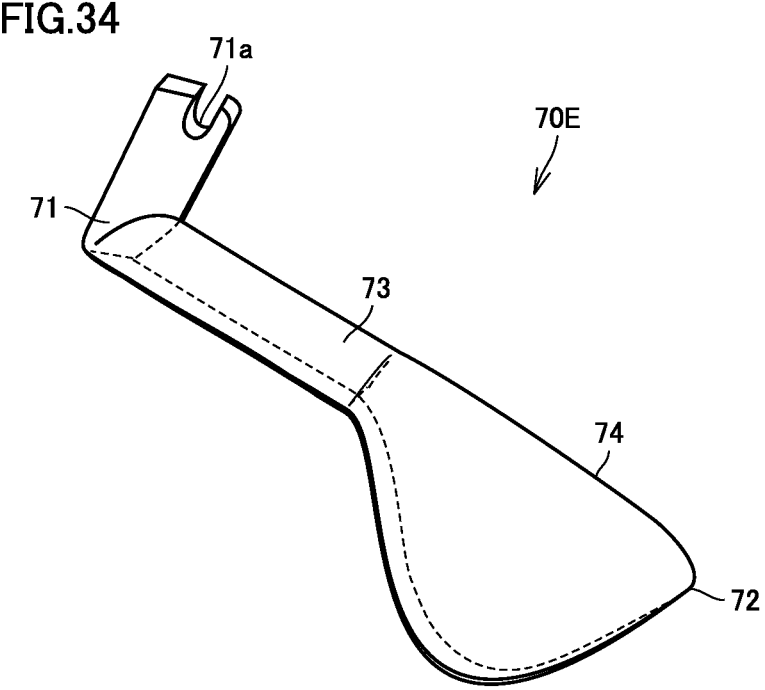
FIG. 34 is a perspective view showing a stirring member (a movable member) in Embodiment 5.

A stirring member 70E in the present embodiment will be described with reference to FIG. 34. Stirring member 70E can be applied to a rice cooker similar to rice cooker 100 (see FIG. 1) in Embodiment 1 described above or a rotor similar to rotor 50 (see FIG. 2) in Embodiment 1 described above. In stirring member 70E, a portion of stirring portion 73 on a side of second end portion 72 slightly swells in an arc shape rearward in the direction of rotation and the entire outer geometry is formed substantially in a scoop shape.

According to stirring member 70E, stirring member 70E is constructed to be attachable to and removable from rotor 50 (see FIG. 2), so that stirring member 70E can be removed from rotor 50 and scoop cooked rice. Stirring member 70E can improve user convenience.

Embodiment 6

Figure 35:
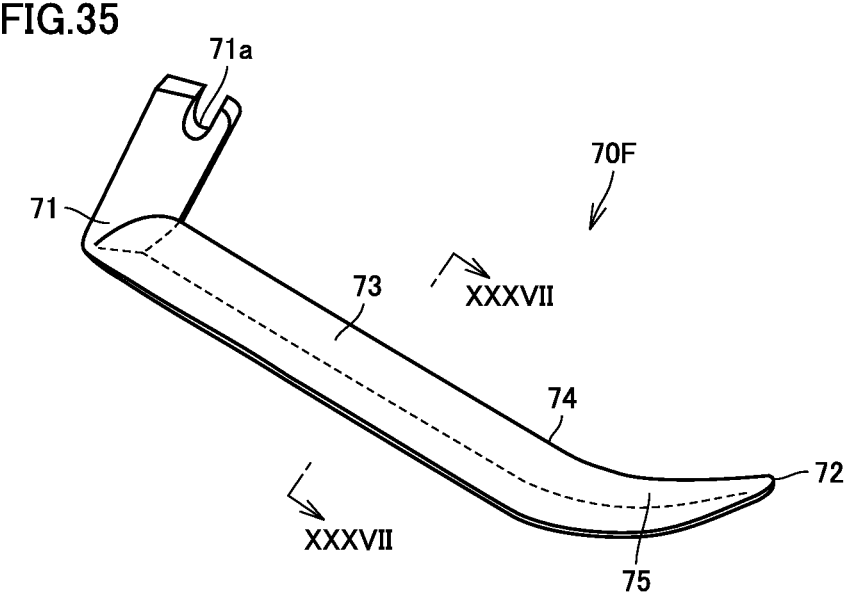
FIG. 35 is a first perspective view showing a stirring member (a movable member) in Embodiment 6.
Figure 36:
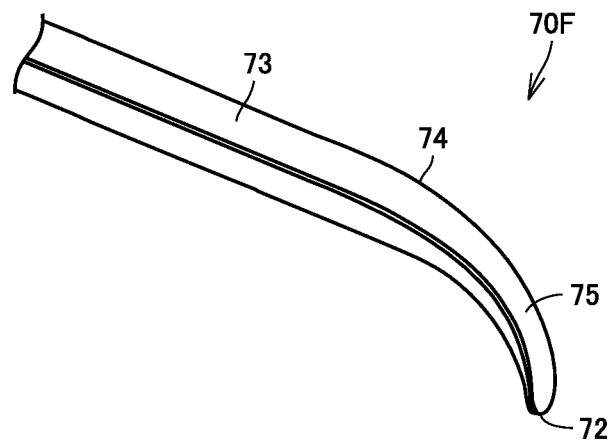
FIG. 36 is a second perspective view showing the stirring member (movable member) in Embodiment 6.
Figure 37:
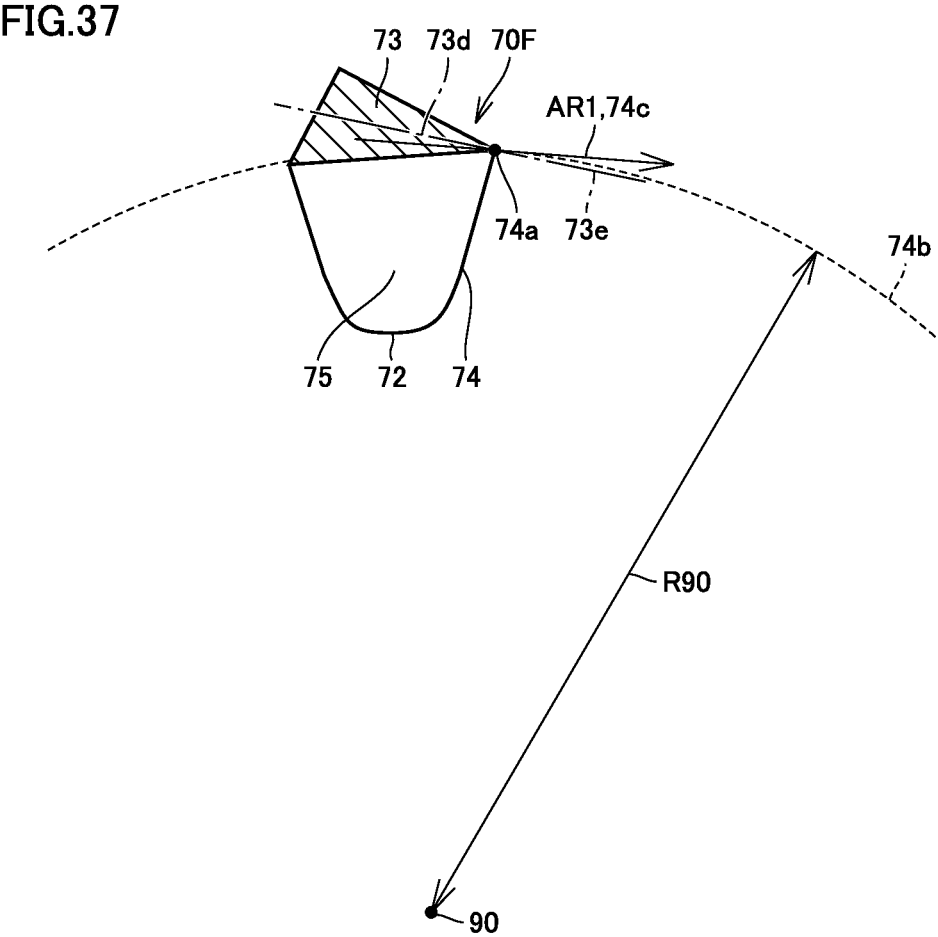
FIG. 37 is a cross-sectional view in a direction shown with an arrow along the line XXXVII-XXXVII in FIG. 35.

A stirring member 70F in the present embodiment will be described with reference to FIGS. 35 to 37. FIG. 35 is a first perspective view showing stirring member 70F. FIG. 36 is a second perspective view showing stirring member 70F. FIG. 37 is a cross-sectional view in a direction shown with an arrow along the line XXXVII-XXXVII in FIG. 35. Stirring member 70F can be applied to a rice cooker similar to rice cooker 100 (see FIG. 1) in Embodiment 1 described above or a rotor similar to rotor 50 (see FIG. 2) in Embodiment 1 described above.

As shown in FIGS. 35 to 37, in stirring member 70F, an extension portion 75 extending inward in the direction of radius of rotation, toward second end portion 72, is formed in a portion of stirring portion 73 closer to second end portion 72. In stirring member 70F in the present embodiment, extension portion 75 is formed as being curved toward second end portion 72 (see FIGS. 35 and 36). Extension portion 75 may be formed as being bent in an L shape toward second end portion 72.

Extension portion 75 of stirring member 70F can stir a stirred object present around the center of inner pot 20 and a stirred object present around a bottom of inner pot 20. Stirring member 70F can improve capability to stir a stirred object.

Around the center of inner pot 20 and around the bottom of inner pot 20, water 93 which has received centrifugal force attempts to move outward in the direction of radius of rotation as it precedes rice 92. If extension portion 75 is not provided, fluid force is less likely to be provided to rice 92 which should start rotation as it receives fluid force from stirred water 93. If extension portion 75 is not provided, it becomes difficult to stir a stirred object present around the center of inner pot 20 relative to stirring member 70F and a stirred object present around the bottom of inner pot 20. Stirring member 70F can effectively be used when an amount of stirred object is small.

As extension portion 75 is curved toward second end portion 72, resistance received from a stirred object by stirring portion 73 can be lowered. Rice 92 and water 93 can smoothly flow along a surface of stirring member 70F and energy consumption required for stirring can also be reduced.

In stirring member 70F, the portion of stirring portion 73 closer to second end portion 72 is formed as being tapered so as to decrease in thickness toward second end portion 72.

Figure 38:
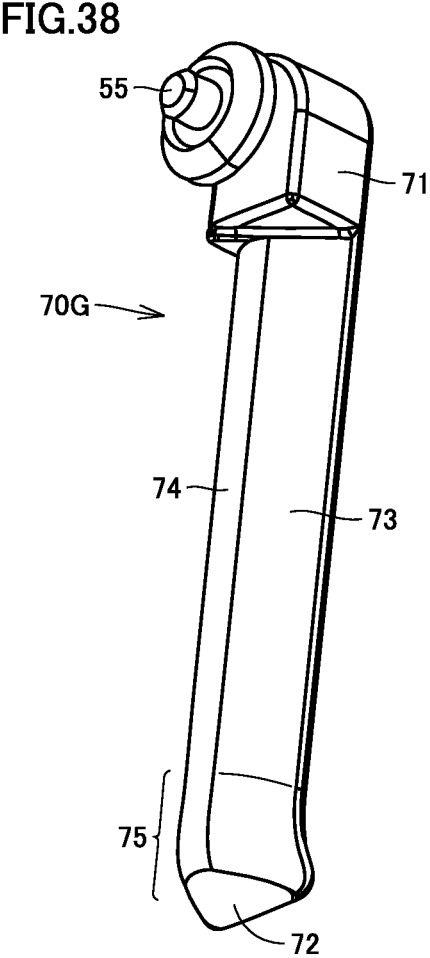
FIG. 38 is a perspective view showing a stirring member (a movable member) in a modification of Embodiment 6.

As in a stirring member 70G shown in FIG. 38, a portion of stirring portion 73 closer to second end portion 72 does not have to be formed as being tapered so as to decrease in thickness toward second end portion 72. Similarly to extension portion 75 of stirring member 70F, extension portion 75 of stirring member 70G can effectively stir a stirred object present around the center of inner pot 20 and a stirred object present around the bottom of inner pot 20.

Embodiment 7

A stirring member 70H in the present embodiment will be described with reference to FIGS. 39 to 42. Stirring member 70H can be applied to a rice cooker similar to rice cooker 100 (see FIG. 1) in Embodiment 1 described above or a rotor similar to rotor 50 (see FIG. 2) in Embodiment 1 described above.

Figure 39:
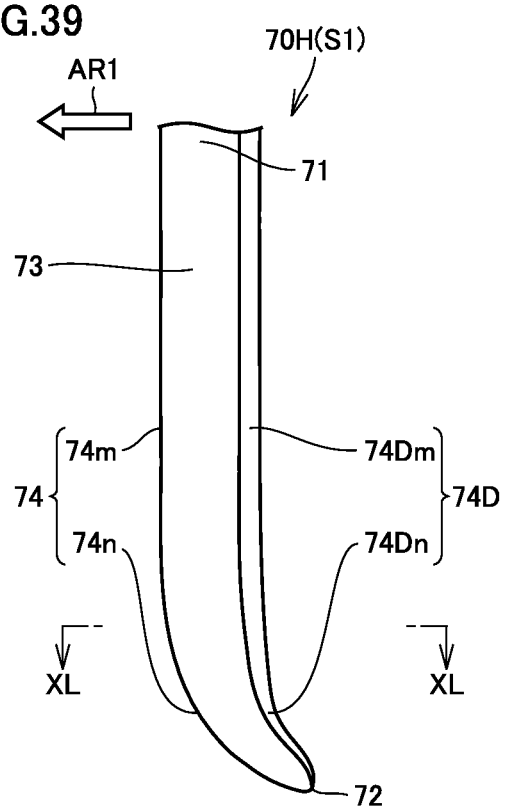
FIG. 39 is a perspective view showing a stirring member (a movable member) in Embodiment 7.
Figure 40:
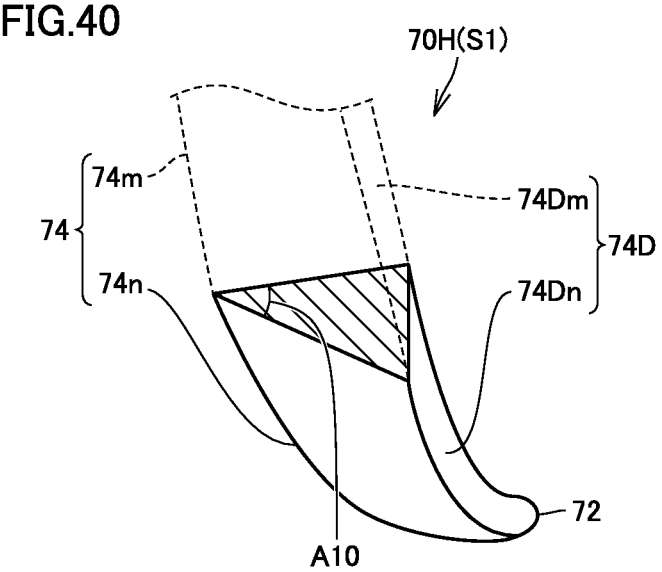
FIG. 40 is a cross-sectional view in a direction shown with an arrow along the line XL-XL in FIG. 39.
Figure 41:
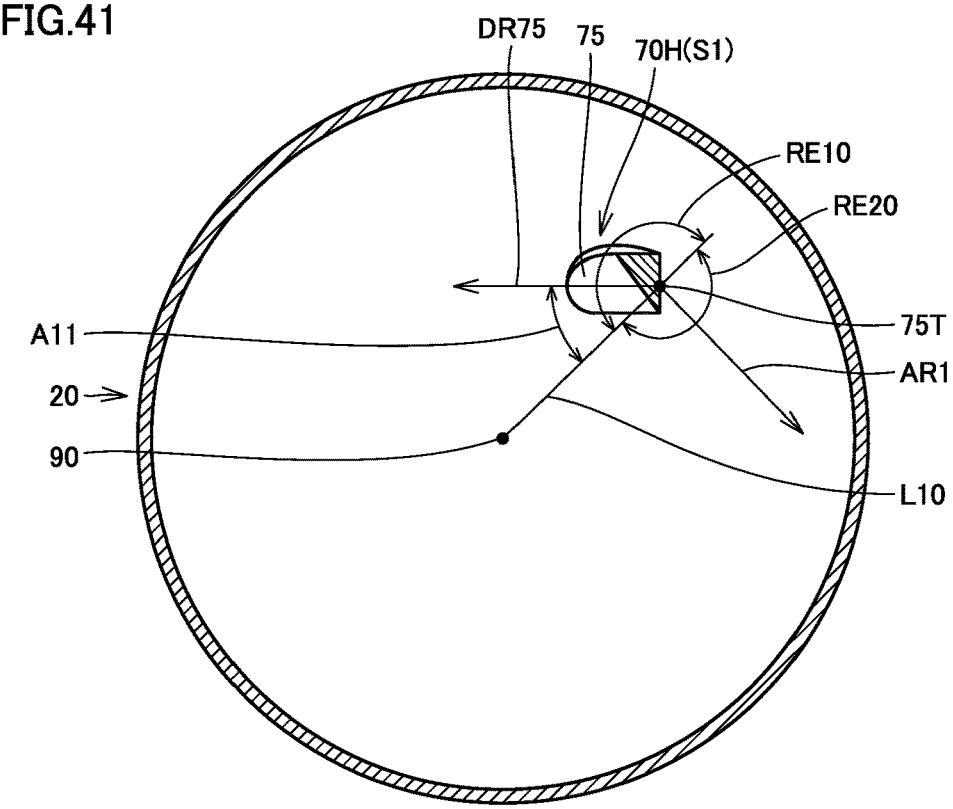
FIG. 41 is a diagram schematically showing a state that the stirring member (movable member) in Embodiment 7 is arranged in an inner pot.
Figure 42:
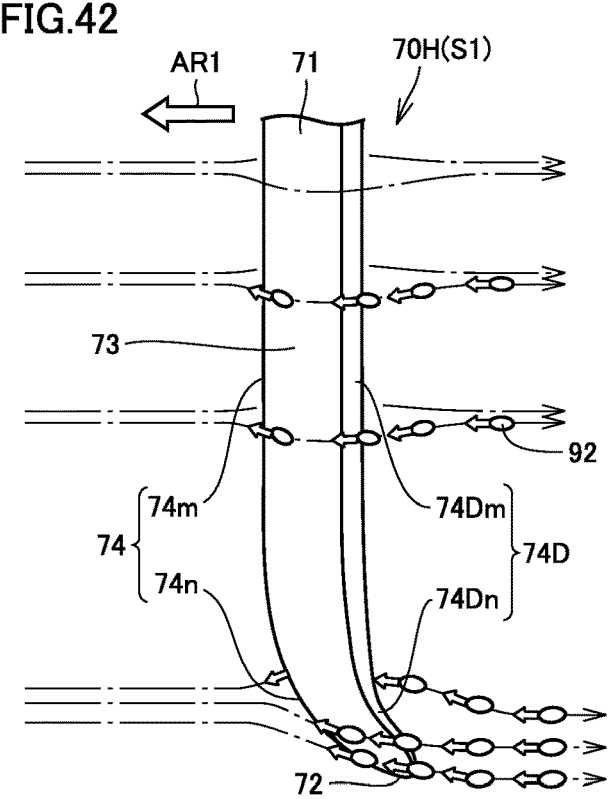
FIG. 42 is a perspective view showing stirring of a stirred object by the stirring member (movable member) in Embodiment 7.

FIG. 39 is a perspective view showing stirring member 70H. FIG. 40 is a cross-sectional view in a direction shown with an arrow along the line XL-XL in FIG. 39. FIG. 41 is a diagram showing arrangement of stirring member 70H in inner pot 20. FIG. 42 is a perspective view showing stirring of a stirred object by stirring member 70H.

As shown in FIGS. 39 and 40, stirring member 70H has a rear edge portion 74D and stirring front edge portion 74 as in the stirring member in each embodiment described above. Rear edge portion 74D in the present embodiment corresponds to rear end surface 73c (see FIG. 8) of stirring member 70 (see FIG. 8) in Embodiment 1 described above. Rear edge portion 74D is located rearmost in the direction of rotation (the direction shown with arrow AR1) of stirring member 70H when stirring member 70H forming standing state S1 (see FIG. 1) rotates in the direction shown with arrow AR1. A portion 74Dn of rear edge portion 74D closer to second end portion 72 is located on the rear side of the direction of rotation (the direction shown with arrow AR1) relative to a portion 74Dm of rear edge portion 74D closer to first end portion 71. Stirring front edge portion 74 is located foremost in the direction of rotation (the direction shown with arrow AR1) of stirring member 70H when stirring member 70H forming standing state S1 (see FIG. 1) rotates in the direction shown with arrow AR1. A portion 74n of stirring front edge portion 74 closer to second end portion 72 is located on the rear side of the direction of rotation (the direction shown with arrow AR1) relative to a portion 74m of stirring front edge portion 74 closer to first end portion 71.

As shown in FIG. 40, in stirring member 70H, a cross-sectional shape of a portion of stirring portion 73 closer to second end portion 72 in a cross-section orthogonal to axis of rotation 90 (see FIG. 41) is such that an interior angle (an angle A10) formed in stirring front edge portion 74 is at an acute angle.

As shown in FIG. 41, in stirring member 70H, extension portion 75 extending inward in the direction of radius of rotation toward second end portion 72 is further formed in a portion of stirring portion 73 closer to second end portion 72. When a direction of extension of extension portion 75 (a direction shown with an arrow DR75) is viewed in a direction in parallel to axis of rotation 90, a reference line L10 is formed to connect a center of rotation of extension portion 75 (axis of rotation 90) and a base end 75T of extension portion 75 in the direction of extension (the direction shown with arrow DR75) to each other. An angle A11 (a sweepback) formed between the direction of extension (the direction shown with arrow DR75) and reference line L10 is desirably not smaller than 0° and not larger than 90°. Preferably, angle A11 (sweepback) is desirably not smaller than 5° and not larger than 50°. The reason therefor will be described in Experimental Example 4 which will be described later.

When relation of 0°<angle A11<180° is satisfied, in other words, when the direction of extension of extension portion 75 (the direction shown with arrow DR75) is included in a range of a region RE10, stirring member 70H can be concluded to form a "sweepback wing". In this case, extension portion 75 extends forward in the second direction of rotation (the direction shown with arrow AR2 opposite to arrow AR1 (see FIGS. 5 and 6)), toward second end portion 72. When relation of −180°<angle A11<0° is satisfied, in other words, when the direction of extension of extension portion 75 (the direction shown with arrow DR75) is included in a range of a region RE20, stirring member 70H can be concluded to form a "forwardswept wing."

As shown in FIG. 42, when stirring member 70H rotates in the direction shown with arrow AR1 (the first direction of rotation) and stirs a stirred object (rice 92 and water), a region of stirring of a stirred object by stirring member 70H is greater than in Comparative Examples 7 and 8 which will be described next. In portions 74n and 74Dn of stirring portion 73 closer to second end portion 72, a stable flow is formed, owing to lowering in fluid friction resistance. Resistance received from a stirred object by these portions 74n and 74Dn decreases, as compared with a stirring member not having a sweepback formed and a stirring member having a forwardswept wing formed.

Rice 92 and water which flow in the vicinity of a portion of stirring member 70H closer to second end portion 72 can smoothly flow along a surface of stirring member 70H. The possibility of damage of a stirred object by stirring member 70H is significantly lowered. Energy consumption required for stirring can also be reduced.

Even when portion 74n of stirring front end portion 74 closer to second end portion 72 is not located on the rear side of the direction of rotation (the direction shown with arrow AR1) relative to portion 74m of stirring front edge portion 74 closer to first end portion 71, in other words, even when stirring front edge portion 74 is formed similarly to stirring front edge portion 74 in Comparative Example 7 (see FIG. 43) which will be described next, portion 74Dn of rear edge portion 74D closer to second end portion 72 is located on the rear side of the direction of rotation (the direction shown with arrow AR1) relative to portion 74Dm of rear edge portion 74D closer to first end portion 71, so that a stable flow is formed in portion 74Dn of stirring portion 73 closer to second end portion 72, owing to lowering in fluid friction resistance. Resistance received from a stirred object by this portion 74Dn decreases, as compared with a stirring member not having a sweepback formed and a stirring member having a forwardswept wing formed. Rice 92 and water which flow in the vicinity of a portion of stirring member 70H closer to second end portion 72 can smoothly flow along the surface of stirring member 70H. The possibility of damage of a stirred object by stirring member 70H is significantly lowered. Energy consumption required for stirring can also be reduced.

As described above, stirring member 70H is provided with extension portion 75 extending inward in the direction of radius of rotation, toward second end portion 72. A stirred object present around the center of inner pot 20 and a stirred object present around the bottom of inner pot 20 can be stirred. Stirring member 70H can improve capability to stir a stirred object.

Comparative Example 7

Figure 43:
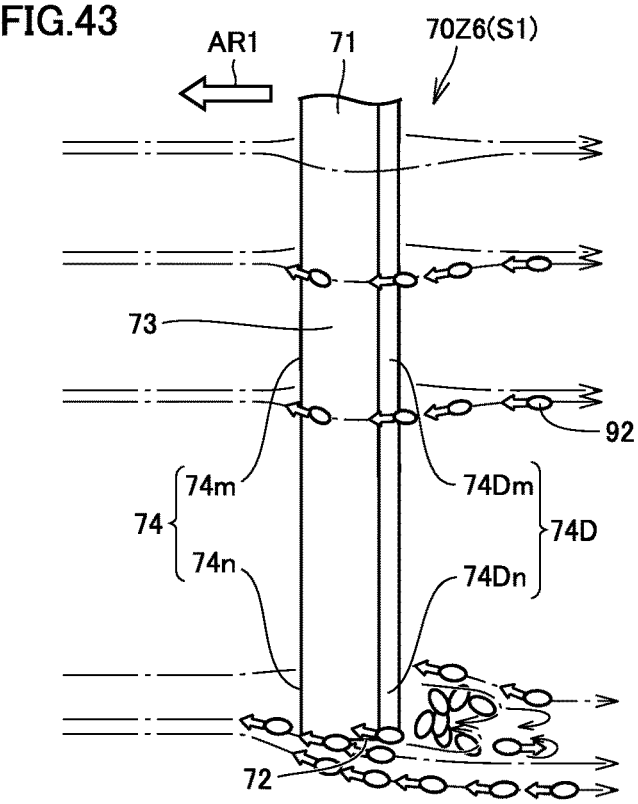
FIG. 43 is a perspective view showing a stirring member (a movable member) in Comparative Example 7 in connection with Embodiment 7.

A stirring member 70Z6 in Comparative Example 7 in connection with Embodiment 7 will be described with reference to FIG. 43. Stirring member 70Z6 does not have extension portion 75, unlike stirring member 70H in Embodiment 7 described above. Stirring member 70Z6 is formed in a form of a rod extending from first end portion 71 to second end portion 72. In the direction of rotation (the direction shown with arrow AR1), portion 74Dn of rear edge portion 74D closer to second end portion 72 and portion 74Dm of rear edge portion 74D closer to first end portion 71 are arranged at the same position (on the same line), and in addition, portion 74n of stirring front edge portion 74 closer to second end portion 72 and portion 74m of stirring front edge portion 74 closer to first end portion 71 are arranged at the same position (on the same line).

When stirring member 70Z6 rotates in the direction shown with arrow AR1 (the first direction of rotation) and stirs a stirred object (rice 92 and water), a region of stirring by stirring member 70Z6 is small. In the vicinity of second end portion 72, a partial turbulence is likely to be formed and rice 92 may collide with one another, which may lead to a crack in some rice 92 and separation of a nutrient from a surface of rice 92.

Comparative Example 8

Figure 44:
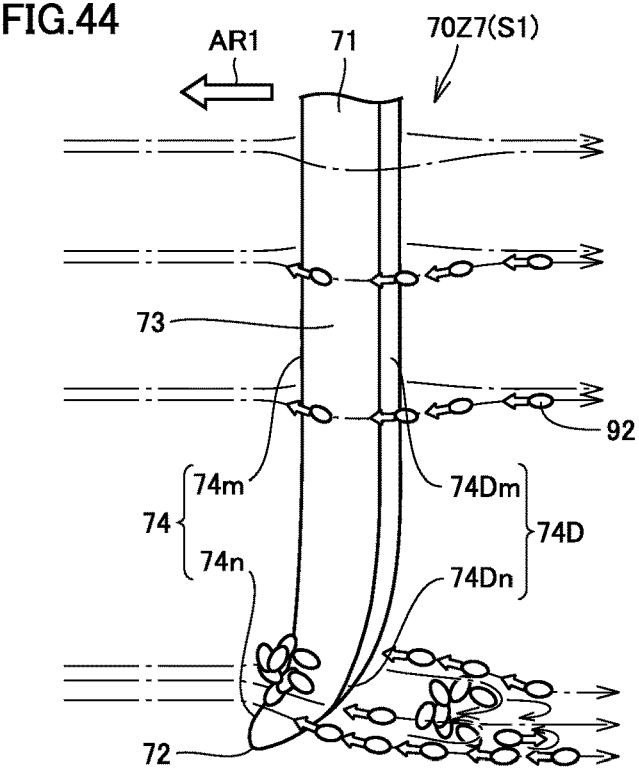
FIG. 44 is a perspective view showing a stirring member (a movable member) in Comparative Example 8 in connection with Embodiment 7.

A stirring member 70Z7 in Comparative Example 8 in connection with Embodiment 7 will be described with reference to FIG. 44. Unlike stirring member 70H in Embodiment 7 described above, stirring member 70Z7 has a forward swept wing formed. Portion 74Dn of rear edge portion 74D closer to second end portion 72 is located on the forward side of the direction of rotation (the direction shown with arrow AR1) relative to portion 74Dm of rear edge portion 74D closer to first end portion 71, and in addition, portion 74n of stirring front edge portion 74 closer to second end portion 72 is located on the forward side of the direction of rotation (the direction shown with arrow AR1) relative to portion 74m of stirring front edge portion 74 closer to first end portion 71.

When stirring member 70Z7 rotates in the direction shown with arrow AR1 (the first direction of rotation) and stirs a stirred object (rice 92 and water), a partial turbulence is likely to be formed in the vicinity of second end portion 72, and rice 92 may collide with one another, which may lead to a crack in some rice 92 and separation of a nutrient from a surface of rice 92. When stirring member 70Z7 forms turned-down state S2, scoop or churn-up of a stirred object is also possible.

Embodiment 8

Figure 45:
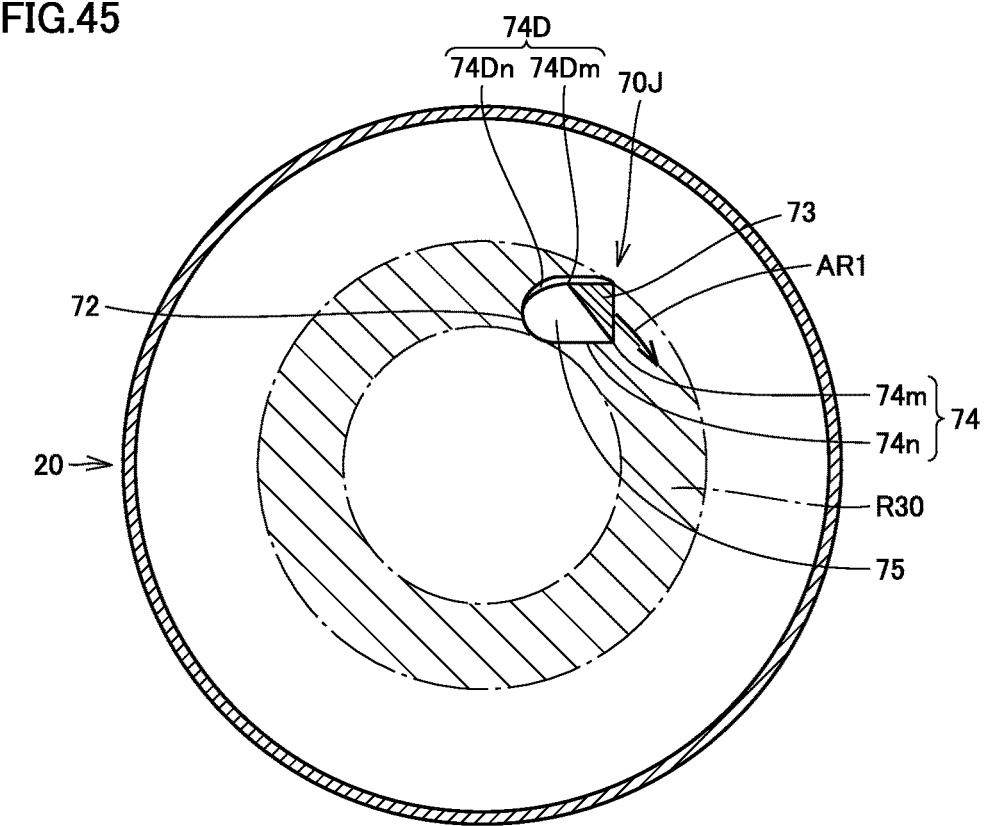
FIG. 45 is a diagram schematically showing arrangement of a stirring member (a movable member) in Embodiment 8 in an inner pot.

A stirring member 70J in the present embodiment will be described with reference to FIG. 45. Stirring member 70J can be applied to a rice cooker similar to rice cooker 100 (see FIG. 1) in Embodiment 1 described above or a rotor similar to rotor 50 (see FIG. 2) in Embodiment 1 described above.

Stirring member 70J is constructed similarly to stirring member 70H (see FIG. 41) in Embodiment 7 described above. In stirring member 70J, angle A11 (see FIG. 41) as a sweepback described above is set to 45°. When stirring member 70J rotates in the direction shown with arrow AR1 (the first direction of rotation) and stirs a stirred object (rice and water), a region of stirring of a stirred object by stirring member 70J is greater than in Comparative Examples 7 and 8 described above. A region R30 shown in FIG. 45 represents an area of passage of stirring member 70J when stirring member 70J rotates in the direction shown with arrow AR1 (the first direction of rotation) and stirs a stirred object (rice and water).

Comparative Example 9

Figure 46:
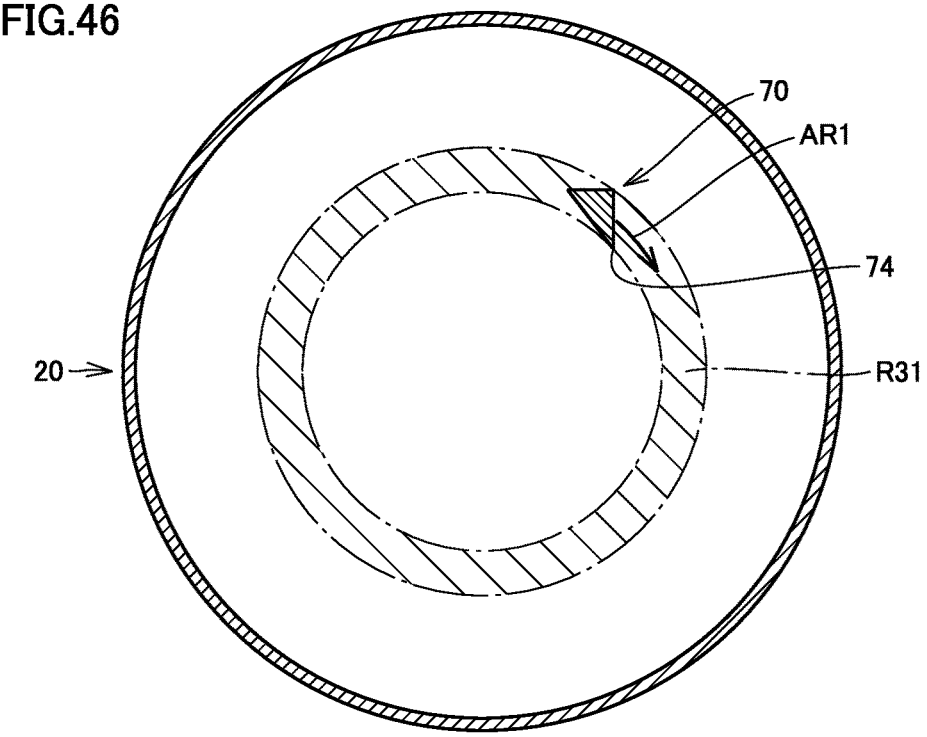
FIG. 46 is a diagram schematically showing arrangement of the stirring member (movable member) in Comparative Example 9 in connection with Embodiment 8 in an inner pot.

Stirring member 70 in Comparative Example 9 in connection with Embodiment 8 will be described with reference to FIG. 46. Stirring member 70 is constructed similarly to stirring member 70 (see FIG. 13) in Embodiment 1 described above. Unlike stirring member 70J in Embodiment 8 described above, in stirring member 70, a portion of rear edge portion 74D closer to second end portion 72 (not shown) and a portion of rear edge portion 74D closer to first end portion 71 (not shown) are arranged at the same position (on the same line) in the direction of rotation (the direction shown with arrow AR1), and in addition, a portion of stirring front edge portion 74 closer to second end portion 72 (not shown) and a portion of stirring front edge portion 74 closer to first end portion 71 (not shown) are arranged at the same position (on the same line) in the direction of rotation (the direction shown with arrow AR1).

Unlike stirring member 70J in Embodiment 8 described above, stirring member 70 does not have extension portion 75 either. Stirring member 70 is formed in a form of a rod extending from first end portion 71 (not shown) to second end portion 72 (not shown).

When stirring member 70 rotates in the direction shown with arrow AR1 (the first direction of rotation) and stirs a stirred object (rice and water), a region of stirring of a stirred object by stirring member 70 is smaller than in Embodiment 8 described above. A region R31 shown in FIG. 46 represents an area of passage of stirring member 70 when stirring member 70 rotates in the direction shown with arrow AR1 (the first direction of rotation) and stirs a stirred object (rice and water).

Region R31 is smaller in area than region R30 (see FIG. 45) in Embodiment 8 described above. It can be concluded that stirring member 70J (see FIG. 45) in Embodiment 8 described above is higher in stirring capability than stirring member 70 in Comparative Example 9.

Embodiment 9

Figure 47:
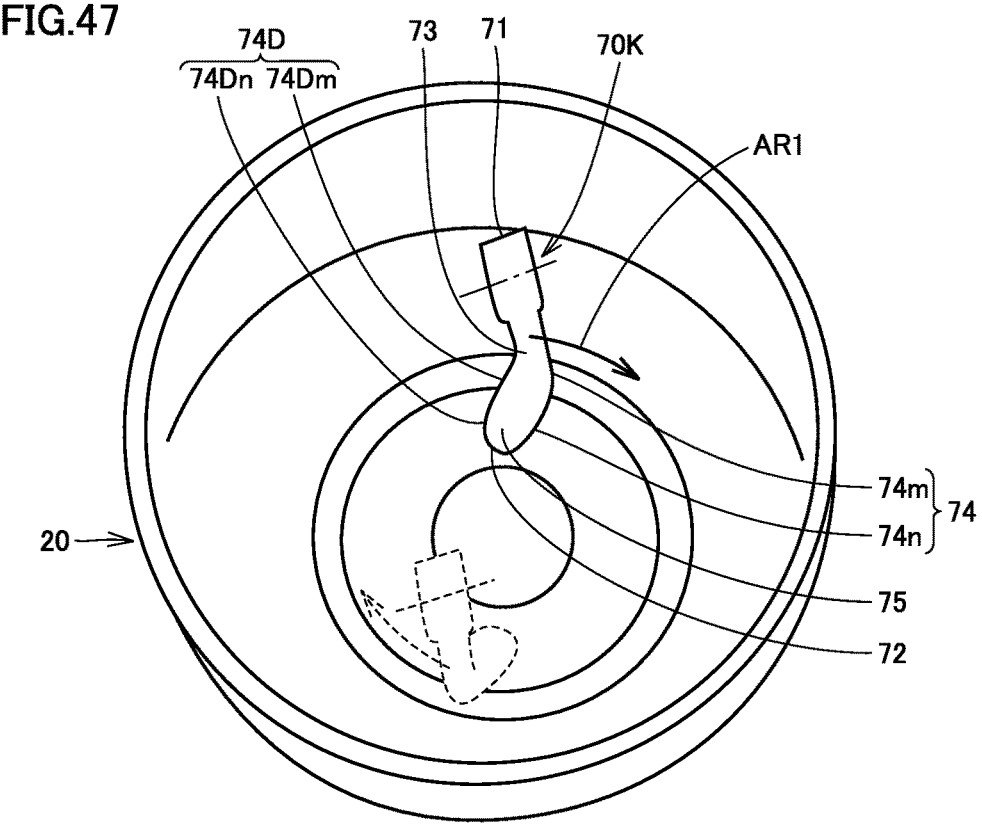
FIG. 47 is a perspective view schematically showing arrangement of a stirring member (a movable member) in Embodiment 9 in an inner pot.
Figure 48:
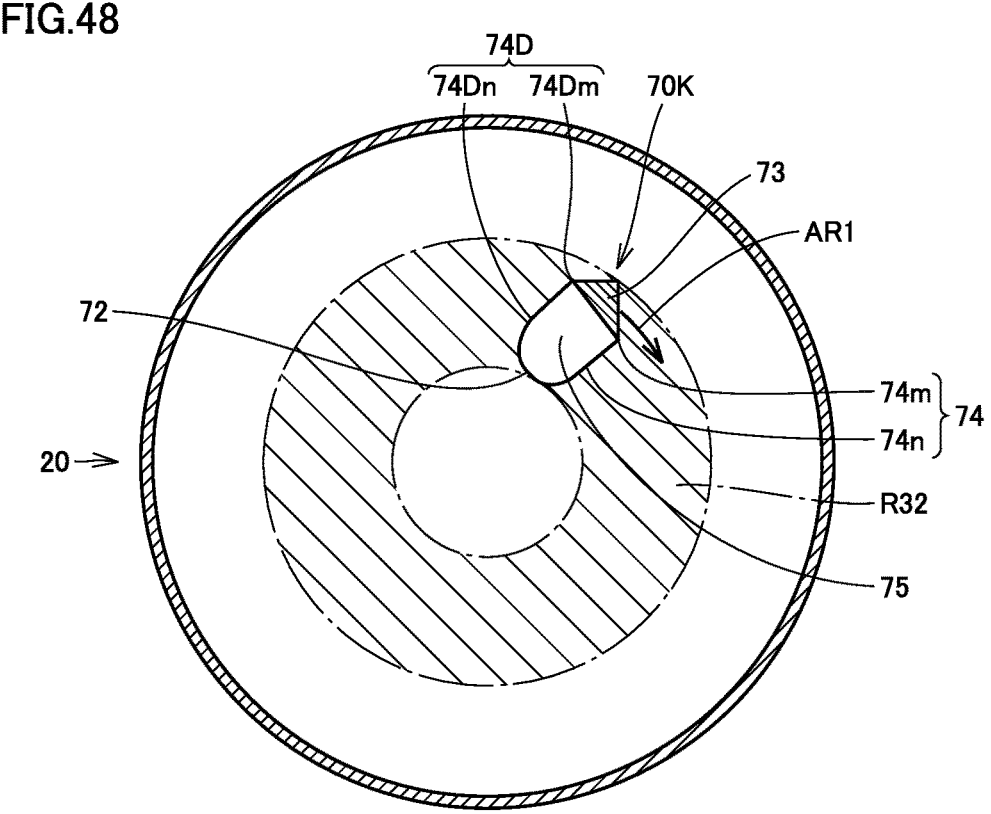
FIG. 48 is a diagram schematically showing arrangement of the stirring member (movable member) in Embodiment 9 in the inner pot.

A stirring member 70K in the present embodiment will be described with reference to FIGS. 47 and 48. Stirring member 70K can be applied to a rice cooker similar to rice cooker 100 (see FIG. 1) in Embodiment 1 described above or a rotor similar to rotor 50 (see FIG. 2) in Embodiment 1 described above.

Stirring member 70K is constructed similarly to stirring member 70H (see FIG. 41) in Embodiment 7 described above. In stirring member 70K, angle A11 (see FIG. 41) as a sweepback described above is set to 5°. When stirring member 70K rotates in the direction shown with arrow AR1 (the first direction of rotation) and stirs a stirred object (rice and water), a region of stirring of a stirred object by stirring member 70K is greater than in Embodiment 8 described above. A region R32 shown in FIG. 48 represents an area of passage of stirring member 70K when stirring member 70K rotates in the direction shown with arrow AR1 (the first direction of rotation) and stirs a stirred object (rice and water).

Region R32 is greater in area than region R30 (see FIG. 45) in Embodiment 8 described above. It can be concluded that stirring member 70K in the present embodiment is higher in stirring capability than stirring member 70J (see FIG. 45) in Embodiment 8 described above.

Experimental Example 4

Experimental Example 4 will be described with reference to FIGS. 49 to 58. In Experimental Example 4, a stirring member 70L1 shown in FIGS. 49 and 50, a stirring member 70L2 shown in FIGS. 51 and 52, and a stirring member 70L3 shown in FIGS. 53 and 54 were used to stir rice and water. An amount of rice and an amount of water prepared were comparable to 3 gou. A speed of rotation of the stirring member was set to 170 rpm. Though details will be described next, stirring member 70L1 and stirring member 70L2 are different from each other only in a position of arrangement, and stirring member 70L1 and stirring member 70L3 are different from each other only in a direction of extension of extension portion 75.

(Stirring Member 70L1)

Figure 49:
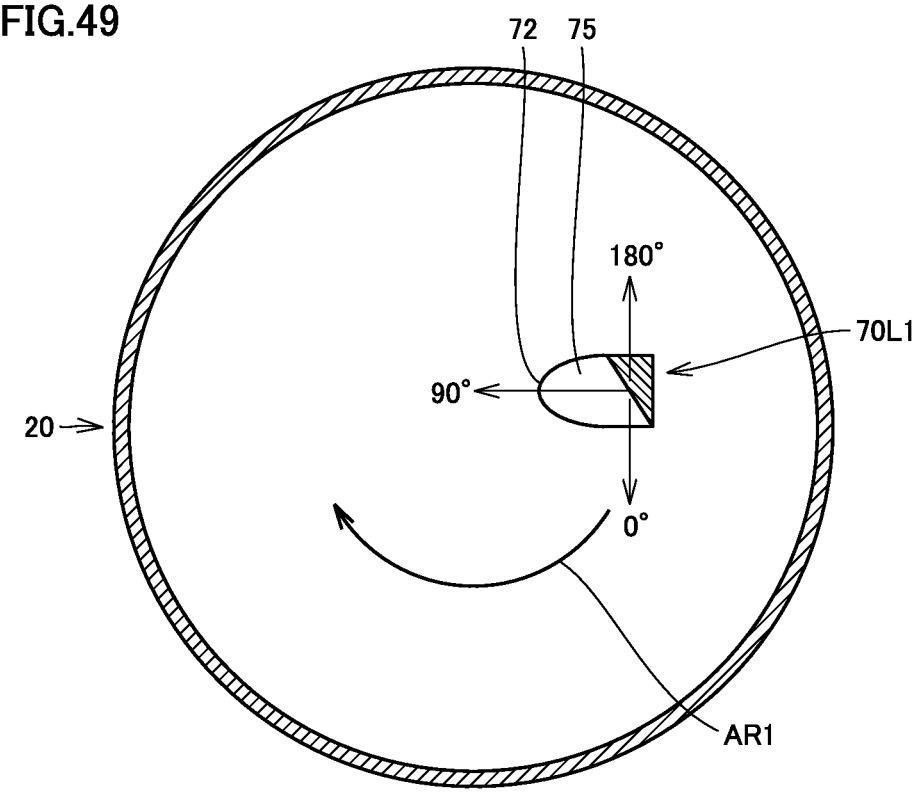
FIG. 49 is a first diagram (a lateral cross-sectional view) schematically showing arrangement in an inner pot, of a stirring member (a movable member) (a stirring member 70L1) used in Experimental Example 4.
Figure 50:
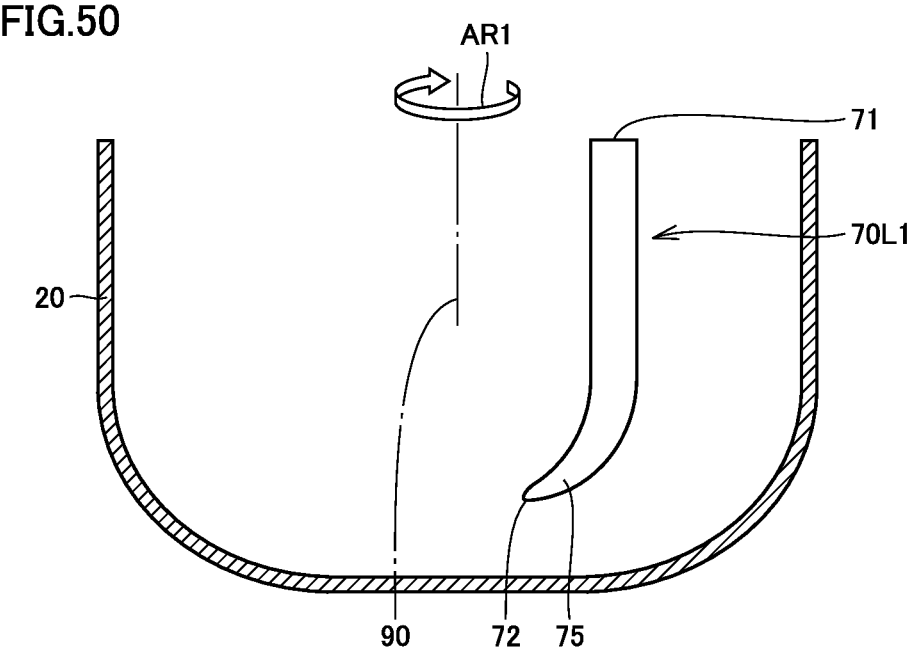
FIG. 50 is a second diagram (a vertical cross-sectional view) schematically showing arrangement in the inner pot, of the stirring member (movable member) (stirring member 70L1) used in Experimental Example 4.

Referring to FIGS. 49 and 50, stirring member 70L1 has extension portion 75 in a portion closer to second end portion 72. Extension portion 75 of stirring member 70L1 extends inward in the direction of radius of rotation, toward second end portion 72. A portion of stirring member 70L1 closer to first end portion 71 has a cross-sectional shape formed in a shape of a right triangle. The portion formed in a shape of a right triangle is formed over a length of ⅔ of a longitudinal direction of stirring member 70L1. Extension portion 75 is formed over a length of ⅓ of the longitudinal direction of stirring member 70L1. Stirring member 70L1 is arranged such that a position of center of gravity of the triangle in the portion formed in the shape of the right triangle is constantly located at ½ of a radius of inner pot 20.

With an angle value of a direction of extension of extension portion 75 being varied within a range from 0° to 180° in FIG. 49, capability of stirring member 70L1 to stir a stirred object (a line SL1 in FIG. 55) and power necessary for stirring member 70L1 to stir a stirred object (a line SL1 in FIG. 56) were measured. An angle value of 0° means that a direction of extension of extension portion 75 coincides with a direction of travel (the direction of rotation) of stirring member 70L1. For the sake of convenience, a value for stirring capability and a value for power do not include influence by the tangential straight line in Embodiment 1 described above.

Figure 57:
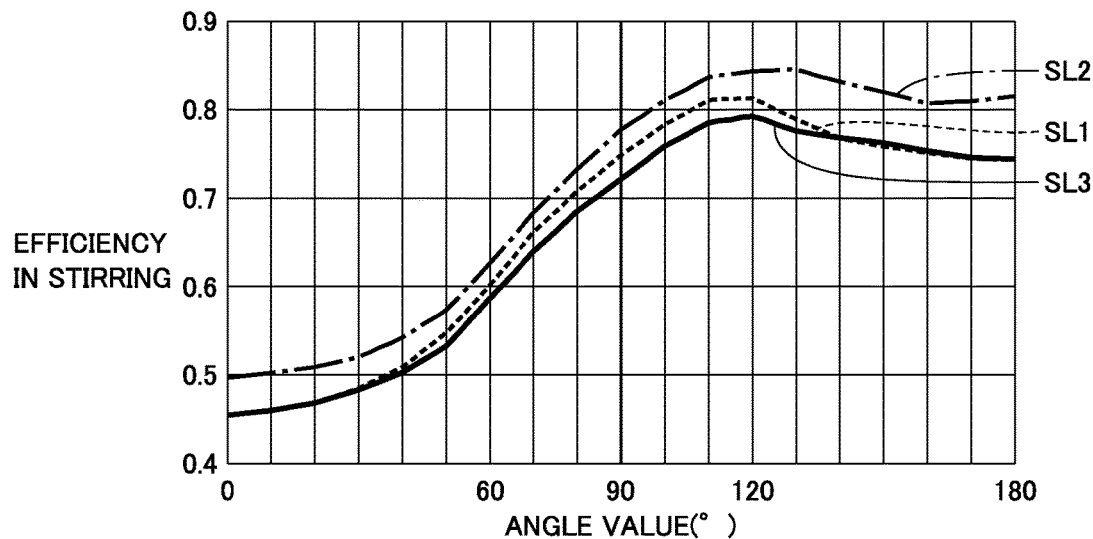
FIG. 57 is a diagram showing efficiency in stirring by the stirring member (movable member) in Experimental Example 4.

Efficiency in stirring was calculated by dividing obtained stirring capability by obtained power (a line SL1 in FIG. 57).

In addition, stirring member 70L1 was rotated in the second direction of rotation (the direction opposite to arrow AR1) to change stirring member 70L1 from standing state S1 to turned-down state S2. Here, a ratio of rice which had been churned up (scooped) toward the wall surface of inner pot 20 and remained adhering to the wall surface of inner pot 20 was measured (a line SL1 in FIG. 58).

(Stirring Member 70L2)

Figure 51:
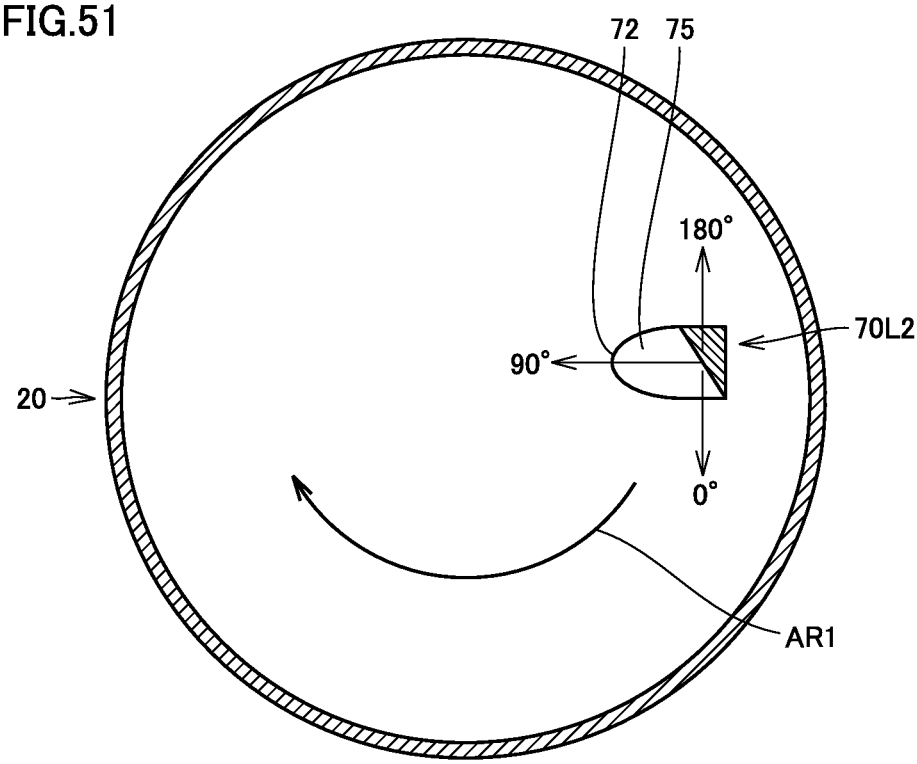
FIG. 51 is a first diagram (a lateral cross-sectional view) schematically showing arrangement in an inner pot, of a stirring member (a movable member) (a stirring member 70L2) used in Experimental Example 4.
Figure 52:
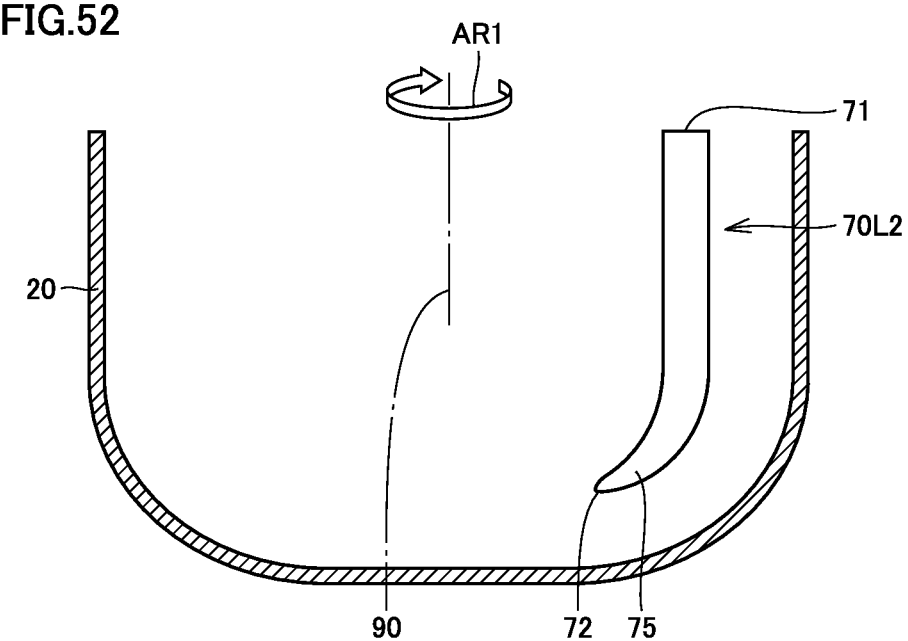
FIG. 52 is a second diagram (a vertical cross-sectional view) schematically showing arrangement in the inner pot, of the stirring member (movable member) (stirring member 70L2) used in Experimental Example 4.

Referring to FIGS. 51 and 52, stirring member 70L2 also has extension portion 75 in a portion closer to second end portion 72. Extension portion 75 of stirring member 70L2 also extends inward in the direction of radius of rotation, toward second end portion 72. A portion of stirring member 70L2 closer to first end portion 71 has a cross-sectional shape formed in a shape of a right triangle. The portion formed in the shape of the right triangle is formed over a length of ⅔ of a longitudinal direction of stirring member 70L2. Extension portion 75 is formed over a length of ⅓ of the longitudinal direction of stirring member 70L2. Stirring member 70L2 is arranged such that a position of center of gravity of the triangle in the portion formed in the shape of the right triangle is constantly located on a further outer side of the direction of radius of rotation as compared with the position in stirring member 70L1 (see FIG. 49) described above.

With an angle value of a direction of extension of extension portion 75 being varied within a range from 0° to 180° in FIG. 51, capability of stirring member 70L2 to stir a stirred object (a line SL2 in FIG. 55) and power necessary for stirring member 70L2 to stir a stirred object (a line SL2 in FIG. 56) were measured. An angle value of 0° means that a direction of extension of extension portion 75 coincides with a direction of travel (the direction of rotation) of stirring member 70L2. For the sake of convenience, a value for stirring capability and a value for power do not include influence by the tangential straight line in Embodiment 1 described above.

Efficiency in stirring was calculated by dividing obtained stirring capability by obtained power (a line SL2 in FIG. 57). In addition, stirring member 70L2 was rotated in the second direction of rotation (the direction opposite to arrow AR1) to change stirring member 70L2 from standing state S1 to turned-down state S2. Here, a ratio of rice which had been churned up toward the wall surface of inner pot 20 and remained adhering to the wall surface of inner pot 20 was measured (a line SL2 in FIG. 58).

(Stirring Member 70L3)

Figure 53:
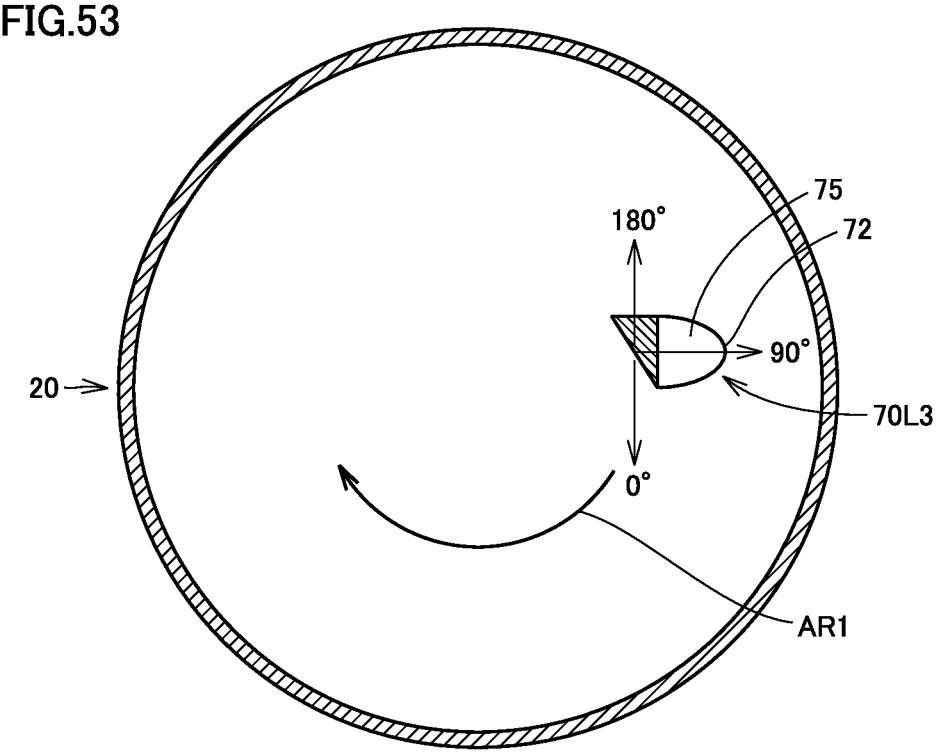
FIG. 53 is a first diagram (a lateral cross-sectional view) schematically showing arrangement in an inner pot, of a stirring member (a movable member) (a stirring member 70L3) used in Experimental Example 4.
Figure 54:
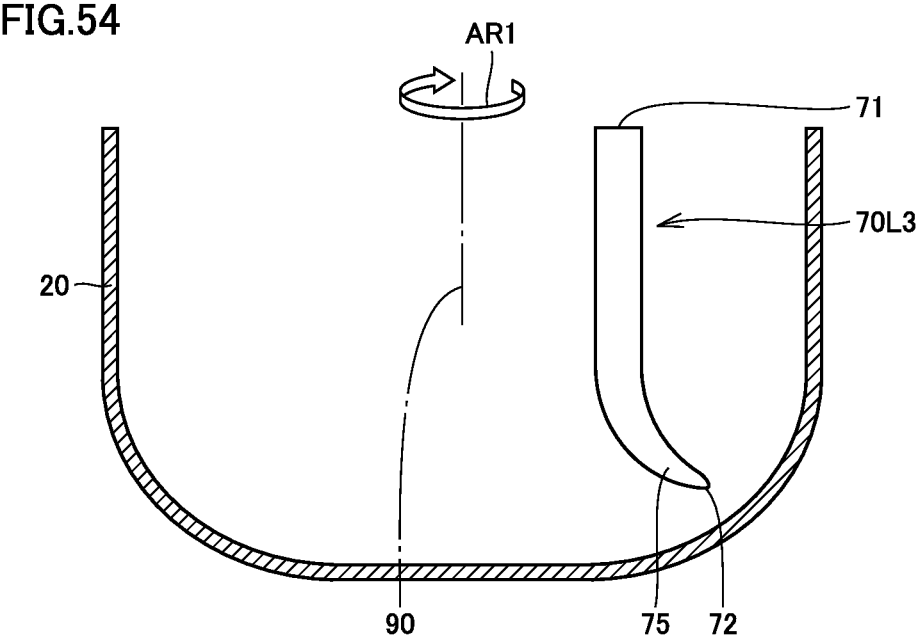
FIG. 54 is a second diagram (a vertical cross-sectional view) schematically showing arrangement in the inner pot, of the stirring member (movable member) (stirring member 70L3) used in Experimental Example 4.

Referring to FIGS. 53 and 54, stirring member 70L3 also has extension portion 75 in a portion closer to second end portion 72. Extension portion 75 of stirring member 70L3 extends outward in the direction of radius of rotation, toward second end portion 72. A portion of stirring member 70L3 closer to first end portion 71 has a cross-sectional shape formed in a shape of a right triangle. The portion formed in the shape of the right triangle is formed over a length of ⅔ of a longitudinal direction of stirring member 70L3. Extension portion 75 is formed over a length of ⅓ of the longitudinal direction of stirring member 70L3. Stirring member 70L3 is arranged such that a position of center of gravity of the triangle in the portion formed in the shape of the right triangle is constantly located at ½ of a radius of inner pot 20.

With an angle value of a direction of extension of extension portion 75 being varied within a range from 0° to 180° in FIG. 53, capability of stirring member 70L3 to stir a stirred object (a line SL3 in FIG. 55) and power necessary for stirring member 70L3 to stir a stirred object (a line SL3 in FIG. 56) were measured. An angle value of 0° means that a direction of extension of extension portion 75 coincides with a direction of travel (the direction of rotation) of stirring member 70L3. For the sake of convenience, a value for stirring capability and a value for power do not include influence by the tangential straight line in Embodiment 1 described above.

Efficiency in stirring was calculated by dividing obtained stirring capability by obtained power (a line SL3 in FIG. 57). In addition, stirring member 70L3 was rotated in the second direction of rotation (the direction opposite to arrow AR1) to change stirring member 70L3 from standing state S1 to turned-down state S2. Here, a ratio of rice which had been churned up toward the wall surface of inner pot 20 and remained adhering to the wall surface of inner pot 20 was measured (a line SL3 in FIG. 58).

(Results of Experiments)

Figure 55:
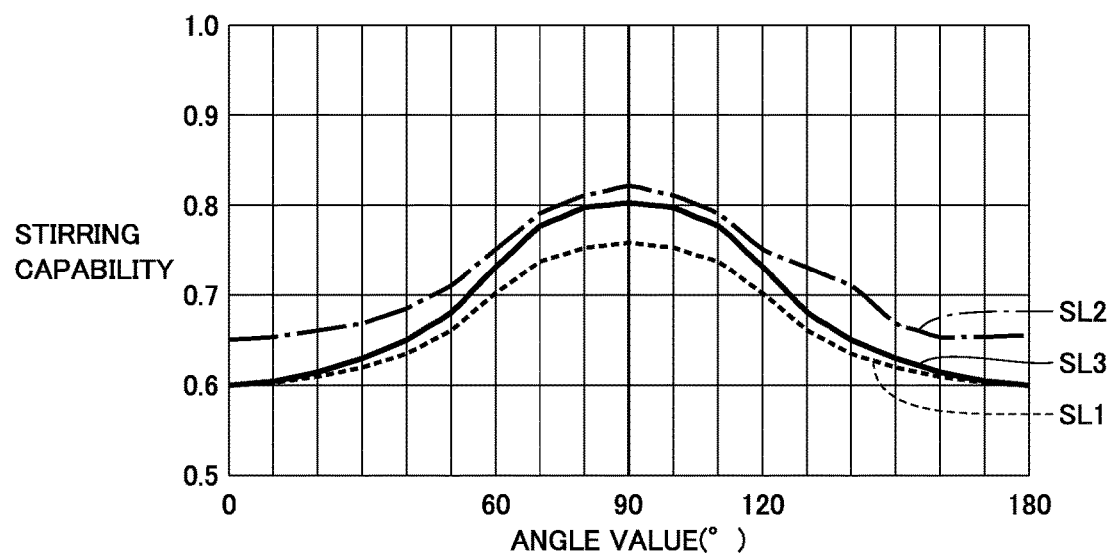
FIG. 55 is a diagram showing a result of simulation in which capability of the stirring member (movable member) in Experimental Example 4 to stir rice was measured.

Results of the experiments in Experimental Example 4 will be described with reference to FIGS. 55 to 58. Stirring capability shown on the ordinate in FIG. 55 is shown with a case that the entire stirred object is stirred and the entire stirred object moves in inner pot 20 being defined as 1.0. A higher numeric value means better stirring of a stirred object.

As shown in FIG. 55, it can be seen that, in a case of stirring member 70L1 (line SL1), when an angle value is not smaller than 80° and not larger than 100°, 75% or more of the stirred object has been stirred. It can be seen that, in a case of stirring member 70L2 (line SL2), when an angle value is not smaller than 80° and not larger than 100°, 80% or more of the stirred object has been stirred. It can be seen that, in a case of stirring member 70L3 (line SL3), when an angle value is not smaller than 80° and not larger than 100°, approximately 80% of the stirred object has been stirred.

Figure 56:
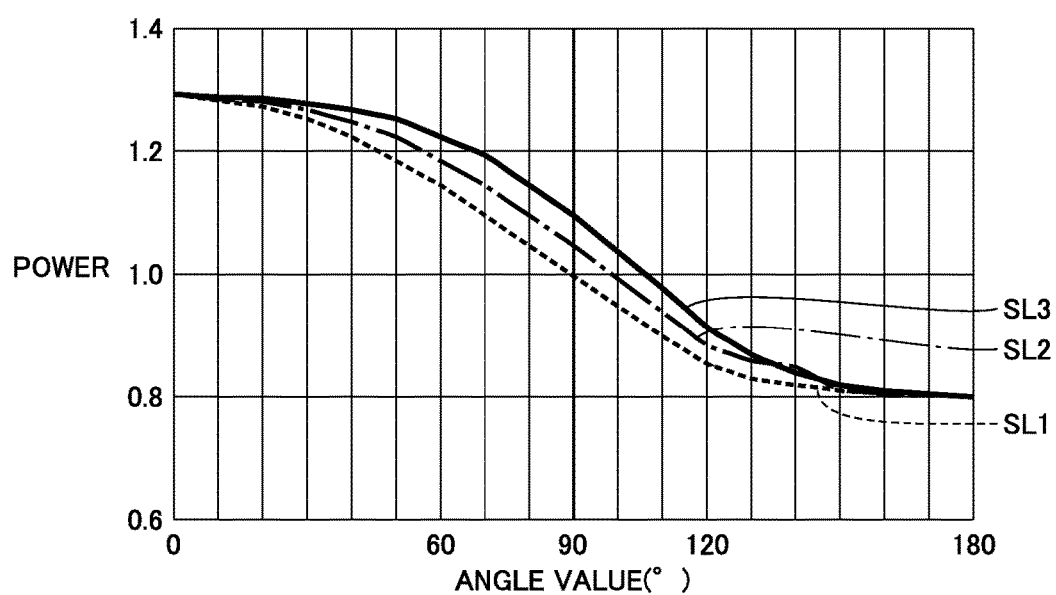
FIG. 56 is a diagram showing a result of simulation in which power necessary for the stirring member (movable member) in Experimental Example 4 to stir rice was measured.

Power shown on the ordinate in FIG. 56 is shown, with a case that an angle value in stirring member 70L1 (line SL1) is set to 0° (in other words, a direction of extension of extension portion 75 of stirring member 70L1 coincides with a direction of travel of rotation) being defined as a reference value of 1.0. A value relative to the reference value is shown as power shown on the ordinate in FIG. 26. A higher numeric value means higher power necessary for a stirring member to stir a stirred object.

As shown in FIG. 56, it can be seen that, in common to stirring members 70L1, 70L2, and 70L3, power necessary for the stirring member to stir a stirred object is higher in a case of 0°<angle value<90° (in the case of a forward swept swing) than in a case of 90°<angle value<180° (in the case of a sweepback wing). It can be seen that power necessary for the stirring member to stir a stirred object is lowest with stirring member 70L1 (line SL1) among the three stirring members, second lowest with stirring member 70L2 (line SL2), and highest with stirring member 70L3 (line SL3) among the three stirring members.

FIG. 57 shows efficiency in stirring by the stirring member when the angle value is varied in a range from 0° to 180°. Efficiency in stirring is represented by a value calculated by dividing stirring capability shown in FIG. 55 by power shown in FIG. 56. A higher numeric value indicates that the stirring member can stir a stirred object with good energy efficiency.

In obtaining an optimal value for an angle value, both of the fact that the stirring member is efficiently stirring a stirred object and the fact that minimum stirring capability (see FIG. 55) is ensured are considered. An angular range in FIG. 57 in which high efficiency in stirring (not lower than 70%) is obtained in an angular range in which stirring capability shown in FIG. 55 exceeds 75% is as follows.

In the case of stirring member 70L1 (line SL1), an optimal angular range is not smaller than 80° and not larger than 100°. In the case of stirring member 70L2 (line SL2), an optimal angular range is not smaller than 75° and not larger than 140°. In the case of stirring member 70L3 (line SL3), an optimal angular range is not smaller than 85° and not larger than 125°. Among these, efficiency in stirring is highest with stirring member 70L2 (line SL2), and the angular range is not smaller than 105° and not larger than 130°.

Figure 58:
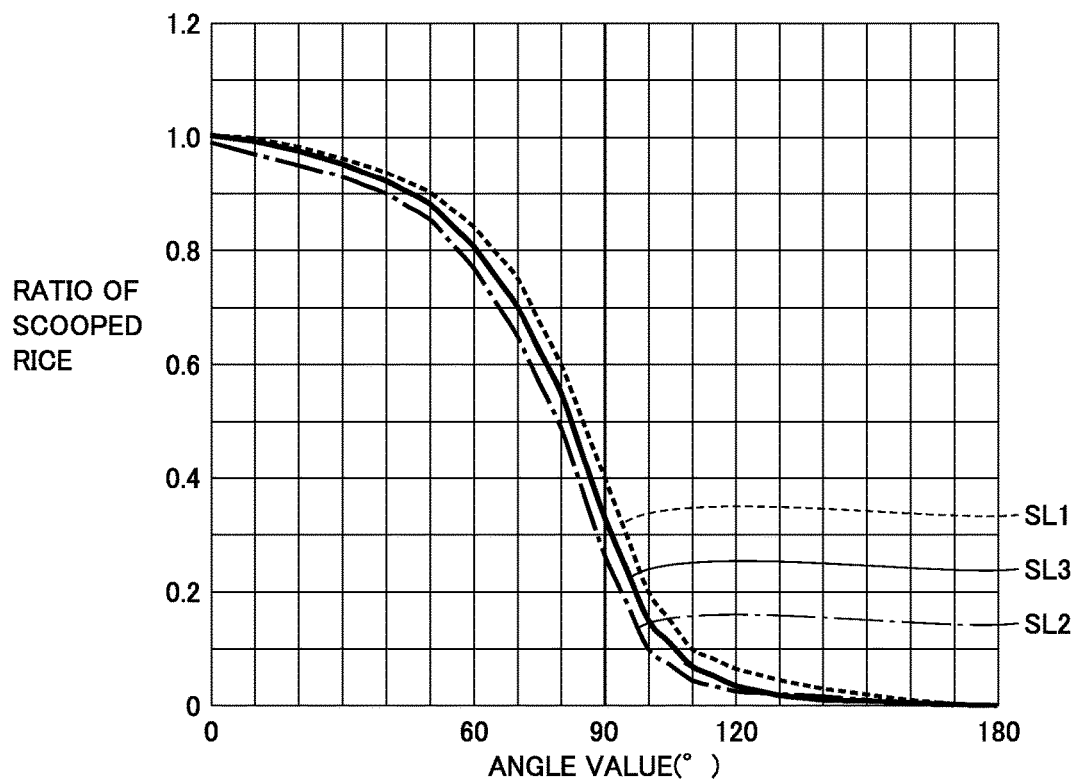
FIG. 58 is a diagram showing a ratio of rice which was churned up (scooped) toward a wall surface of an inner pot and remained adhering to the wall surface of the inner pot when the stirring member (movable member) in Experimental Example 4 was changed from the standing state to the turned-down state.

In FIG. 58, a ratio of rice which had been churned up (scooped) toward the wall surface of inner pot 20 and remained adhering to the wall surface of inner pot 20 when the stirring member was rotated in the second direction of rotation (the direction opposite to arrow AR1) and the stirring member was changed from standing state S1 to turned-down state S2 was measured. A ratio shown on the ordinate in FIG. 58 represents a value at the time when the angle value was varied within a range from 0° to 180°. This value is shown, with a case that an angle value is set to 0° (in other words, a direction of extension of extension portion 75 of stirring member 70 coincides with a direction of travel of rotation) being defined as a reference value of 1.0.

Scoop of rice by the stirring member at the time when the stirring member is changed from standing state S1 to turned-down state S2 is not much preferred from a point of view of sanity or cleaning. If a large amount of rice is scooped and adhere to a rotor, an operation of the rotor may fail. Rice which adhere to the rotor may be cooked in that state. As shown in FIG. 58, it can be seen that, as an angle value is smaller, an amount of scooped rice increases, and as an angle value is larger, an amount of scooped rice decreases. It can be seen that an amount of scooped rice is larger with a forward swept wing than with a sweepback wing.

Referring again to FIG. 55, stirring member 70L1 (see FIGS. 49 and 50) and stirring member 70L3 (see FIGS. 53 and 54) are identical to each other in a position of arrangement of the portion formed in a shape of the right triangle. In contrast, stirring member 70L3 (line SL3 in FIG. 55) is higher in stirring capability than stirring member 70L1 (line SL1 in FIG. 55). An amount of rice present on an outer side in inner pot 20 is larger than an amount of rice present on an inner side in inner pot 20. When the stirring member stirs rice on the outer side, an area of an outer portion of the stirring member significantly affects stirring capability. Therefore, stirring member 70L3 having a large area on the outer side is higher in stirring capability than stirring member 70L1.

On the other hand, stirring member 70L2 (line SL2 in FIG. 55) is higher in stirring capability than stirring member 70L3 (line SL3 in FIG. 55), because the portion formed in a shape of the right triangle is located on the outer side of inner pot 20 in stirring member 70L2. Stirring member 70L2 is highest in stirring capability among the three stirring members.

It can be seen from the results shown in FIGS. 55 to 58 that an angle value allowing high stirring capability, allowing efficient stirring with low power, and achieving a small amount of scooped rice is not smaller than 95° and not larger than 140° in the case of stirring member 70L2 (it can be seen that the angle value is not smaller than 5° and not larger than 50° when converted to a sweepback). Therefore, as described with reference to FIG. 41, it can be seen that angle A11 (sweepback) formed between the direction of extension (the direction shown with arrow DR75) shown in FIG. 41 and reference line L10 is desirably not smaller than 5° and not larger than 50°.

Embodiment 10

Rice Cooker 200

Figure 59:
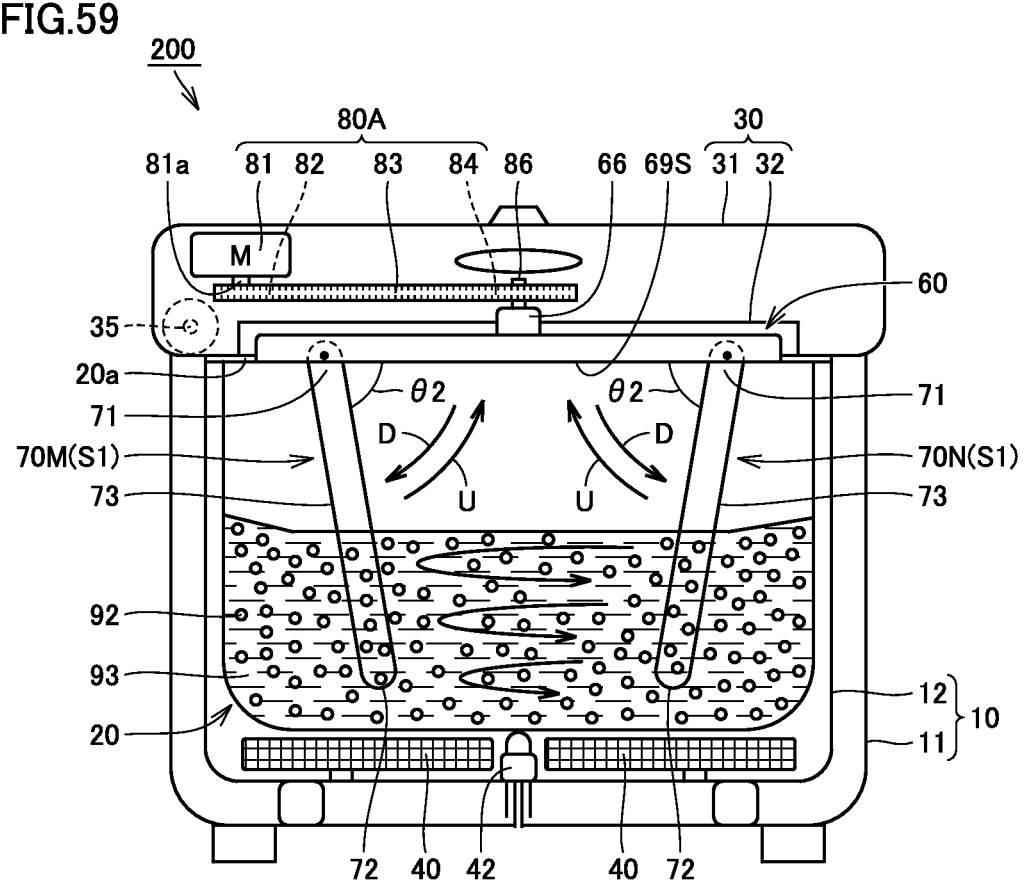
FIG. 59 is a cross-sectional view showing a rice cooker in Embodiment 10.

A rice cooker 200 in the present embodiment will be described with reference to FIG. 59. Rice cooker 200 is used, for example, as one of household or commercial cooking apparatuses. Rice cooker 200 includes main body 10, inner pot 20, lid body 30, heating portion 40, temperature sensor 42, a control unit (not shown), a rotor 60, and a driving mechanism 80A.

Though details will be described later, rotor 60 includes two stirring members 70M and 70N (movable members). Stirring members 70M and 70N each have first end portion 71 pivotably supported by a pivot shaft of rotor 60, second end portion 72 located opposite to first end portion 71, and stirring portion 73 located between first end portion 71 and second end portion 72. Stirring members 70M and 70N rotate around an axis of rotation of rotor 60 together with rotor 60, as rotor 60 rotates.

Main body 10 accommodates inner pot 20. Main body 10 includes outer case 11 and an inner case 12 arranged on the inner side of outer case 11. Inner case 12 is formed of a material having resistance to heat and an electrically insulating property. Inner case 12 holds inner pot 20. Inner pot 20 is molded from a cladding material containing a magnetic material. An opening is provided in a top portion of inner pot 20, and annular flange portion 20a is provided around an edge of this opening. A stirred object such as rice and/or water (such as rice 92 and water 93) is accommodated in inner pot 20.

Lid body 30 is attached to a top portion of main body 10 and pivots around a pivot mechanism 35 provided in main body 10. Main body 10 opens and closes the opening of inner pot 20. Lid body 30 includes outer lid 31 and inner lid 32. Inner lid 32 is arranged in outer lid 31 on the side of inner pot 20 and removably attached to outer lid 31. Rotor 60 is rotatably attached to inner lid 32.

When lid body 30 closes the opening of inner pot 20, outer circumferential edge portion of inner lid 32 is in intimate contact with the upper surface of flange portion 20a of inner pot 20. The outer circumferential edge portion is sealed against flange portion 20a so that leakage of rice gruel therebetween is suppressed. Vapor generated in inner pot 20 is emitted to the outside of rice cooker 200 through a vapor hole (not shown) provided in lid body 30.

Heating portion 40, temperature sensor 42, and the control unit (not shown) are arranged in the lower portion in main body 10. Heating portion 40 is implemented, for example, by an induction heating (IH) heater having an induction coil and inductively heats inner pot 20. Temperature sensor 42 senses a temperature of inner pot 20. The control unit is arranged in the space between outer case 11 and inner case 12. The control unit controls an amount of induction heating by heating portion 40 or controls rotational driving force by motor 81 (details of which will be described next).

Driving mechanism 80A includes motor 81, small pulley 82, belt 83, and large pulley 84. Motor 81, small pulley 82, belt 83, and large pulley 84 are arranged in outer lid 31.

Motor 81 in the present embodiment is implemented by a direct-current (DC) brushless motor and arranged in the vicinity of pivot mechanism 35. Motor 81 has rotation shaft 81a. Small pulley 82 is fixed to rotation shaft 81a. Belt 83 is implemented by a timing belt and wound around a part of the outer circumference of small pulley 82 and a part of the outer circumference of large pulley 84. Large pulley 84 is attached to an input shaft 86 of rotor 60. Rotational driving force from motor 81 is transmitted to input shaft 86 of rotor 60 through small pulley 82, belt 83, and large pulley 84.

(Rotor 60)

Rotor 60 includes two stirring members 70M and 70N of which position can be changed. Stirring members 70M and 70N are the same in shape as stirring member 70 in Embodiment 1 described above and are formed separately from each other. Stirring members 70M and 70N may be identical or different in shape to or from each other. With the use of two stirring members 70M and 70N, a water flow is stabilized, vibration and water splash are suppressed, and disturbance of a water surface can be lessened. Rice-rinse water can be prevented from adhering to inner lid 32 when a large volume of a stirred object is stirred. The number of stirring members is desirably increased or decreased depending on an application.

It is assumed that motor 81 generates driving force for rotating rotor 60 in the first direction of rotation (directions corresponding to the directions shown with arrows R and AR1 in FIGS. 5 and 6). In this case, second end portion 72 moves away from rotor 60 and stirring members 70M and 70N form standing state S1 with respect to a rotational plane of rotor 60.

It is assumed that motor 81 generates driving force for rotating rotor 60 in the second direction of rotation (directions corresponding to the directions shown with arrows L and AR2 in FIGS. 5 and 6). In this case, second end portion 72 comes closer to rotor 60 and stirring members 70M and 70N form turned-down state S2 with respect to the rotational plane of rotor 60.

As motor 81 generates driving force for rotating rotor 60 in the first direction of rotation, stirring members 70M and 70N pivot in the direction shown with an arrow D. As motor 81 generates driving force for rotating rotor 60 in the second direction of rotation, stirring members 70M and 70N pivot in a direction shown with an arrow U. Stirring portions 73 of stirring members 70M and 70N can selectively form standing state S1 and turned-down state S2.

While stirring portions 73 of stirring members 70M and 70N form standing state S1, stirring portions 73 are closer to an axis of rotation, from first end portion 71 toward second end portion 72, and an angle θ2 formed between stirring portion 73 and a horizontal surface (a rotational plane) is desirably not larger than 90°. More preferably, angle θ2 is not smaller than 80° and not larger than 85°.

(Detailed Structure of Rotor 60)

Figure 60:
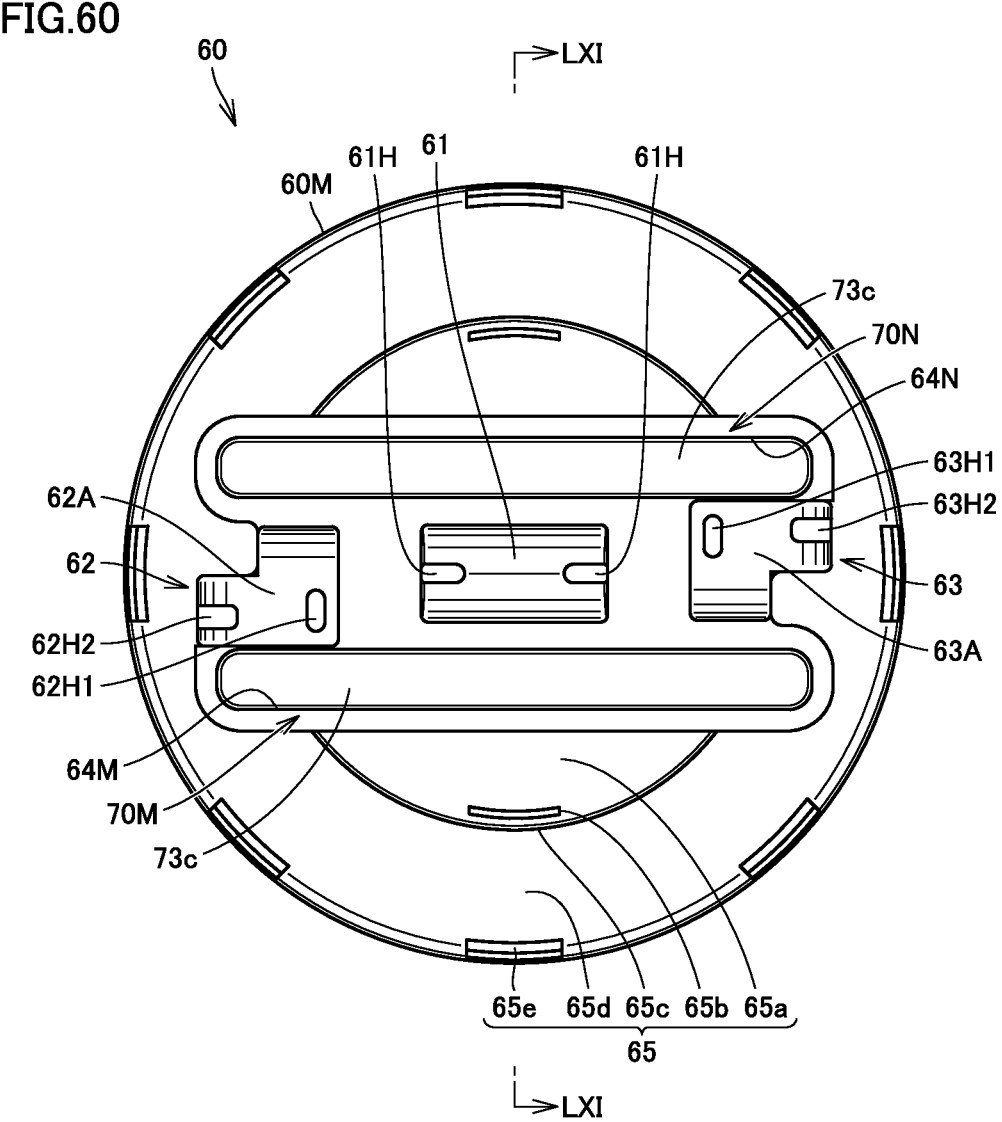
FIG. 60 is a schematic diagram when an inner pot side of a rotor (opposite to an inner lid side) in Embodiment 10 is viewed in a direction perpendicular to a rotational plane of a rotor.
Figure 61:
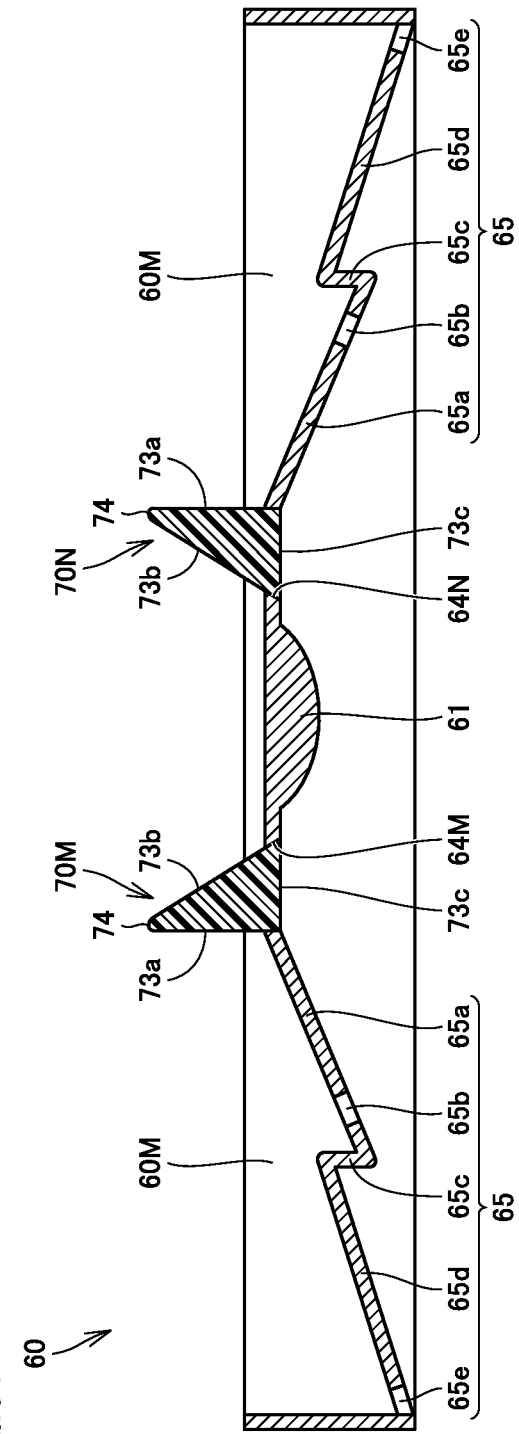
FIG. 61 is a cross-sectional view in a direction shown with an arrow along the line LXI-LXI in FIG. 60.

A detailed structure of rotor 60 in the present embodiment will be described with reference to FIGS. 60 to 63. FIG. 60 is a schematic diagram when a side of inner pot 20 of rotor 60 (a side opposite to a side of inner lid 32) is viewed in a direction perpendicular to the rotational plane of rotor 60. FIG. 61 is a cross-sectional view in a direction shown with an arrow along the line LXI-LXI in FIG. 60. For the sake of convenience of illustration, FIG. 61 does not show some features of rotor 60.

Figure 62:
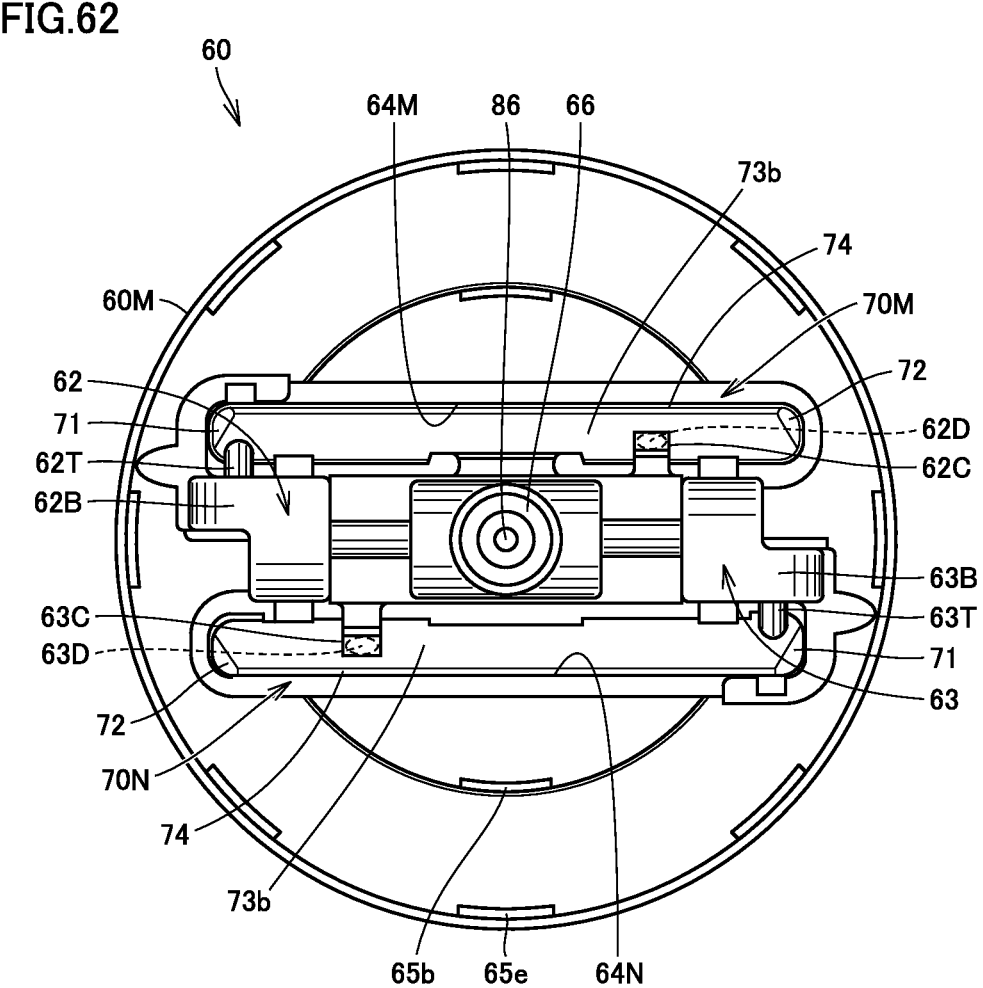
FIG. 62 is a schematic diagram when the inner lid side of the rotor in Embodiment 10 is viewed in a direction perpendicular to the rotational plane of the rotor.
Figure 63:
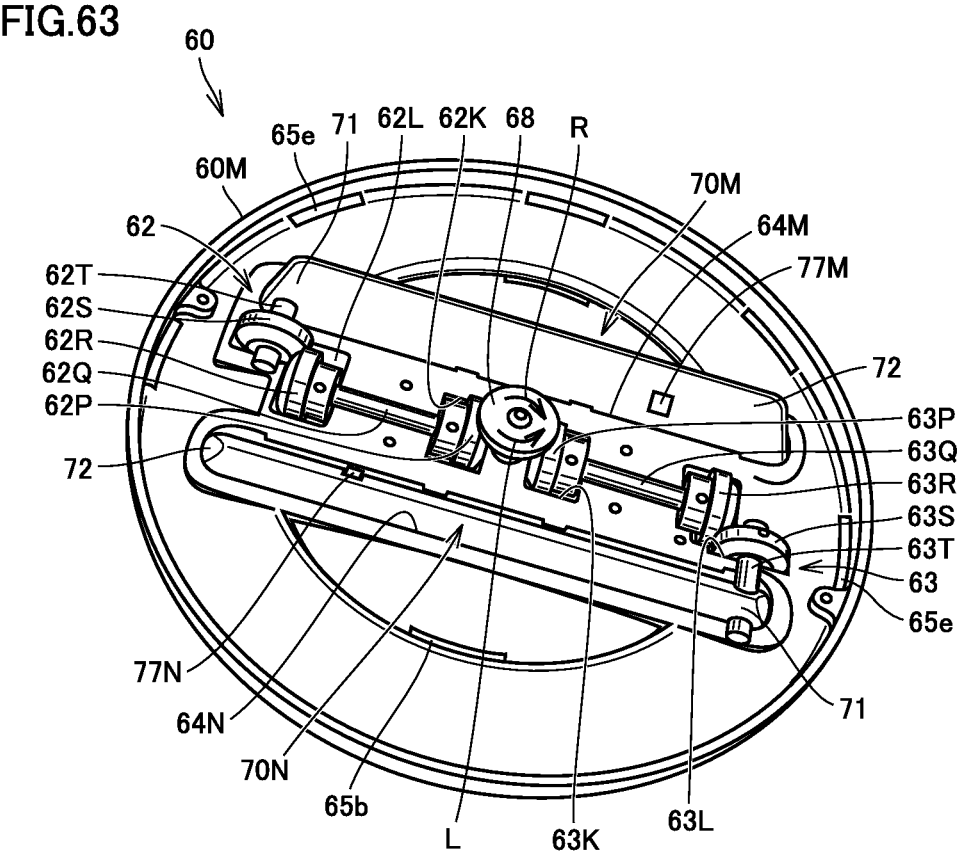
FIG. 63 is a schematic diagram when the inner lid side of the rotor in Embodiment 10 is viewed in a direction inclined with respect to the rotational plane of the rotor.

FIG. 62 is a schematic diagram when the side of inner lid 32 of rotor 60 is viewed in a direction perpendicular to the rotational plane of rotor 60. FIG. 63 is a schematic diagram when the side of inner lid 32 of rotor 60 from which input shaft 86 of rotor 60, gear covers 62B and 63B, and a bearing portion 66 (see FIGS. 59 and 62) are removed is viewed in a direction inclined with respect to the rotational plane of rotor 60.

As shown in FIG. 60, rotor 60 includes a main body 60M, miter gear mounting portions 61 to 63, and stirring members 70M and 70N. Main body 60M is formed in a shape of a container. Main body 60M has a front surface 65 on the side of inner pot 20 (see FIG. 59). Front surface 65 is provided with accommodation portions 64M and 64N for accommodating stirring members 70M and 70N, respectively. Front surface 65 on the side of inner pot 20 (see FIG. 59) corresponds to a surface 69S of rotor 60 opposed to inner pot 20 in FIG. 59.

Miter gear mounting portion 61 is provided in a central portion of front surface 65. Miter gear mounting portion 61 has a shape swelling toward inner pot 20. Miter gear mounting portion 61 is provided with a plurality of water drainage holes 61H. A shape of water drainage hole 61H when viewed from inner pot 20 (see FIG. 59) is substantially rectangular. Water drainage hole 61H extends from a surface of miter gear mounting portion 61 on the side of inner pot 20 to a surface on an outer side in a direction of radius. Substantially half of water drainage hole 61H opens toward inner pot 20 and remaining half opens outward in the direction of radius. Water which enters a space between miter gear mounting portion 61 and gear covers 62B and 63B (see FIG. 62) can be returned into inner pot 20 (see FIG. 59) through water drainage hole 61H.

Miter gear mounting portions 62 and 63 are provided in circumferential edge portions of front surface 65. Miter gear mounting portion 62 is located on one side of miter gear mounting portion 61. Miter gear mounting portion 63 is located on the other side of miter gear mounting portion 61.

Miter gear mounting portion 62 includes a cover member 62A and gear cover 62B (see FIG. 62). Cover member 62A has a non-curved surface located on the inner side of the direction of radius and a curved surface located on the outer side of the direction of radius. A water drainage hole 62H1 is provided in the non-curved surface of cover member 62A. A water drainage hole 62H2 is provided in the curved surface of cover member 62A. Substantially the entirety of water drainage hole 62H2 opens outward in the direction of radius. A shape of water drainage hole 62H2 when viewed from inner pot 20 is substantially rectangular. Water which enters a space between cover member 62A and gear cover 62B (see FIG. 62) can be returned into inner pot 20 (see FIG. 59) through water drainage holes 62H1 and 62H2.

Miter gear mounting portion 63 includes a cover member 63A and gear cover 63B (see FIG. 62). Cover member 63A has a non-curved surface located on the inner side of the direction of radius and a curved surface located on the outer side of the direction of radius. A water drainage hole 63H1 is provided in the non-curved surface of cover member 63A. A water drainage hole 63H2 is provided in the curved surface of cover member 63A. Substantially the entirety of water drainage hole 63H2 opens outward in the direction of radius. A shape of water drainage hole 63H2 when viewed from inner pot 20 is substantially rectangular. Water which enters a space between cover member 63A and gear cover 63B (see FIG. 62) can be returned into inner pot 20 (see FIG. 59) through water drainage holes 63H1 and 63H2.

Accommodation portion 64M for accommodating stirring member 70M is located on one sides of miter gear mounting portions 61 to 63. Accommodation portion 64N for accommodating stirring member 70N is located on the other sides of miter gear mounting portions 61 to 63. When stirring members 70M and 70N do not stir rice 92 and water 93 in inner pot 20 (see FIG. 59), stirring members 70M and 70N are accommodated in accommodation portions 64M and 64N, respectively.

When stirring members 70M and 70N are accommodated in accommodation portions 64M and 64N, stirring members 70M and 70N close accommodation portions 64M and 64N, respectively. Rear end surfaces 73c of stirring members 70M and 70N are exposed on the side of inner pot 20. Rear end surfaces 73c of stirring members 70M and 70N are desirably substantially in parallel to the rotational plane of rotor 60.

Referring to FIG. 61, stirring members 70M and 70N have a cross-section substantially in a shape of a right triangle, similarly to stirring member 70 in Embodiment 1 described above. While stirring members 70M and 70N are accommodated in accommodation portions 64M and 64N, rear end surfaces 73c of stirring members 70M and 70N are substantially in parallel to the rotational plane of rotor 60. Outer surfaces 73a of stirring members 70M and 70N are substantially perpendicular to the rotational plane of rotor 60. Inner surfaces 73b of stirring members 70M and 70N are inclined with respect to the rotational plane of rotor 60.

In other words, when stirring members 70M and 70N do not stir rice 92 and water 93 in inner pot 20, rear end surfaces 73c of stirring members 70M and 70N are substantially perpendicular to the axis of rotation of rotor 60. Outer surfaces 73a of stirring members 70M and 70N are substantially in parallel to the axis of rotation of rotor 60. Inner surfaces 73b of stirring members 70M and 70N are inclined with respect to the axis of rotation of rotor 60. Stirring front edge portions 74 are located in deepest portions in accommodation portions 64M and 64N.

As shown in FIGS. 61 and 62, front surface 65 of rotor 60 opposed to inner pot 20 (see FIG. 59) includes inclined surfaces 65a and 65d, a step portion 65c, and water drainage holes 65b and 65e. Inclined surface 65a is located on the inner side in the direction of radius relative to inclined surface 65d. As shown in FIG. 61, when lid body 30 (see FIG. 59) is closed, inclined surfaces 65a and 65d are formed such that an edge portion on the outer side in the direction of radius is lower than an edge portion on the inner side in the direction of radius.

Step portion 65c connects the edge portion of inclined surface 65a on the outer side in the direction of radius and the edge portion of inclined surface 65d on the outer inner side in the direction of radius to each other. Water drainage hole 65b is formed in the edge portion of inclined surface 65a on the outer side in the direction of radius. Water drainage hole 65e is formed in the edge portion of inclined surface 65d on the outer side in the direction of radius. Water drainage holes 65b and 65e are formed such that a shape thereof viewed from inner pot 20 (see FIG. 59) is substantially in an arc shape. Water which enters a space between inner lid 32 and main body 60M can be returned into inner pot 20 through water drainage holes 65b and 65e.

Referring to FIGS. 62 and 63, in main body 60M of rotor 60, input shaft 86, gear covers 62B and 63B, stoppers 62C and 63C, magnets 62D and 63D, bearing portion 66, a miter gear 68, recesses 62K and 62L, a miter gear 62P, a transmission shaft 62Q, a miter gear 62R, a miter gear 62S, a pivot shaft 62T, recesses 63K and 63L, a miter gear 63P, a transmission shaft 63Q, a miter gear 63R, a miter gear 63S, and a pivot shaft 63T are provided.

Miter gear 62R, transmission shaft 62Q, miter gear 62P, miter gear 68, miter gear 63P, transmission shaft 63Q, and miter gear 63R are aligned on main body 60M substantially linearly along a radial direction. Stirring member 70M and stirring member 70N are arranged substantially in plane symmetry with respect to a surface including a central axis of each of transmission shaft 62Q, input shaft 86, and transmission shaft 63Q. When a position where pivot shaft 62T is coupled to stirring member 70M is turned 180° around input shaft 86, the position substantially matches with a position where pivot shaft 63T is coupled to stirring member 70N. In other words, when a center of pivot of stirring member 70M is turned 180° around the axis of rotation of rotor 60, the center substantially matches with the center of pivot of stirring member 70N.

Input shaft 86 is provided to be rotatable with respect to main body 60M and bearing portion 66. Miter gear 68 is fixed to an end portion of input shaft 86 on the side of main body 60M. Bearing portion 66 is removably fitted into a through hole (not shown) provided in inner lid 32. When bearing portion 66 is fitted into this through hole, an end portion of input shaft 86 opposite to the side of main body 60M is arranged between outer lid 31 and inner lid 32 and coupled to small pulley 82 (see FIG. 59).

Miter gear 68 meshes with miter gear 62P. Miter gear 62P is fixed to an end portion of transmission shaft 62Q on the inner side in the direction of radius. Miter gear 62R is fixed to an end portion of transmission shaft 62Q on the outer side in the direction of radius. Miter gear 62P, transmission shaft 62Q, and miter gear 62R rotate integrally with one another. Miter gear 62R meshes with miter gear 62S. Pivot shaft 62T couples miter gear 62S and first end portion 71 of stirring member 70M to each other. Miter gear 62S, stirring member 70M, and pivot shaft 62T are integrated with one another. As miter gear 68 rotates, stirring member 70M pivots around pivot shaft 62T within a certain range.

Miter gear 68 meshes with miter gear 63P. Miter gear 63P is fixed to an end portion of transmission shaft 63Q on the inner side in the direction of radius. Miter gear 63R is fixed to an end portion of transmission shaft 63Q on the outer side in the direction of radius. Miter gear 63P, transmission shaft 63Q, and miter gear 63R rotate integrally with one another. Miter gear 63R meshes with miter gear 63S. Pivot shaft 63T couples miter gear 63S and first end portion 71 of stirring member 70N to each other. Miter gear 63S, stirring member 70N, and pivot shaft 63T are integrated with one another. As miter gear 68 rotates, stirring member 70N pivots around pivot shaft 63T within a certain range.

Miter gears 62P and 63P are rotatably mounted on recesses 62K and 63K formed in miter gear mounting portion 61, respectively. A space in recesses 62K and 63K communicates with a space in inner pot 20 through water drainage hole 61H while lid body 30 is closed. Miter gears 62R and 63R are rotatably mounted on recesses 62L and 63L formed in miter gear mounting portion 62, respectively. A space in recesses 62L and 63L communicates with a space in inner pot 20 through water drainage holes 62H1, 63H1, 62H2, and 63H2 while lid body 30 is closed.

Gear covers 62B and 63B have stoppers 62C and 63C, respectively. Stoppers 62C and 63C restrict pivot of stirring members 70M and 70N in the direction shown with arrow U as they abut to stirring members 70M and 70N. Magnets 62D and 63D are attached to lower surfaces of tip end portions of stoppers 62C and 63C (surfaces on the side of stirring members 70M and 70N). Magnets 77M and 77N are attached to portions of stirring members 70M and 70N where they can be in contact with magnets 62D and 63D. Magnets 77M and 77N have magnetic poles opposite to magnetic poles of magnets 62D and 63D. Even when motor 81 is not driven, turned-down state S2 of stirring members 70M and 70N is maintained owing to attractive force between magnets 62D and 63D and magnets 77M and 77N.

Gear covers 62B and 63B are attachable to and removable from main body 60M. By attaching gear covers 62B and 63B to main body 60M, miter gear 68, miter gear 62P, transmission shaft 62Q, miter gear 62R, miter gear 62S, miter gear 63P, transmission shaft 63Q, miter gear 63R, and miter gear 63S are covered with gear covers 62B and 63B. What is called a snap-fit structure is preferably employed as a structure for attaching and removing gear covers 62B and 63B.

When rotor 60 is viewed in a direction perpendicular to the rotational plane of rotor 60, stirring member 70M is located on one sides of miter gears 68, 62P, 62R, 62S, 63P, 63R, and 63S, and stirring member 70N is located on the other sides of miter gears 68, 62P, 62R, 62S, 63P, 63R, and 63S. In other words, when rotor 60 is viewed in the direction perpendicular to the rotational plane of rotor 60, miter gears 68, 62P, 62R, 62S, 63P, 63R, and 63S are arranged between stirring member 70M and stirring member 70N.

Pivot of stirring members 70M and 70N in the direction shown with arrow D (see FIG. 59) is restricted by a part of peripheral portions of accommodation portions 64M and 64N. As stirring members 70M and 70N accommodated in accommodation portions 64M and 64N are pivoted in the direction shown with arrow D, first end portions 71 of stirring members 70M and 70N abut to portions located in the vicinity of pivot shafts 62T and 63T in the peripheral edge portions of accommodation portions 64M and 64N (hereinafter referred to as "a part of the peripheral edge portions of accommodation portions 64M and 64N"). Pivot of stirring members 70M and 70N after abutment is restricted.

As described above with reference to FIG. 59, when first end portions 71 of stirring members 70M and 70N abut to a part of the peripheral edge portions of accommodation portions 64M and 64N, angle θ2 formed by stirring members 70M and 70N with respect to the rotational plane of rotor 60 (see FIG. 59) is set to 80°. In such a state, driving force for pivoting stirring members 70M and 70N in the direction shown with arrow D is provided to input shaft 86. First end portions 71 of stirring members 70M and 70N are locked into a part of the peripheral edge portions of accommodation portions 64M and 64N and stirring members 70M and 70N rotate together with rotor 60. Stirring members 70M and 70N can rotate together with rotor 60 as being locked to rotor 60 while an interval between stirring member 70M and stirring member 70N is narrower as a distance from rotor 60 is greater.

In cooking rice with the use of rice cooker 200, a desired amount of rice 92 and water 93 in an amount in accordance with this amount of rice 92 are placed in inner pot 20. Inner pot 20 is stored in main body 10 and lid body 30 is closed to cover inner pot 20. Here, as shown in FIGS. 60 to 62, stirring members 70M and 70N form turned-down state S2 as being accommodated in accommodation portions 64M and 64N.

Thereafter, motor 81 is driven and driving force from motor 81 is transmitted to input shaft 86 of rotor 60. Miter gear 68 rotates in the direction shown with arrow R. With rotor 60 not being rotating, stirring members 70M and 70N pivot in the direction shown with arrow D in FIG. 59. Pivot of stirring members 70M and 70N in the direction shown with arrow D stops as first end portions 71 of stirring members 70M and 70N abut to a part of the peripheral edge portions of accommodation portions 64M and 64N. Driving force of motor 81 rotates miter gear 68 in the direction shown with arrow R through input shaft 86 of rotor 60. Stirring members 70M and 70N rotate together with rotor 60. Rice 92 and water 93 in inner pot 20 are stirred by stirring members 70M and 70N.

When lid body 30 is opened, motor 81 is again driven and driving force from motor 81 is transmitted to input shaft 86 of rotor 60. Miter gear 68 rotates in the direction shown with arrow L (see FIG. 59). With rotor 60 not being rotating, stirring members 70M and 70N pivot in the direction shown with arrow U and stirring members 70M and 70N are accommodated in accommodation portions 64M and 64N. As stoppers 62C and 63C abut to stirring members 70M and 70N, pivot of stirring members 70M and 70N in the direction shown with arrow U stops. Lid body 30 can readily be opened without second end portions 72 of stirring members 70M and 70N being caught by inner pot 20.

Pivot of stirring members 70M and 70N in the directions shown with arrows D and U and rotation of rotor 60 are realized by driving force from one motor 81. A rice cooker can be reduced in size as compared with a case that a motor for pivoting stirring members 70M and 70N in the directions shown with arrows D and U and a motor for rotating rotor 60 are provided separately.

By accommodating stirring members 70M and 70N in accommodation portions 64M and 64N, block by stirring members 70M and 70N in putting inner pot 20 in and taking inner pot 20 out of main body 10 can be prevented. Since rotor 60 is attached to inner lid 32, rotor 60 moves together with lid body 30 when lid body 30 is opened. When inner pot 20 is put in and taken out of main body 10, rotor 60 does not block putting in and taking out of inner pot 20.

When stirring members 70M and 70N are set to standing state 51 with respect to the rotational plane of rotor 60, stirring members 70M and 70N come in contact not only with rice 92 and water 93 on a side of rotor 60 but also with rice 92 and water 93 on a side of the bottom portion of inner pot 20. While stirring members 70M and 70N form standing state 51, stirring members 70M and 70N rotate together with rotor 60. Stirring members 70M and 70N can sufficiently stir rice 92 and water 93 on the side of rotor 60 and can also sufficiently stir rice 92 and water 93 near the bottom portion of inner pot 20.

When stirring members 70M and 70N are set to turned-down state S2 with respect to the rotational plane of rotor 60, stirring members 70M and 70N do not come in contact with rice 92 and water 93 in inner pot 20. While stirring members 70M and 70N form turned-down state S2, stirring members 70M and 70N rotate together with rotor 60. Stirring members 70M and 70N can refrain from stirring rice 92 and water 93 in inner pot 20.

By stirring rice 92 and water 93 in inner pot 20 with two stirring members 70M and 70N, rice 92 and water 93 in inner pot 20 can moderately be moved. Therefore, stirring of rice 92 and water 93 can sufficiently be achieved with low vibration. Three or more stirring members may stir rice 92 and water 93 in inner pot 20.

When stirring members 70M and 70N are set to standing state S1 with respect to the rotational plane of rotor 60, an interval between stirring member 70M and stirring member 70N is narrower as a distance from rotor 60 is greater. Stirring members 70M and 70N come in contact not only with rice 92 and water 93 in the vicinity of the center in inner pot 20 but also with rice 92 and water 93 in the vicinity of the peripheral edge portion in inner pot 20.

By rotating stirring members 70M and 70N together with rotor 60 while stirring members 70M and 70N are set to standing state S1 with respect to the rotational plane of rotor 60 and the interval between stirring member 70M and stirring member 70N is narrowed as a distance from rotor 60 is greater, rice 92 and water 93 in the vicinity of the central portion in inner pot 20 can sufficiently be stirred and rice 92 and water 93 in the vicinity of the peripheral edge portion in inner pot 20 can also sufficiently be stirred.

Second end portions 72 of stirring members 70M and 70N may be constructed to move vertically as motor 81 is continuously driven. Since a region which can be stirred at the time when stirring members 70M and 70N stir a stirred object accommodated in inner pot 20 is greater, stirring capability can be enhanced.

When rotor 60 is viewed in a direction perpendicular to the rotational plane of rotor 60 while stirring members 70M and 70N are accommodated in accommodation portions 64M and 64N, stirring members 70M and 70N are located lateral to miter gears 68, 62P, 62R, 62S, 63P, 63R, and 63S. Stirring members 70M and 70N do not overlap with these miter gears. A thickness of a structure constituted of stirring members 70M and 70N and rotor 60 can be made smaller.

When rotor 60 is viewed in the direction perpendicular to the rotational plane of rotor 60 while stirring members 70M and 70N are accommodated in accommodation portions 64M and 64N, miter gears 68, 62P, 62R, 62S, 63P, 63R, and 63S are arranged between stirring member 70M and stirring member 70N. Even when rotor 60 is rotated, rotation of rotor 60 can be stabilized. During rotation of rotor 60, vibration of rotor 60 can be lessened.

A center of pivot of stirring member 70M substantially coincides with a center of pivot of stirring member 70N when it is turned 180° around the axis of rotation of rotor 60. When rotor 60 is rotated while an angle formed by stirring members 70M and 70N with respect to the rotational plane of rotor 60 is set to 80° as well, rotation of rotor 60 can be stabilized.

As compared with rice cooker 100 (see FIG. 1) in Embodiment 1 described above, rice cooker 200 in the present embodiment can achieve a more stable water flow during stirring of rice 92 and water 93 and significantly less vibration and water splash. An effect of stirring obtained at the time when the number of rotations of rotor 60 is set to approximately 200 rpm in rice cooker 100 can be obtained in rice cooker 200 at the time when the number of rotations of rotor 60 is set to approximately 150 rpm. Rice cooker 200 can achieve reduction in the number of rotations.

Though rotor 60 in the present embodiment is attachable to and removable from lid body 30, it may be irremovable from lid body 30. When stirring members 70M and 70N rotate together with rotor 60 as being locked to rotor 60, an angle formed by stirring members 70M and 70N with respect to the rotational plane of rotor 60 is set to 80°, however, the angle may be set, for example, to 75° or 85°.

When stirring members 70M and 70N rotate together with rotor 60 as being locked to rotor 60, an angle formed by stirring member 70M with respect to the rotational plane of rotor 60 is the same as an angle formed by stirring member 70N with respect to the rotational plane of rotor 60, however, an angle formed by stirring member 70M with respect to the rotational plane of rotor 60 may be different from an angle formed by stirring member 70N with respect to the rotational plane of rotor 60. In such a case, a portion of rice 92 and water 93 in contact with stirring members 70M and 70N can be increased.

When rotor 60 is viewed in the direction perpendicular to the rotational plane of rotor 60, stirring member 70M is arranged on one sides of miter gears 68, 62P, 63R, and 63S and stirring member 70N is arranged on the other sides of miter gears 68, 62P, 63R, and 63S, however, stirring members 70M and 70N may be arranged on one sides of miter gears 68, 62P, 63R, and 63S.

Stirring members 70M and 70N have a cross-section substantially in a triangular shape, however, they may have a cross-section substantially in a trapezoidal shape. In such a case as well, a width of stirring members 70M and 70N is preferably made smaller as a distance from the side of inner pot 20 is greater while stirring members 70M and 70N are accommodated in accommodation portions 64M and 64N.

Though stoppers 63C and 62C are provided in gear covers 62B and 63B, a stopper having a notch in a tip end portion may be provided. In such a case, a protrusion, for example, in a hemispherical shape fitting into and locked to a notch at the time when stirring members 70M and 70N are accommodated in accommodation portions 64M and 64N may be provided in stirring members 70M and 70N.

Though stoppers 63C and 62C are provided in gear covers 62B and 63B, a stopper having a protrusion, for example, in a hemispherical shape may be provided in a tip end portion. In such a case, a notch into which the protrusion is fitted and locked at the time when stirring members 70M and 70N are accommodated in accommodation portions 64M and 64N may be provided in stirring members 70M and 70N.

Rotor 60 and gear covers 62B and 63B may be formed of a metal or may be formed of a heat resistant resin, similarly to stirring members 70M and 70N. When stirring members 70M and 70N are accommodated in accommodation portions 64M and 64N, stirring members 70M and 70N are prevented from protruding from rotor 60, however, a part of stirring members 70M and 70N may protrude from rotor 60. A stirring element of which part can be accommodated in rotor 60 may be employed.

By providing a space for accommodation without providing an accommodation portion accommodating stirring members 70M and 70N, block by stirring members 70M and 70N can be avoided at the time when inner pot 20 is put in and taken out of main body 10. As compared with a case that a hole for storage is provided, cost for materials can be reduced and design can also be freer. Any shape of the accommodation space is acceptable.

Embodiment 11

Rotor 60A

Figure 64:
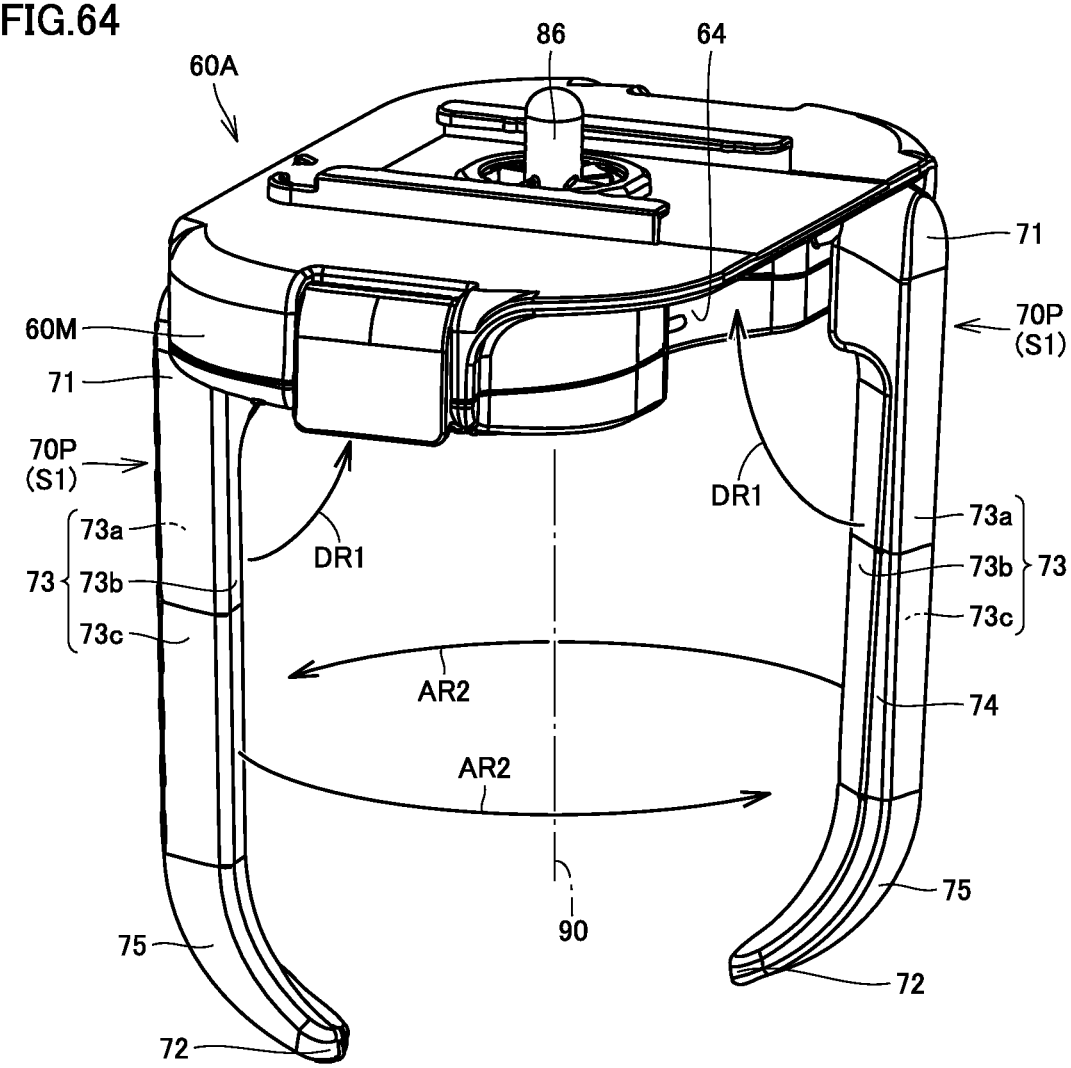
FIG. 64 is a perspective view when a rotor in Embodiment 11 is viewed from the inner lid side.
Figure 65:
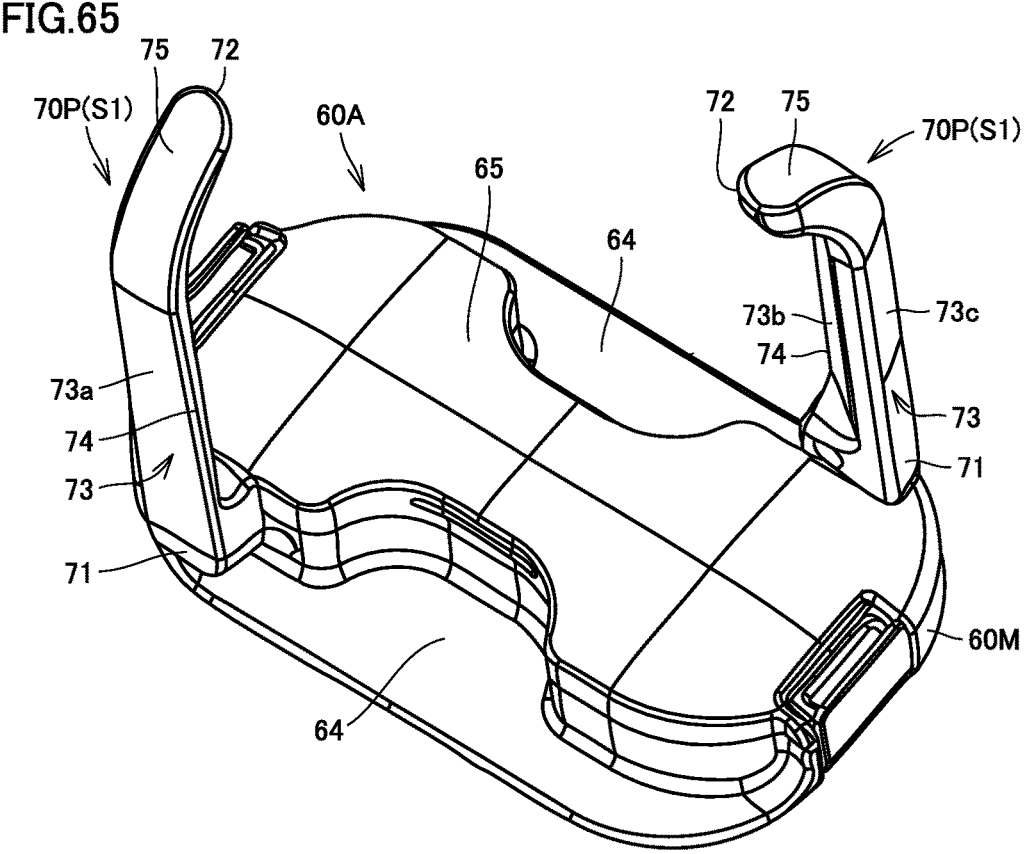
FIG. 65 is a perspective view when the rotor in Embodiment 11 is viewed from the inner pot side.
Figure 66:
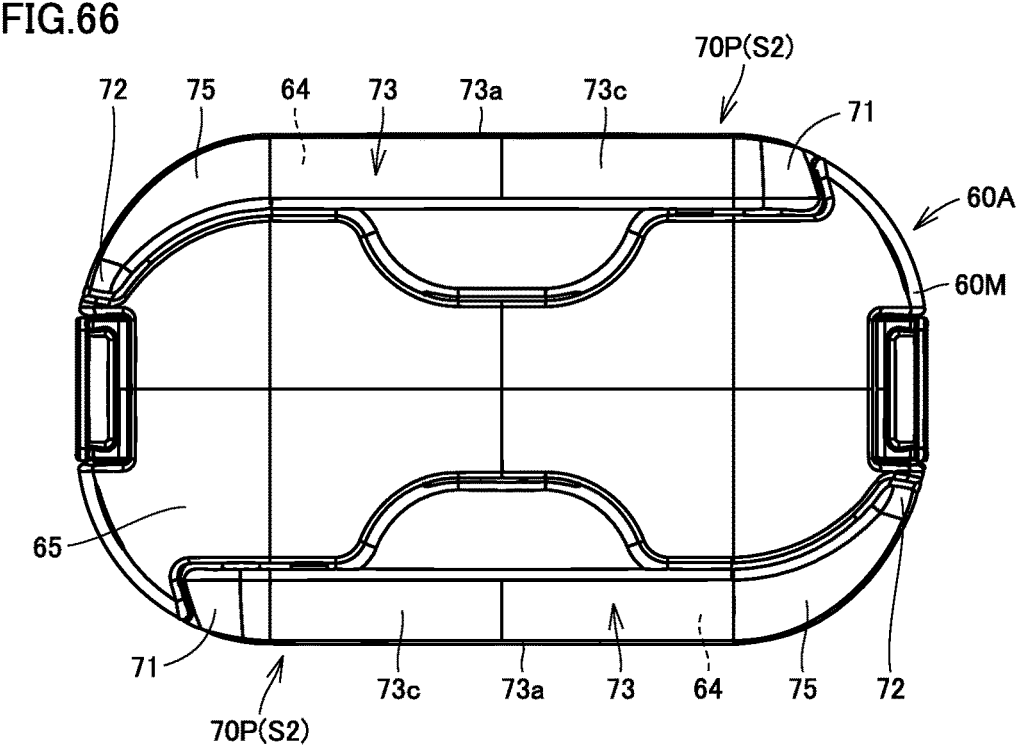
FIG. 66 is a bottom view when the rotor in Embodiment 11 is viewed from the inner pot side.
Figure 67:
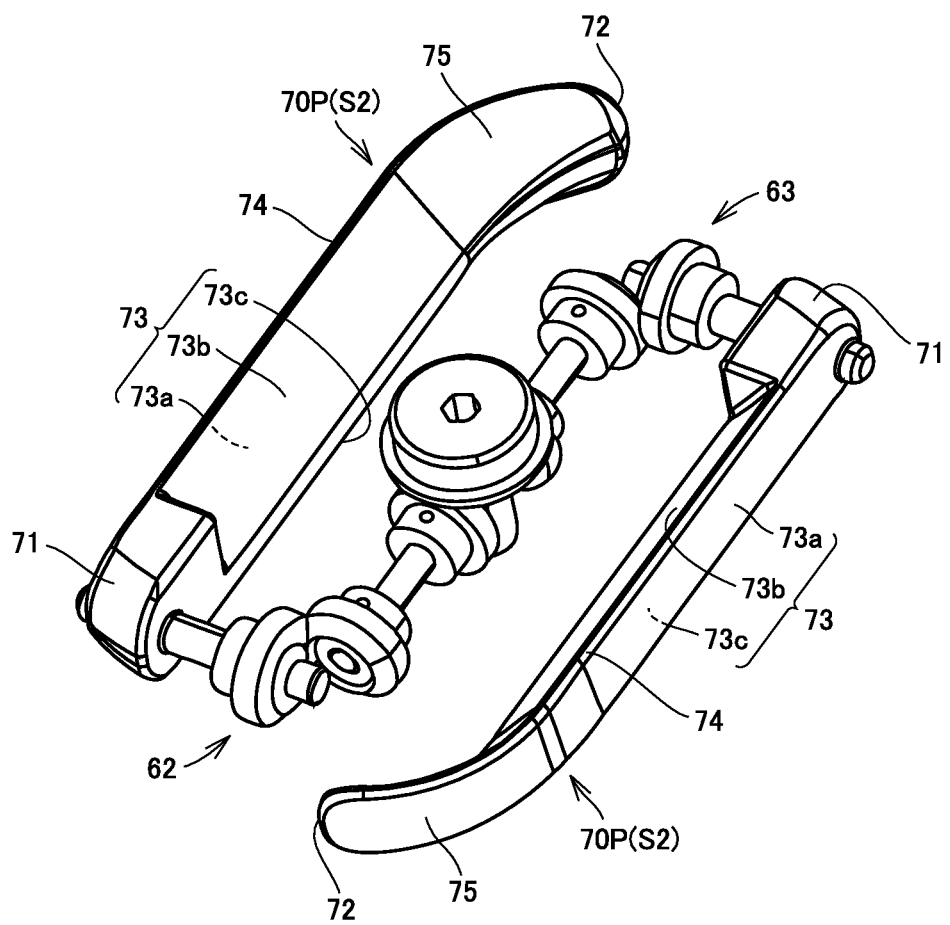
FIG. 67 is a perspective view showing an internal structure of the rotor in Embodiment 11.
Figure 68:
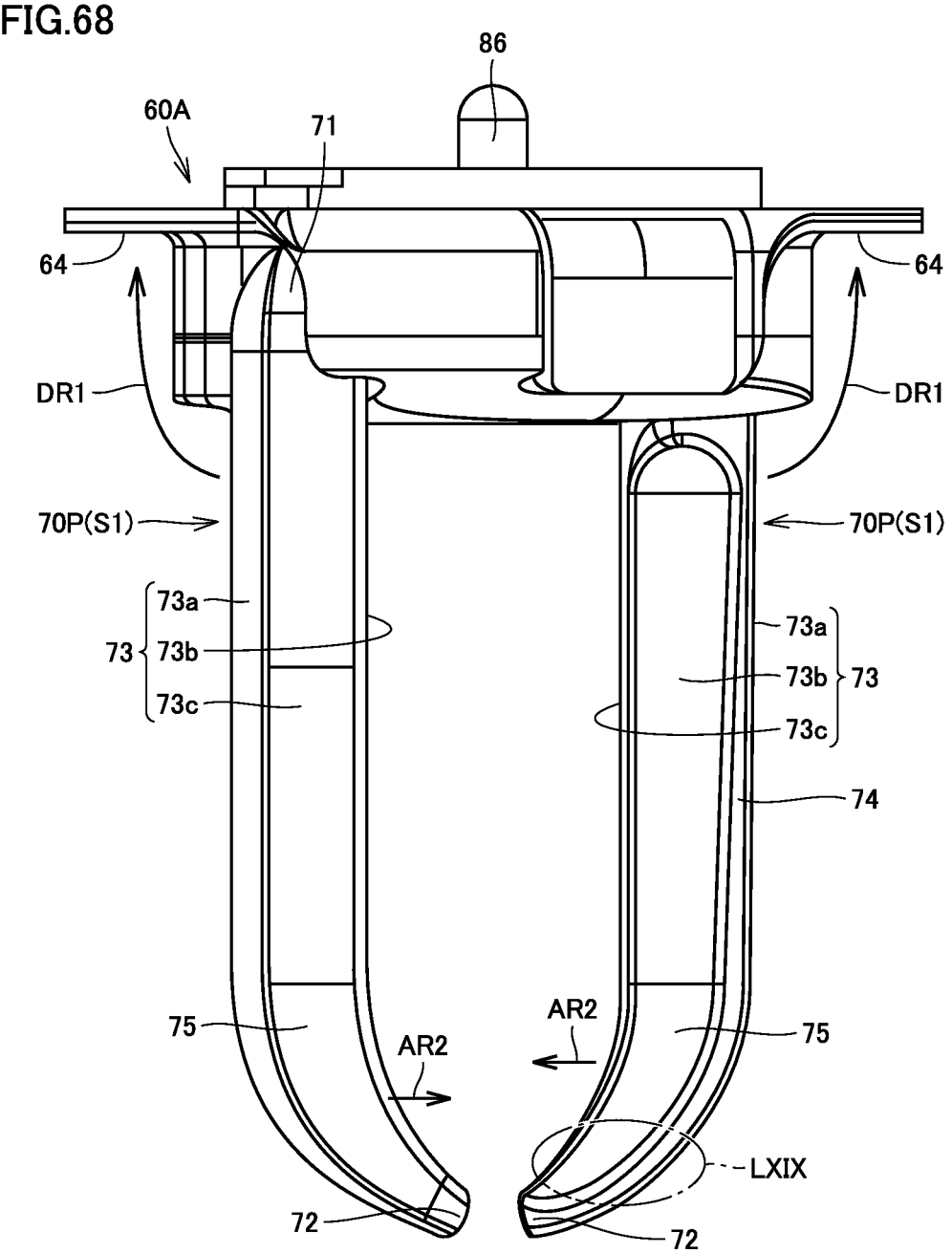
FIG. 68 is a side view showing the rotor in Embodiment 11.
Figure 69:
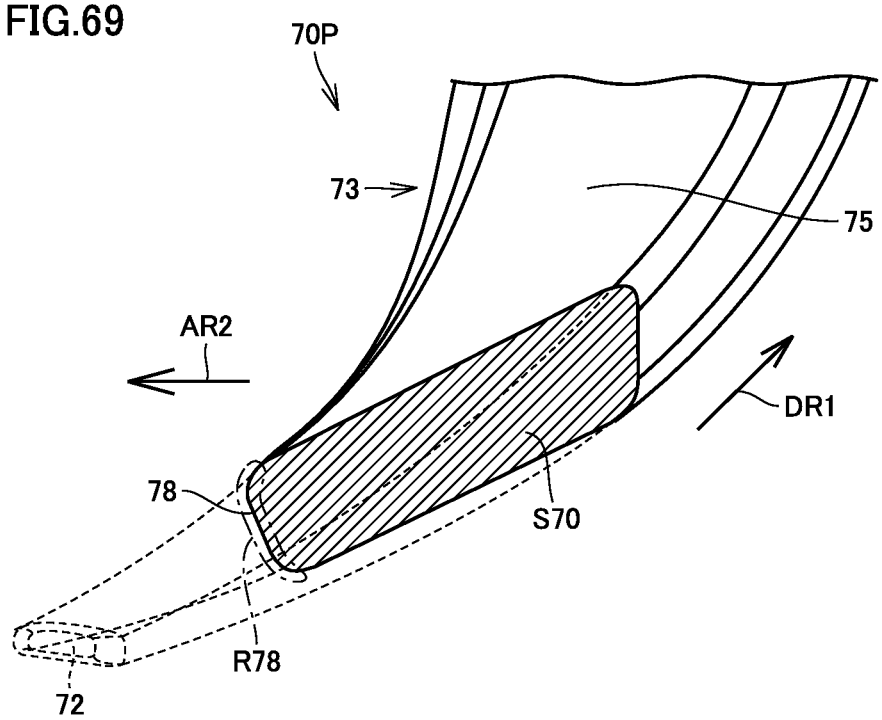
FIG. 69 is a perspective cross-sectional view showing a portion in the vicinity of a region surrounded by the line LXIX in FIG. 68.
Figure 70:
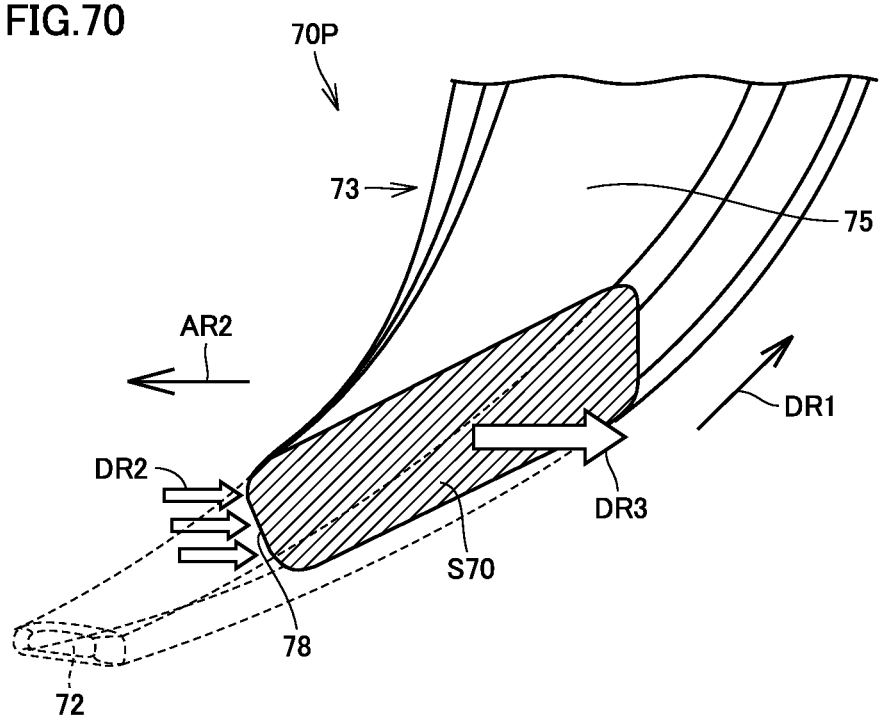
FIG. 70 is a perspective cross-sectional view showing pivot of a portion of a stirring member (a movable member) closer to a second end portion, which is included in the rotor in Embodiment 11.
Figure 71:
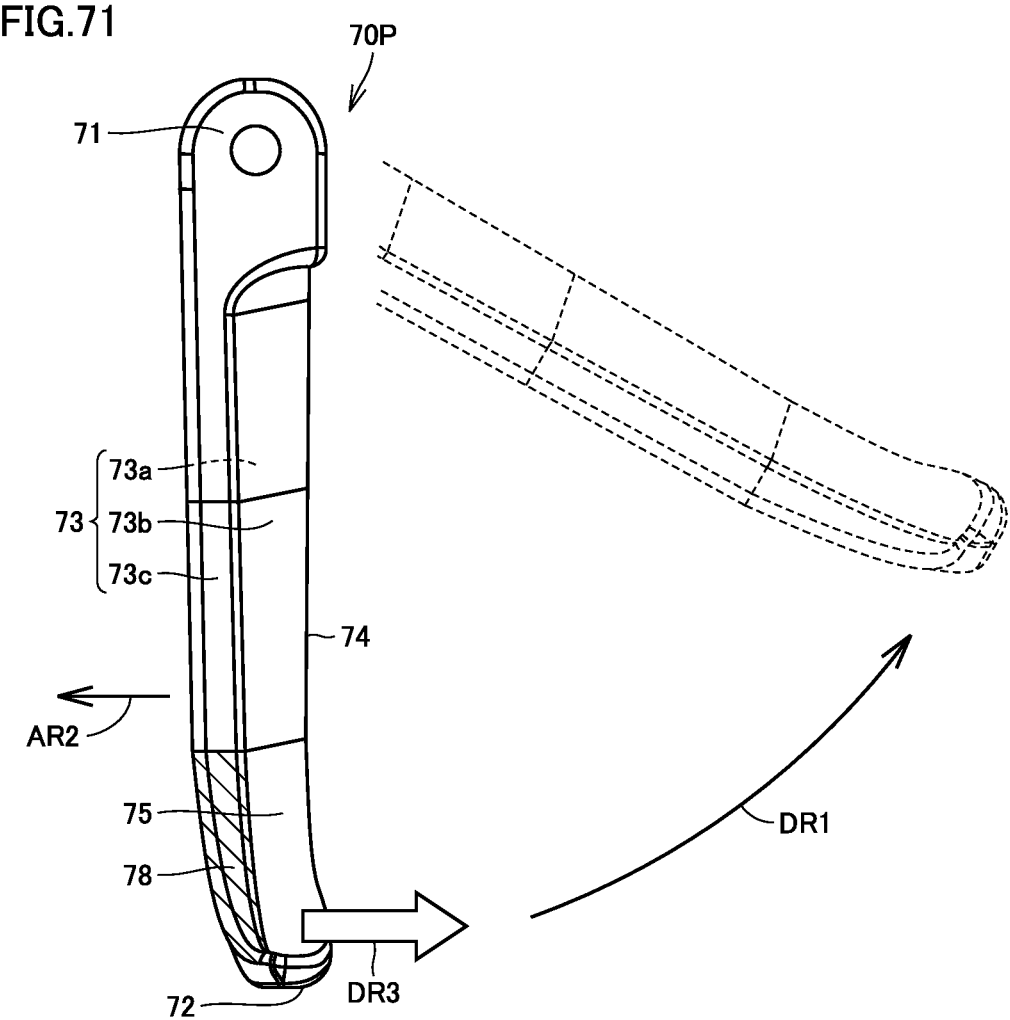
FIG. 71 is a side view showing pivot of the stirring member (movable member) included in the rotor in Embodiment 11.

A rotor 60A in the present embodiment will be described with reference to FIGS. 64 to 71. FIG. 64 is a perspective view when rotor 60A is viewed from the inner lid side. FIG. 65 is a perspective view when rotor 60A is viewed from the inner pot side. FIG. 66 is a bottom view when rotor 60A is viewed from the inner pot side. FIG. 67 is a perspective view showing an internal structure of rotor 60A. FIG. 68 is a side view showing rotor 60A. FIG. 69 is a cross-sectional view showing a portion in the vicinity of a region surrounded by the line LXIX in FIG. 68. FIG. 70 is a perspective view showing pivot of a portion of a stirring member 70P provided in rotor 60A, which is closer to second end portion 72. FIG. 71 is a side view showing pivot of stirring member 70P provided in rotor 60A.

As shown in FIGS. 64 to 68, rotor 60A includes two stirring members 70P of which position can be changed. Stirring members 70P are the same in shape as stirring member 70F in Embodiment 6 (see FIGS. 35 and 36) described above and they are formed separately from each other. Similarly to stirring member 70F, stirring member 70P has first end portion 71, second end portion 72, stirring portion 73, stirring front edge portion 74, and extension portion 75. Stirring portion 73 includes outer surface 73*a*, inner surface 73*b*, and rear end surface 73*c* similarly to stirring portion 73 of stirring member 70F.

Two stirring members 70P may be identical to or different from each other in shape. By using two stirring members 70P, a water flow is stabilized, vibration and water splash are suppressed, and disturbance of a water surface can be lessened. Rice-rinse water can be prevented from adhering to inner lid 32 when a large volume of a stirred object is stirred. The number of stirring members is desirably increased or decreased depending on an application.

It is assumed that a motor (not shown) generates driving force for rotating rotor 60A in the first direction of rotation (the direction opposite to direction AR2 in FIG. 64). Driving force is transmitted to stirring member 70P through input shaft 86 and each miter gear mounted on miter gear mounting portions 62 and 63 (see FIG. 67). Second end portion 72 of stirring member 70P moves away from front surface 65 (see FIG. 65) on the inner pot side of rotor 60A and stirring member 70P forms standing state 51 as shown in FIG. 64 with respect to the rotational plane of rotor 60A.

It is assumed that a motor (not shown) generates driving force for rotating rotor 60A in the second direction of rotation (the direction corresponding to direction AR2 in FIGS. 64 and 68). In this case, stirring member 70P pivots in a direction shown with an arrow DR1 shown in FIG. 68. Second end portion 72 of stirring member 70P comes closer to front surface 65 (see FIG. 65) of rotor 60A on the inner pot side and stirring member 70P is accommodated in accommodation portion 64. Turned-down state S2 with respect to the rotational plane of rotor 60A (see FIG. 66) is formed.

(Stirring Member 70P)

Referring to FIG. 69, a resistance surface 78 is provided in stirring portion 73 of stirring member 70P. It is assumed that stirring portion 73 of stirring member 70P forms standing state 51 and rotor 60A (see FIG. 68) rotates in the second direction of rotation (the direction shown with arrow AR2) opposite to the first direction of rotation (the direction shown with arrow AR1). Stirring portion 73 is formed to receive resistance from a stirred object in the first direction of rotation (the direction shown with arrow AR1) when rotor 60A rotates in the second direction of rotation (the direction shown with arrow AR2).

Resistance surface 78 in the present embodiment is formed in a portion facing the second direction of rotation (the direction shown with arrow AR2) (a region R78), which has a cross-sectional shape S70 obtained when stirring portion 73 is viewed in a cross-section. Resistance surface 78 is inclined with respect to the second direction of rotation (the direction shown with arrow AR2), and formed to have a prescribed area so as to receive resistance from a stirred object in the first direction of rotation (the direction shown with arrow AR1). Resistance surface 78 may be formed over stirring portion 73 from a portion thereof closer to first end portion 71 to a portion thereof closer to second end portion 72.

Referring to FIG. 70, when stirring member 70P rotates in the second direction of rotation (the direction shown with arrow AR2), resistance surface 78 receives resistance in the first direction of rotation, that is, rearward force in the second direction of rotation (see an arrow DR2) from a stirred object. This force acts on the entire stirring portion 73 (see an arrow DR3), and supports pivot of stirring member 70P and resultant transition from turned-down state S2 to standing state S1.

As shown in FIG. 71, stirring member 70P smoothly rotates in the direction shown with arrow DR1 by effectively utilizing force received at resistance surface 78, and can more reliably be stored into accommodation portion 64 (see FIG. 68).

Embodiment 12

Stirring Member 70Q

A stirring member 70Q in the present embodiment will be described with reference to FIGS. 72 and 73. Stirring member 70Q having resistance surface 78 can be applied to a rice cooker similar to rice cookers 100 and 200 in Embodiments 1 and 10 described above or a rotor similar to rotors 50, 60, and 60A in Embodiments 1, 10, and 11 described above.

Figure 72:
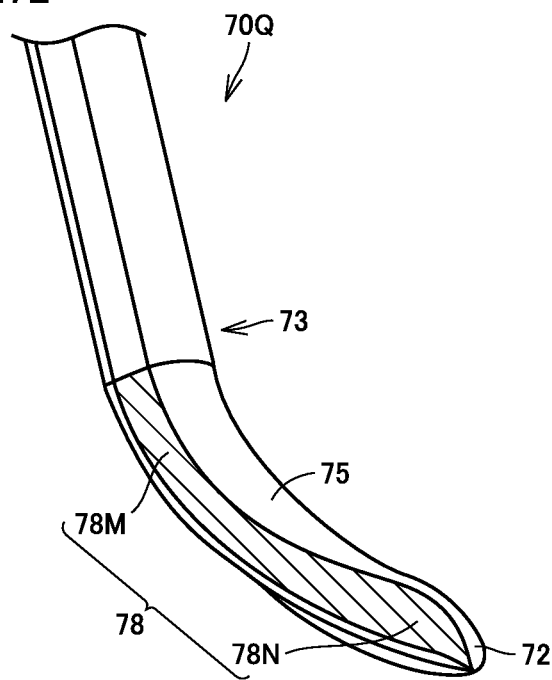
FIG. 72 is a perspective view showing a portion of a stirring member (a movable member) closer to the second end portion in Embodiment 12.

As shown in FIG. 72, unlike stirring member 70P in Embodiment 11 described above, in stirring member 70Q, a width of resistance surface 78 in a direction orthogonal to a direction of pivot of stirring member 70Q (the direction shown with arrow DR1) is formed to be greater in a portion 78N closer to second end portion 72 than in a portion 78M farther from second end portion 72.

Figure 73:
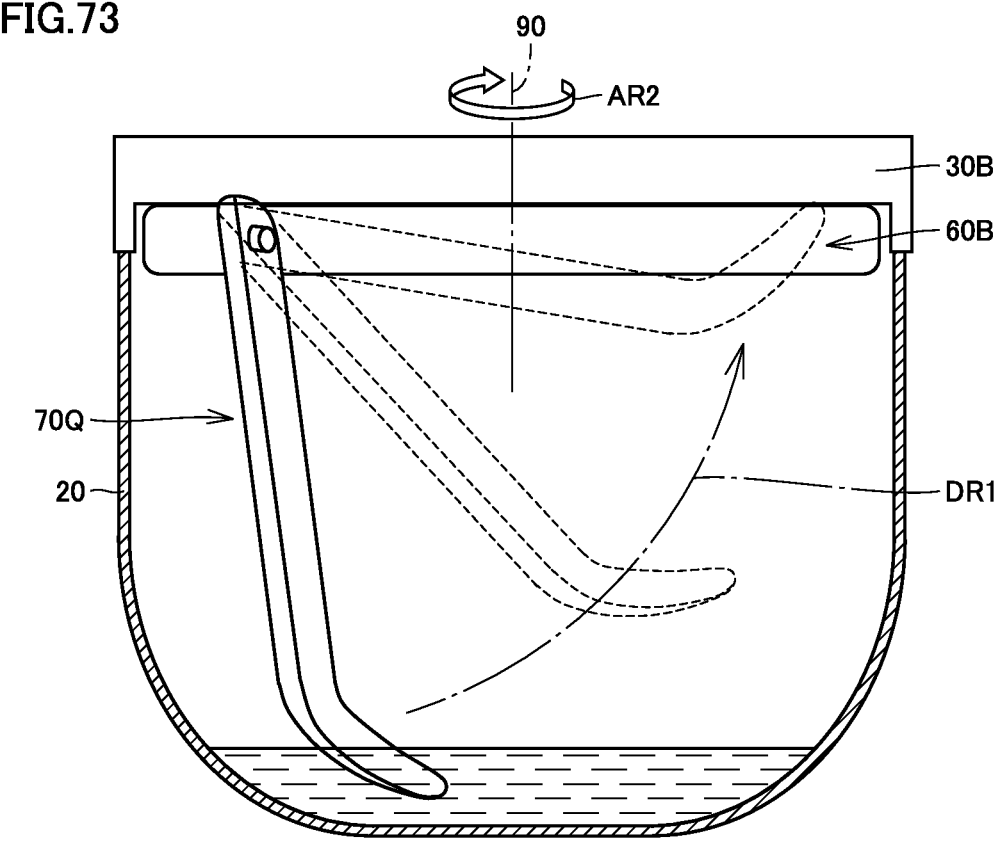
FIG. 73 is a schematic diagram showing pivot of the stirring member (movable member) included in a rotor in Embodiment 12.

As shown in FIG. 73, it is assumed that a rotor 60B attached to a lid body 30B rotates in the second direction of rotation (arrow AR2). Stirring member 70Q provided in rotor 60B pivots in the direction shown with arrow DR1 as in Embodiment 11 described above. Here, second end portion 72 of stirring member 70Q comes in contact with a stirred object until a last stage of pivot. According to stirring member 70Q, portion 78N (see FIG. 72) closer to second end portion 72 is formed to have a larger width, so that sufficient force can be received for a long time from a stirred object. As upward force is applied to the portion closer to second end portion 72, other portions also attempt to follow that portion and to move in a direction of pivot.

Therefore, according to stirring member 70Q, smooth rotation in the direction shown with arrow DR1 and more reliable storage into accommodation portion 64 (see FIG. 68) can be achieved. According to stirring member 70Q, even when an amount of a stirred object is small and contact between stirring member 70Q and a stirred object is little, portion 78N (see FIG. 72) closer to second end portion 72 is formed to have a larger width, so that sufficient force can be received for a long time from a stirred object.

Embodiment 13

Stirring Member 70R

A stirring member 70R in the present embodiment will be described with reference to FIGS. 74 to 77. Stirring member 70R having resistance surface 78 can be applied to a rice cooker similar to rice cookers 100 and 200 in Embodiments 1 and 10 described above or a rotor similar to rotors 50, 60, and 60A in Embodiments 1, 10, and 11 described above.

Figure 74:
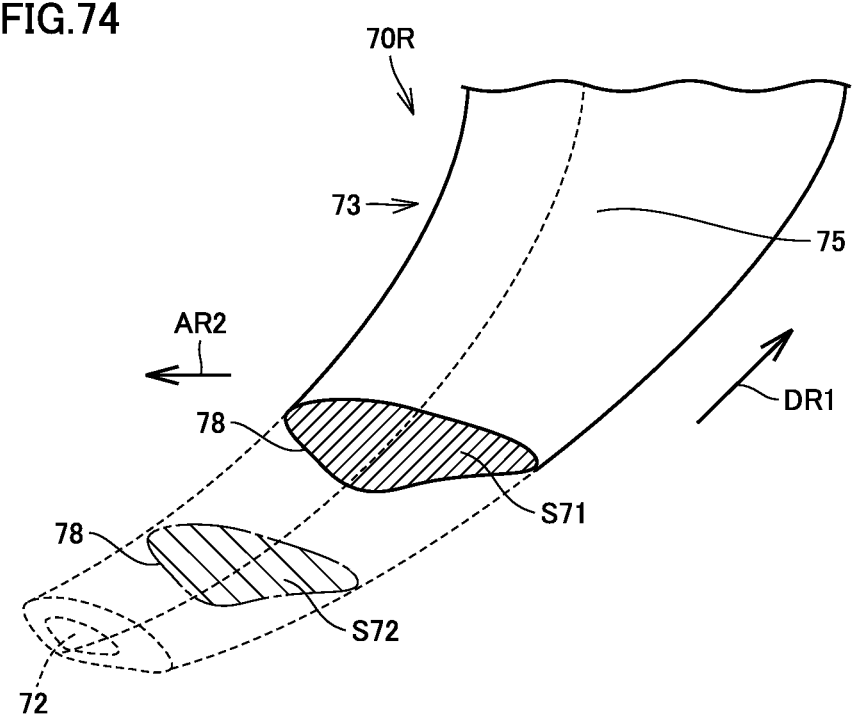
FIG. 74 is a perspective cross-sectional view showing a portion of a stirring member (a movable member) closer to the second end portion in Embodiment 13.

As shown in FIG. 74, in stirring member 70R, regarding areas S71 and S72 of a cross-sectional shape of stirring portion 73 in a cross-section including an axis of rotation of stirring member 70R at the time when stirring portion 73 forms standing state 51, area S72 on a side closer to second end portion 72 is smaller than area S71 on a side farther from second end portion 72. In addition, in stirring member 70R, a surface area of resistance surface 78 on the side of area S72 is larger than a surface area of resistance surface 78 on the side of area S71.

In stirring member 70R, an area of a cross-section is smaller toward second end portion 72, with a width of resistance surface 78 being great. A volume of stirring member 70R is smaller toward second end portion 72. In other words, a volume of stirring member 70R is smaller on the side closer to second end portion 72 than on the side farther from second end portion 72. Stirring member 70R can be lighter in weight on the side of second end portion 72 and more reliably be stored into accommodation portion 64 (see FIG. 68).

Such a phenomenon that rice is churned up or flies off as a stirring member applies upward force to rice (a stirred object) at the time when the stirring member pivots and makes transition from standing state 51 to turned-down state S2 is most likely at a tip end where moment is large. According to stirring member 70R, an area and a volume of a tip end decrease, and hence force applied to rice decreases and churn-up of rice can also be prevented.

Figure 75:
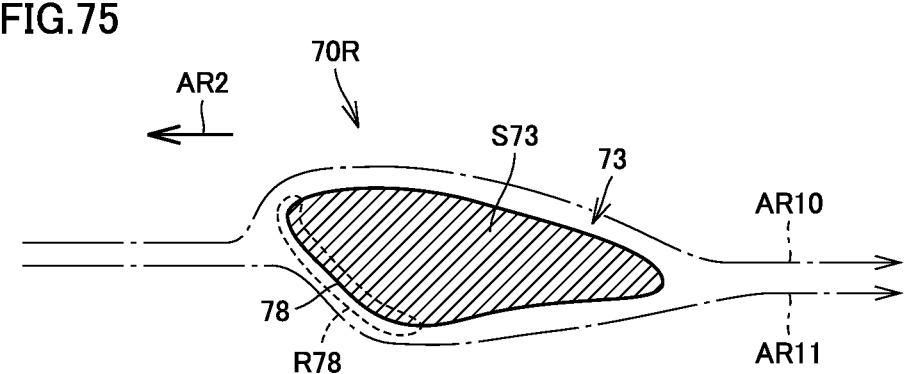
FIG. 75 is a first cross-sectional view showing the portion of the stirring member (movable member) in Embodiment 13, which is closer to the second end portion.

As shown in FIG. 75, in stirring member 70R, while stirring portion 73 forms the standing state, a portion of resistance surface 78 closer to the first end portion is located on the forward side in the second direction of rotation (the direction shown with arrow AR2) relative to a portion of resistance surface 78 closer to second end portion 72. In other words, resistance surface 78 is inclined forward with respect to the second direction of rotation (the direction shown with arrow AR2) and a portion of resistance surface 78 on an upper side of a direction of gravity is located forward in the second direction of rotation (the direction shown with arrow AR2) relative to a portion of resistance surface 78 on a lower side of the direction of gravity.

Figure 76:
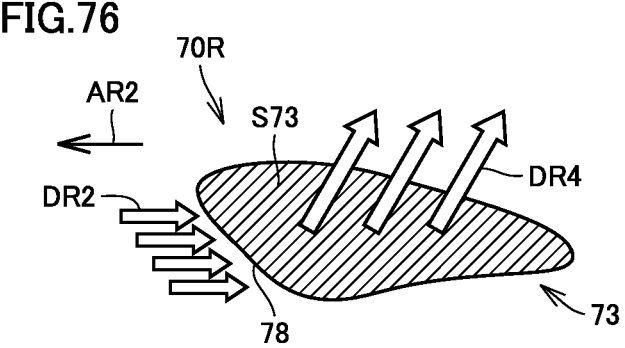
FIG. 76 is a second cross-sectional view showing the portion of the stirring member (movable member) closer to the second end portion in Embodiment 13.
Figure 77:
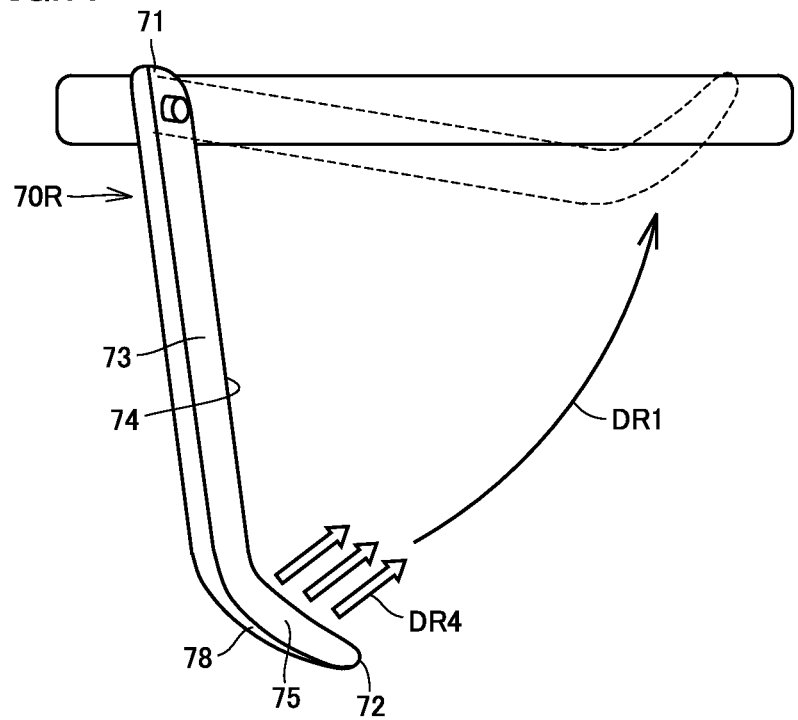
FIG. 77 is a schematic diagram showing pivot of the stirring member (movable member) in Embodiment 13.

As shown in FIGS. 76 and 77, according to stirring member 70R, when resistance surface 78 of stirring member 70R receives force in the direction shown with arrow DR2 (see FIG. 76) from a stirred object, upward force (see an arrow DR4) is generated in a portion S73 (see FIG. 76) of stirring portion 73 where resistance surface 78 is formed. Stirring member 70R can more reliably be stored into accommodation portion 64 (see FIG. 68).

(Modification 1)

Figure 78:
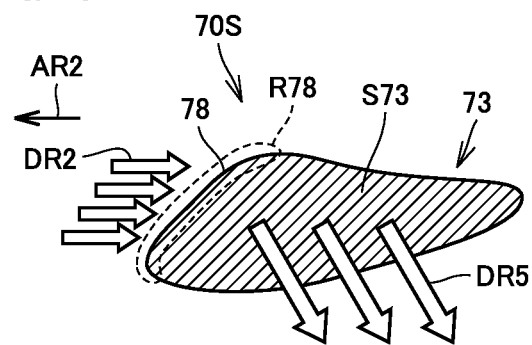
FIG. 78 is a cross-sectional view showing a portion of a stirring member (a movable member) closer to the second end in modification 1 of Embodiment 13.

As in a stirring member 70S shown in FIG. 78, while stirring portion 73 forms the standing state, a portion of resistance surface 78 closer to the first end portion may be located on the rear side of the second direction of rotation (the direction shown with arrow AR2) relative to a portion of resistance surface 78 closer to second end portion 72. In other words, resistance surface 78 is inclined rearward with respect to the second direction of rotation (the direction shown with arrow AR2) and a portion of resistance surface 78 on the upper side of the direction of gravity is located on the rear side of the second direction of rotation (the direction shown with arrow AR2) relative to a portion of resistance surface 78 on the lower side of the direction of gravity.

In stirring member 70S, when resistance surface 78 of stirring member 70S receives force in the direction shown with arrow DR2 from a stirred object, downward force (see an arrow DR5) is generated in portion S73 of stirring portion 73 where resistance surface 78 is formed. As in Embodiment 11 described above, according to stirring member 70S as well, pivot by effectively utilizing force received at resistance surface 78 and reliable storage into accommodation portion 64 (see FIG. 68) can be achieved.

(Modification 2)

Figure 79:
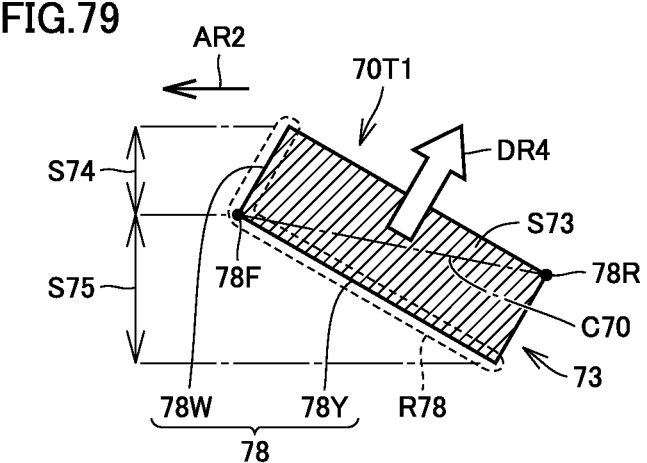
FIG. 79 is a cross-sectional view showing a portion of a stirring member (a movable member) closer to the second end in modification 2 of Embodiment 13.

Resistance surface 78 of a stirring member 70T1 shown in FIG. 79 has a tip end portion 78F located foremost in the second direction of rotation (the direction shown with arrow AR2), an upper surface 78W extending vertically upward from tip end portion 78F, a lower surface 78Y extending vertically downward from tip end portion 78F, and a rear end portion 78R located rearmost in the second direction of rotation (the direction shown with arrow AR2), while stirring portion 73 forms the standing state.

In stirring member 70T1, an area S75 of a projection shape obtained at the time when lower surface 78Y is projected forward in the second direction of rotation (the direction shown with arrow AR2) is larger than an area S74 of a projection shape obtained at the time when upper surface 78W is projected forward in the second direction of rotation (the direction shown with arrow AR2).

According to stirring member 70T1, when resistance surface 78 of stirring member 70T1 receives force from a stirred object, upward force (see arrow DR4) is generated in portion S73 of stirring portion 73 where resistance surface 78 is formed. Stirring member 70T1 can more reliably be stored into accommodation portion 64 (see FIG. 68).

(Modification 3)

Figure 80:
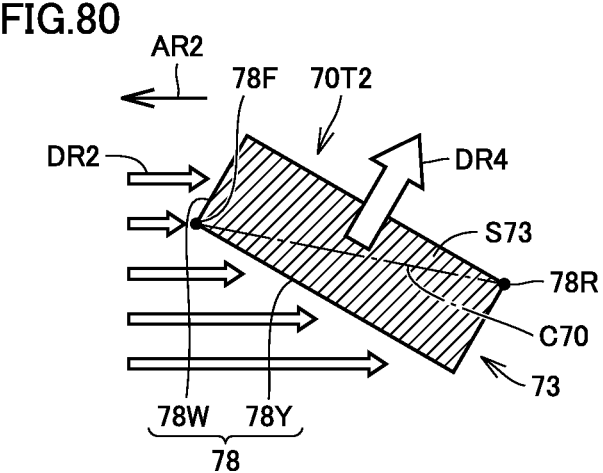
FIG. 80 is a cross-sectional view showing a portion of a stirring member (a movable member) closer to the second end in modification 3 of Embodiment 13.

In a stirring member 70T2 shown in FIG. 80, a cross-sectional shape of a cross-section along the second direction of rotation (the direction shown with arrow AR2) in a portion of stirring portion 73 including resistance surface 78 includes tip end portion 78F and rear end portion 78R. A straight line C70 connecting tip end portion 78F and rear end portion 78R to each other is inclined forward with respect to the second direction of rotation (the direction shown with arrow AR2) and is directed vertically upward with respect to the second direction of rotation on the forward side of the second direction of rotation (the direction shown with arrow AR2).

As in stirring member 70T1 (see FIG. 79), according to stirring member 70T2 as well, when resistance surface 78 of stirring member 70T2 receives force in the direction shown with arrow DR2 from a stirred object, upward force (see arrow DR4) is generated in portion S73 of stirring portion 73 where resistance surface 78 is formed. Stirring member 70T2 can more reliably be stored into accommodation portion 64 (see FIG. 68).

(Modification 4)

Figure 81:
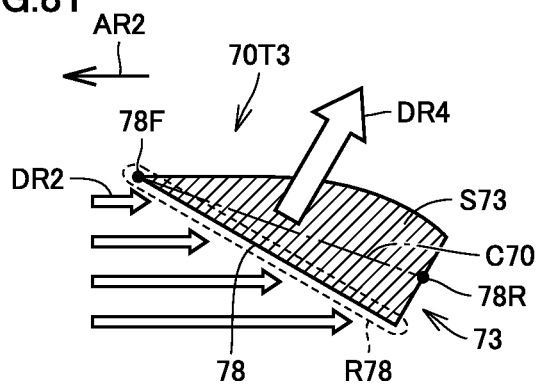
FIG. 81 is a cross-sectional view showing a portion of a stirring member (a movable member) closer to the second end in modification 4 of Embodiment 13.

A stirring member 70T3 shown in FIG. 81 does not include a site corresponding to upper surface 78W of stirring members 70T1 and 70T2 in FIGS. 79 and 80. As in stirring members 70T1 and 70T2, according to stirring member 70T3 as well, when resistance surface 78 of stirring member 70T3 receives force in the direction shown with arrow DR2 from a stirred object, upward force (see arrow DR4) is generated in portion S73 of stirring portion 73 where resistance surface 78 is formed. Stirring member 70T3 can more reliably be stored into accommodation portion 64 (see FIG. 68).

(Modification 5)

Figure 82:
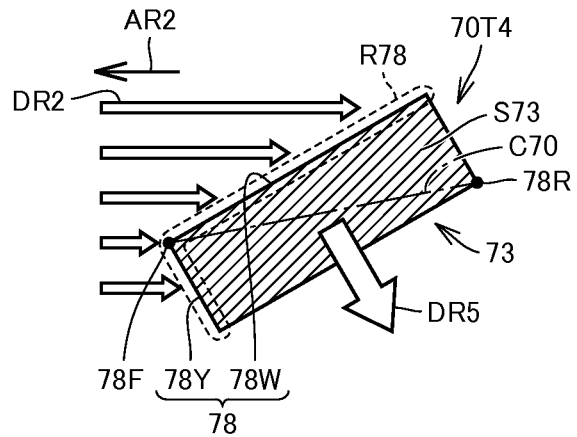
FIG. 82 is a cross-sectional view showing a portion of a stirring member (a movable member) closer to the second end in modification 5 of Embodiment 13.

In a stirring member 70T4 shown in FIG. 82, straight line C70 connecting tip end portion 78F and rear end portion 78R to each other is inclined rearward with respect to the second direction of rotation (the direction shown with arrow AR2), is directed vertically downward with respect to the second direction of rotation on the forward side of the second direction of rotation (the direction shown with arrow AR2), and is directed vertically upward with respect to the second direction of rotation on the rear side in the second direction of rotation (the direction shown with arrow AR2).

In stirring member 70T4, when resistance surface 78 receives force in the direction shown with arrow DR2 from a stirred object, downward force (see arrow DR5) is generated in portion S73 of stirring portion 73 where resistance surface 78 is formed. As in Embodiment 11 described above, according to stirring member 70T4 as well, pivot by effectively utilizing force received at resistance surface 78 and reliable storage into accommodation portion 64 (see FIG. 68) can be achieved.

(Modification 6)

Figure 83:
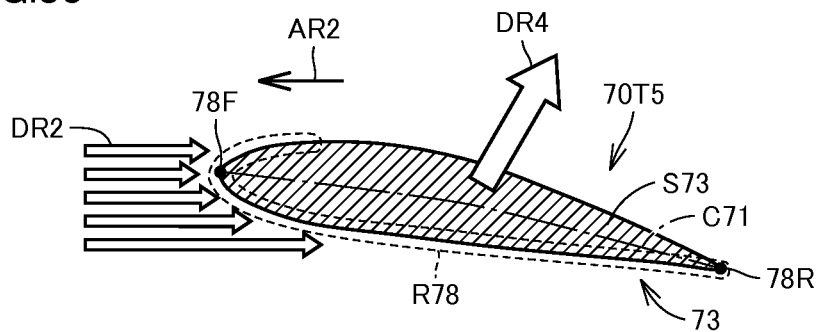
FIG. 83 is a cross-sectional view showing a portion of a stirring member (a movable member) closer to the second end in modification 6 of Embodiment 13.

In a stirring member 70T5 shown in FIG. 83, a cross-sectional shape is formed in a form of a wing and a line C71 connecting tip end portion 78F and rear end portion 78R to each other is convexly warped in a vertically upward direction. According to stirring member 70T5 as well, when resistance surface 78 receives force in the direction shown with arrow DR2 from a stirred object, upward force (see arrow DR4) is generated in portion S73 of stirring portion 73 where resistance surface 78 is formed. Stirring member 70T5 can more reliably be stored into accommodation portion 64 (see FIG. 68).

(Modification 7)

Figure 84:
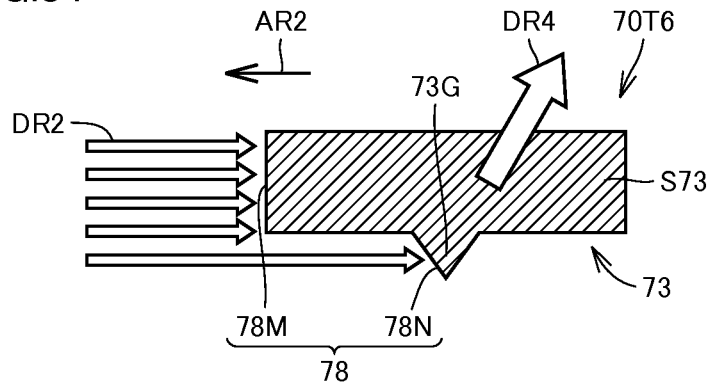
FIG. 84 is a cross-sectional view showing a portion of a stirring member (a movable member) closer to the second end in modification 7 of Embodiment 13.

In a stirring member 70T6 shown in FIG. 84, a projection 73G is provided on a lower side of stirring portion 73. According to stirring member 70T6 as well, when resistance surface 78 receives force in the direction shown with arrow DR2 from a stirred object, upward force (see arrow DR4) is generated in portion S73 of stirring portion 73 where resistance surface 78 is formed. Stirring member 70T6 can more reliably be stored into accommodation portion 64 (see FIG. 68).

(Modification 8)

Figure 85:
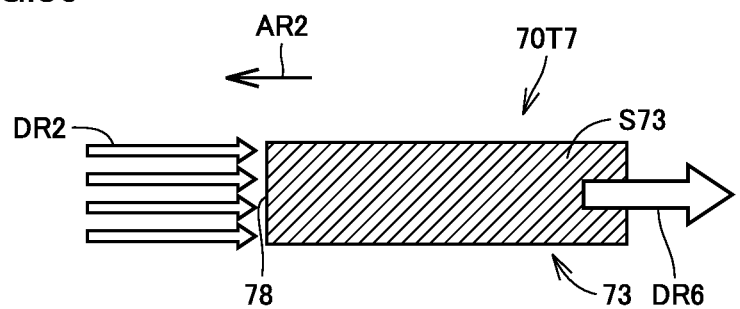
FIG. 85 is a cross-sectional view showing a portion of a stirring member (a movable member) closer to the second end in modification 8 of Embodiment 13.

A stirring member 70T7 shown in FIG. 85 has a cross-sectional shape formed in a quadrangular shape. In stirring member 70T7, when resistance surface 78 receives force in the direction shown with arrow DR2 from a stirred object, force in a direction in parallel to the direction shown with arrow DR2 (a direction shown with an arrow DR6) is generated in portion S73 of stirring portion 73 where resistance surface 78 is formed. As in Embodiment 11 described above, according to stirring member 70T7 as well, pivot by effectively utilizing force received at resistance surface 78 and reliable storage into accommodation portion 64 (see FIG. 68) can be achieved.

(Modification 9)

Figure 86:
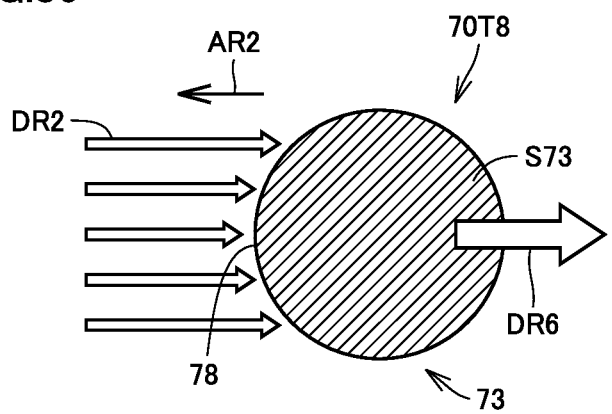
FIG. 86 is a cross-sectional view showing a portion of a stirring member (a movable member) closer to the second end in modification 9 of Embodiment 13.

A stirring member 70T8 shown in FIG. 86 has a cross-sectional shape formed in a circular shape. In stirring member 70T8, when resistance surface 78 receives force in the direction shown with arrow DR2 from a stirred object, force in a direction in parallel to the direction shown with arrow DR2 (the direction shown with arrow DR6) is generated in portion S73 of stirring portion 73 where resistance surface 78 is formed. As in Embodiment 11 described above, according to stirring member 70T8 as well, pivot by effectively utilizing force received at resistance surface 78 and reliable storage into accommodation portion 64 (see FIG. 68) can be achieved.

Embodiment 14

Stirring Member 70U1

Figure 87:
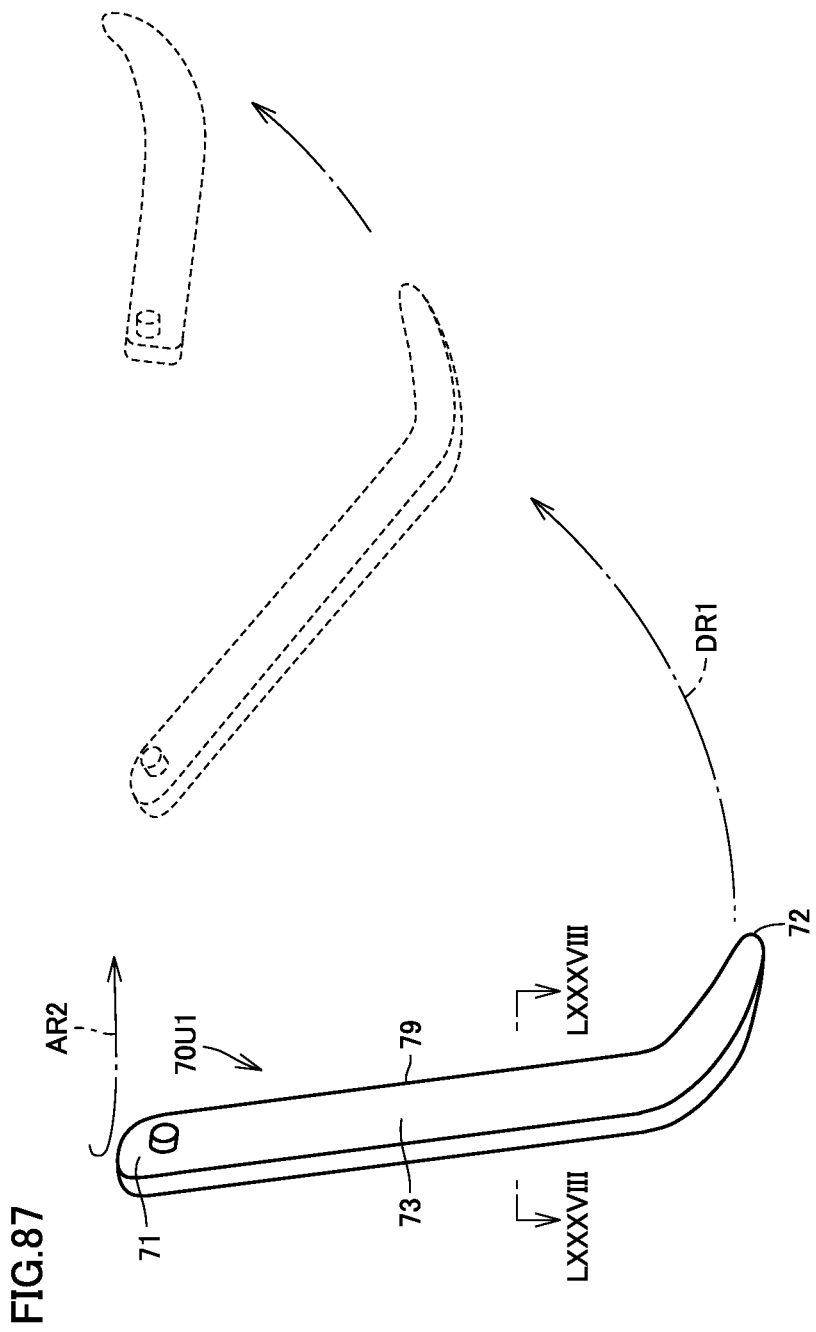
FIG. 87 is a schematic diagram showing pivot of a stirring member (a movable member) in Embodiment 14 and transition from the standing state to the turned-down state.
Figure 88:
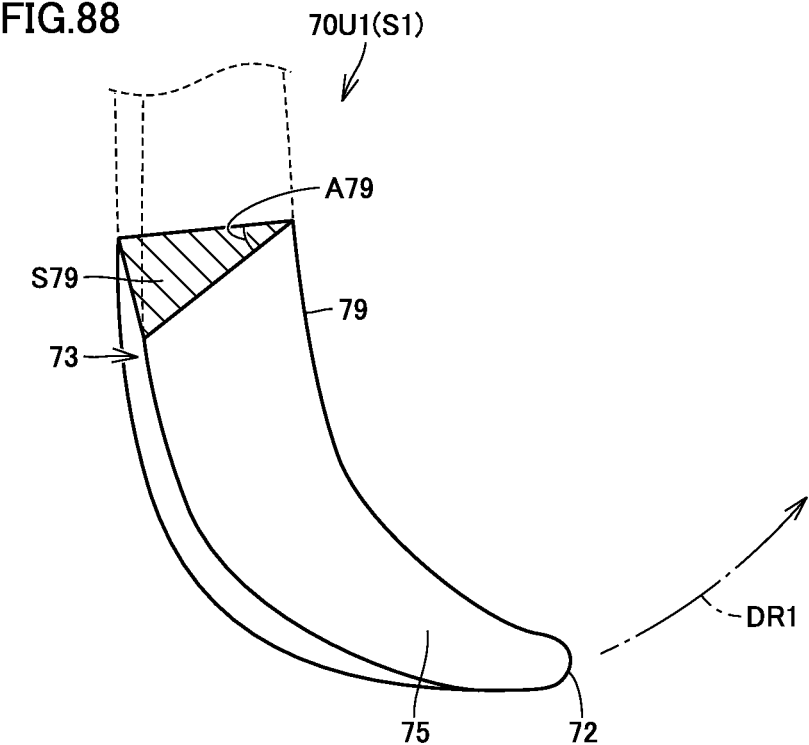
FIG. 88 is a cross-sectional view in a direction shown with an arrow along the line LXXXVIII-LXXXVIII in FIG. 87.

A stirring member 70U1 in the present embodiment will be described with reference to FIGS. 87 and 88. FIG. 87 is a schematic diagram showing pivot of stirring member 70U1 and transition from the standing state to the turned-down state. FIG. 88 is a cross-sectional view in a direction shown with an arrow along the line LXXXVIII-LXXXVIII in FIG. 87. Stirring member 70U1 can be applied to a rice cooker similar to rice cookers 100 and 200 in Embodiments 1 and 10 described above or a rotor similar to rotors 50, 60, and 60A in Embodiments 1, 10, and 11 described above.

As shown in FIG. 87, stirring portion 73 of stirring member 70U1 has a pivot front edge portion 79 located foremost in the direction of pivot (the direction shown with arrow DR1) in which pivot from the standing state (S1) to the turned-down state (S2) is made. Pivot front edge portion 79 of stirring member 70U1 corresponds to the stirring front edge portion (74) of the stirring member in each embodiment described above.

As shown in FIG. 88, a cross-sectional shape S79 of stirring portion 73 in a cross-section orthogonal to the axis of rotation of stirring member 70U1 while stirring portion 73 forms standing state S1 is formed to decrease in width toward pivot front edge portion 79. In addition, an interior angle A79 formed in pivot front edge portion 70 is at an acute angle.

According to stirring member 70U1, as pivot front edge portion 79 is formed to be small in thickness, what is called a scoop phenomenon that a stirred object rides on stirring member 70U1 and moves upward during pivot of stirring member 70U1 can be suppressed.

(Modification 1)

Figure 89:
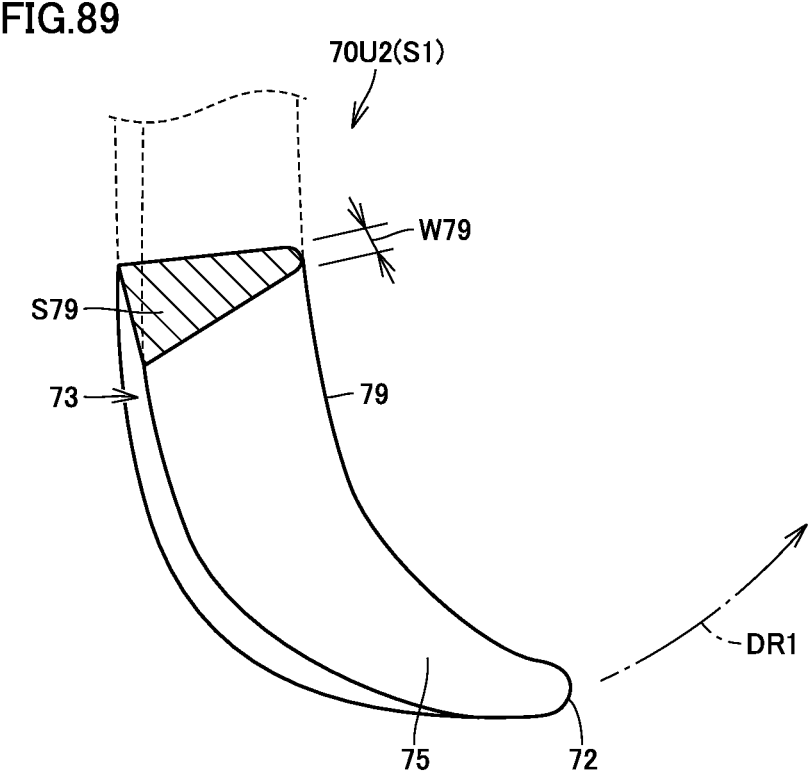
FIG. 89 is a schematic diagram showing a stirring member (a movable member) in modification 1 of Embodiment 14.

As in a stirring member 70U2 shown in FIG. 89, interior angle A79 formed in pivot front edge portion 79 may not be at an acute angle. In this case, a width W79 of pivot front edge portion 79 in the direction orthogonal to the direction of pivot (the direction shown with arrow DR1) while stirring portion 73 forms standing state S1 is desirably not larger than 3 mm (a representative length of general rice). According to stirring member 70U2 as well, as pivot front edge portion 79 is formed to be small in thickness, what is called a scoop phenomenon that a stirred object rides on stirring member 70U1 and moves upward during pivot of stirring member 70U1 can be suppressed.

Comparative Example 10

Figure 90:
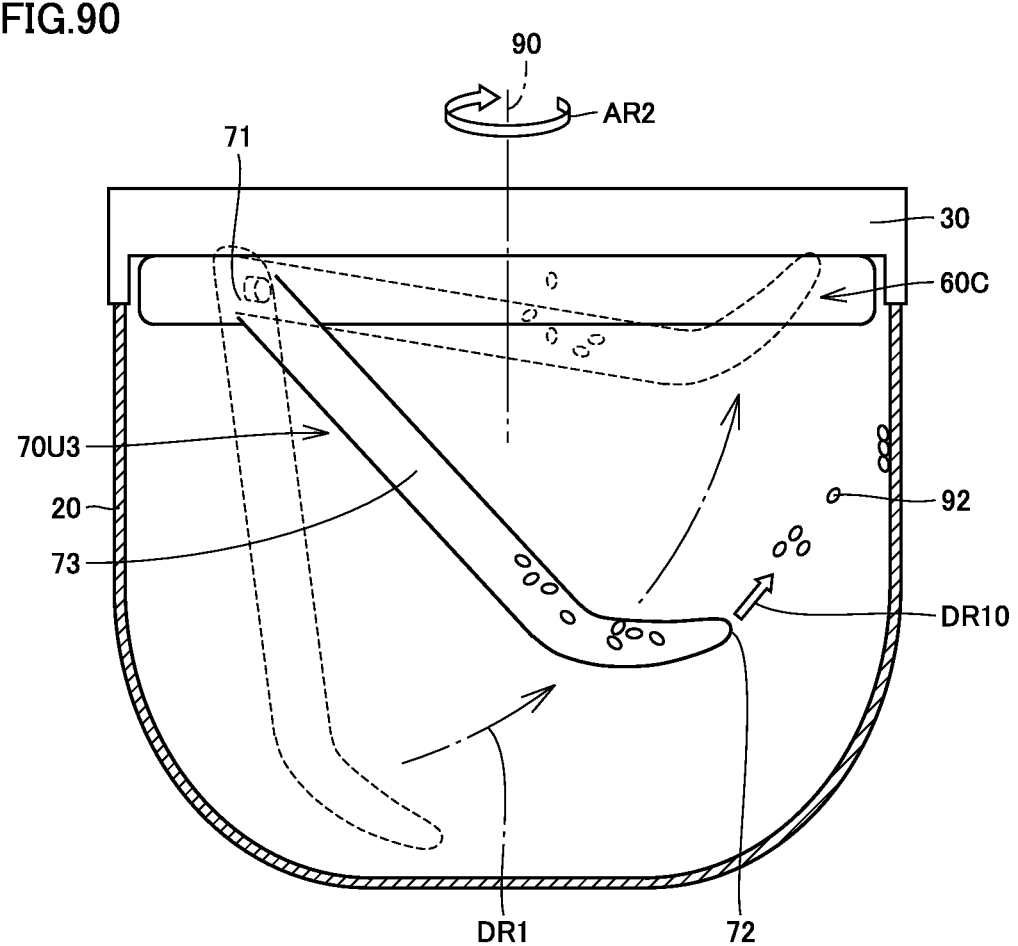
FIG. 90 is a schematic diagram showing a stirring member (a movable member) in Comparative Example 10 in connection with Embodiment 14.

FIG. 90 is a schematic diagram showing a stirring member 70U3 in Comparative Example 10 in connection with Embodiment 14. Stirring member 70U3 does not include a site corresponding to pivot front edge portion 79 in stirring member 70U1 in Embodiment 14 described above. A pivot front edge portion of stirring member 70U3 is not formed to decrease in width toward the pivot front edge portion.

When stirring member 70U3 makes transition from the standing state to the turned-down state, stirring member 70U3 is more likely to scoop rice 92. A state that stirring member U3 remains scooping rice 92 is not much preferred from a point of view of sanity or cleaning. If a large amount of rice 92 is scooped and adhere to a rotor 60C (see an arrow DR10), an operation of rotor 60C may fail. Rice which adhere to rotor 60C may be cooked as they are.

(Modification 2)

Figure 91:
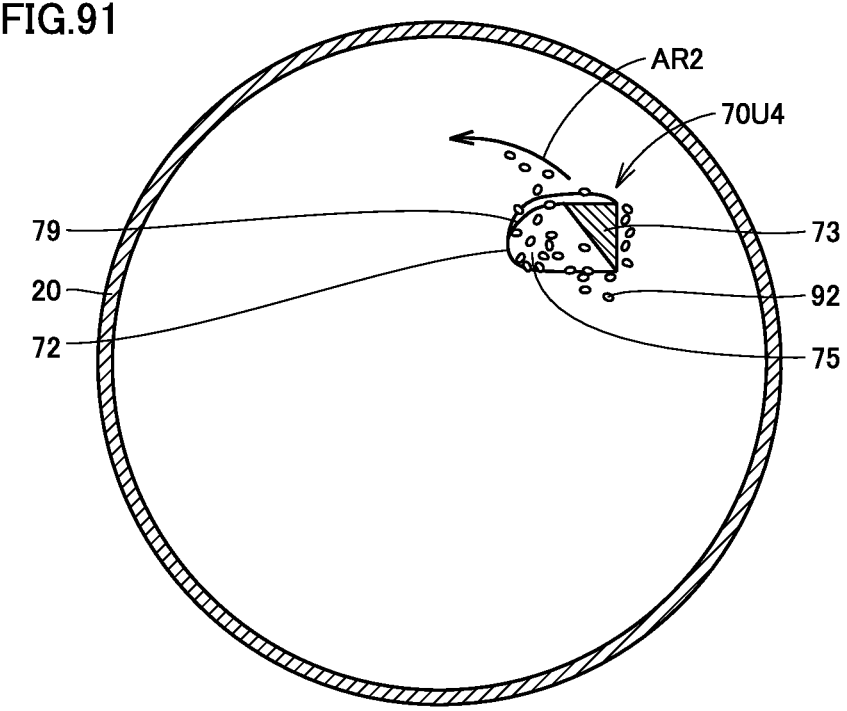
FIG. 91 is a schematic diagram showing a stirring member (a movable member) in modification 2 of Embodiment 14 (at the time of start of pivot).
Figure 92:
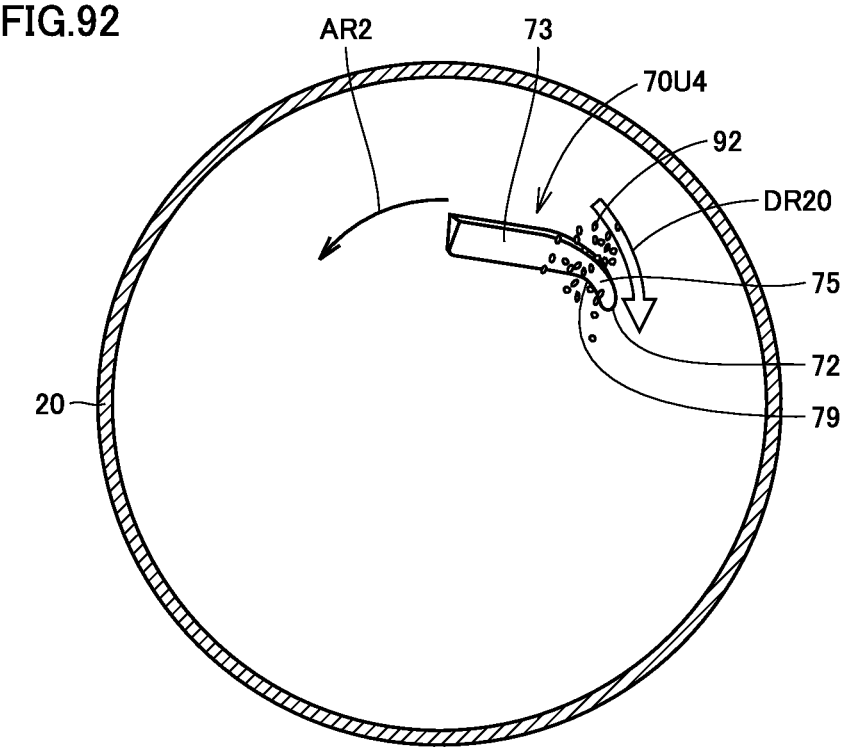
FIG. 92 is a schematic diagram showing the stirring member (movable member) in modification 2 of Embodiment 14 (during pivot).
Figure 93:
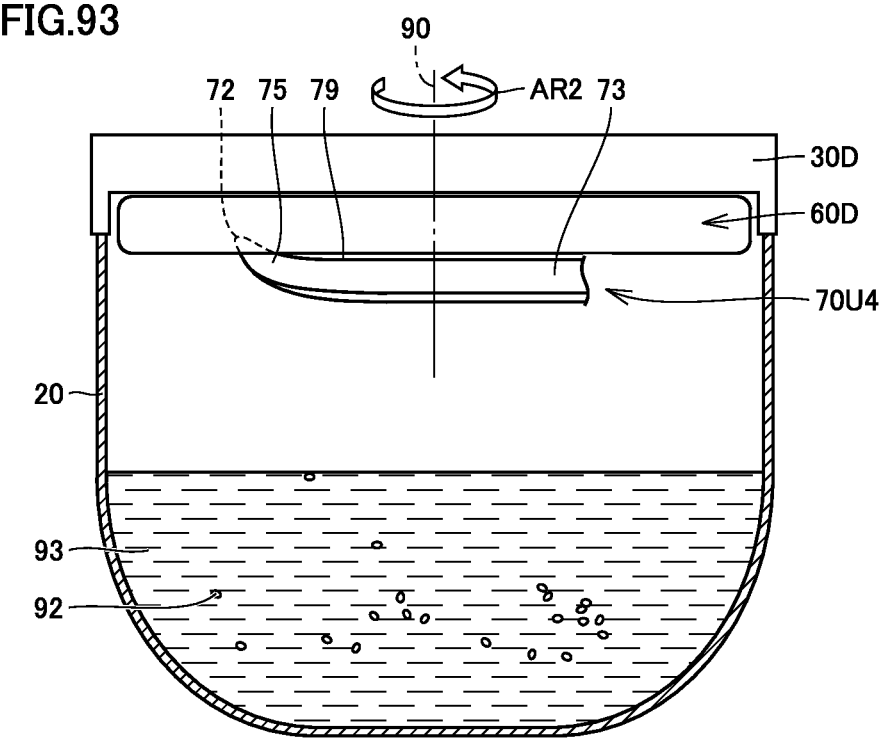
FIG. 93 is a schematic diagram showing the stirring member (movable member) in modification 2 of Embodiment 14 (at the time of completion of pivot).

As in a stirring member 70U4 shown in FIGS. 91 to 93, pivot front edge portion 79 is desirably curved inward in the direction of radius of rotation, toward second end portion 72. As a rotor 60D (see FIG. 93) provided in a lid body 30D (see FIG. 93) rotates and stirring member 70U4 makes transition from standing state S1 to turned-down state S2, a shape of pivot front edge portion 79 in the vicinity of second end portion 72 conforms to a shape of a circumference.

Since stirring member 70U4 pivots along a flow of a stirred object (see an arrow DR20), resistance force of a fluid reaching stirring member 70U4 during pivot is less. At the time of start of pivot (a state shown in FIG. 91), a behavior substantially the same as that of a straight stirring member (a stirring member 70U5 in Comparative Example 11 which will be described next) is exhibited, however, as pivot proceeds (a state shown in FIG. 92), drag applied to stirring member 70U4 becomes less.

A curved portion of pivot front edge portion 79 of stirring member 70U4 decreases in speed of movement upward and starts to slowly move upward. Accordingly, a speed of movement of a portion of stirring member 70U4 which serves to churn up rice 92 becomes lower. According to stirring member 70U4, what is called a scoop phenomenon can further be suppressed (see FIG. 93). Since a speed of movement of the portion of stirring member 70U4 which serves to churn up rice 92 becomes lower, an initial speed of rice 92 is low even though rice is churned up and rice 92 can soon return into inner pot 20.

Comparative Example 11

Figure 94:
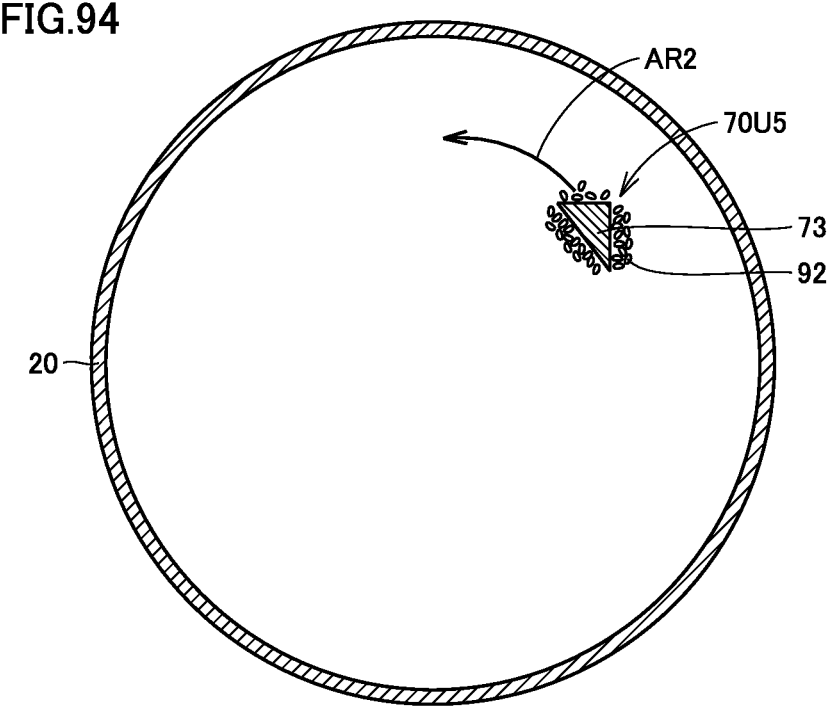
FIG. 94 is a schematic diagram showing a stirring member (a movable member) in Comparative Example 11 in connection with Embodiment 14 (at the time of start of pivot).
Figure 95:
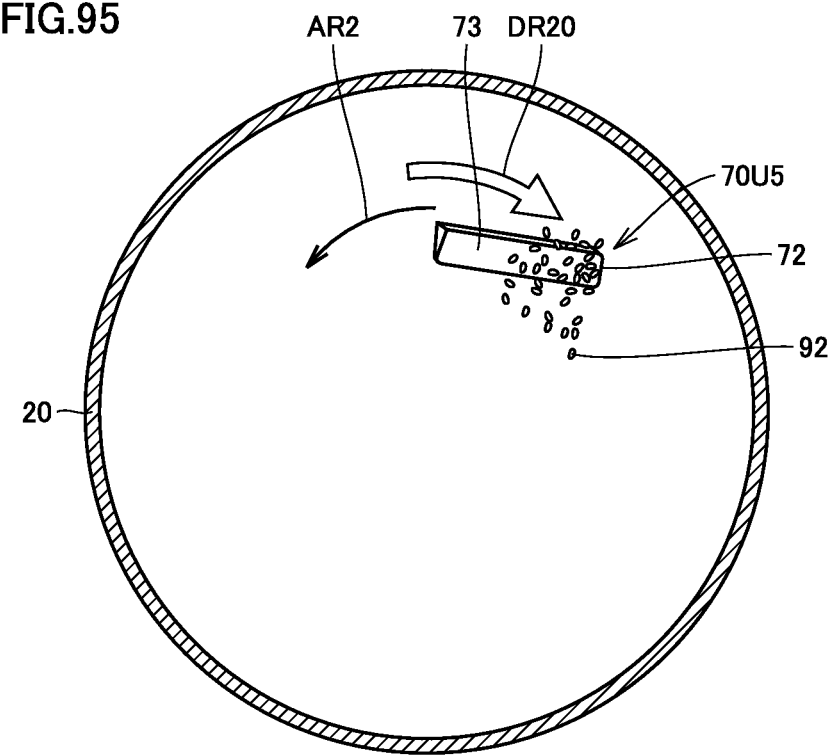
FIG. 95 is a schematic diagram showing the stirring member (movable member) in Comparative Example 11 in connection with Embodiment 14 (during pivot).
Figure 96:
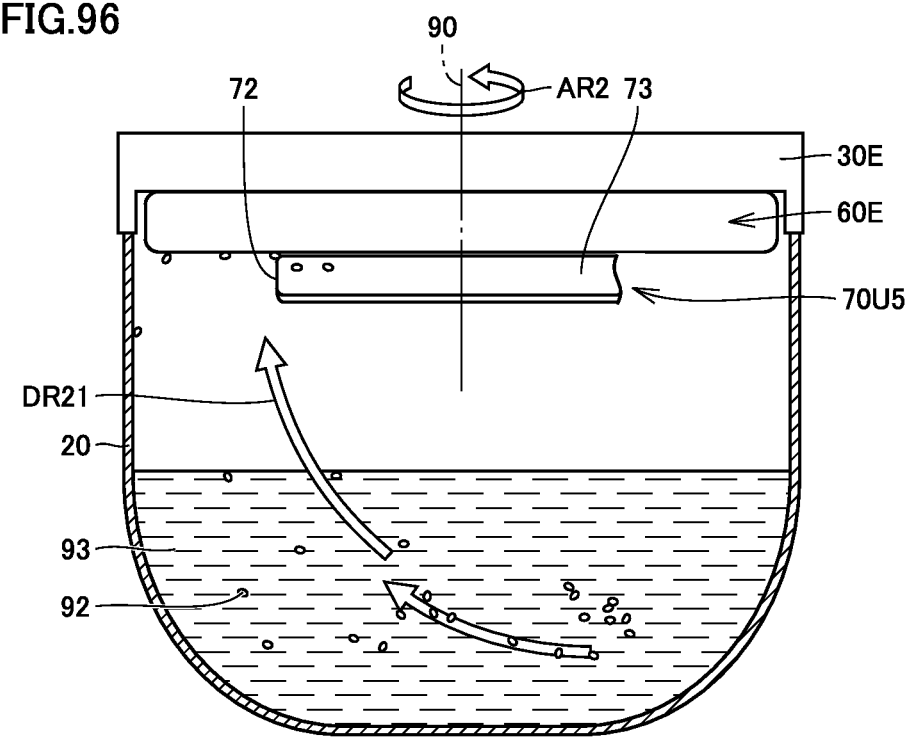
FIG. 96 is a schematic diagram showing the stirring member (movable member) in Comparative Example 11 in connection with Embodiment 14 (at the time of completion of pivot).

Stirring member 70U5 shown in FIGS. 94 to 96 is not formed such that pivot front edge portion 79 is curved inward in the direction of radius of rotation, toward second end portion 72. When a rotor 60E (see FIG. 96) provided in a lid body 30E (see FIG. 96) rotates, stirring member 70U5 does not pivot along a flow of a stirred object and resistance force of a fluid reaching stirring member 70U5 during pivot is more than in the case of stirring member 70U4 described above.

At the time of start of pivot (a state shown in FIG. 94) of stirring member 70U5, it exhibits a behavior substantially the same as that of stirring member 70U4 described above, however, as pivot proceeds (a state shown in FIG. 95), drag applied to stirring member 70U5 increases. A speed of movement of a portion of stirring member 70U5 which serves to churn up rice 92 is not lowered even when stirring member 70U5 pivots. According to stirring member 70U5, rice 92 may be scooped and adhere to rotor 60E (see an arrow DR21).

(Modification 3)

Figure 97:
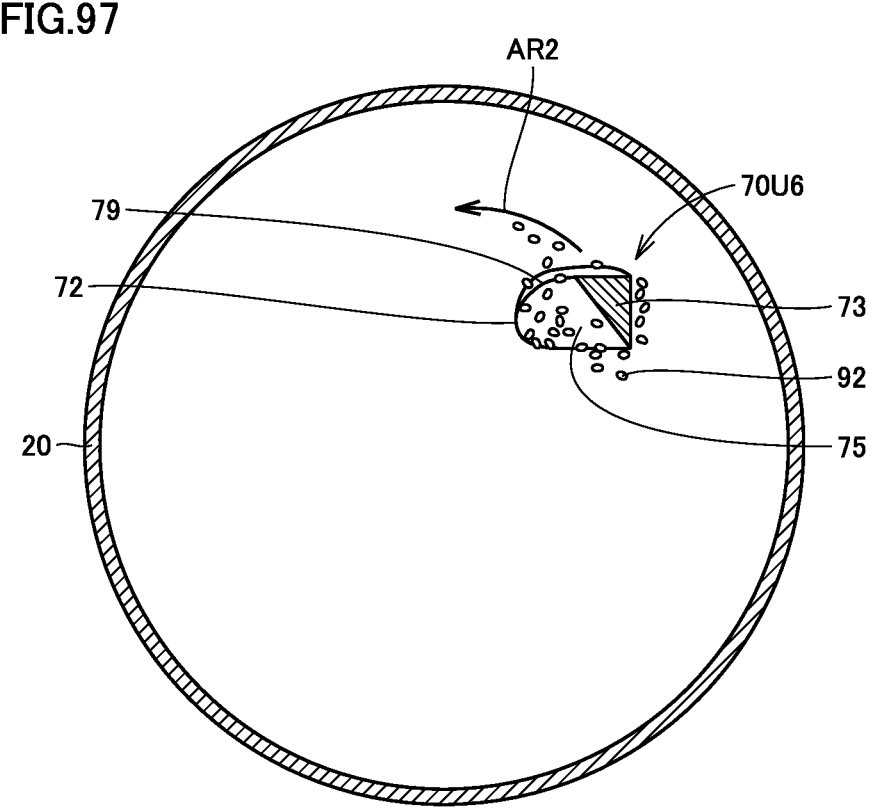
FIG. 97 is a schematic diagram showing a stirring member (a movable member) in modification 3 of Embodiment 14 (at the time of start of pivot).
Figure 98:
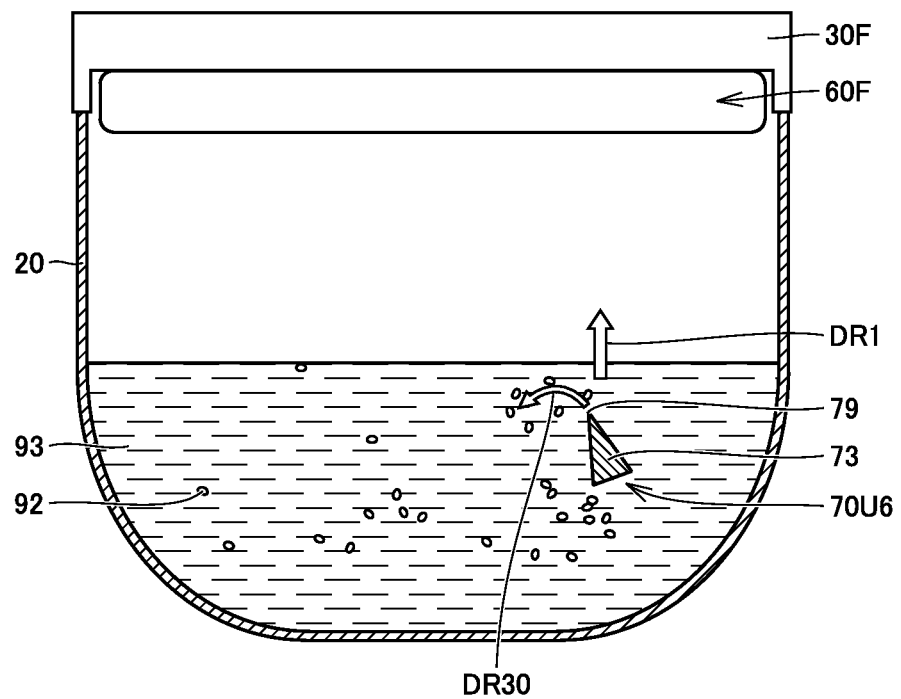
FIG. 98 is a schematic diagram showing the stirring member (movable member) in modification 3 of Embodiment 14 (during pivot).

As in a stirring member 70U6 shown in FIGS. 97 and 98, pivot front edge portion 79 is desirably formed as being displaced from the direction of pivot (the direction shown with arrow DR1) such that a direction of extension of pivot front edge portion 79 in a cross-section orthogonal to axis of rotation 90 does not coincide with the direction of pivot (the direction shown with arrow DR1) during pivot. As shown in FIG. 98, in the present modification, pivot front edge portion 79 is formed such that the direction of extension of pivot front edge portion 79 is closer to the axis of rotation of stirring member 70U6, toward the front in the second direction of rotation (the direction shown with arrow AR2).

Stirring member 70U6 pivots as a rotor 60F (see FIG. 98) provided in a lid body 30F (see FIG. 98) rotates, and makes transition from the standing state to the turned-down state. When stirring member 70U6 pivots, with rotation of stirring member 70U6 in the second direction of rotation (the direction shown with arrow AR2), rice 92 and water 93 flow along a circumferential direction. With pivot of stirring member 70U6, upward force is applied to rice 92. As the direction of extension of pivot front edge portion 79 is formed as being displaced from the direction of pivot (the direction shown with arrow DR1), a direction of movement of rice 92 is not in the upward direction but in a diagonally upward direction (see an arrow DR30).

According to stirring member 70U6, what is called a scoop phenomenon can further be suppressed. An initial speed of rice 92 is low even though rice is churned up and rice 92 can soon return into inner pot 20.

(Modification 4)

Figure 99:
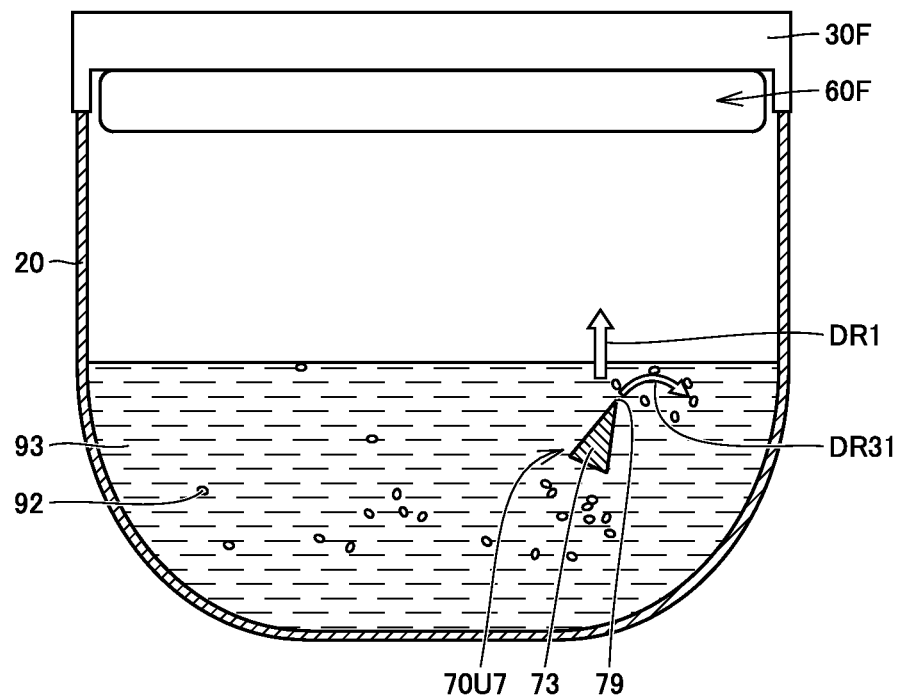
FIG. 99 is a schematic diagram showing a stirring member (a movable member) in modification 4 of Embodiment 14 (during pivot).

As in a stirring member 70U7 shown in FIG. 99, pivot front edge portion 79 may be formed such that a direction of extension of pivot front edge portion 79 is away from the axis of rotation of stirring member 70U6, toward the front in the second direction of rotation (the direction shown with arrow AR2). As in stirring member 70U6 (see FIG. 98), according to stirring member 70U7 as well, what is called a scoop phenomenon can further be suppressed. An initial speed of rice 92 is low even though rice is churned up and rice 92 can soon return into inner pot 20.

Comparative Example 12

Figure 100:
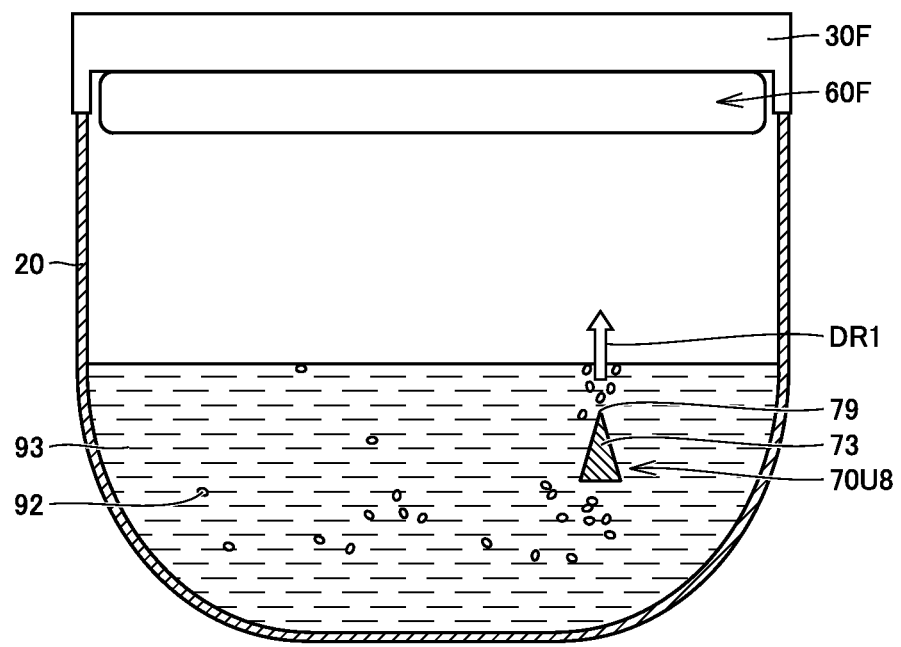
FIG. 100 is a schematic diagram showing a stirring member (a movable member) in Comparative Example 12 in connection with Embodiment 14 (during pivot).

In a stirring member 70U8 shown in FIG. 100, pivot front edge portion 79 is formed such that a direction of extension of pivot front edge portion 79 in a cross-section orthogonal to axis of rotation 90 coincides with the direction of pivot (the direction shown with arrow DR1) during pivot. With pivot of stirring member 70U8, upward force is applied to rice 92. As the direction of extension of pivot front edge portion 79 is not formed as being displaced from the direction of pivot (the direction shown with arrow DR1), a direction of movement of rice 92 is in the upward direction. According to stirring member 70U8, as compared with stirring members 70U and 70U7, it is difficult to further suppress what is called a scoop phenomenon.

(Modification 5)

Figure 101:
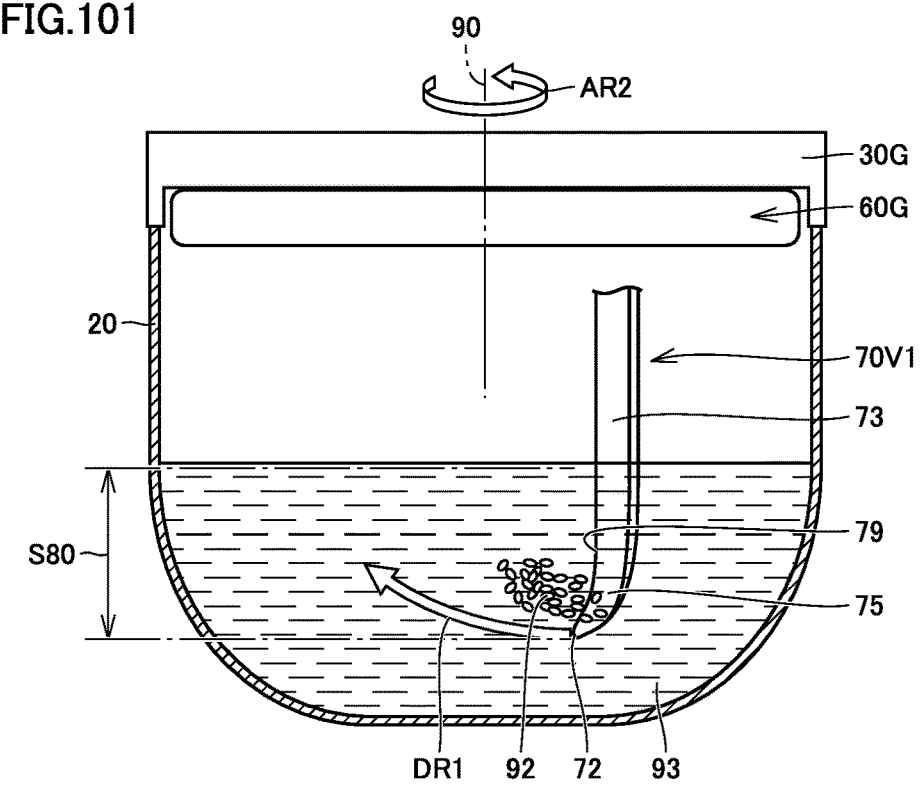
FIG. 101 is a schematic diagram showing a stirring member (a movable member) in modification 5 of Embodiment 14 (at the time of start of pivot).

As in a stirring member 70V1 shown in FIG. 101, pivot front edge portion 79 desirably extends forward in the direction of pivot (the direction shown with arrow DR1), toward second end portion 72. As a rotor 60G (see FIG. 96) provided in a lid body 30G (see FIG. 96) starts to rotate in the second direction of rotation (the direction shown with arrow AR2), stirring member 70V1 starts to pivot. At a time point of start of pivot, an area of projection of a portion of stirring member 70V1 located in water 93 has an area S80 (see FIG. 101).

Figure 102:
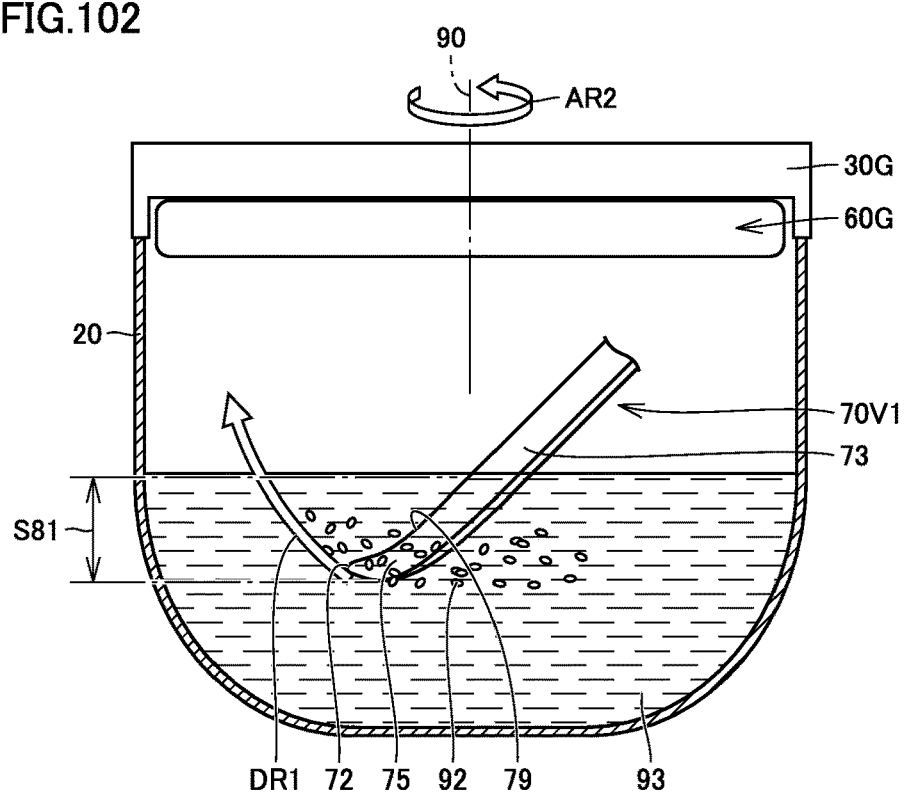
FIG. 102 is a schematic diagram showing the stirring member (movable member) in modification 5 of Embodiment 14 (during pivot).

Referring to FIG. 102, at a time point during pivot, an area of projection of the portion of stirring member 70V1 located in water 93 has an area S81 (see FIG. 102). Drag received from a stirred object by stirring member 70V1 as a result of rotation of stirring member 70V1 relates to an area of projection along a direction of a flow. According to stirring member 70V1, an area of projection along the direction of the flow becomes smaller relatively-early quickly from area S80 toward area S81.

Figure 103:
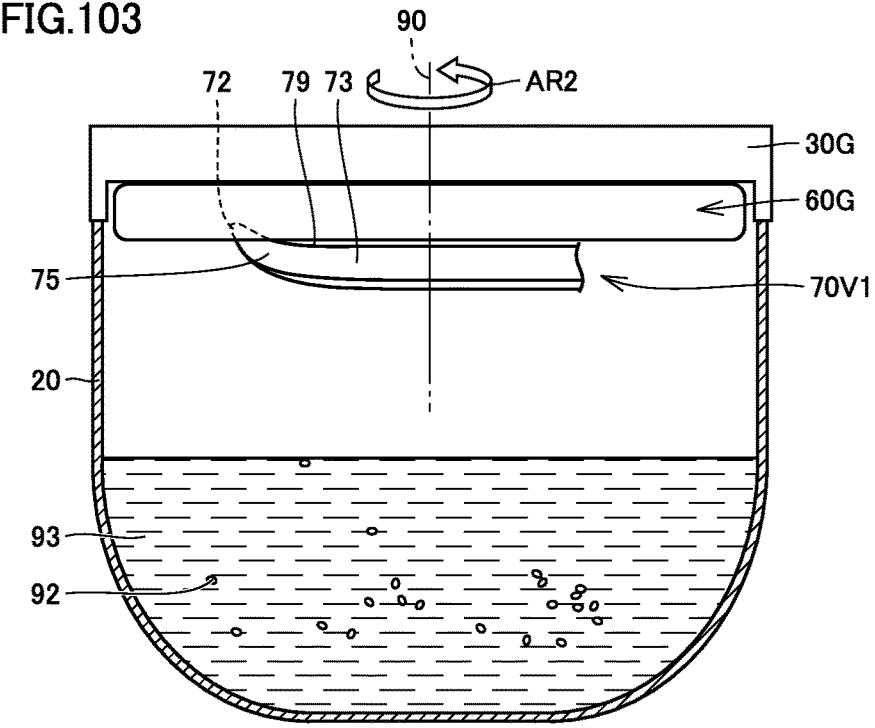
FIG. 103 is a schematic diagram showing the stirring member (movable member) in modification 5 of Embodiment 14 (at the time of completion of pivot).

FIG. 103 shows a condition at a time point of completion of pivot of stirring member 70V1. As the area of projection along the direction of the flow is made smaller relatively quickly, a speed of movement upward resulting from force received from a fluid lowers from a time point during pivot. A speed of movement of a portion of stirring member 70V1 which serves to churn up rice 92 also lowers. According to stirring member 70V1, what is called a scoop phenomenon can further be suppressed.

Comparative Example 13

Figure 104:
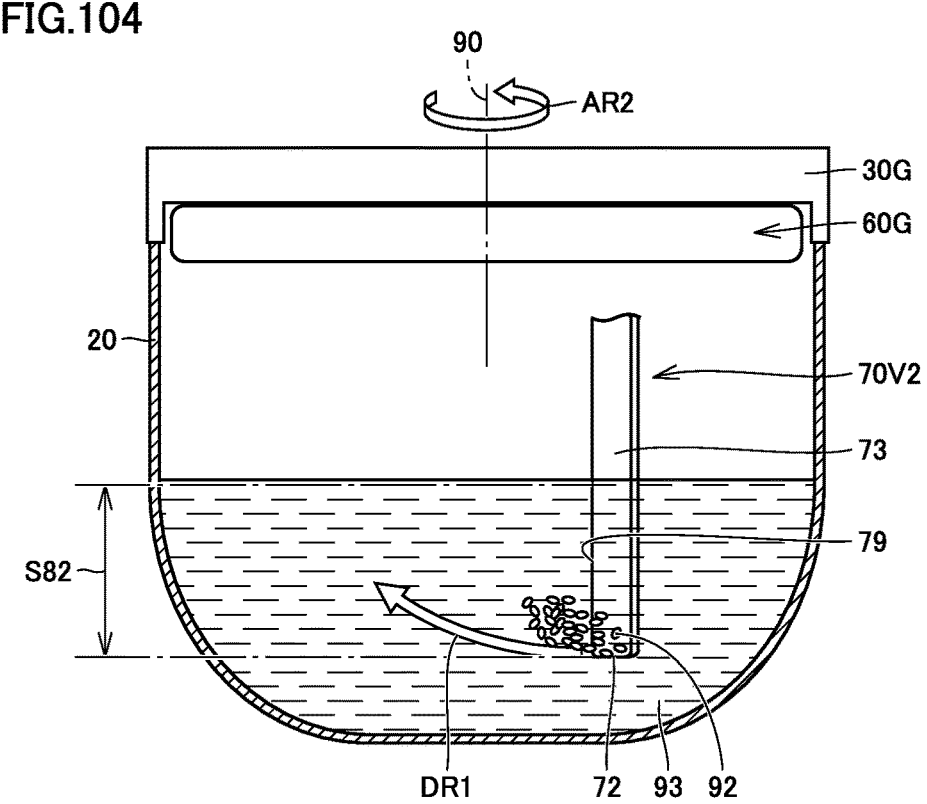
FIG. 104 is a schematic diagram showing a stirring member (a movable member) in Comparative Example 13 in connection with Embodiment 14 (at the time of start of pivot).

Pivot front edge portion 79 of a stirring member 70V2 shown in FIG. 104 is not constructed to be directed forward in the direction of pivot (the direction shown with arrow DR1), toward second end portion 72. At a time point of start of pivot, an area of projection of a portion of stirring member 70V2 located in water 93 has an area S82 (see FIG. 104). Area S82 is equal to area S80 (see FIG. 101) described above.

Figure 105:
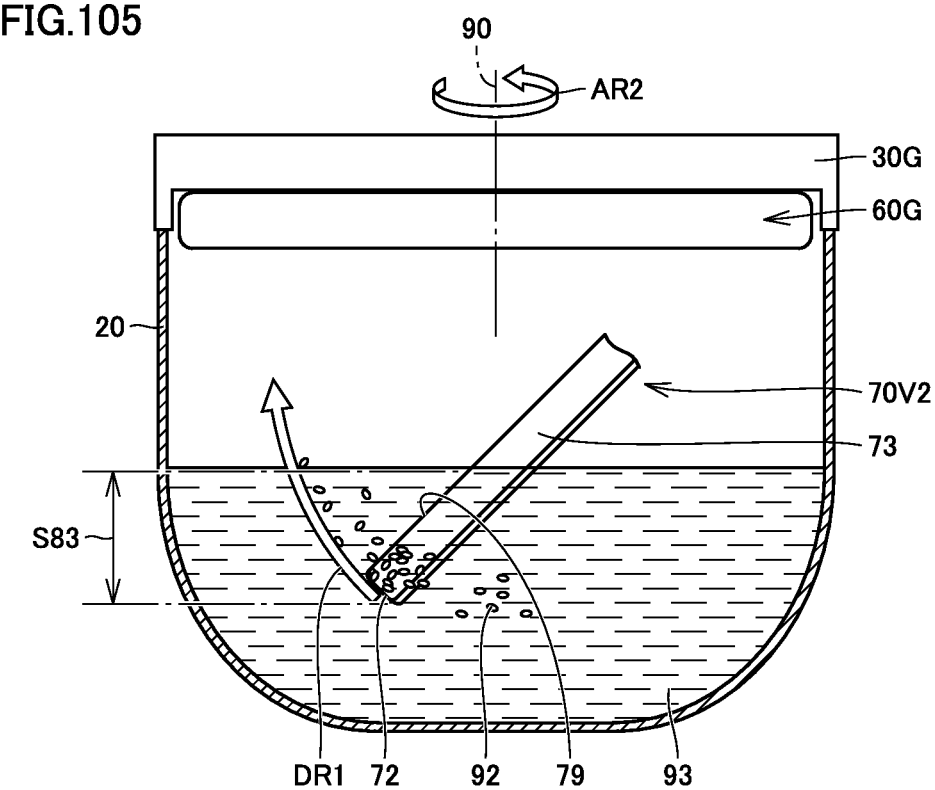
FIG. 105 is a schematic diagram showing the stirring member (movable member) in Comparative Example 13 in connection with Embodiment 14 (during pivot).

Referring to FIG. 105, at a time point during pivot, an area of projection of a portion of stirring member 70V2 located in water 93 has an area S83 (see FIG. 105). According to stirring member 70V2, an area of projection along a direction of a flow decreases relatively slowly from area S82 to area S83.

Figure 106:
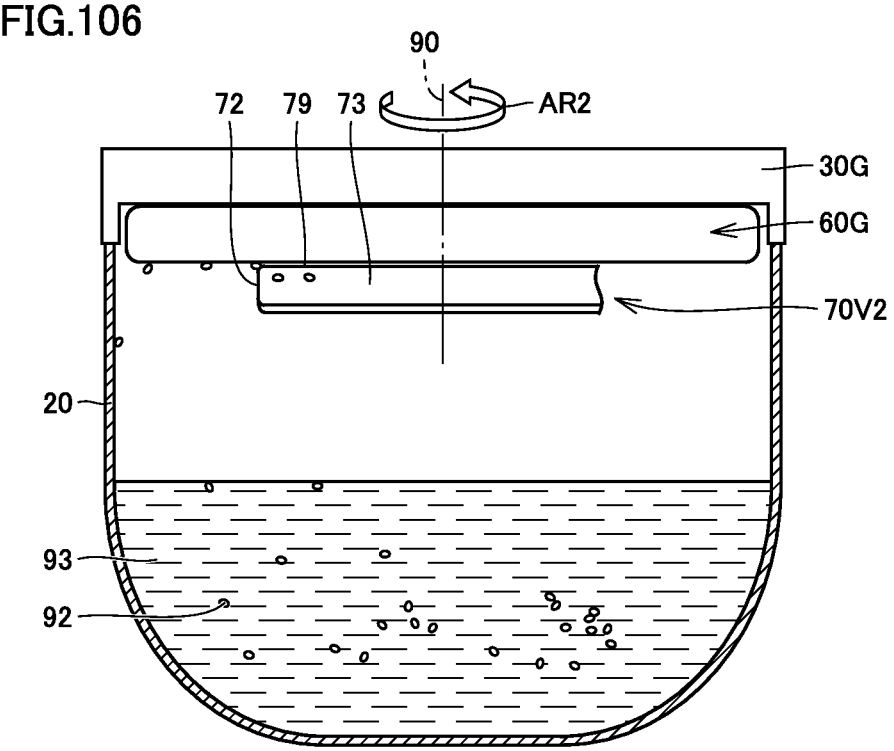
FIG. 106 is a schematic diagram showing the stirring member (movable member) in Comparative Example 13 in connection with Embodiment 14 (at the time of completion of pivot).

FIG. 106 shows a condition at a time point of completion of pivot of stirring member 70V2. As an area of projection along a direction of a flow decreases relatively slowly, a speed of movement upward resulting from force received from a fluid is not lowered from a time point during pivot, as compared with stirring member 70V1. A speed of movement of a portion of stirring member 70V2 which serves to churn up rice 92 is not lowered either, as compared with stirring member 70V1. According to stirring member 70V2, it is difficult to further suppress what is called a scoop phenomenon, as compared with stirring member 70V1.

Embodiment 15

Figure 107:
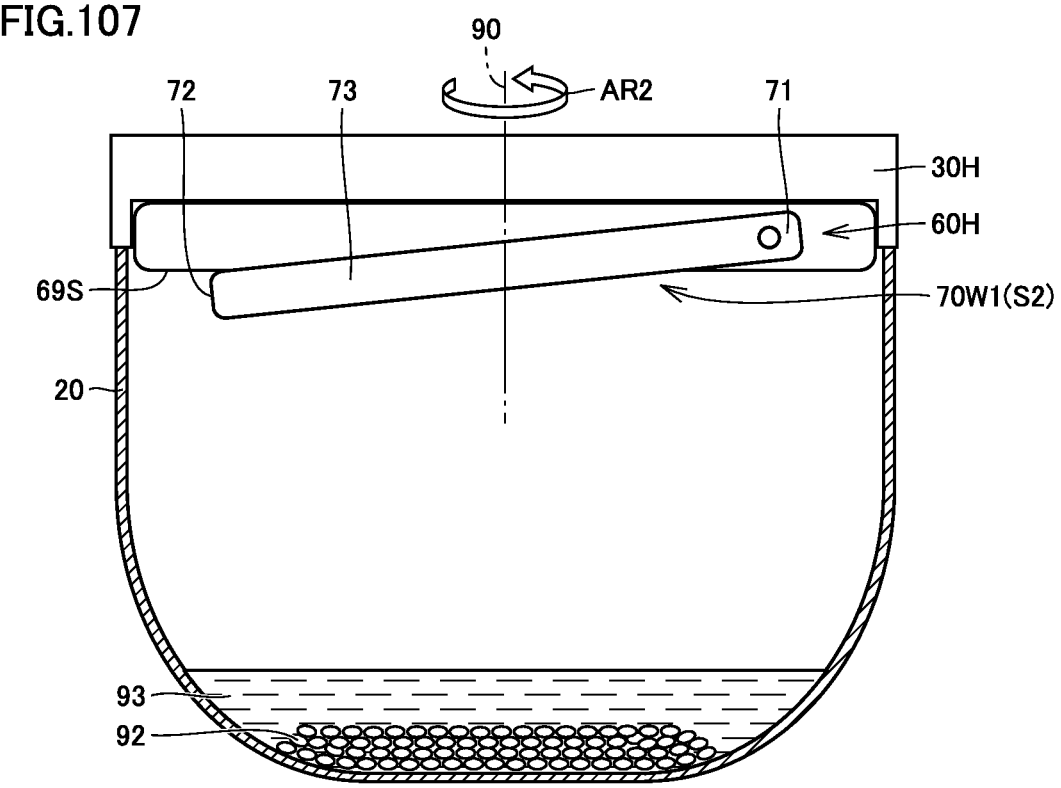
FIG. 107 is a schematic diagram showing a lid body and a stirring member (a movable member) in Embodiment 15.

A stirring member 70W1 in the present embodiment will be described with reference to FIGS. 107 and 108. As shown in FIG. 107, stirring member 70W1 is attached to a rotor 60H provided in a lid body 30H. As rotor 60H rotates in the second direction of rotation (the direction shown with arrow AR2), stirring member 70W1 also rotates in the same direction.

When stirring member 70W1 forms turned-down state S2, stirring member 70W1 is inclined with respect to the horizontal surface and protrudes substantially in a triangular shape from surface 69S of rotor 60H opposed to inner pot 20. As rotor 60H rotates in the second direction of rotation (the direction shown with arrow AR2), stirring member 70W1 also rotates.

Figure 108:
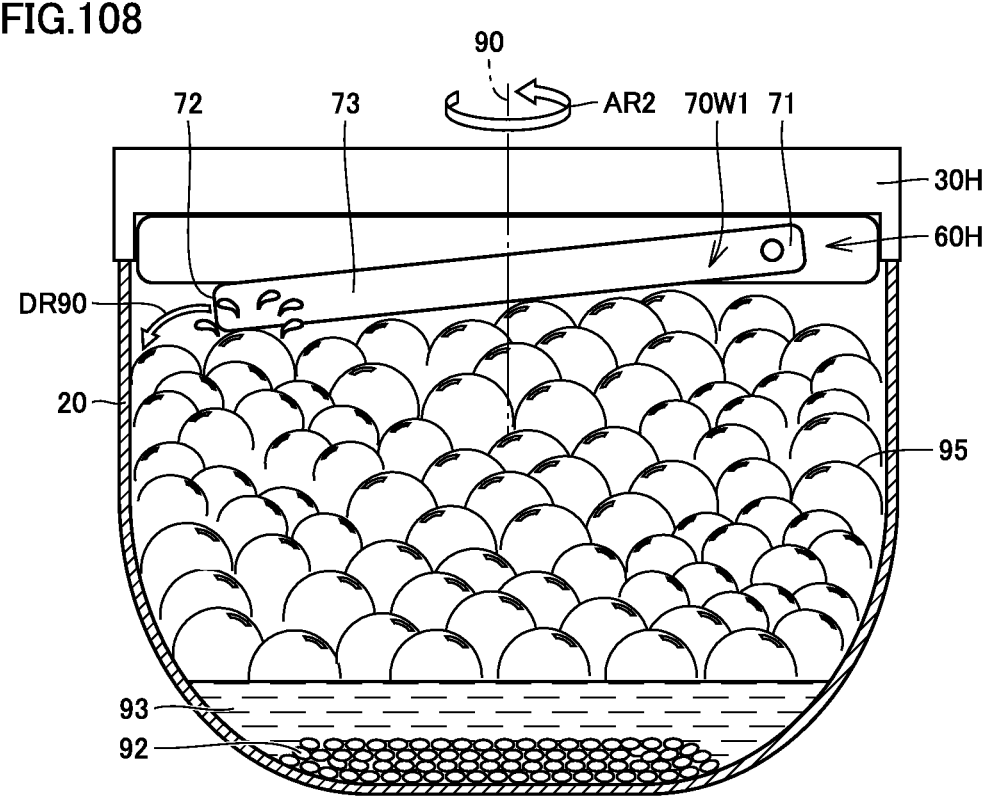
FIG. 108 is a schematic diagram of the lid body and the stirring member (movable member) in Embodiment 15 during operation.

As shown in FIG. 108, rice gruel 95 produced from rice 92 and water 93 is broken by physical contact with rotating stirring member 70W1. Rice gruel 95 exhibits a complicated behavior owing to external force provided from stirring member 70W1. Contact between rice gruel 95 and rice gruel 95 can also break rice gruel 95. Broken rice gruel 95 is returned into rice 92 and water 93 (see an arrow DR90). Since stirring member 70W1 can suppress leakage of a savory component to the outside and a temperature of rice can be kept high, pregelatinization of rice can reliably be promoted and tasty cooked rice can be obtained.

Lid body 30H may have an asymmetric or symmetric cross-sectional shape which passes through axis of rotation 90. When the cross-sectional shape is asymmetric, different surfaces come to turn and hence a behavior of rice gruel becomes complicated and breakage can further be promoted. When the cross-sectional shape is symmetric, with rotation, a similar surface continues to come to turn, and hence rice gruel which rises is uniformly broken and rice are cooked uniformly.

Comparative Example 14

Figure 109:
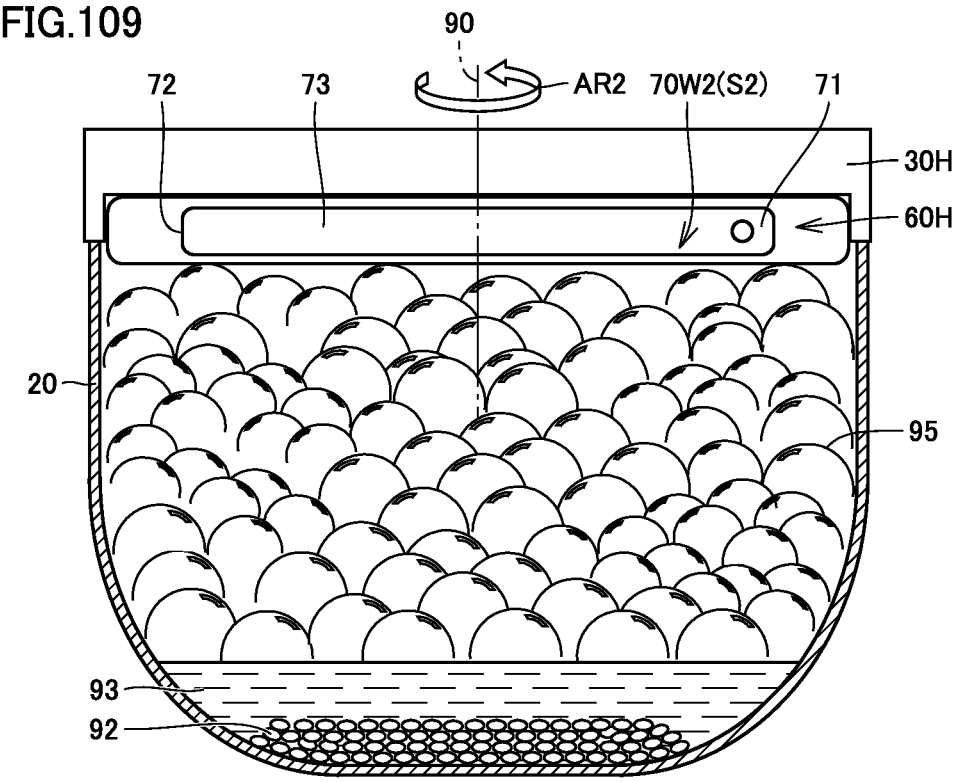
FIG. 109 is a schematic diagram of a lid body and a stirring member (a movable member) in Comparative Example 14 in connection with Embodiment 15 during operation.

When a stirring member 70W2 shown in FIG. 109 forms turned-down state S2, stirring member 70W2 is not inclined with respect to the horizontal surface and does not protrude either from surface 69S of rotor 60H opposed to inner pot 20. According to stirring member 70W2, only rotor 60H may rotate, and unless such measures as high-speed rotation are taken, an amount of broken rice gruel 95 is smaller than in the case of stirring member 70W1 (see FIG. 107).

Even when stirring member 70W2 can break rice gruel 95, broken rice gruel 95 is flown outward by centrifugal force and tends to adhere to the wall surface of inner pot 20. A savory component is less likely to return into rice. Appearance after rice cooking is poorer than in use of stirring member 70W1, and load imposed in a cleaning operation also increases. Rice gruel 95 adheres to rotor 60H and load imposed in the cleaning operation also increases.

(Modification 1)

Figure 110:
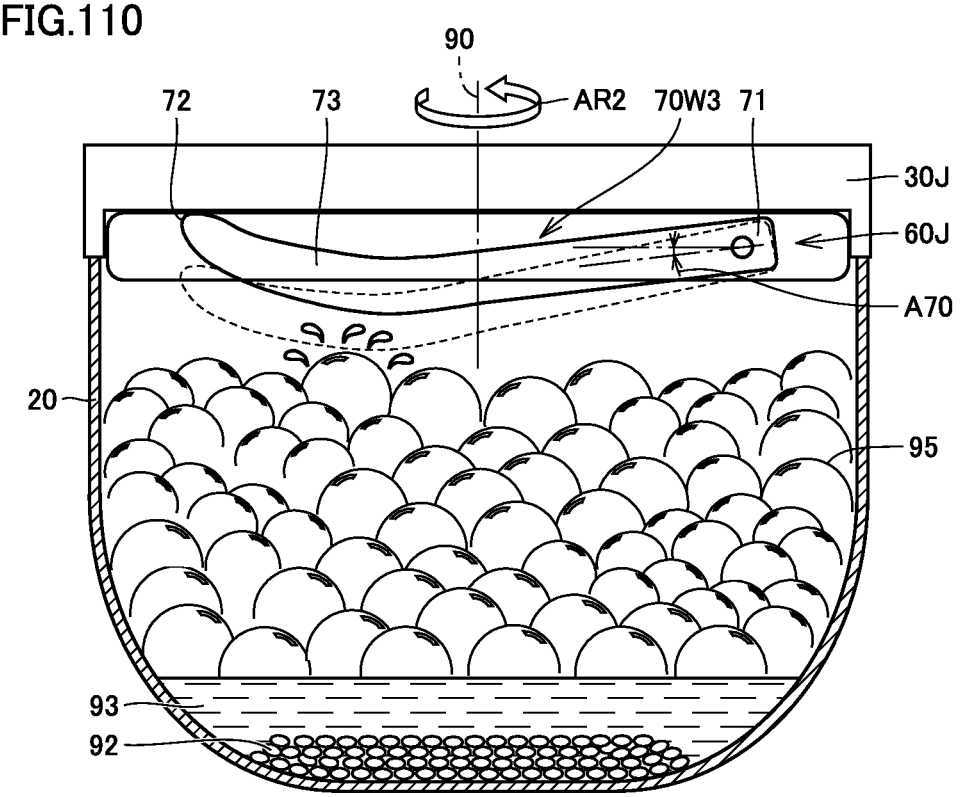
FIG. 110 is a schematic diagram of a lid body and a stirring member (a movable member) in modification 1 of Embodiment 15 during operation.

A stirring member 70W3 shown in FIG. 110 is formed in what is called a knife shape and constructed such that second end portion 72 vertically moves (such that an angle A70 changes). When stirring member 70W3 rotates together with a rotor 60J provided in a lid body 30J, a motor is continuously driven. While stirring member 70W3 rotates around axis of rotation 90, second end portion 72 vertically moves, so that rice gruel 95 can more effectively be broken.

Stirring member 70W3 may be constructed so as to carry out not only rotational motion but also carry out, for example, reciprocating motion, sliding motion, or motion like a wiper in a plane. According to stirring member 70W3, rice gruel 95 is likely to be broken more on the inner side in the direction of radius, and hence broken rice gruel 95 can be less likely to adhere to the wall surface of inner pot 20.

(Modification 2)

Figure 111:
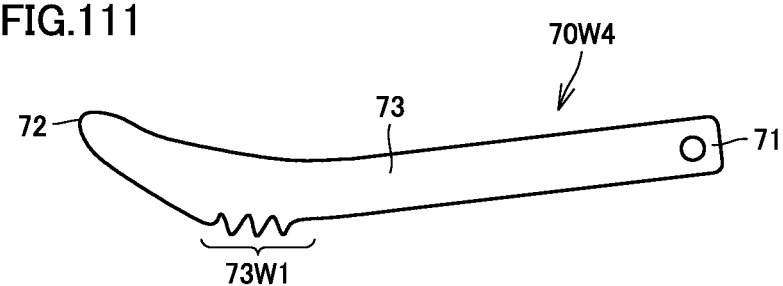
FIG. 111 is a schematic diagram showing a stirring member (a movable member) in modification 2 of Embodiment 15.

A stirring member 70W4 shown in FIG. 111 has what is called a knife shape and a protrusion 73W1 is provided on an end surface on the side of inner pot 20. Stirring member 70W4 can also more effectively break rice gruel 95.

(Modification 3)

Figure 112:
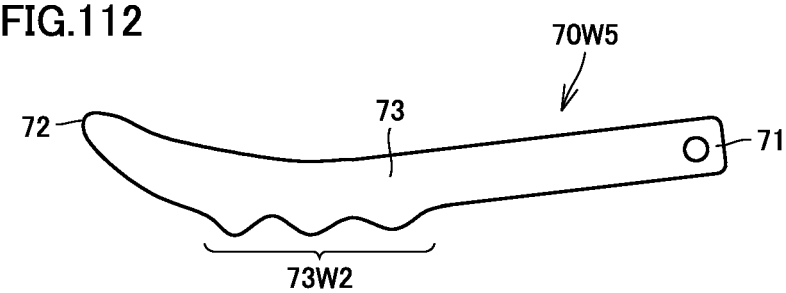
FIG. 112 is a schematic diagram showing a stirring member (a movable member) in modification 3 of Embodiment 15.

A stirring member 70W5 shown in FIG. 112 has what is called a knife shape and a protrusion 73W2 is provided on an end surface on the side of inner pot 20.

Protrusion 73W2 is larger in size than protrusion 73W1 (FIG. 111). Stirring member 70W5 can also more effectively break rice gruel 95.

(Modification 4)

Figure 113:
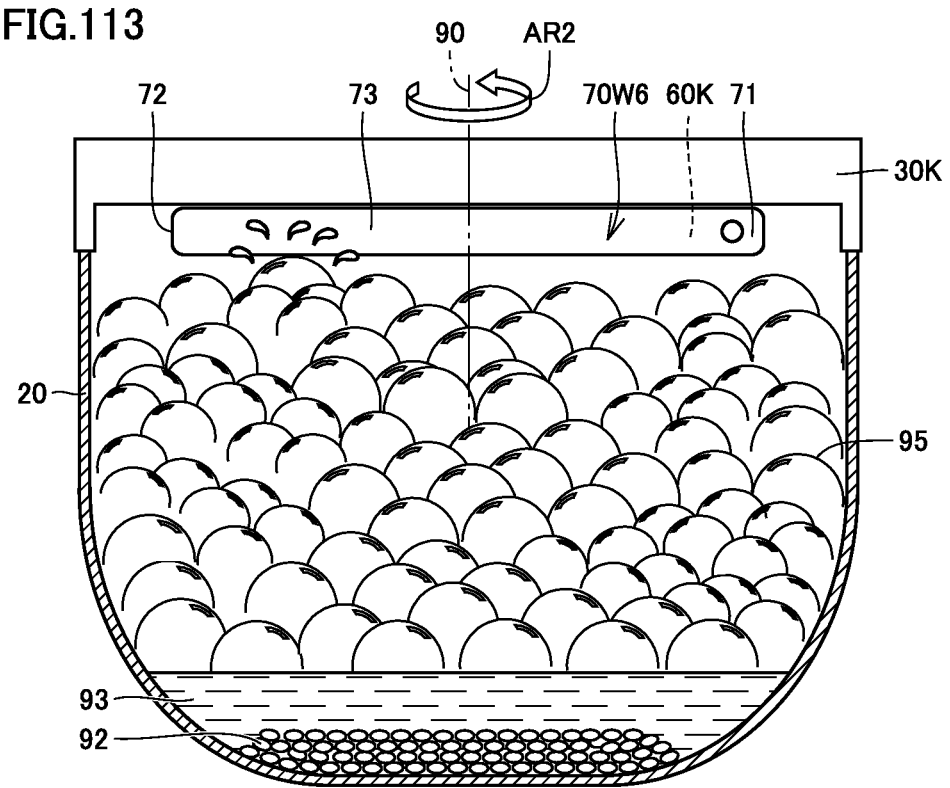
FIG. 113 is a schematic diagram of a lid body and a stirring member (a movable member) in modification 4 of Embodiment 15 during operation.

A rotor 60K having a stirring member 70W6 is provided in a lid body 30K shown in FIG. 113. Rotor 60K and stirring member 70W6 are arranged substantially at the same height position, and a part of stirring member 70W6 protrudes below from rotor 60K. According to such a construction as well, rice gruel 95 exhibits a complicated behavior owing to external force provided from stirring member 70W6. Contact between rice gruel 95 and rice gruel 95 can break rice gruel 95. Broken rice gruel 95 is returned into rice 92 and water 93. Since stirring member 70W6 can suppress leakage of a savory component to the outside and a temperature of rice can be kept high, pregelatinization of rice can reliably be promoted and tasty cooked rice can be obtained.

(Modification 5)

Figure 114:
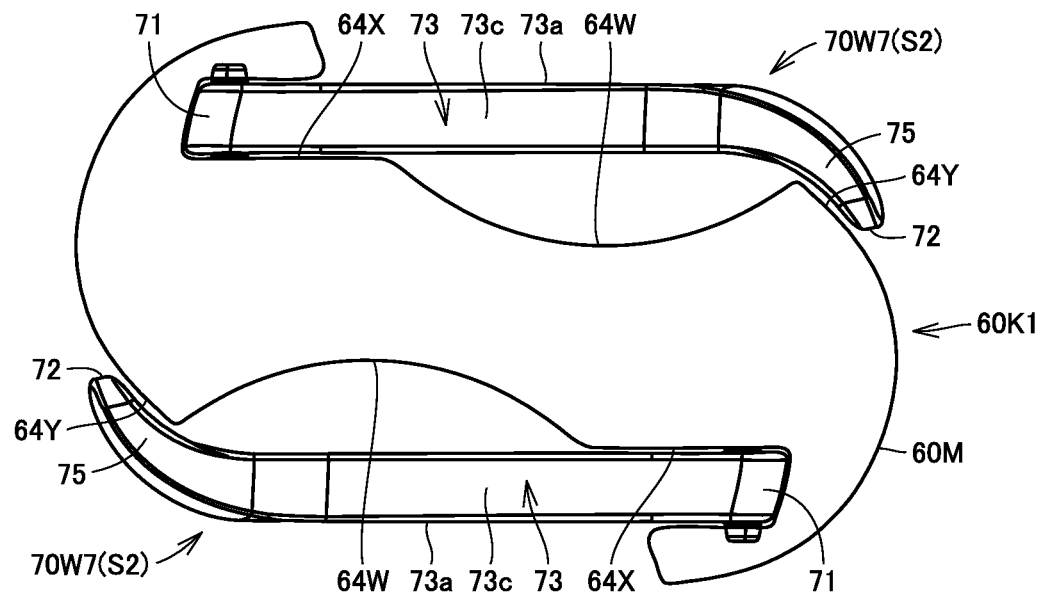
FIG. 114 is a schematic diagram showing a rotor and a stirring member (a movable member) in modification 5 of Embodiment 15.
Figure 115:
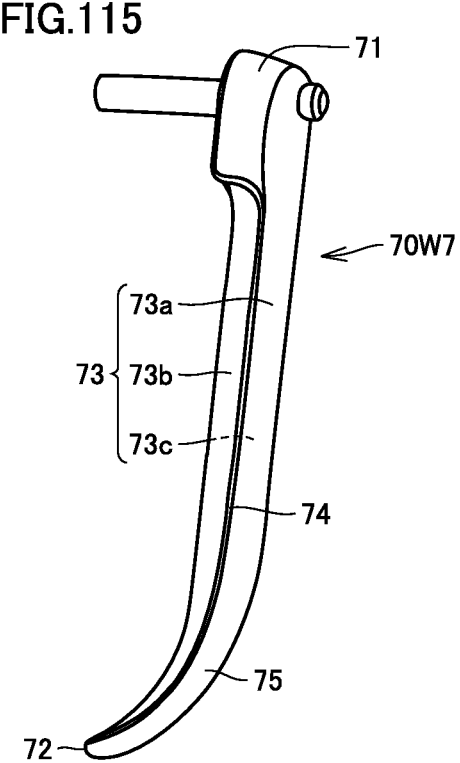
FIG. 115 is a schematic diagram showing the stirring member (movable member) in modification 5 of Embodiment 15.

Referring to FIGS. 114 and 115, a stirring member 70W7 is included in a rotor 60K1. When stirring member 70W7 forms turned-down state S2, stirring member 70W7 is arranged in accommodation portions 64X, 64W, and 64Y provided in a main body 60M. Rotor 60K1 and stirring member 70W7 are arranged substantially at the same height position, and a part of stirring member 70W7 protrudes below from rotor 60K1 (on the side of inner pot 20).

According to the construction as well, rice gruel exhibits a complicated behavior owing to external force provided from stirring member 70W7. Contact between rice gruel and rice gruel can break rice gruel. Broken rice gruel is returned into rice and water. Since stirring member 70W7 can suppress leakage of a savory component to the outside and a temperature of rice can be kept high, pregelatinization of rice can reliably be promoted and tasty cooked rice can be obtained.

(Modification 6)

Figure 116:
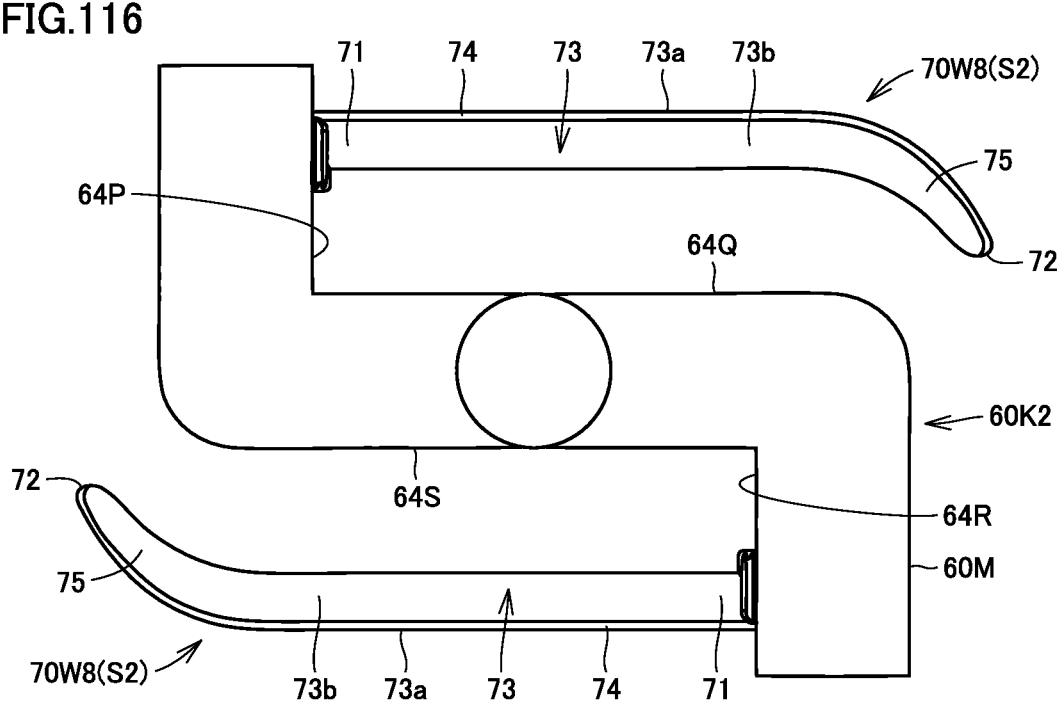
FIG. 116 is a schematic diagram showing a rotor and a stirring member (a movable member) in modification 6 of Embodiment 15.
Figure 117:
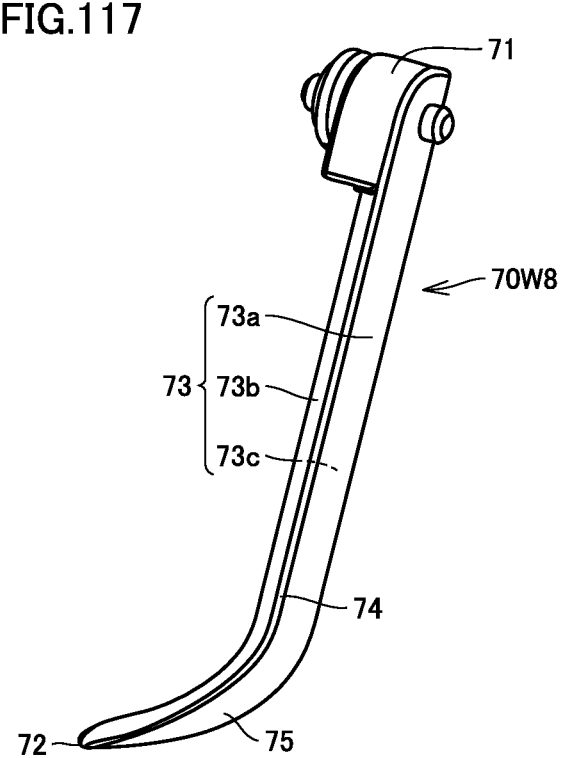
FIG. 117 is a schematic diagram showing the stirring member (movable member) in modification 6 of Embodiment 15.

Referring to FIGS. 116 and 117, a stirring member 70W8 is included in a rotor 60K2. When stirring member 70W8 forms turned-down state S2, stirring member 70W8 is arranged in accommodation portions 64P, 64Q, 64R, and 64S provided in main body 60M. Rotor 60K2 and stirring member 70W8 are arranged substantially at the same height position, and a part of stirring member 70W8 protrudes below from rotor 60K2 (on the side of inner pot 20).

According to the construction as well, rice gruel exhibits a complicated behavior owing to external force provided from stirring member 70W8. Contact between rice gruel and rice gruel can break rice gruel. Broken rice gruel is returned into rice and water. Since stirring member 70W8 can suppress leakage of a savory component to the outside and a temperature of rice can be kept high, pregelatinization of rice can reliably be promoted and tasty cooked rice can be obtained.

(Modification 7)

Figure 118:
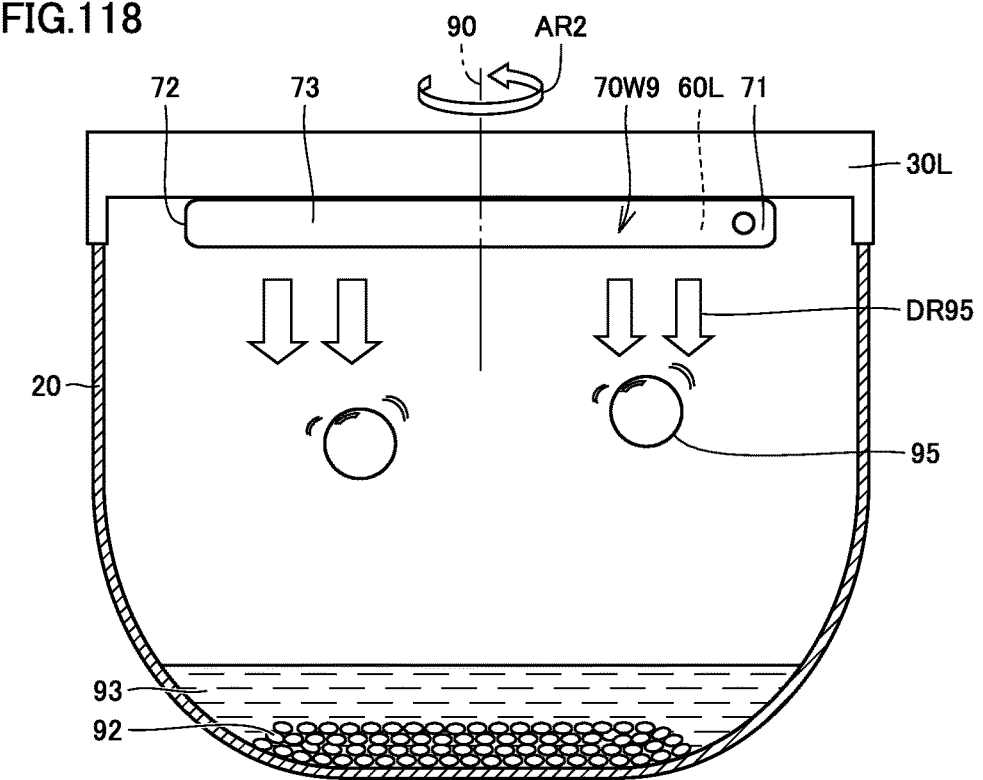
FIG. 118 is a schematic diagram showing a rotor and a stirring member (a movable member) in modification 7 of Embodiment 15.

Referring to FIG. 118, a rotor 60L having a stirring member 70W9 is attached to a lid body 30L. As stirring member 70W9 is driven, it generates an air current toward inner pot 20 (see an arrow DR95). Stirring member 70W9 can provide external force to rice gruel 95 in a non-contact manner.

Figure 119:
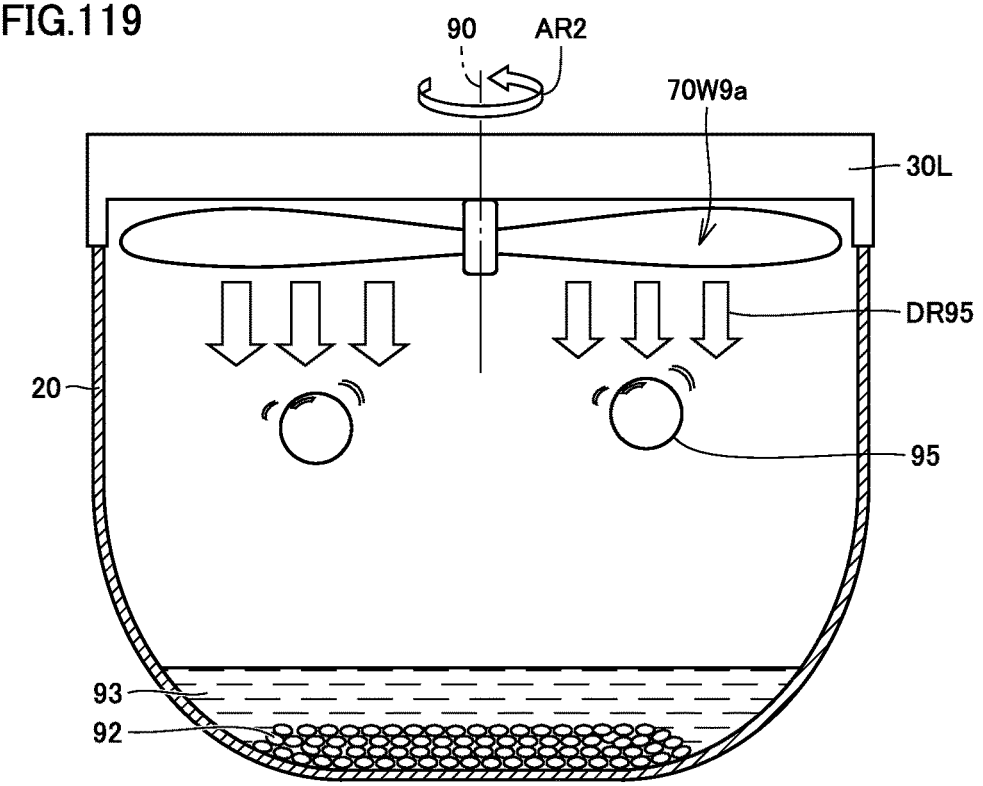
FIG. 119 is a schematic diagram showing another construction of the rotor and a stirring member (movable member) in modification 7 of Embodiment 15.

As in a stirring member 70W9a shown in FIG. 119, a stirring member having a propeller shape (a fan shape) may be employed. Stirring member 70W9a can provide stronger external force to rice gruel 95 in a non-contact manner. According to the construction as well, rice gruel 95 exhibits a complicated behavior owing to external force provided from stirring member 70W9 or 70W9a. Contact between rice gruel 95 and rice gruel 95 can break rice gruel 95. Broken rice gruel 95 is returned into rice 92 and water 93. Since stirring member 70W9 or 70W9a can suppress leakage of a savory component to the outside and a temperature of rice can be kept high, pregelatinization of rice can reliably be promoted and tasty cooked rice can be obtained.

(Modification 8)

Figure 120:
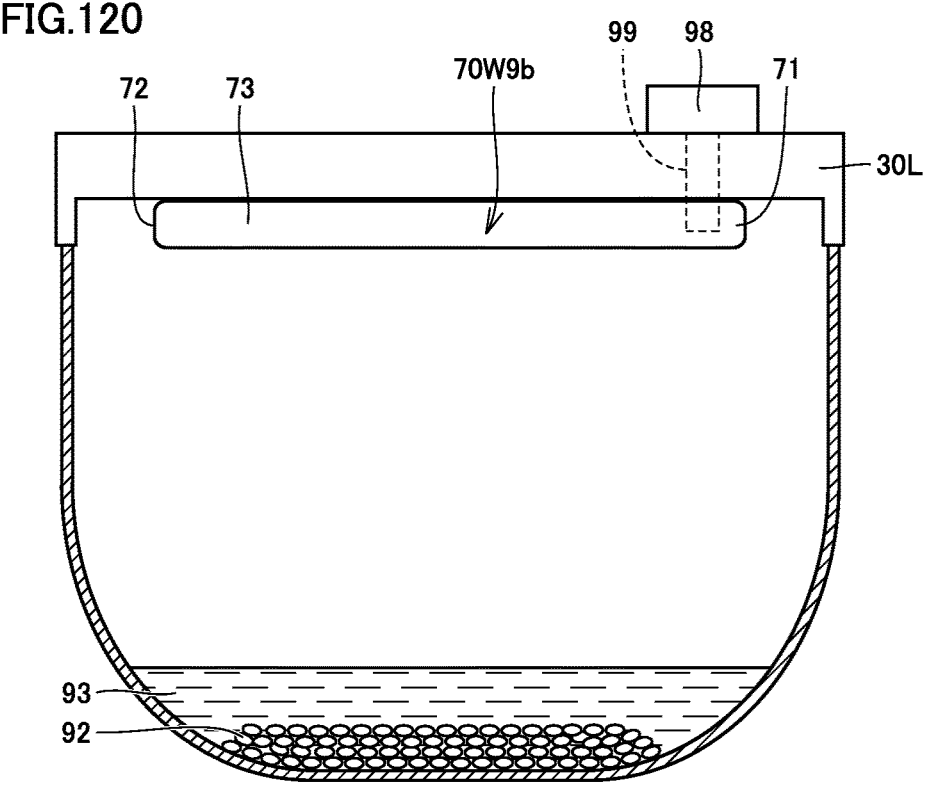
Figure 121:
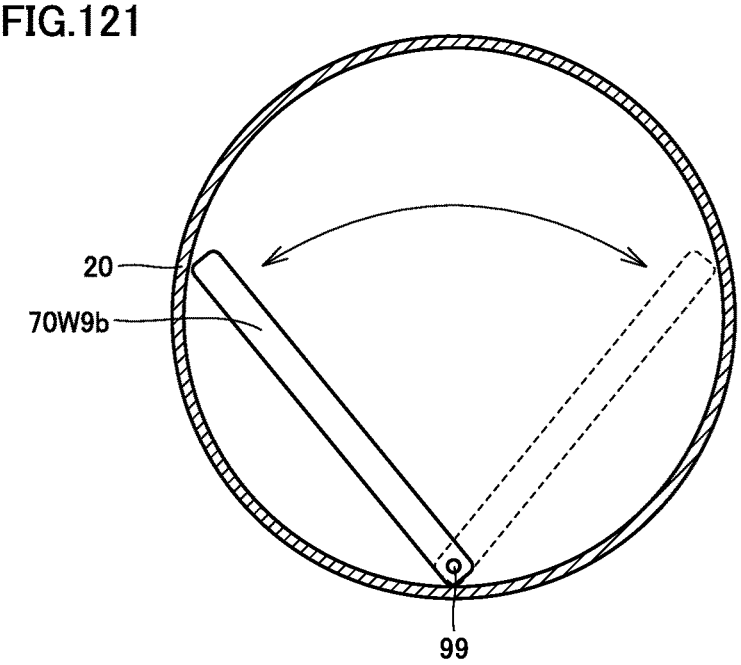

Referring to FIGS. 120 and 121, a stirring member 70W9b is provided in a lid body 30L in the present modification. Stirring member 70W9b has first end portion 71 pivotally supported by a swing shaft 99 in a swingable manner. Stirring member 70W9b swings around swing shaft 99 in a substantially horizontal surface (see an arrow in FIG. 121) as swing shaft 99 is driven by a driving apparatus 98. An angle at which stirring member 70W9b is attached is not limited to a case that the stirring member is in parallel to the horizontal surface, but the stirring member may be inclined with respect to the horizontal surface.

According to the construction as well, rice gruel exhibits a complicated behavior owing to external force provided from stirring member 70W9b. Contact between rice gruel and rice gruel can break rice gruel. Broken rice gruel is returned into rice and water. Since stirring member 70W9b can suppress leakage of a savory component to the outside and a temperature of rice can be kept high, pregelatinization of rice can reliably be promoted and tasty cooked rice can be obtained.

Figure 122:
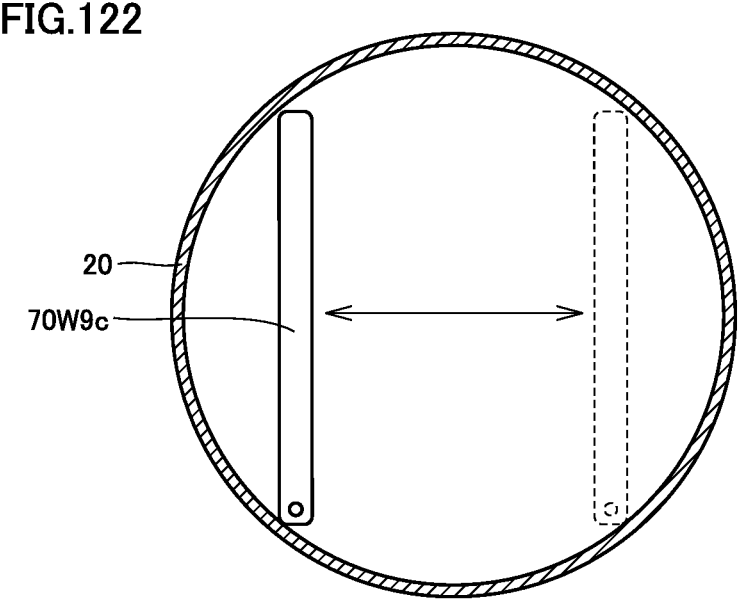

Referring to FIG. 122, a stirring member 70W9c as another construction of stirring member 70W9b (see FIGS. 120 and 121) is driven to swing such that a parallel state is maintained before and after swing. According to the construction as well, rice gruel exhibits a complicated behavior owing to external force provided from stirring member 70W9c as in the case of stirring member 70W9b (see FIGS. 120 and 121). Contact between rice gruel and rice gruel can break rice gruel. Broken rice gruel is returned into rice and water. Since stirring member 70W9c can suppress leakage of a savory component to the outside and a temperature of rice can be kept high, pregelatinization of rice can reliably be promoted and tasty cooked rice can be obtained.

(Modification 9)

Figure 123:
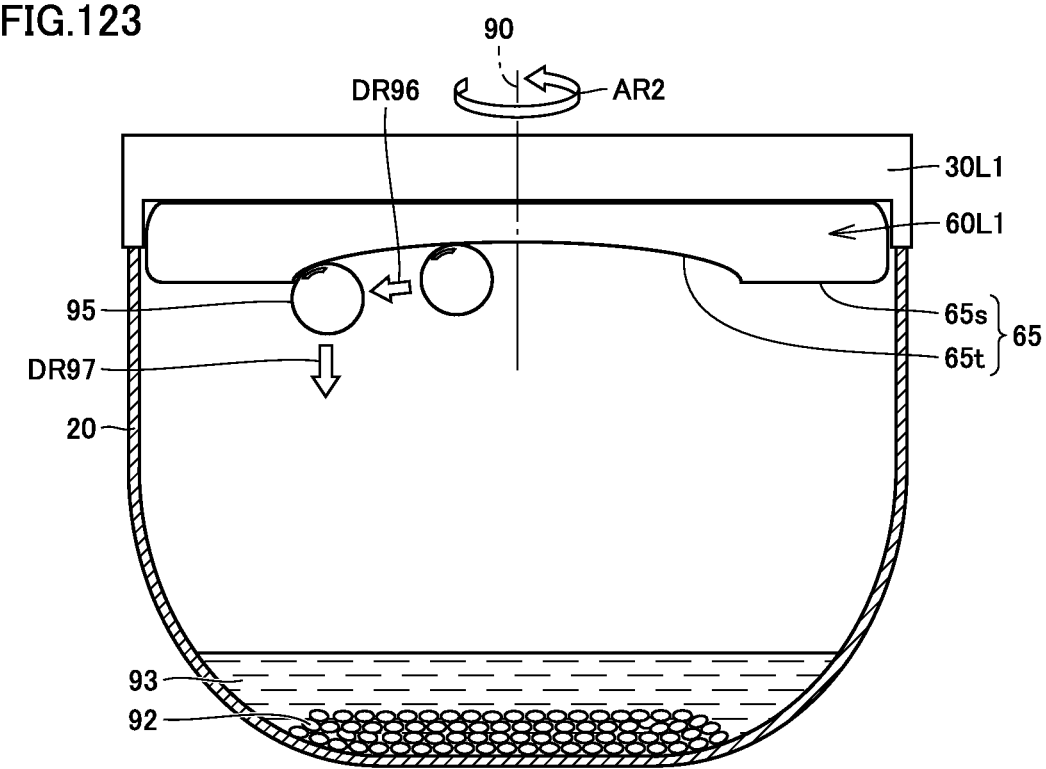

Referring to FIG. 123, a rotor 60L1 having a not-shown stirring member is attached to a lid body 30L1. Front surface 65 of rotor 60L1 opposed to inner pot 20 is provided with a recess 65t as recessed from a flat portion 65s. A surface shape of recess 65t is formed such that a radially outer portion is located closer to the bottom portion of inner pot 20 than a radially inner portion.

Rice gruel 95 in contact with recess 65t is flown radially outward (see an arrow DR96) owing to rotational force of rotor 60L1. Rice gruel 95 collides with a projecting portion between flat portion 65s and recess 65t and is broken. Broken rice gruel 95 is returned into rice 92 and water 93 (see an arrow DR97). Since lid body 30L1 and rotor 60L1 can also suppress leakage of a savory component to the outside and a temperature of rice can be kept high, pregelatinization of rice can reliably be promoted and tasty cooked rice can be obtained.

(Modification 10)

Figure 124:
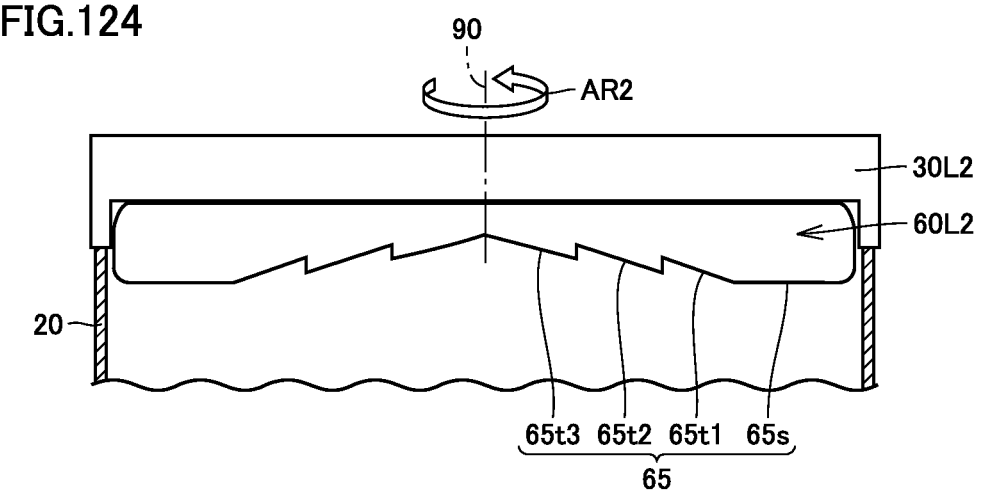

Referring to FIG. 124, a rotor 60L2 having a not-shown stirring member is attached to a lid body 30L2. Front surface 65 of rotor 60L2 opposed to inner pot 20 is provided with recesses 65t1, 65t2, and 65t3 as recessed from flat portion 65s. Recesses 65t1, 65t2, and 65t3 have such a shape like steps that a distance from inner pot 20 is smaller radially outward. Since lid body 30L2 and rotor 60L2 can also suppress leakage of a savory component to the outside and a temperature of rice can be kept high, pregelatinization of rice can reliably be promoted and tasty cooked rice can be obtained.

(Modification 11)

Figure 125:
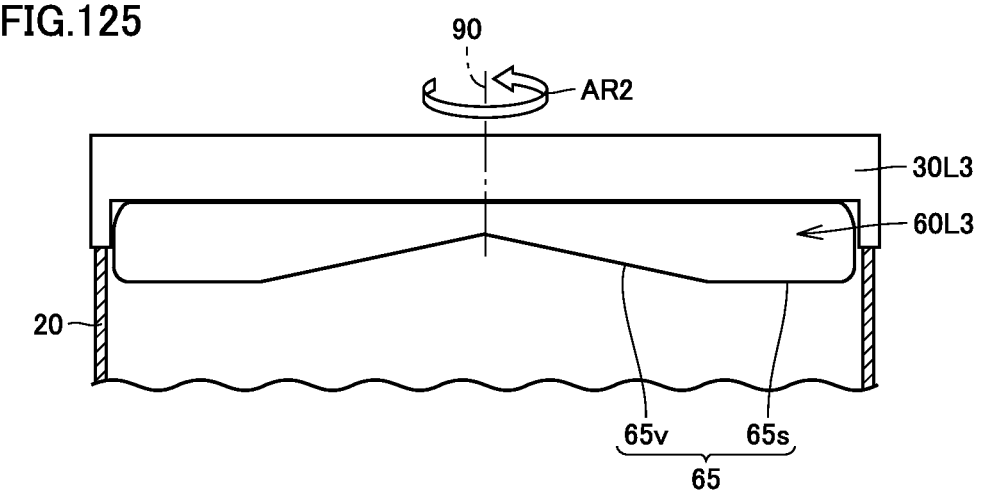

Referring to FIG. 125, a rotor 60L3 having a not-shown stirring member is attached to a lid body 30L3. Front surface 65 of rotor 60L3 opposed to inner pot 20 is provided with a recess 65v as recessed in a conical shape from flat portion 65s. Since lid body 30L3 and rotor 60L3 can also suppress leakage of a savory component to the outside and a temperature of rice can be kept high, pregelatinization of rice can reliably be promoted and tasty cooked rice can be obtained.

(Modification 12)

Figure 126:
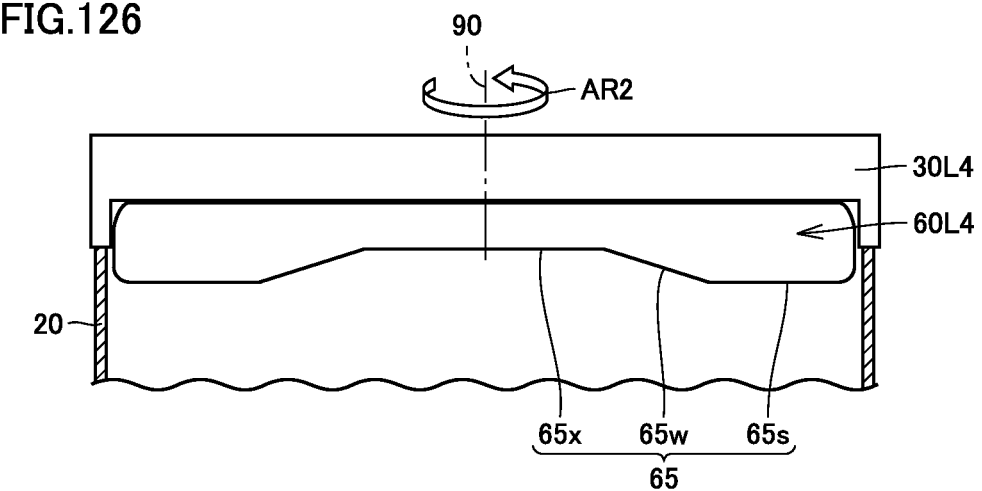
Figure 127:
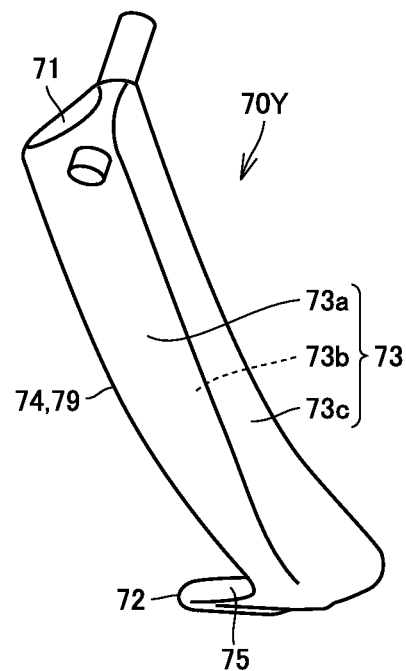
Figure 128:
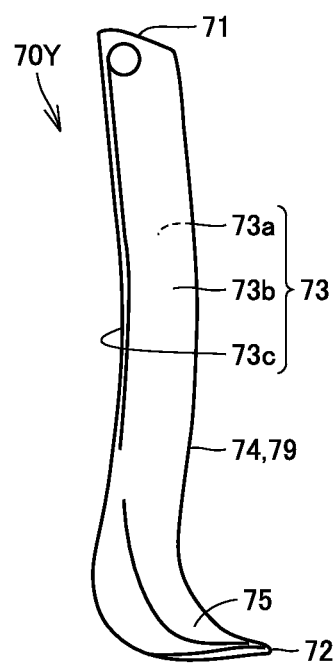
Figure 129:
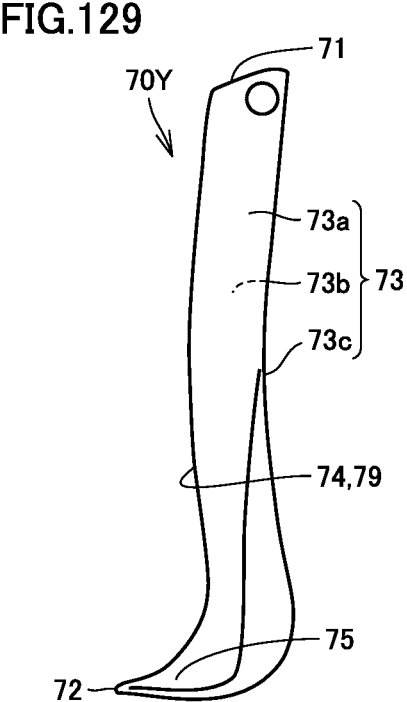
Figure 130:
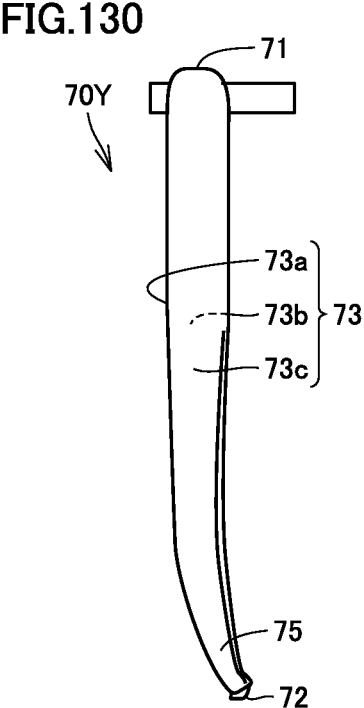
Figure 131:
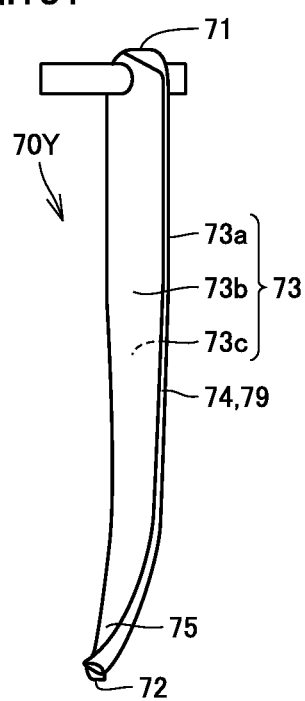

Referring to FIG. 126, a rotor 60L4 having a not-shown stirring member is attached to a lid body 30L4. Front surface 65 of rotor 60L4 opposed to inner pot 20 is provided with recesses 65w and 65x as recessed in a shape of a frustum from flat portion 65s. Since lid body 30L4 and rotor 60L4 can also suppress leakage of a savory component to the outside and a temperature of rice can be kept high, pregelatinization of rice can reliably be promoted and tasty cooked rice can be obtained.

(Modification 13)

A stirring member 70Y in the present modification will be described with reference to FIGS. 127 to 131. Stirring member 70Y has stirring front edge portion 74 (pivot front edge portion 79) and extension portion 75. Stirring member 70Y has the construction in each embodiment described above, and it can form a flow as reaching the entire stirred object accommodated in the inner pot (a stirred object present around the center of inner pot 20 and a stirred object present around the bottom of inner pot 20 as compared with stirring member 70F) and can more uniformly stir the entire stirred object with high efficiency in stirring.

Stirring member 70Y can effectively suppress occurrence of disturbance of a flow resulting from a pressure difference in the vicinity of second end portion 72. Collision between rice 92, which may lead to a crack in rice 92 or separation of a nutrient from a surface of rice 92, can also effectively be suppressed. According to stirring member 70Y, rice gruel can also be broken with both of contact means and non-contact means.

[Generalization 1]

Each embodiment and each example described above can be generalized as follows.

(Additional Statement 1)

A stirring member rotating around an axis of rotation in a first direction of rotation together with a rotor and stirring a stirred object accommodated in an inner pot, including:

a first end portion pivotably supported by the rotor;

a second end portion located opposite to the first end portion; and a stirring portion located between the first end portion and the second end portion, the stirring portion forming a standing state in which the second end portion is arranged at a position distant from the rotor and a turned-down state in which the second end portion is arranged at a position in proximity to the rotor as the stirring portion pivots around the first end portion, and the stirring portion having a resistance surface formed to receive resistance in the first direction of rotation from the stirred object when the stirring portion forms the standing state and the rotor rotates in a second direction of rotation opposite to the first direction of rotation.

(Additional Statement 2)

The stirring member according to additional statement 1, wherein a cross-sectional shape of the stirring portion in a cross-section including the axis of rotation while the stirring portion forms the standing state has an area smaller on a side closer to the second end portion than on a side farther from the second end portion.

(Additional Statement 3)

The stirring member according to additional statement 1 or 2, wherein the stirring portion has a pivot front edge portion located foremost in a direction of pivot in which pivot from the standing state to the turned-down state is made, and a cross-sectional shape of the stirring portion in a cross-section orthogonal to the axis of rotation while the stirring portion forms the standing state is formed to decrease in width toward the pivot front edge portion.

(Additional Statement 4)

The stirring member according to additional statement 3, wherein in the cross-sectional shape of the stirring portion in the cross-section orthogonal to the axis of rotation while the stirring portion forms the standing state, an interior angle formed in the pivot front edge portion is at an acute angle.

(Additional Statement 5)

The stirring member according to any of additional statements 1 to 4, wherein while the stirring portion forms the standing state, the resistance surface has a tip end portion located foremost in the second direction of rotation, an upper surface extending vertically upward from the tip end portion, and a lower surface extending vertically downward from the tip end portion, and an area of a projected shape obtained when the lower surface is projected forward in the second direction of rotation is larger than an area of a projected shape obtained when the upper surface is projected forward in the second direction of rotation.

(Additional Statement 6)

The stirring member according to any of additional statements 1 to 4, wherein while the stirring portion forms the standing state, a portion of the resistance surface closer to the first end portion is located forward in the second direction of rotation relative to a portion of the resistance surface closer to the second end portion.

(Additional Statement 7)

The stirring member according to any of additional statements 1 to 4, wherein while the stirring portion forms the standing state, a cross-sectional shape of a cross-section along the second direction of rotation of a portion of the stirring portion including the resistance surface has a tip end portion located foremost in the second direction of rotation, and a rear end portion located rearmost in the second direction of rotation, and a straight line connecting the tip end portion and the rear end portion to each other is directed vertically upward with respect to the second direction of rotation on the forward side in the second direction of rotation.

(Additional Statement 8)

The stirring member according to any of additional statements 1 to 4, wherein while the stirring portion forms the standing state, a cross-sectional shape of a cross-section along the second direction of rotation of a portion of the stirring portion including the resistance surface has a tip end portion located foremost in the second direction of rotation, and a rear end portion located rearmost in the second direction of rotation, and a line connecting the tip end portion and the rear end portion to each other is convexly warped in a vertically upward direction.

(Additional Statement 9)

The stirring member according to additional statement 3, wherein the pivot front edge portion in a direction orthogonal to
the direction of pivot while the stirring portion forms
the standing state has a width not larger than 3 mm.

(Additional Statement 10)

The stirring member according to additional statement 3 or 4, wherein the pivot front edge portion is curved inward in a direction of radius of rotation, toward the second end portion.

(Additional Statement 11)

The stirring member according to additional statement 3 or 4, wherein the pivot front edge portion extends forward in the direction of pivot, toward the second end portion.

(Additional Statement 12)

The stirring member according to additional statement 3 or 4, wherein the pivot front edge portion is formed as being displaced from the direction of pivot such that a direction of extension of the pivot front edge portion in a cross-section orthogonal to the axis of rotation does not coincide with the direction of pivot during pivot.

(Additional Statement 13)

The stirring member according to additional statement 12, wherein the pivot front edge portion is formed such that the direction of extension of the pivot front edge portion comes closer to the axis of rotation, toward front in the second direction of rotation.

(Additional Statement 14)

The stirring member according to additional statement 12, wherein the pivot front edge portion is formed such that the direction of extension of the pivot front edge portion is distant from the axis of rotation, toward front in the second direction of rotation.

(Additional Statement 15)

The stirring member according to any of additional statements 1 to 14, wherein the stirring portion has a volume smaller on a side closer to the second end portion than on a side farther from the second end portion.

(Additional Statement 16)

The stirring member according to any of additional statements 1 to 8, wherein the resistance surface is formed in a portion of the stirring portion closer to the second end portion.

(Additional Statement 17)

The stirring member according to any of additional statements 1 to 8, wherein the resistance surface is formed over the stirring portion from a portion of the stirring portion closer to the first end portion to a portion closer to the second end portion.

(Additional Statement 18)

The stirring member according to any of additional statements 1 to 17, wherein the stirring portion comes closer to the axis of rotation, from the first end portion toward the second end portion, and an angle formed between the stirring portion and a horizontal surface is not smaller than 80° and not larger than 85°.

(Additional Statement 19)

The stirring member according to any of additional statements 1 to 18, wherein the stirring portion has a rear edge portion located rearmost in the first direction of rotation, and a portion of the rear edge portion closer to the second end portion is located on a rear side of the first direction of rotation relative to a portion of the rear edge portion closer to the first end portion.

(Additional Statement 20)

The stirring member according to any of additional statements 1 to 18, wherein a portion of the stirring portion closer to the second end portion has an extension portion formed, which extends inward in the direction of radius of rotation, toward the second end portion, and the extension portion extends forward in the second direction of rotation, toward the second end portion.

(Additional Statement 21)

A rotor, including one stirring member or a plurality of stirring members according to any of additional statements 1 to 20.

(Additional Statement 22)

A rice cooker, including one stirring member or a plurality of stirring members according to any of additional statements 1 to 20.

(Additional Statement 23)

A movable member rotating around an axis of rotation together with a rotor, including:

a first end portion pivotably supported by the rotor;

a second end portion located opposite to the first end portion; and a movable portion located between the first end portion and the second end portion and having a resistance surface, the movable portion forming a standing state in which the second end portion is arranged at a position distant from the rotor and a turned-down state in which the second end portion is arranged at a position in proximity to the rotor as the movable portion pivots around the first end portion, the resistance surface being arranged in a content including a liquid and/or a solid while the movable portion forms the standing state, and the movable portion pivoting owing to resistance received from the content by the resistance surface and making transition from the standing state to the turned-down state when the rotor rotates while the movable portion forms the standing state.

(Summary of Generalization 1)

In order to address a problem to be solved, that is, "to provide a movable member and a stirring member capable of smoothly moving away from a content such as a stirred object in making transition from a standing state to a turned-down state as they pivot around a pivotably supported portion, a rotor including the stirring member, and a rice cooker including the stirring member," according to generalization 1, a movable member and a stirring member capable of smoothly moving away from a content such as a stirred object in making transition from a standing state to a turned-down state as they pivot around a pivotably supported portion, a rotor including the stirring member, and a rice cooker including the stirring member can be obtained.

[Generalization 2]

Each embodiment and each example described above can also be generalized as follows.

(Additional Statement 1)

A stirring member rotating around an axis of rotation in a prescribed direction of rotation together with a rotor and stirring a stirred object accommodated in an inner pot, including:

a first end portion pivotably supported by the rotor;

a second end portion located opposite to the first end portion; and a stirring portion located between the first end portion and the second end portion, the stirring portion having a rear edge portion located rearmost in the direction of rotation, and a portion of the rear edge portion closer to the second end portion being located on a rear side of the direction of rotation relative to a portion of the rear edge portion closer to the first end portion.

(Additional Statement 2)

The stirring member according to additional statement 1, wherein the stirring portion has a stirring front edge portion located foremost in the direction of rotation, and in a cross-sectional shape of a portion of the stirring portion closer to the second end portion in a cross-section orthogonal to the axis of rotation, an interior angle formed in the stirring front edge portion is at an acute angle.

(Additional Statement 3)

The stirring member according to additional statement 1 or 2, wherein a portion of the stirring portion closer to the second end portion has an extension portion formed, which extends inward in a direction of radius of rotation, toward the second end portion.

(Additional Statement 4)

The stirring member according to additional statement 3, wherein when a direction of extension of the extension portion is viewed in a direction in parallel to the axis of rotation, a reference line connecting a center of rotation of the extension portion and a base end of the extension portion in the direction of extension to each other is formed and an angle formed between the direction of extension and the reference line is not smaller than 5° and not larger than 50°.

(Additional Statement 5)

The stirring member according to any of additional statements 1 to 4, wherein a cross-sectional shape of the stirring portion in a cross-section orthogonal to the axis of rotation has a front end portion located foremost in the direction of rotation, and when a virtual circle centered at the axis of rotation and passing through the front end portion is drawn, a tangential straight line in the front end portion of a centerline of the cross-sectional shape is directed inward in a direction of radius of rotation on a forward side of the direction of rotation with respect to a tangent in the front end portion of the virtual circle.

(Additional Statement 6)

The stirring member according to additional statement 5, wherein the tangential straight line is directed inward in the direction of radius of rotation within a range not smaller than 5° and not larger than 50° on the forward side of the direction of rotation with respect to the tangent.

(Additional Statement 7)

The stirring member according to additional statement 5 or 6, wherein the cross-sectional shape of the stirring portion is formed to decrease in width in the direction of radius of rotation from a portion at some midpoint in the direction of rotation toward an opposite side of the direction of rotation.

(Additional Statement 8)

The stirring member according to additional statement 3 or 4, wherein the extension portion is formed as being curved toward the second end portion.

(Additional Statement 9)

The stirring member according to any of additional statements 1 to 8, wherein a portion of the stirring portion closer to the second end portion is formed as being tapered to decrease in thickness toward the second end portion.

(Additional Statement 10)

The stirring member according to any of additional statements 1 to 9, wherein the stirring portion comes closer to the axis of rotation, from the first end portion toward the second end portion, and an angle formed between the stirring portion and a horizontal surface is not larger than 90°.

(Additional Statement 11)

The stirring member according to any of additional statements 1 to 10, wherein the stirring portion forms a standing state in which the second end portion is arranged at a position distant from the rotor and a turned-down state in which the second end portion is arranged at a position in proximity to the rotor as the stirring portion pivots around the first end portion, the stirring portion has a pivot front edge portion located foremost in a direction of pivot in which pivot from the standing state to the turned-down state is made, and a cross-sectional shape of the stirring portion in a cross-section orthogonal to the axis of rotation while the stirring portion forms the standing state is formed to decrease in width toward the pivot front edge portion.

(Additional Statement 12)

The stirring member according to additional statement 11, wherein in the cross-sectional shape of the stirring portion in the cross-section orthogonal to the axis of rotation when the stirring portion forms the standing state, an interior angle formed in the pivot front edge portion is at an acute angle.

(Additional Statement 13)

The stirring member according to additional statement 11, wherein the pivot front edge portion in a direction orthogonal to the direction of pivot while the stirring portion forms the standing state has a width not larger than 3 mm.

(Additional Statement 14)

The stirring member according to any of additional statements 11 to 13, wherein the pivot front edge portion is curved inward in a direction of radius of rotation, toward the second end portion.

(Additional Statement 15)

The stirring member according to any of additional statements 11 to 14, wherein the pivot front edge portion extends forward in the direction of pivot, toward the second end portion.

(Additional Statement 16)

The stirring member according to any of additional statements 11 to 15, wherein the pivot front edge portion is formed as being displaced from the direction of pivot such that a direction of extension of the pivot front edge portion in a cross-section orthogonal to the axis of rotation does not coincide with the direction of pivot during pivot.

(Additional Statement 17)

The stirring member according to additional statement 16, wherein the pivot front edge portion is formed such that the direction of extension of the pivot front edge portion comes closer to the axis of rotation, toward a direction opposite to the direction of rotation.

(Additional Statement 18)

The stirring member according to additional statement 16, wherein the pivot front edge portion is formed such that the direction of extension of the pivot front edge portion is distant from the axis of rotation, toward a direction opposite to the direction of rotation.

(Additional Statement 19)

The stirring member according to any of additional statements 1 to 18, wherein the stirring portion has a volume smaller on a side closer to the second end portion than on a side farther from the second end portion.

(Additional Statement 20)

The stirring member according to any of additional statements 1 to 19, wherein a surface of the stirring portion has asperities formed.

(Additional Statement 21)

A rotor, including one stirring member or a plurality of stirring members according to any of additional statements 1 to 20.

(Additional Statement 22)

The rotor according to additional statement 21, wherein the stirring portion has an outer geometry substantially in a shape of a scoop, and the stirring member is constructed to be attachable to and removable from the rotor.

(Additional Statement 23)

A rice cooker, including one stirring member or a plurality of stirring members according to any of additional statements 1 to 20.

(Summary of Generalization 2)

In order to address a problem to be solved, that is, "to provide a stirring member rotating around an axis of rotation in a prescribed direction of rotation together with a rotor and stirring a stirred object accommodated in an inner pot, which allows the stirred object to smoothly flow along a surface of the stirring member, a rotor including the stirring member, and a rice cooker including the stirring member," according to generalization 2, a stirring member rotating around an axis of rotation in a prescribed direction of rotation together with a rotor and stirring a stirred object accommodated in an inner pot, which allows the stirred object to smoothly flow along a surface of the stirring member, a rotor including the stirring member, and a rice cooker including the stirring member can be obtained.

[Generalization 3]

Each embodiment and each example described above can also be generalized as follows.

(Additional Statement 1)

A stirring member rotating around an axis of rotation in a first direction of rotation together with a rotor and stirring a stirred object accommodated in an inner pot, including:

a first end portion pivotably supported by the rotor;

a second end portion located opposite to the first end portion; and a stirring portion located between the first end portion and the second end portion, the stirring portion forming a standing state in which the second end portion is arranged at a position distant from the rotor and a turned-down state in which the second end portion is arranged at a position in proximity to the rotor as the stirring portion pivots around the first end portion, the stirring portion having a pivot front edge portion located foremost in a direction of pivot in which pivot from the standing state to the turned-down state is made, and a cross-sectional shape of the stirring portion in a cross-section orthogonal to the axis of rotation while the stirring portion forms the standing state being formed to decrease in width toward the pivot front edge portion.

(Additional Statement 2)

The stirring member according to additional statement 1, wherein in the cross-sectional shape of the stirring portion in the cross-section orthogonal to the axis of rotation while the stirring portion forms the standing state, an interior angle formed in the pivot front edge portion is at an acute angle.

(Additional Statement 3)

The stirring member according to additional statement 1, wherein the pivot front edge portion in a direction orthogonal to the direction of pivot while the stirring portion forms the standing state has a width not larger than 3 mm.

(Additional Statement 4)

The stirring member according to any of additional statements 1 to 3, wherein the pivot front edge portion is curved inward in a direction of radius of rotation, toward the second end portion.

(Additional Statement 5)

The stirring member according to any of additional statements 1 to 4, wherein the pivot front edge portion extends forward in the direction of pivot, toward the second end portion.

(Additional Statement 6)

The stirring member according to any of additional statements 1 to 5, wherein the pivot front edge portion is formed as being displaced from the direction of pivot such that a direction of extension of the pivot front edge portion in a cross-section orthogonal to the axis of rotation does not coincide with the direction of pivot during pivot.

(Additional Statement 7)

The stirring member according to additional statement 6, wherein the pivot front edge portion is formed such that the direction of extension of the pivot front edge portion comes closer to the axis of rotation, toward rear in the first direction of rotation.

(Additional Statement 8)

The stirring member according to additional statement 6, wherein the pivot front edge portion is formed such that the direction of extension of the pivot front edge portion is distant from the axis of rotation toward rear in the first direction of rotation.

(Additional Statement 9)

The stirring member according to any of additional statements 1 to 8, wherein the stirring portion has a volume smaller on a side closer to the second end portion than on a side farther from the second end portion.

(Additional Statement 10)

The stirring member according to any of additional statements 1 to 9, wherein the stirring portion has a resistance surface formed to receive resistance in the first direction of rotation from the stirred object when the stirring portion forms the standing state and the rotor rotates in a second direction of rotation opposite to the first direction of rotation.

(Additional Statement 11)

The stirring member according to additional statement 10, wherein a width of the resistance surface in a direction orthogonal to the direction of pivot is greater on a side closer to the second end portion than on a side farther from the second end portion.

(Additional Statement 12)

The stirring member according to additional statement 10 or 11, wherein a cross-sectional shape of the stirring portion in a cross-section including the axis of rotation while the stirring portion forms the standing state has an area smaller on a side closer to the second end portion than on a side farther from the second end portion.

(Additional Statement 13)

The stirring member according to any of additional statements 10 to 12, wherein while the stirring portion forms the standing state, the resistance surface has a tip end portion located foremost in the second direction of rotation, an upper surface extending vertically upward from the tip end portion, and a lower surface extending vertically downward from the tip end portion, and an area of a projected shape obtained when the lower surface is projected forward in the second direction of rotation is larger than an area of a projected shape obtained when the upper surface is projected forward in the second direction of rotation.

(Additional Statement 14)

The stirring member according to any of additional statements 10 to 12, wherein a portion of the resistance surface closer to the first end portion while the stirring portion forms the standing state is located forward in the second direction of rotation relative to a portion of the resistance surface closer to the second end portion.

(Additional Statement 15)

The stirring member according to any of additional statements 10 to 12, wherein a cross-sectional shape of a cross-section along the second direction of rotation of a portion of the stirring portion including the resistance surface while the stirring portion forms the standing state has a tip end portion located foremost in the second direction of rotation, and a rear end portion located rearmost in the second direction of rotation, and a straight line connecting the tip end portion and the rear end portion to each other is directed vertically upward with respect to the second direction of rotation on the forward side of the second direction of rotation.

(Additional Statement 16)

The stirring member according to any of additional statements 10 to 12, wherein a cross-sectional shape of a cross-section along the second direction of rotation of a portion of the stirring portion including the resistance surface while the stirring portion forms the standing state has a tip end portion located foremost in the second direction of rotation, and a rear end portion located rearmost in the second direction of rotation, and a line connecting the tip end portion and the rear end portion to each other is convexly warped in a vertically upward direction.

(Additional Statement 17)

The stirring member according to any of additional statements 10 to 16, wherein the resistance surface is formed in a portion of the stirring portion closer to the second end portion.

(Additional Statement 18)

The stirring member according to any of additional statements 10 to 16, wherein the resistance surface is formed over the stirring portion from a portion of the stirring portion closer to the first end portion to a portion closer to the second end portion.

(Additional Statement 19)

The stirring member according to any of additional statements 1 to 18, wherein the stirring portion comes closer to the axis of rotation, from the first end portion toward the second end portion, and an angle formed between the stirring portion and a horizontal surface is not smaller than 80° and not larger than 85°.

(Additional Statement 20)

The stirring member according to any of additional statements 1 to 19, wherein the stirring portion has a rear edge portion located rearmost in the first direction of rotation, and a portion of the rear edge portion closer to the second end portion is located on a rear side of the first direction of rotation relative to a portion of the rear edge portion closer to the first end portion.

(Additional Statement 21)

The stirring member according to any of additional statements 1 to 19, wherein a portion of the stirring portion closer to the second end portion has an extension portion formed, which extends inward in the direction of radius of rotation, toward the second end portion, and the extension portion extends rearward in the first direction of rotation, toward the second end portion.

(Additional Statement 22)

A rotor, including one stirring member or a plurality of stirring members according to any of additional statements 1 to 21.

(Additional Statement 23)

A rice cooker, including one stirring member or a plurality of stirring members according to any of additional statements 1 to 21.

(Summary of Generalization 3)

In order to address a problem to be solved, that is, "to provide a stirring member rotating together with a rotor and stirring a stirred object accommodated in an inner pot, which can suppress scoop of the stirred object when the stirring member pivots around a first end portion pivotally supported by the rotor and makes transition from a standing state to a turned-down state, a rotor including the stirring member, and a rice cooker including the stirring member," according to generalization 3, a stirring member rotating together with a rotor and stirring a stirred object accommodated in an inner pot, which can suppress scoop of the stirred object when the stirring member pivots around a first end portion pivotally supported by the rotor and makes transition from a standing state to a turned-down state, a rotor including the stirring member, and a rice cooker including the stirring member can be obtained.

[Generalization 4]

Each embodiment and each example described above can also be generalized as follows.

(Additional Statement 1)

A lid body, including:

a movable member providing external force to rice gruel in a contact or non-contact manner; and a surface opposed to an inner pot, the movable member being provided in the surface opposed to the inner pot.

(Additional Statement 2)

The lid body according to additional statement 1, wherein the movable member is driven to rotate or swing around an axis of rotation.

(Additional Statement 3)

The lid body according to additional statement 1, wherein the movable member is driven to rotate around the axis of rotation in a prescribed direction of rotation.

(Additional Statement 4)

The lid body according to additional statement 3, wherein the movable member has a first end portion pivotably supported by the surface opposed to the inner pot, a second end portion located opposite to the first end portion, and a movable portion located between the first end portion and the second end portion.

(Additional Statement 5)

The lid body according to additional statement 4, wherein the movable member forms a standing state in which the second end portion is arranged at a position distant from the surface opposed to the inner pot and a turned-down state in which the second end portion is arranged at a position in proximity to the surface opposed to the inner pot as the movable member pivots around the first end portion, and the movable member stirs a stirred object accommodated in the inner pot as the movable member is driven while the movable member forms the standing state.

(Additional Statement 6)

The lid body according to additional statement 5, wherein the movable portion has a rear edge portion located rearmost in the direction of rotation, and a portion of the rear edge portion closer to the second end portion is located on a rear side in the direction of rotation relative to a portion of the rear edge portion closer to the first end portion.

(Additional Statement 7)

The lid body according to additional statement 5 or 6, wherein a cross-sectional shape of the movable portion in a cross-section orthogonal to the axis of rotation has a front end portion located foremost in the direction of rotation, and when a virtual circle centered at the axis of rotation and passing through the front end portion is drawn, a tangential straight line in the front end portion of a centerline of the cross-sectional shape is directed inward in a direction of radius of rotation on a forward side of the direction of rotation with respect to a tangent in the front end portion of the virtual circle.

(Additional Statement 8)

The lid body according to any of additional statements 5 to 7, wherein the movable portion has a pivot front edge portion located foremost in a direction of pivot in which pivot from the standing state to the turned-down state is made, and a cross-sectional shape of the movable portion in a cross-section orthogonal to the axis of rotation while the movable portion forms the standing state is formed to decrease in width toward the pivot front edge portion.

(Additional Statement 9)

The lid body according to any of additional statements 5 to 8, wherein a portion of the movable portion closer to the second end portion has an extension portion formed, which extends inward in a direction of radius of rotation, toward the second end portion.

(Additional Statement 10)

The lid body according to any of additional statements 5 to 9, wherein a portion of the movable portion closer to the second end portion is formed as being tapered to decrease in thickness toward the second end portion.

(Additional Statement 11)

The lid body according to any of additional statements 5 to 10, wherein the movable member is inclined with respect to a horizontal surface while the movable member forms the turned-down state.

(Additional Statement 12)

The lid body according to additional statement 8, wherein in the cross-sectional shape of the movable portion in the cross-section orthogonal to the axis of rotation while the movable portion forms the standing state, an interior angle formed in the pivot front edge portion is at an acute angle.

(Additional Statement 13)

The lid body according to additional statement 8, wherein the pivot front edge portion in a direction orthogonal to the direction of pivot while the movable portion forms the standing state has a width not larger than 3 mm.

(Additional Statement 14)

The lid body according to additional statement 8, wherein the pivot front edge portion is curved inward in a direction of radius of rotation, toward the second end portion.

(Additional Statement 15)

The lid body according to additional statement 8, wherein the pivot front edge portion is formed as being displaced from the direction of pivot such that a direction of extension of the pivot front edge portion in a cross-section orthogonal to the axis of rotation does not coincide with the direction of pivot during pivot.

(Additional Statement 16)

The lid body according to additional statement 5, wherein the movable member protrudes substantially in a triangular shape from the surface opposed to the inner pot while the movable member forms the turned-down state.

(Additional Statement 17)

The lid body according to any of additional statements 1 to 16, wherein the surface opposed to the inner pot is provided with a recess, and a surface shape of the recess is formed such that a radially outer portion is located closer to a bottom portion of the inner pot than a radially inner portion.

(Additional Statement 18)

The lid body according to any of additional statements 1 to 17, including a plurality of movable members.

(Additional Statement 19)

The lid body according to any of additional statements 1 to 18, wherein the movable member produces an air current toward the inner pot as the movable member is driven.

(Additional Statement 20)

The lid body according to additional statement 3, wherein a cross-sectional shape passing through the axis of rotation is asymmetric.

(Additional Statement 21)

The lid body according to additional statement 3, wherein a cross-sectional shape passing through the axis of rotation is symmetric.

(Additional Statement 22)

The lid body according to any of additional statements 1 to 21, including a rotor forming the surface opposed to the inner pot.

(Additional Statement 23)

A rice cooker, including the lid body according to any of additional statements 1 to 22.

(Summary of Generalization 4)

In order to address a problem to be solved, that is, "to provide a lid body capable of allowing preparation of tasty cooked rice by physically breaking bubbles of rice gruel efficiently and suppressing boilover of rice gruel and a rice cooker including the lid body," according to generalization 4, a lid body allowing preparation of tasty cooked rice by physically breaking bubbles of rice gruel efficiently and suppressing boilover of rice gruel and a rice cooker including the lid body can be obtained.

As above, each embodiment and each example based on the present invention have been described, however, each embodiment and each example disclosed herein are illustrative and non-restrictive in every respect. The technical scope of the present invention is shown by the terms of the claims, and intended to include any modifications within the scope and meaning equivalent to the terms of the claims.

REFERENCE SIGNS LIST 10, 60M main body; 11 outer case; 12 inner case; 20 inner pot; 20a flange portion; 30, 30B, 30D, 30E, 30F, 30G, 30H, 30J, 30K, 30L, 30L1, 30L2, 30L3, 30L4 lid body; 31 outer lid; 31a, 62K, 62L, 63K, 63L, 65t, 65t1, 65t2, 65t3, 65v, 65w, 65x recess; 32 inner lid; 32a outer circumferential edge portion; 32b insertion hole; 35 pivot mechanism; 40 heating portion; 42 temperature sensor; 44 control unit; 50, 60, 60A, 60B, 60C, 60D, 60E, 60F, 60G, 60H, 60J, 60K, 60K1, 60K2, 60L, 60L1, 60L2, 60L3, 60L4 rotor; 51, 52 frame body; 52a, 64, 64M, 64N accommodation portion; 52b standing stopper; 53, 54 transmission mechanism; 53a, 54a, 62Q, 63Q transmission shaft; 53b, 53c, 53d, 54b, 62P, 62R, 62S, 63P, 63R, 63S, 68 miter gear; 54c driven-side coupling; 55, 62T, 63T pivot shaft; 59S, 69S surface; 61, 62, 63 miter gear mounting portion; 61H, 62H1, 62H1, 62H2, 63H1, 63H2, 65b, 65e water drainage hole; 62A, 63A cover member; 62B, 63B gear cover; 62C, 63C stopper; 62D, 63D, 77M, 77N magnet; 65 front surface; 65a, 65b inclined surface; 65c step portion; 65s flat portion; 66 bearing portion; 70, 70A, 70B, 70C, 70D, 70E, 70F, 70G, 70H, 70J, 70K, 70L1, 70L2, 70L3, 70L3, 70M, 70N, 70P, 70Q, 70R, 70S, 70T1, 70T2, 70T3, 70T4, 70T5, 70T6, 70T7, 70T8, 70U, 70U1, 70U2, 70U3, 70U4, 70U5, 70U6, 70U7, 70U8, 70V1, 70V2, 70W1, 70W2, 70W3, 70W4, 70W5, 70W6, 70W7, 70W8, 70W9, 70W9a, 70W9b, 70W9c, 70Y, 70Z1, 70Z2, 70Z3, 70Z4, 70Z6, 70Z7 stirring member (movable member); 71 first end portion; 71a notch; 72 second end portion; 73 stirring portion (movable portion); 73G projection; 73W1, 73W2 protrusion; 73a outer surface; 73b inner surface; 73c rear end surface; 73d centerline; 73e tangential straight line; 73r curved surface portion; 74, 79 front edge portion; 74a front end portion; 74b virtual circle; 74c tangent; 74D rear edge portion; 74Dm, 74Dn, 74m, 74n, 78M, 78N, S73 portion; 75 extension portion; 75T base end; 78 resistance surface; 78F tip end portion; 78R rear end portion; 78W upper surface; 78Y lower surface; 80, 80A driving mechanism; 81 motor; 81a, 90 rotation shaft, axis of rotation; 82 small pulley; 83 belt; 84 large pulley; 85 drive-side coupling; 86 input shaft; 91 horizontal surface; 92 rice; 93 water; 100, 200 rice cooker; A1, A2, A3, A10, A11, A70 angle; A79 interior angle; C70 straight line; C71, SL1, SL2, SL3 line; L10 reference line; R10, R11, R12, R30, R31, R32, R78, RE10, RE20 region; R90 radius; S1 standing state; S2 turned-down state; S70, S79 cross-sectional shape; S71, S72, S74, S75, S80, S81, S82, S83 area; and W79 width.

The invention claimed is:

1. A stirring member configured to rotate around an axis of rotation in a prescribed first direction of rotation together with a rotor and to stir a stirred content accommodated in an inner pot, the stirring member comprising:

a first end portion pivotably supported by said rotor;

a second end portion located opposite to said first end portion; and a stirring portion located between said first end portion and said second end portion, a cross-sectional shape of said stirring portion in a cross-section orthogonal to said axis of rotation having a front end portion, as a leading end, located foremost in said direction of rotation, wherein when a virtual circle centered at said axis of rotation and passing through said front end portion is drawn, a tangential straight line, which is an extension of a centerline of said cross-sectional shape in said front end portion, being directed inward in a direction of radius of rotation toward said axis of rotation on a forward side of said direction of rotation with respect to a tangent of the virtual circle in said front end portion, said stirring portion forms a standing state in which said second end portion is arranged at a position distant from said rotor and a turned-down state in which said second end portion is arranged at a position in proximity to said rotor as said stirring portion pivots around said first end portion, said stirring portion is configured to be disposed in a content including a liquid and/or a solid while said stirring portion forms said standing state, and at least a section of said stirring portion proximate the second end portion includes a resistance surface oriented substantially at an angle obtuse to a second direction of rotation and away from the axis of rotation when in the standing state, the resistance surface of the stirring portion structured and oriented to receive at least a majority of a resistance force from said content against the stirring portion such that a major component of the resistance force received at the resistance surface is directed in a direction of pivoting of said stirring portion around said first end portion to facilitate a transition from said standing state to said turned-down state.

2. The stirring member according to claim 1, wherein said tangential straight line is directed inward in the direction of radius of rotation within a range not smaller than 5° and not larger than 50° on the forward side of said direction of rotation with respect to said tangent.

3. The stirring member according to claim 1, wherein said cross-sectional shape of said stirring portion is such that an interior angle formed in said front end portion is at an acute angle.

4. The stirring member according to claim 1, wherein said cross-sectional shape of said stirring portion has an outer surface located on an outer side of the direction of radius of rotation, and said outer surface is directed inward in the direction of radius of rotation with respect to said direction of rotation.

5. The stirring member according to claim 1, wherein said cross-sectional shape of said stirring portion is formed to decrease in width in the direction of radius of rotation, starting from a portion at some midpoint, between said front end portion and a trailing end portion of said stirring portion, in said direction of rotation as said stirring portion extends in a direction toward a direction opposite to said direction of rotation.

6. The stirring member according to claim 1, wherein a portion of said stirring portion closer to said second end portion is formed as being tapered so as to decrease in thickness toward said second end portion.

7. The stirring member according to claim 1, wherein a portion of said stirring portion closer to said second end portion has an extension portion formed, which extends inward in the direction of radius of rotation, toward said second end portion.

8. The stirring member according to claim 7, wherein said stirring portion has a rear edge portion located rearmost in said direction of rotation, and a portion of said rear edge portion closer to said second end portion is located on a rear side of said direction of rotation, relative to a portion of said rear edge portion closer to said first end portion.

9. The stirring member according to claim 8, wherein when a direction of extension of said extension portion is viewed in a direction in parallel to said axis of rotation, a reference line connecting a center of rotation of said extension portion and a base end of said extension portion in said direction of extension to each other is formed and an angle formed between said direction of extension and said reference line is not smaller than 0° and not larger than 90°.

10. The stirring member according to claim 1, wherein said stirring portion comes closer to said axis of rotation, from said first end portion toward said second end portion, and an angle formed between said stirring portion and a horizontal surface is not larger than 90°.

11. The stirring member according to claim 7, wherein said extension portion is formed as being curved toward said second end portion.

12. The stirring member according to claim 1, wherein said stirring portion has an outer geometry formed substantially in a scoop shape.

13. The stirring member according to claim 1, wherein a surface of said stirring portion has asperities formed.

14. A rotor, comprising:
the stirring member according to claim 1; and
another stirring member identical or different in shape to or from said stirring member.

15. A rotor, comprising:
the stirring member according to claim 1,
said stirring member being driven such that said second end portion vertically moves when said stirring member stirs said stirred object accommodated in said inner pot.

16. A rotor, comprising:
a frame member accommodating therein, at least one stirring member configured to rotate around an axis of rotation in a prescribed first direction of rotation together with the rotor and to stir a stirred object accommodated in an inner pot, the stirring member including,
a first end portion pivotably supported by said rotor;
a second end portion located opposite to said first end portion; and
a stirring portion located between said first end portion and said second end portion, a cross-sectional shape of said stirring portion in a cross-section orthogonal to said axis of rotation having a front end portion, as a leading end, located foremost in said direction of rotation, wherein when a virtual circle centered at said axis of rotation and passing through said front end portion is drawn, a tangential straight line, which is an extension of a centerline of said cross-sectional shape in said front end portion, being directed inward in a direction of radius of rotation toward said axis of rotation on a forward side of said direction of rotation with respect to a tangent of the virtual circle in said front end portion, said stirring portion forms a standing state in which said second end portion is arranged at a position distant from said rotor and a turned-down state in which said second end portion is arranged at a position in proximity to said rotor as said stirring portion pivots around said first end portion, said stirring portion is configured to be in a content including a liquid and/or a solid while said stirring portion forms said standing state, and at least a section of said stirring portion proximate the second end portion includes a resistance surface oriented substantially at an angle obtuse to a second direction of rotation and away from the axis of rotation when in the standing state, the resistance surface of the stirring portion structured and oriented to receive at least a majority of a resistance force from said content against the stirring portion such that a major component of the resistance force received at the resistance surface is directed in a direction of pivoting of said stirring portion around said first end portion to facilitate a transition from said standing state to said turned-down state.

17. A rice cooker, comprising:
at least one stirring member configured to rotate around an axis of rotation in a prescribed first direction of rotation together with a rotor and to stir a stirred object accommodated in an inner pot, the stirring member including;
  a first end portion pivotably supported by said rotor;
  a second end portion located opposite to said first end portion; and
  a stirring portion located between said first end portion and said second end portion, a cross-sectional shape of said stirring portion in a cross-section orthogonal to said axis of rotation having a front end portion, as a leading end, located foremost in said direction of rotation, wherein when a virtual circle centered at said axis of rotation and passing through said front end portion is drawn, a tangential straight line, which is an extension of a centerline of said cross-sectional shape in said front end portion, being directed inward in a direction of radius of rotation toward said axis of rotation on a forward side of said direction of rotation with respect to a tangent of the virtual circle in said front end portion, said stirring portion forms a standing state in which said second end portion is arranged at a position distant from said rotor and a turned-down state in which said second end portion is arranged at a position in proximity to said rotor as said stirring portion pivots around said first end portion, said stirring portion is configured to be in a content including a liquid and/or a solid while said stirring portion forms said standing state, and at least a section of said stirring portion proximate the second end portion includes a resistance surface oriented substantially at an angle obtuse to a second direction of rotation and away from the axis of rotation when in the standing state, the resistance surface of the stirring portion structured and oriented to receive at least a majority of a resistance force from said content against the stirring portion such that a major component of the resistance force received at the resistance surface is directed in a direction of pivoting of said stirring portion around said first end portion to facilitate a transition from said standing state to said turned-down state.

* * * * *